United States Patent
Carrigan et al.

(10) Patent No.: US 12,197,699 B2
(45) Date of Patent: Jan. 14, 2025

(54) USER INTERFACES FOR PLAYING AND MANAGING AUDIO ITEMS

(71) Applicant: Apple Inc., Cupertino, CA (US)

(72) Inventors: Taylor G. Carrigan, San Francisco, CA (US); Christopher Patrick Foss, San Francisco, CA (US); Stephen O. Lemay, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/848,845

(22) Filed: Jun. 24, 2022

(65) Prior Publication Data
US 2022/0326817 A1 Oct. 13, 2022

Related U.S. Application Data

(63) Continuation of application No. 17/176,908, filed on Feb. 16, 2021, now abandoned, which is a (Continued)

(51) Int. Cl.
G06F 3/0482 (2013.01)
G06F 3/0362 (2013.01)
(Continued)

(52) U.S. Cl.
CPC .......... *G06F 3/0482* (2013.01); *G06F 3/0362* (2013.01); *G06F 3/0488* (2013.01);
(Continued)

(58) Field of Classification Search
CPC ...... G06F 3/0482; G06F 3/0488; G06F 16/44; G06F 3/04883; G06F 2203/04808; G11B 27/34
See application file for complete search history.

(56) References Cited

U.S. PATENT DOCUMENTS 5,202,961 A  4/1993  Mills et al.
5,305,435 A  4/1994  Bronson
(Continued)

FOREIGN PATENT DOCUMENTS

AU  2007100826 A4  9/2007
AU  2008100011 A4  2/2008
(Continued)

OTHER PUBLICATIONS

S. Mitroff, "8 things you should know about Apple Music for Android," CNET website, dated Nov. 11, 2015, downloaded from https://www.cnet.com/tech/services-and-software/apple-music-for-android-what-to-know/ (Year: 2015).*

(Continued)

*Primary Examiner* — Eric J Yoon
(74) *Attorney, Agent, or Firm* — DLA Piper LLP (US)

(57) ABSTRACT

The present disclosure generally relates to playing and managing audio items. In some examples, an electronic device provides intuitive user interfaces for playing and managing audio items on the device. In some examples, an electronic device provides seamless transitioning from navigating a stack of items corresponding to groups of audio items to navigating a list of menus. In some examples, an electronic device provides for quick and easy access between different applications that are active on the device. In some examples, an electronic device enables automatic transmission of data associated with audio items to be stored locally on a linked external device.

27 Claims, 66 Drawing Sheets

Related U.S. Application Data continuation of application No. 15/730,610, filed on Oct. 11, 2017, now Pat. No. 10,928,980.

(60) Provisional application No. 62/505,760, filed on May 12, 2017.

(51) Int. Cl.

| | | |
|---|---|---|
| *G06F 3/0488* | (2022.01) | |
| *G06F 16/638* | (2019.01) | |
| *G06F 16/64* | (2019.01) | |
| *H04N 21/41* | (2011.01) | |
| *H04N 21/414* | (2011.01) | |
| *H04N 21/433* | (2011.01) | |
| *H04N 21/4363* | (2011.01) | |
| *H04N 21/458* | (2011.01) | |
| *H04N 21/472* | (2011.01) | |
| *H04N 21/482* | (2011.01) | |
| *H04N 21/81* | (2011.01) | |

(52) U.S. Cl.
CPC ............ *G06F 16/639* (2019.01); *G06F 16/64* (2019.01); *H04N 21/4126* (2013.01); *H04N 21/41407* (2013.01); *H04N 21/433* (2013.01); *H04N 21/43637* (2013.01); *H04N 21/4586* (2013.01); *H04N 21/47214* (2013.01); *H04N 21/4825* (2013.01); *H04N 21/8113* (2013.01); *H04N 21/8173* (2013.01)

(56) References Cited

U.S. PATENT DOCUMENTS

| | | |
|---|---|---|
| 5,347,628 A | 9/1994 | Welch et al. |
| 5,404,316 A | 4/1995 | Klingler et al. |
| 5,463,725 A | 10/1995 | Henckel et al. |
| 5,495,566 A | 2/1996 | Kwatinetz |
| 5,513,342 A | 4/1996 | Leong et al. |
| 5,519,828 A | 5/1996 | Rayner |
| 5,521,841 A | 5/1996 | Arman et al. |
| 5,557,724 A | 9/1996 | Sampat et al. |
| 5,568,603 A | 10/1996 | Chen et al. |
| 5,611,060 A | 3/1997 | Belfiore et al. |
| 5,614,940 A | 3/1997 | Cobbley et al. |
| 5,682,326 A | 10/1997 | Klingler et al. |
| 5,684,970 A | 11/1997 | Asuma et al. |
| 5,692,213 A | 11/1997 | Harrison et al. |
| 5,726,687 A | 3/1998 | Belfiore et al. |
| 5,732,184 A | 3/1998 | Chao et al. |
| 5,745,096 A | 4/1998 | Ludolph et al. |
| 5,751,260 A | 5/1998 | Nappi et al. |
| 5,754,174 A | 5/1998 | Carpenter et al. |
| 5,758,180 A | 5/1998 | Duffy et al. |
| 5,760,767 A | 6/1998 | Shore et al. |
| 5,760,772 A | 6/1998 | Austin |
| 5,778,053 A | 7/1998 | Skarbo et al. |
| 5,793,366 A | 8/1998 | Mano et al. |
| 5,841,971 A | 11/1998 | Longginou et al. |
| 5,864,868 A | 1/1999 | Contois |
| 5,872,566 A | 2/1999 | Bates et al. |
| 5,872,922 A | 2/1999 | Hogan et al. |
| 5,874,958 A | 2/1999 | Ludolph |
| 5,880,725 A | 3/1999 | Southgate |
| 5,880,733 A | 3/1999 | Horvitz et al. |
| 5,892,507 A | 4/1999 | Moorby |
| 5,936,623 A | 8/1999 | Amro |
| 5,999,173 A | 12/1999 | Ubillos |
| 6,011,537 A | 1/2000 | Slotznick |
| 6,016,248 A | 1/2000 | Anzai et al. |
| 6,023,275 A | 2/2000 | Horvitz et al. |
| 6,026,389 A | 2/2000 | Nakajima et al. |
| 6,031,529 A | 2/2000 | Migos et al. |
| 6,061,062 A | 5/2000 | Venolia |
| 6,072,503 A | 6/2000 | Tani et al. |
| 6,081,256 A | 6/2000 | Martin et al. |
| 6,094,197 A | 7/2000 | Buxton et al. |
| 6,115,037 A | 9/2000 | Sumiyoshi et al. |
| 6,118,450 A | 9/2000 | Proehl et al. |
| 6,166,736 A | 12/2000 | Hugh |
| 6,204,840 B1 | 3/2001 | Petelycky et al. |
| 6,208,342 B1 | 3/2001 | Mugura et al. |
| 6,236,400 B1 | 5/2001 | Guerrero |
| 6,262,724 B1 | 7/2001 | Crow et al. |
| 6,308,187 B1 | 10/2001 | Destefano |
| 6,310,613 B1 | 10/2001 | Tanaka et al. |
| 6,317,784 B1 | 11/2001 | Mackintosh et al. |
| 6,332,147 B1 | 12/2001 | Moran et al. |
| 6,351,765 B1 | 2/2002 | Pietropaolo et al. |
| 6,362,837 B1 | 3/2002 | Ginn |
| 6,363,395 B1 | 3/2002 | Tanaka et al. |
| 6,366,296 B1 | 4/2002 | Boreczky et al. |
| 6,369,835 B1 | 4/2002 | Lin |
| 6,393,430 B1 | 5/2002 | Van et al. |
| 6,446,080 B1 | 9/2002 | Van Ryzin et al. |
| 6,452,609 B1 | 9/2002 | Katinsky et al. |
| 6,456,305 B1 | 9/2002 | Qureshi et al. |
| 6,477,117 B1 | 11/2002 | Narayanaswami et al. |
| 6,489,951 B1 | 12/2002 | Wong et al. |
| 6,504,934 B1 | 1/2003 | Kasai et al. |
| 6,515,681 B1 | 2/2003 | Knight |
| 6,538,665 B2 | 3/2003 | Crow et al. |
| 6,544,295 B1 | 4/2003 | Bodnar et al. |
| 6,556,222 B1 | 4/2003 | Narayanaswami |
| 6,577,330 B1 | 6/2003 | Tsuda et al. |
| 6,584,479 B2 | 6/2003 | Chang et al. |
| 6,587,127 B1 | 7/2003 | Stojakovic et al. |
| 6,600,936 B1 | 7/2003 | Kärkkäinen et al. |
| 6,674,452 B1 | 1/2004 | Kraft et al. |
| 6,677,965 B1 | 1/2004 | Ullmann et al. |
| 6,725,427 B2 | 4/2004 | Freeman et al. |
| 6,833,848 B1 | 12/2004 | Wolff et al. |
| 6,834,371 B1 | 12/2004 | Jensen et al. |
| 6,850,256 B2 | 2/2005 | Crow et al. |
| 6,975,306 B2 | 12/2005 | Hinckley et al. |
| 7,081,905 B1 | 7/2006 | Raghunath |
| 7,091,964 B2 | 8/2006 | Wong et al. |
| 7,111,240 B2 | 9/2006 | Crow et al. |
| 7,191,411 B2 | 3/2007 | Moehrle |
| 7,240,297 B1 | 7/2007 | Anderson et al. |
| 7,315,984 B2 | 1/2008 | Crow et al. |
| 7,318,196 B2 | 1/2008 | Crow et al. |
| 7,441,207 B2 | 10/2008 | Filner |
| 7,458,025 B2 | 11/2008 | Crow et al. |
| 7,479,949 B2 | 1/2009 | Jobs et al. |
| 7,492,350 B2 | 2/2009 | Fabre et al. |
| 7,571,014 B1 | 8/2009 | Lambourne et al. |
| 7,581,186 B2 | 8/2009 | Dowdy et al. |
| 7,596,761 B2 | 9/2009 | Lemay et al. |
| 7,656,393 B2 | 2/2010 | King et al. |
| 7,710,393 B2 | 5/2010 | Tsuk |
| 7,750,893 B2 | 7/2010 | Hashimoto et al. |
| 7,831,054 B2 | 11/2010 | Ball et al. |
| 7,996,792 B2 | 8/2011 | Anzures et al. |
| 8,028,323 B2 | 9/2011 | Weel |
| 8,116,807 B2 | 2/2012 | Matas |
| 8,146,019 B2 | 3/2012 | Kim et al. |
| 8,196,043 B2 | 6/2012 | Crow et al. |
| 8,217,906 B2 | 7/2012 | Sinclair |
| 8,264,465 B2 | 9/2012 | Grant et al. |
| 8,280,539 B2 | 10/2012 | Jehan et al. |
| 8,290,603 B1 | 10/2012 | Lambourne |
| 8,305,356 B1 | 11/2012 | Jang |
| 8,458,780 B1 | 6/2013 | Takkallapally et al. |
| 8,462,961 B1 | 6/2013 | Bywaters et al. |
| 8,531,427 B2 | 9/2013 | Jang |
| 8,564,543 B2 | 10/2013 | Chaudhri |
| 8,572,513 B2 | 10/2013 | Chaudhri et al. |
| 8,587,528 B2 | 11/2013 | Chaudhri |
| 8,589,823 B2 | 11/2013 | Lemay et al. |
| 8,689,128 B2 | 4/2014 | Chaudhri et al. |
| 8,698,762 B2 | 4/2014 | Wagner et al. |
| 8,736,557 B2 | 5/2014 | Chaudhri et al. |
| 8,830,181 B1 | 9/2014 | Clark et al. |

(56) References Cited

U.S. PATENT DOCUMENTS

| | | |
|---|---|---|
| 8,860,674 B2 | 10/2014 | Lee et al. |
| 8,875,046 B2 | 10/2014 | Jitkoff |
| 8,914,752 B1 | 12/2014 | Spiegel |
| 8,943,410 B2 | 1/2015 | Ubillos |
| 8,984,431 B2 | 3/2015 | Newman et al. |
| 9,042,556 B2 | 5/2015 | Kallai et al. |
| 9,080,736 B1 | 7/2015 | Salzinger et al. |
| 9,084,003 B1 | 7/2015 | Sanio et al. |
| 9,112,849 B1 | 8/2015 | Werkelin Ahlin et al. |
| 9,134,902 B2 | 9/2015 | Kang et al. |
| 9,185,062 B1 | 11/2015 | Yang et al. |
| 9,195,219 B2 | 11/2015 | Hong et al. |
| 9,202,509 B2 | 12/2015 | Kallai et al. |
| 9,244,584 B2 | 1/2016 | Fino |
| 9,247,363 B2 | 1/2016 | Triplett et al. |
| 9,251,787 B1 | 2/2016 | Hart et al. |
| 9,294,853 B1 | 3/2016 | Dhaundiyal |
| 9,319,782 B1 | 4/2016 | Crump et al. |
| 9,329,831 B1 | 5/2016 | Fullerton et al. |
| 9,374,607 B2 | 6/2016 | Bates et al. |
| 9,395,905 B2 | 7/2016 | Wherry |
| D765,118 S | 8/2016 | Bachman et al. |
| 9,431,021 B1 | 8/2016 | Scalise et al. |
| 9,450,812 B2 | 9/2016 | Lee et al. |
| 9,489,106 B2 | 11/2016 | Chaudhri et al. |
| D773,510 S | 12/2016 | Foss et al. |
| 9,519,413 B2 | 12/2016 | Bates |
| 9,588,661 B1 | 3/2017 | Jauhal et al. |
| 9,628,414 B1 | 4/2017 | Umapathy et al. |
| D789,381 S | 6/2017 | Okumura et al. |
| 9,710,639 B1 | 7/2017 | Saini |
| 9,727,749 B2 | 8/2017 | Tzeng et al. |
| 9,794,720 B1 | 10/2017 | Kadri |
| 9,798,443 B1 | 10/2017 | Gray |
| 9,820,323 B1 | 11/2017 | Young et al. |
| 9,898,250 B1 | 2/2018 | Williams et al. |
| 9,954,989 B2 | 4/2018 | Zhou |
| 10,104,089 B2 | 10/2018 | Kim et al. |
| 10,129,044 B2 | 11/2018 | Kangshang et al. |
| 10,157,040 B2 | 12/2018 | Ballinger et al. |
| 10,182,138 B2 | 1/2019 | Motika et al. |
| 10,198,563 B2 | 2/2019 | Wang et al. |
| 10,200,468 B2 | 2/2019 | Leban et al. |
| 10,284,980 B1 | 5/2019 | Woo et al. |
| 10,299,300 B1 | 5/2019 | Young |
| 10,300,394 B1 | 5/2019 | Evans et al. |
| 10,339,769 B2 | 7/2019 | Mixter et al. |
| 10,374,804 B2 | 8/2019 | Lee et al. |
| 10,523,625 B1 | 12/2019 | Allen et al. |
| 10,524,300 B2 | 12/2019 | Ueda et al. |
| 10,705,701 B2 | 7/2020 | Pisula et al. |
| 10,713,699 B1 | 7/2020 | Lien et al. |
| 10,732,819 B2 | 8/2020 | Wang et al. |
| 10,742,645 B2 | 8/2020 | Hevizi et al. |
| 10,742,648 B2 | 8/2020 | Magyar et al. |
| 10,783,883 B2 | 9/2020 | Mixter et al. |
| 10,824,299 B2 | 11/2020 | Bai |
| 10,833,887 B2 | 11/2020 | Wu |
| 10,924,446 B1 | 2/2021 | Paul |
| 10,929,099 B2 | 2/2021 | Querze et al. |
| 10,963,145 B1 | 3/2021 | Voss et al. |
| 11,024,303 B1 | 6/2021 | Devaraj et al. |
| 11,079,913 B1 | 8/2021 | Kim et al. |
| 11,164,580 B2 | 11/2021 | Kraker |
| 11,176,940 B1 | 11/2021 | Zhong et al. |
| 11,283,916 B2 | 3/2022 | Coffman et al. |
| 11,316,709 B2 | 4/2022 | Brown et al. |
| 11,343,370 B1 | 5/2022 | Gordon et al. |
| 11,343,613 B2 | 5/2022 | Gordon et al. |
| 11,431,834 B1 | 8/2022 | Gordon et al. |
| 11,463,576 B1 | 10/2022 | Gordon et al. |
| 11,523,166 B1 | 12/2022 | Tu et al. |
| 12,014,118 B2 | 6/2024 | Gruber et al. |
| 12,085,421 B2 | 9/2024 | Yedid et al. |
| 2001/0030597 A1 | 10/2001 | Inoue et al. |
| 2001/0043514 A1 | 11/2001 | Kita et al. |
| 2001/0050687 A1 | 12/2001 | Iida et al. |
| 2002/0002039 A1 | 1/2002 | Qureshey et al. |
| 2002/0054158 A1 | 5/2002 | Asami |
| 2002/0054164 A1 | 5/2002 | Uemura |
| 2002/0057262 A1 | 5/2002 | Patrick et al. |
| 2002/0080151 A1 | 6/2002 | Venolia |
| 2002/0122066 A1 | 9/2002 | Bates et al. |
| 2002/0137565 A1 | 9/2002 | Blanco |
| 2002/0154173 A1 | 10/2002 | Etgen et al. |
| 2002/0168938 A1 | 11/2002 | Chang |
| 2002/0191028 A1 | 12/2002 | Senechalle et al. |
| 2002/0198909 A1 | 12/2002 | Huynh et al. |
| 2003/0028382 A1 | 2/2003 | Chambers et al. |
| 2003/0030673 A1 | 2/2003 | Ho |
| 2003/0052901 A1 | 3/2003 | Fukuchi |
| 2003/0067908 A1 | 4/2003 | Mattaway et al. |
| 2003/0076301 A1 | 4/2003 | Tsuk et al. |
| 2003/0112938 A1 | 6/2003 | Kanakubo et al. |
| 2003/0122787 A1 | 7/2003 | Zimmerman et al. |
| 2003/0128192 A1 | 7/2003 | Van Os |
| 2004/0027371 A1 | 2/2004 | Jaeger |
| 2004/0032955 A1 | 2/2004 | Hashimoto et al. |
| 2004/0055446 A1 | 3/2004 | Robbin et al. |
| 2004/0056837 A1 | 3/2004 | Koga et al. |
| 2004/0100479 A1 | 5/2004 | Nakano et al. |
| 2004/0104896 A1 | 6/2004 | Suraqui |
| 2004/0122683 A1 | 6/2004 | Grossman et al. |
| 2004/0125088 A1 | 7/2004 | Zimmerman et al. |
| 2004/0130581 A1 | 7/2004 | Howard et al. |
| 2004/0139398 A1 | 7/2004 | Testa et al. |
| 2004/0140956 A1 | 7/2004 | Kushler et al. |
| 2004/0155907 A1 | 8/2004 | Yamaguchi et al. |
| 2004/0168118 A1 | 8/2004 | Wong et al. |
| 2004/0189714 A1 | 9/2004 | Fox et al. |
| 2004/0235520 A1 | 11/2004 | Cadiz et al. |
| 2004/0237048 A1 | 11/2004 | Tojo et al. |
| 2004/0250217 A1 | 12/2004 | Tojo et al. |
| 2004/0261010 A1 | 12/2004 | Matsuishi |
| 2004/0264916 A1 | 12/2004 | Van et al. |
| 2004/0268400 A1 | 12/2004 | Barde et al. |
| 2005/0012723 A1 | 1/2005 | Pallakoff |
| 2005/0021418 A1 | 1/2005 | Marcus et al. |
| 2005/0024341 A1 | 2/2005 | Gillespie et al. |
| 2005/0052458 A1 | 3/2005 | Lambert |
| 2005/0144247 A1 | 6/2005 | Christensen et al. |
| 2005/0144568 A1 | 6/2005 | Gruen et al. |
| 2005/0146534 A1 | 7/2005 | Fong et al. |
| 2005/0160372 A1 | 7/2005 | Gruen et al. |
| 2005/0162402 A1 | 7/2005 | Watanachote |
| 2005/0177445 A1 | 8/2005 | Church |
| 2005/0181774 A1 | 8/2005 | Miyata |
| 2005/0192924 A1 | 9/2005 | Drucker et al. |
| 2005/0210412 A1 | 9/2005 | Matthews et al. |
| 2005/0216839 A1 | 9/2005 | Salvucci |
| 2005/0229112 A1 | 10/2005 | Clay et al. |
| 2005/0240756 A1 | 10/2005 | Mayer |
| 2005/0275628 A1 | 12/2005 | Balakrishnan et al. |
| 2006/0001645 A1 | 1/2006 | Drucker et al. |
| 2006/0002523 A1 | 1/2006 | Bettis et al. |
| 2006/0020904 A1 | 1/2006 | Aaltonen et al. |
| 2006/0026535 A1 | 2/2006 | Hotelling et al. |
| 2006/0026536 A1 | 2/2006 | Hotelling et al. |
| 2006/0038796 A1 | 2/2006 | Hinckley et al. |
| 2006/0050054 A1 | 3/2006 | Liang et al. |
| 2006/0085751 A1 | 4/2006 | O'brien et al. |
| 2006/0085766 A1 | 4/2006 | Dominowska et al. |
| 2006/0125799 A1 | 6/2006 | Hillis et al. |
| 2006/0132460 A1 | 6/2006 | Kolmykov-zotov et al. |
| 2006/0132469 A1 | 6/2006 | Lai et al. |
| 2006/0146074 A1 | 7/2006 | Harrison |
| 2006/0148455 A1 | 7/2006 | Kim |
| 2006/0161621 A1 | 7/2006 | Rosenberg |
| 2006/0161870 A1 | 7/2006 | Hotelling et al. |
| 2006/0161871 A1 | 7/2006 | Hotelling et al. |
| 2006/0176278 A1 | 8/2006 | Mathews et al. |
| 2006/0178110 A1 | 8/2006 | Nurminen et al. |
| 2006/0197753 A1 | 9/2006 | Hotelling |
| 2006/0227106 A1 | 10/2006 | Hashimoto et al. |

(56) References Cited

U.S. PATENT DOCUMENTS

| | | |
|---|---|---|
| 2006/0246874 A1 | 11/2006 | Sullivan |
| 2006/0256090 A1 | 11/2006 | Huppi |
| 2006/0258289 A1 | 11/2006 | Dua |
| 2006/0268020 A1 | 11/2006 | Han |
| 2006/0271864 A1 | 11/2006 | Satterfield et al. |
| 2006/0271867 A1 | 11/2006 | Wang et al. |
| 2006/0279541 A1 | 12/2006 | Kim et al. |
| 2006/0281449 A1 | 12/2006 | Kun et al. |
| 2006/0286971 A1 | 12/2006 | Maly et al. |
| 2007/0011614 A1 | 1/2007 | Crow et al. |
| 2007/0013671 A1 | 1/2007 | Zadesky et al. |
| 2007/0027682 A1 | 2/2007 | Bennett |
| 2007/0033295 A1 | 2/2007 | Marriott |
| 2007/0053268 A1 | 3/2007 | Crandall et al. |
| 2007/0070045 A1 | 3/2007 | Sung et al. |
| 2007/0070066 A1 | 3/2007 | Bakhash |
| 2007/0085841 A1 | 4/2007 | Tsuk et al. |
| 2007/0097090 A1 | 5/2007 | Battles |
| 2007/0097093 A1 | 5/2007 | Ohshita et al. |
| 2007/0113294 A1 | 5/2007 | Field et al. |
| 2007/0124680 A1 | 5/2007 | Robbin et al. |
| 2007/0126715 A1 | 6/2007 | Funamoto |
| 2007/0136679 A1 | 6/2007 | Yang |
| 2007/0152979 A1 | 7/2007 | Jobs et al. |
| 2007/0157094 A1 | 7/2007 | Lemay et al. |
| 2007/0168369 A1 | 7/2007 | Bruns |
| 2007/0168413 A1 | 7/2007 | Barletta et al. |
| 2007/0191008 A1 | 8/2007 | Bucher et al. |
| 2007/0192744 A1 | 8/2007 | Reponen |
| 2007/0198111 A1 | 8/2007 | Oetzel et al. |
| 2007/0226645 A1 | 9/2007 | Kongqiao et al. |
| 2008/0016468 A1 | 1/2008 | Chambers et al. |
| 2008/0034289 A1 | 2/2008 | Doepke et al. |
| 2008/0036743 A1 | 2/2008 | Westerman et al. |
| 2008/0037951 A1 | 2/2008 | Cho et al. |
| 2008/0055264 A1 | 3/2008 | Anzures et al. |
| 2008/0062141 A1 | 3/2008 | Chaudhri |
| 2008/0066016 A1 | 3/2008 | Dowdy et al. |
| 2008/0075368 A1 | 3/2008 | Kuzmin |
| 2008/0081558 A1 | 4/2008 | Dunko et al. |
| 2008/0082939 A1 | 4/2008 | Nash et al. |
| 2008/0084400 A1 | 4/2008 | Rosenberg |
| 2008/0091717 A1 | 4/2008 | Garbow et al. |
| 2008/0094367 A1 | 4/2008 | Van De Ven et al. |
| 2008/0109764 A1 | 5/2008 | Linnamaki |
| 2008/0122794 A1 | 5/2008 | Koiso et al. |
| 2008/0122796 A1 | 5/2008 | Jobs et al. |
| 2008/0126935 A1 | 5/2008 | Blomgren |
| 2008/0155413 A1 | 6/2008 | Ubillos et al. |
| 2008/0155417 A1 | 6/2008 | Vallone et al. |
| 2008/0155474 A1 | 6/2008 | Duhig et al. |
| 2008/0158170 A1 | 7/2008 | Herz et al. |
| 2008/0163127 A1 | 7/2008 | Newell et al. |
| 2008/0165141 A1 | 7/2008 | Christie |
| 2008/0165152 A1 | 7/2008 | Forstall et al. |
| 2008/0165153 A1 | 7/2008 | Platzer et al. |
| 2008/0168185 A1 | 7/2008 | Robbin et al. |
| 2008/0168384 A1 | 7/2008 | Platzer et al. |
| 2008/0168395 A1 | 7/2008 | Ording et al. |
| 2008/0168403 A1 | 7/2008 | Westerman et al. |
| 2008/0190266 A1 | 8/2008 | Kim et al. |
| 2008/0209468 A1 | 8/2008 | Milosevski |
| 2008/0222546 A1 | 9/2008 | Mudd et al. |
| 2008/0225007 A1 | 9/2008 | Nakadaira et al. |
| 2008/0225013 A1 | 9/2008 | Muylkens et al. |
| 2008/0250319 A1 | 10/2008 | Lee et al. |
| 2008/0273712 A1 | 11/2008 | Eichfeld et al. |
| 2008/0273713 A1 | 11/2008 | Hartung et al. |
| 2008/0285772 A1 | 11/2008 | Haulick et al. |
| 2008/0320391 A1 | 12/2008 | Lemay et al. |
| 2009/0002335 A1 | 1/2009 | Chaudhri |
| 2009/0002396 A1 | 1/2009 | Andrews et al. |
| 2009/0006958 A1 | 1/2009 | Pohjola et al. |
| 2009/0007188 A1 | 1/2009 | Omernick |
| 2009/0055377 A1 | 2/2009 | Hedge et al. |
| 2009/0058822 A1 | 3/2009 | Chaudhri |
| 2009/0061837 A1 | 3/2009 | Chaudhri et al. |
| 2009/0066648 A1 | 3/2009 | Kerr et al. |
| 2009/0075694 A1 | 3/2009 | Kim et al. |
| 2009/0077491 A1 | 3/2009 | Kim |
| 2009/0125571 A1 | 5/2009 | Kiilerich et al. |
| 2009/0128500 A1 | 5/2009 | Sinclair |
| 2009/0140991 A1 | 6/2009 | Takasaki et al. |
| 2009/0144391 A1 | 6/2009 | Jung et al. |
| 2009/0144623 A1 | 6/2009 | Jung |
| 2009/0174677 A1 | 7/2009 | Gehani et al. |
| 2009/0174680 A1 | 7/2009 | Anzures et al. |
| 2009/0177966 A1 | 7/2009 | Chaudhri |
| 2009/0198359 A1 | 8/2009 | Chaudhri |
| 2009/0199119 A1 | 8/2009 | Park et al. |
| 2009/0199130 A1 | 8/2009 | Tsern et al. |
| 2009/0204920 A1 | 8/2009 | Beverley et al. |
| 2009/0204929 A1 | 8/2009 | Baurmann et al. |
| 2009/0304205 A1 | 12/2009 | Hardacker et al. |
| 2009/0307633 A1 | 12/2009 | Haughay et al. |
| 2009/0322695 A1 | 12/2009 | Cho et al. |
| 2010/0001967 A1 | 1/2010 | Yoo |
| 2010/0004031 A1 | 1/2010 | Kim |
| 2010/0005421 A1 | 1/2010 | Yoshioka |
| 2010/0017474 A1 | 1/2010 | Kandekar et al. |
| 2010/0054497 A1 | 3/2010 | Bull et al. |
| 2010/0058228 A1 | 3/2010 | Park |
| 2010/0058253 A1 | 3/2010 | Son |
| 2010/0070490 A1 | 3/2010 | Amidon et al. |
| 2010/0085379 A1 | 4/2010 | Hishikawa et al. |
| 2010/0088634 A1 | 4/2010 | Tsuruta et al. |
| 2010/0088639 A1 | 4/2010 | Yach et al. |
| 2010/0106647 A1 | 4/2010 | Raman |
| 2010/0121636 A1 | 5/2010 | Burke et al. |
| 2010/0122195 A1 | 5/2010 | Hwang |
| 2010/0178873 A1 | 7/2010 | Lee et al. |
| 2010/0205563 A1 | 8/2010 | Haapsaari et al. |
| 2010/0229094 A1 | 9/2010 | Nakajima et al. |
| 2010/0231534 A1 | 9/2010 | Chaudhri et al. |
| 2010/0231535 A1 | 9/2010 | Chaudhri et al. |
| 2010/0231536 A1 | 9/2010 | Chaudhri et al. |
| 2010/0231537 A1 | 9/2010 | Pisula et al. |
| 2010/0235729 A1 | 9/2010 | Kocienda et al. |
| 2010/0235746 A1 | 9/2010 | Anzures et al. |
| 2010/0251304 A1 | 9/2010 | Donoghue et al. |
| 2010/0257484 A1 | 10/2010 | Nakamura et al. |
| 2010/0259482 A1 | 10/2010 | Ball |
| 2010/0283743 A1 | 11/2010 | Coddington |
| 2010/0284389 A1 | 11/2010 | Ramsay et al. |
| 2010/0293598 A1 | 11/2010 | Collart et al. |
| 2010/0296678 A1 | 11/2010 | Kuhn-rahloff et al. |
| 2010/0299639 A1 | 11/2010 | Ramsay et al. |
| 2010/0302172 A1 | 12/2010 | Wilairat et al. |
| 2010/0306657 A1 | 12/2010 | Derbyshire et al. |
| 2010/0318908 A1 | 12/2010 | Neuman et al. |
| 2010/0318928 A1 | 12/2010 | Neuman et al. |
| 2010/0318939 A1 | 12/2010 | Moon |
| 2010/0321201 A1 | 12/2010 | Huang et al. |
| 2011/0126148 A1 | 5/2011 | Krishnaraj et al. |
| 2011/0131537 A1 | 6/2011 | Cho et al. |
| 2011/0138284 A1 | 6/2011 | Wigdor et al. |
| 2011/0159469 A1 | 6/2011 | Hwang et al. |
| 2011/0159927 A1 | 6/2011 | Choi |
| 2011/0163971 A1 | 7/2011 | Wagner et al. |
| 2011/0164042 A1 | 7/2011 | Chaudhri |
| 2011/0209099 A1 | 8/2011 | Hinckley et al. |
| 2011/0242002 A1 | 10/2011 | Kaplan et al. |
| 2011/0246942 A1 | 10/2011 | Misawa |
| 2011/0283334 A1 | 11/2011 | Choi et al. |
| 2011/0291971 A1 | 12/2011 | Masaki et al. |
| 2011/0302493 A1 | 12/2011 | Runstedler et al. |
| 2012/0004920 A1 | 1/2012 | Kelly et al. |
| 2012/0011437 A1 | 1/2012 | James et al. |
| 2012/0050185 A1 | 3/2012 | Davydov et al. |
| 2012/0051560 A1 | 3/2012 | Sanders |
| 2012/0054278 A1 | 3/2012 | Taleb et al. |
| 2012/0084697 A1 | 4/2012 | Reeves |
| 2012/0089951 A1 | 4/2012 | Cassidy |
| 2012/0110455 A1 | 5/2012 | Sharma et al. |

(56) References Cited

U.S. PATENT DOCUMENTS

| | | |
|---|---|---|
| 2012/0115608 A1 | 5/2012 | Pfeifer et al. |
| 2012/0131459 A1 | 5/2012 | Ilama-vaquero et al. |
| 2012/0178431 A1 | 7/2012 | Gold |
| 2012/0197419 A1 | 8/2012 | Dhruv et al. |
| 2012/0210226 A1 | 8/2012 | Mccoy et al. |
| 2012/0222092 A1 | 8/2012 | Rabii |
| 2012/0223959 A1 | 9/2012 | Lengeling et al. |
| 2012/0260169 A1 | 10/2012 | Schwartz et al. |
| 2012/0272145 A1 | 10/2012 | Ryan et al. |
| 2012/0272230 A1 | 10/2012 | Lee |
| 2012/0294118 A1 | 11/2012 | Haulick et al. |
| 2012/0304111 A1 | 11/2012 | Queru et al. |
| 2012/0311444 A1 | 12/2012 | Chaudhri |
| 2012/0324390 A1 | 12/2012 | Tao et al. |
| 2013/0002589 A1 | 1/2013 | Jang |
| 2013/0007617 A1 | 1/2013 | Mackenzie et al. |
| 2013/0022221 A1 | 1/2013 | Kallai et al. |
| 2013/0027289 A1 | 1/2013 | Choi et al. |
| 2013/0047084 A1 | 2/2013 | Sanders et al. |
| 2013/0051755 A1 | 2/2013 | Brown et al. |
| 2013/0053107 A1 | 2/2013 | Kang et al. |
| 2013/0055082 A1 | 2/2013 | Fino et al. |
| 2013/0055150 A1 | 2/2013 | Galor |
| 2013/0073584 A1 | 3/2013 | Kuper et al. |
| 2013/0080516 A1 | 3/2013 | Bologh |
| 2013/0080955 A1 | 3/2013 | Reimann et al. |
| 2013/0094666 A1 | 4/2013 | Haaff et al. |
| 2013/0094770 A1 | 4/2013 | Lee et al. |
| 2013/0111407 A1 | 5/2013 | Mullen |
| 2013/0117693 A1 | 5/2013 | Anderson et al. |
| 2013/0124207 A1 | 5/2013 | Sarin et al. |
| 2013/0132865 A1 | 5/2013 | Li |
| 2013/0138272 A1 | 5/2013 | Louise-babando et al. |
| 2013/0159858 A1 | 6/2013 | Joffray et al. |
| 2013/0162411 A1 | 6/2013 | Moses et al. |
| 2013/0173794 A1 | 7/2013 | Agerbak et al. |
| 2013/0191220 A1 | 7/2013 | Dent et al. |
| 2013/0191454 A1 | 7/2013 | Oliver et al. |
| 2013/0194476 A1 | 8/2013 | Shimosato |
| 2013/0205375 A1 | 8/2013 | Woxblom et al. |
| 2013/0246522 A1 | 9/2013 | Bilinski et al. |
| 2013/0246916 A1 | 9/2013 | Reimann et al. |
| 2013/0268593 A1 | 10/2013 | Parekh |
| 2013/0275881 A1 | 10/2013 | Hahm et al. |
| 2013/0282180 A1 | 10/2013 | Layton |
| 2013/0305354 A1 | 11/2013 | King et al. |
| 2013/0322634 A1 | 12/2013 | Bennett et al. |
| 2013/0324081 A1 | 12/2013 | Gargi et al. |
| 2013/0329924 A1 | 12/2013 | Fleizach et al. |
| 2013/0339343 A1 | 12/2013 | Hierons et al. |
| 2013/0346859 A1 | 12/2013 | Bates et al. |
| 2013/0347022 A1 | 12/2013 | Bates et al. |
| 2014/0033035 A1 | 1/2014 | Crow et al. |
| 2014/0037107 A1 | 2/2014 | Marino et al. |
| 2014/0040742 A1 | 2/2014 | Park et al. |
| 2014/0046464 A1 | 2/2014 | Reimann |
| 2014/0047020 A1 | 2/2014 | Matus et al. |
| 2014/0049447 A1 | 2/2014 | Choi |
| 2014/0072282 A1 | 3/2014 | Cho |
| 2014/0075311 A1 | 3/2014 | Boettcher et al. |
| 2014/0080416 A1 | 3/2014 | Seo et al. |
| 2014/0114966 A1 | 4/2014 | Bilinski et al. |
| 2014/0139422 A1 | 5/2014 | Mistry et al. |
| 2014/0139637 A1 | 5/2014 | Mistry et al. |
| 2014/0143737 A1 | 5/2014 | Mistry et al. |
| 2014/0157160 A1 | 6/2014 | Cudak et al. |
| 2014/0176298 A1 | 6/2014 | Kumar et al. |
| 2014/0181202 A1 | 6/2014 | Gossain |
| 2014/0181654 A1 | 6/2014 | Kumar et al. |
| 2014/0207707 A1 | 7/2014 | Na et al. |
| 2014/0215413 A1 | 7/2014 | Calkins et al. |
| 2014/0229835 A1 | 8/2014 | Ravine |
| 2014/0237361 A1 | 8/2014 | Martin et al. |
| 2014/0267002 A1 | 9/2014 | Luna |
| 2014/0267911 A1 | 9/2014 | Grant et al. |
| 2014/0270183 A1 | 9/2014 | Luna |
| 2014/0334644 A1 | 11/2014 | Selig et al. |
| 2014/0335789 A1 | 11/2014 | Cohen et al. |
| 2014/0337791 A1 | 11/2014 | Agnetta et al. |
| 2014/0362293 A1 | 12/2014 | Bakar et al. |
| 2014/0363024 A1 | 12/2014 | Apodaca |
| 2014/0364056 A1 | 12/2014 | Belk et al. |
| 2014/0365904 A1 | 12/2014 | Kim et al. |
| 2015/0032812 A1 | 1/2015 | Dudley |
| 2015/0033361 A1 | 1/2015 | Choi et al. |
| 2015/0040012 A1 | 2/2015 | Faaborg et al. |
| 2015/0049591 A1 | 2/2015 | Adams et al. |
| 2015/0052222 A1 | 2/2015 | Farrell et al. |
| 2015/0058744 A1 | 2/2015 | Dhingra et al. |
| 2015/0067803 A1 | 3/2015 | Alduaiji |
| 2015/0089359 A1 | 3/2015 | Brisebois |
| 2015/0095804 A1 | 4/2015 | Grossman et al. |
| 2015/0100623 A1 | 4/2015 | Gudell et al. |
| 2015/0113407 A1 | 4/2015 | Hoffert et al. |
| 2015/0130737 A1 | 5/2015 | Im et al. |
| 2015/0135049 A1 | 5/2015 | Murphy |
| 2015/0138101 A1 | 5/2015 | Park et al. |
| 2015/0148927 A1 | 5/2015 | Georges et al. |
| 2015/0149599 A1 | 5/2015 | Caunter et al. |
| 2015/0160856 A1 | 6/2015 | Jang et al. |
| 2015/0177914 A1 | 6/2015 | Coyner et al. |
| 2015/0189426 A1 | 7/2015 | Pang |
| 2015/0193130 A1 | 7/2015 | Cho et al. |
| 2015/0193196 A1 | 7/2015 | Lin et al. |
| 2015/0200715 A1 | 7/2015 | Oiwa et al. |
| 2015/0205511 A1 | 7/2015 | Vinna et al. |
| 2015/0205971 A1 | 7/2015 | Sanio et al. |
| 2015/0206529 A1 | 7/2015 | Kwon et al. |
| 2015/0215382 A1 | 7/2015 | Arora et al. |
| 2015/0222615 A1 | 8/2015 | Allain et al. |
| 2015/0222680 A1 | 8/2015 | Grover |
| 2015/0223005 A1 | 8/2015 | Hardman et al. |
| 2015/0229650 A1 | 8/2015 | Grigg et al. |
| 2015/0229782 A1 | 8/2015 | Zuidema et al. |
| 2015/0242065 A1 | 8/2015 | Ko et al. |
| 2015/0242073 A1 | 8/2015 | Munoz et al. |
| 2015/0242597 A1 | 8/2015 | Danciu |
| 2015/0242611 A1 | 8/2015 | Cotterill |
| 2015/0242837 A1 | 8/2015 | Yarbrough et al. |
| 2015/0243163 A1 | 8/2015 | Shoemake |
| 2015/0248268 A1 | 9/2015 | Kumar et al. |
| 2015/0253960 A1 | 9/2015 | Lin et al. |
| 2015/0261493 A1 | 9/2015 | Lemmon et al. |
| 2015/0264304 A1 | 9/2015 | Chastney et al. |
| 2015/0286360 A1 | 10/2015 | Wachter |
| 2015/0309768 A1 | 10/2015 | Van Der Heide |
| 2015/0312299 A1 | 10/2015 | Chen |
| 2015/0319006 A1 | 11/2015 | Plummer et al. |
| 2015/0324552 A1 | 11/2015 | Beckhardt |
| 2015/0347738 A1 | 12/2015 | Ulrich et al. |
| 2015/0355816 A1 | 12/2015 | Shim |
| 2015/0355818 A1 | 12/2015 | Corbin |
| 2015/0355879 A1 | 12/2015 | Beckhardt et al. |
| 2015/0356278 A1 | 12/2015 | Britt et al. |
| 2015/0358043 A1 | 12/2015 | Jeong et al. |
| 2015/0358304 A1 | 12/2015 | Beckhardt et al. |
| 2015/0370426 A1 | 12/2015 | Carrigan et al. |
| 2015/0370455 A1 | 12/2015 | Van Os et al. |
| 2015/0373172 A1 | 12/2015 | Boesen |
| 2015/0373178 A1 | 12/2015 | Felt et al. |
| 2015/0378522 A1 | 12/2015 | Butts |
| 2016/0004393 A1 | 1/2016 | Faaborg et al. |
| 2016/0004417 A1 | 1/2016 | Bates |
| 2016/0011850 A1 | 1/2016 | Sheen et al. |
| 2016/0026429 A1 | 1/2016 | Triplett |
| 2016/0029146 A1 | 1/2016 | Tembey et al. |
| 2016/0048705 A1 | 2/2016 | Yang |
| 2016/0050476 A1 | 2/2016 | Patil |
| 2016/0054710 A1 | 2/2016 | Jo et al. |
| 2016/0062487 A1 | 3/2016 | Foss et al. |
| 2016/0062567 A1 | 3/2016 | Yang et al. |
| 2016/0062589 A1 | 3/2016 | Wan et al. |
| 2016/0062606 A1 | 3/2016 | Vega et al. |
| 2016/0062719 A1 | 3/2016 | Romano et al. |

(56) References Cited

U.S. PATENT DOCUMENTS

| | | |
|---|---|---|
| 2016/0077734 A1 | 3/2016 | Buxton et al. |
| 2016/0088039 A1 | 3/2016 | Millington et al. |
| 2016/0092072 A1 | 3/2016 | So et al. |
| 2016/0099901 A1 | 4/2016 | Allen et al. |
| 2016/0127799 A1 | 5/2016 | Alsina et al. |
| 2016/0134942 A1 | 5/2016 | Lo |
| 2016/0142763 A1 | 5/2016 | Kim et al. |
| 2016/0150624 A1 | 5/2016 | Meerbeek et al. |
| 2016/0155443 A1 | 6/2016 | Khan et al. |
| 2016/0156687 A1 | 6/2016 | Leung |
| 2016/0156957 A1 | 6/2016 | Yun |
| 2016/0156992 A1 | 6/2016 | Kuper |
| 2016/0162252 A1 | 6/2016 | Di Censo et al. |
| 2016/0183046 A1 | 6/2016 | Kwon |
| 2016/0196042 A1 | 7/2016 | Laute et al. |
| 2016/0196106 A1 | 7/2016 | Hammer et al. |
| 2016/0202866 A1 | 7/2016 | Zambetti |
| 2016/0209939 A1 | 7/2016 | Zambetti et al. |
| 2016/0210983 A1 | 7/2016 | Amada et al. |
| 2016/0231902 A1 | 8/2016 | Sirpal et al. |
| 2016/0239167 A1 | 8/2016 | Reimann et al. |
| 2016/0241983 A1 | 8/2016 | Lambourne et al. |
| 2016/0246566 A1 | 8/2016 | Fullerton et al. |
| 2016/0253145 A1 | 9/2016 | Lee et al. |
| 2016/0267319 A1 | 9/2016 | Murillo et al. |
| 2016/0277903 A1 | 9/2016 | Poosala et al. |
| 2016/0291824 A1 | 10/2016 | Grossman et al. |
| 2016/0291924 A1 | 10/2016 | Bierbower et al. |
| 2016/0295340 A1 | 10/2016 | Baker et al. |
| 2016/0299669 A1 | 10/2016 | Bates |
| 2016/0299736 A1 | 10/2016 | Bates et al. |
| 2016/0320849 A1 | 11/2016 | Koo |
| 2016/0335041 A1 | 11/2016 | Wachter et al. |
| 2016/0336531 A1 | 11/2016 | Yokoyama |
| 2016/0342386 A1 | 11/2016 | Kallai et al. |
| 2016/0345039 A1 | 11/2016 | Billmeyer |
| 2016/0350839 A1 | 12/2016 | Avidor et al. |
| 2016/0351191 A1 | 12/2016 | Vilermo et al. |
| 2016/0357507 A1 | 12/2016 | Decker et al. |
| 2016/0360344 A1 | 12/2016 | Shim et al. |
| 2016/0364600 A1 | 12/2016 | Shah et al. |
| 2016/0366531 A1 | 12/2016 | Popova |
| 2016/0372113 A1 | 12/2016 | David et al. |
| 2016/0381476 A1 | 12/2016 | Gossain et al. |
| 2017/0003931 A1 | 1/2017 | Dvortsov et al. |
| 2017/0010782 A1 | 1/2017 | Chaudhri et al. |
| 2017/0010794 A1 | 1/2017 | Cho et al. |
| 2017/0013562 A1 | 1/2017 | Lim et al. |
| 2017/0025124 A1 | 1/2017 | Mixter et al. |
| 2017/0026686 A1 | 1/2017 | Glazier et al. |
| 2017/0031552 A1 | 2/2017 | Lin |
| 2017/0031648 A1 | 2/2017 | So et al. |
| 2017/0041727 A1 | 2/2017 | Reimann |
| 2017/0068402 A1 | 3/2017 | Lochhead et al. |
| 2017/0068507 A1 | 3/2017 | Kim et al. |
| 2017/0070346 A1 | 3/2017 | Lombardi et al. |
| 2017/0078294 A1 | 3/2017 | Medvinsky |
| 2017/0083285 A1 | 3/2017 | Meyers et al. |
| 2017/0083494 A1 | 3/2017 | Kim et al. |
| 2017/0092085 A1 | 3/2017 | Agarwal |
| 2017/0092270 A1 | 3/2017 | Newendorp et al. |
| 2017/0097621 A1 | 4/2017 | Ackmann et al. |
| 2017/0099270 A1 | 4/2017 | Anson |
| 2017/0115940 A1 | 4/2017 | Byeon |
| 2017/0127145 A1 | 5/2017 | Rajapakse |
| 2017/0134553 A1 | 5/2017 | Jeon et al. |
| 2017/0134567 A1 | 5/2017 | Jeon et al. |
| 2017/0134872 A1 | 5/2017 | Silva et al. |
| 2017/0142087 A1 | 5/2017 | Maninder et al. |
| 2017/0180843 A1 | 6/2017 | Perianu et al. |
| 2017/0185373 A1 | 6/2017 | Kim et al. |
| 2017/0193813 A1 | 7/2017 | Carroll et al. |
| 2017/0195772 A1 | 7/2017 | Han et al. |
| 2017/0206779 A1 | 7/2017 | Lee et al. |
| 2017/0230705 A1 | 8/2017 | Pardue et al. |
| 2017/0235545 A1 | 8/2017 | Millington et al. |
| 2017/0242653 A1 | 8/2017 | Lang et al. |
| 2017/0322713 A1 | 11/2017 | Hwang et al. |
| 2017/0357420 A1 | 12/2017 | Dye et al. |
| 2017/0357421 A1* | 12/2017 | Dye .............. H04N 21/8113 |
| 2017/0357425 A1 | 12/2017 | Smith et al. |
| 2017/0357434 A1 | 12/2017 | Coffman et al. |
| 2017/0357439 A1 | 12/2017 | Lemay et al. |
| 2017/0357477 A1 | 12/2017 | Im et al. |
| 2017/0357479 A1* | 12/2017 | Shenoy .............. G06F 3/165 |
| 2017/0359191 A1 | 12/2017 | Smith et al. |
| 2017/0363436 A1 | 12/2017 | Eronen et al. |
| 2018/0020530 A1 | 1/2018 | Scordato et al. |
| 2018/0039916 A1 | 2/2018 | Ravindra |
| 2018/0040324 A1 | 2/2018 | Wilberding |
| 2018/0067712 A1 | 3/2018 | Behzadi et al. |
| 2018/0069957 A1 | 3/2018 | Mushikabe et al. |
| 2018/0070187 A1 | 3/2018 | Drinkwater et al. |
| 2018/0096064 A1 | 4/2018 | Lennon et al. |
| 2018/0101297 A1 | 4/2018 | Yang et al. |
| 2018/0139292 A1 | 5/2018 | Koren et al. |
| 2018/0190279 A1 | 7/2018 | Anderson et al. |
| 2018/0199137 A1 | 7/2018 | Mate et al. |
| 2018/0213396 A1 | 7/2018 | Segal et al. |
| 2018/0217709 A1 | 8/2018 | Hotelling |
| 2018/0227341 A1 | 8/2018 | Rizzi |
| 2018/0228003 A1 | 8/2018 | O'driscoll et al. |
| 2018/0228006 A1 | 8/2018 | Baker et al. |
| 2018/0267773 A1 | 9/2018 | Kim et al. |
| 2018/0267774 A1 | 9/2018 | Williams et al. |
| 2018/0286395 A1 | 10/2018 | Li et al. |
| 2018/0288104 A1 | 10/2018 | Padilla et al. |
| 2018/0308480 A1 | 10/2018 | Jang et al. |
| 2018/0329585 A1 | 11/2018 | Carrigan et al. |
| 2018/0329586 A1 | 11/2018 | Sundstrom et al. |
| 2018/0332559 A1 | 11/2018 | Gudivada et al. |
| 2018/0335903 A1 | 11/2018 | Coffman et al. |
| 2018/0337924 A1 | 11/2018 | Graham et al. |
| 2018/0338038 A1 | 11/2018 | Ly et al. |
| 2018/0341448 A1 | 11/2018 | Behzadi et al. |
| 2018/0351762 A1 | 12/2018 | Iyengar et al. |
| 2018/0364665 A1 | 12/2018 | Clymer et al. |
| 2019/0012069 A1 | 1/2019 | Bates |
| 2019/0012073 A1 | 1/2019 | Hwang |
| 2019/0012966 A1 | 1/2019 | Shi |
| 2019/0025943 A1 | 1/2019 | Jobs et al. |
| 2019/0028419 A1 | 1/2019 | Sullivan |
| 2019/0056854 A1 | 2/2019 | Azzolin et al. |
| 2019/0058777 A1 | 2/2019 | Chen |
| 2019/0102145 A1 | 4/2019 | Wilberding et al. |
| 2019/0129661 A1 | 5/2019 | Hirota et al. |
| 2019/0138951 A1 | 5/2019 | Brownhill et al. |
| 2019/0163329 A1 | 5/2019 | Yang et al. |
| 2019/0279634 A1 | 9/2019 | Tak et al. |
| 2019/0294406 A1 | 9/2019 | Bierbower et al. |
| 2019/0297439 A1 | 9/2019 | Maeda |
| 2019/0306607 A1 | 10/2019 | Clayton et al. |
| 2019/0332400 A1 | 10/2019 | Spoor et al. |
| 2019/0339769 A1 | 11/2019 | Cox et al. |
| 2019/0354252 A1 | 11/2019 | Badr |
| 2019/0361575 A1 | 11/2019 | Ni et al. |
| 2020/0050426 A1 | 2/2020 | Jung et al. |
| 2020/0050502 A1 | 2/2020 | Ghafourifar et al. |
| 2020/0104018 A1 | 4/2020 | Coffman et al. |
| 2020/0127988 A1 | 4/2020 | Bradley et al. |
| 2020/0135191 A1 | 4/2020 | Nourbakhsh |
| 2020/0142667 A1 | 5/2020 | Querze et al. |
| 2020/0152186 A1 | 5/2020 | Koh et al. |
| 2020/0154583 A1 | 5/2020 | Lee et al. |
| 2020/0186378 A1 | 6/2020 | Six et al. |
| 2020/0201491 A1 | 6/2020 | Coffman et al. |
| 2020/0201495 A1 | 6/2020 | Coffman et al. |
| 2020/0218486 A1 | 7/2020 | Behzadi et al. |
| 2020/0225817 A1 | 7/2020 | Coffman et al. |
| 2020/0302913 A1 | 9/2020 | Marcinkiewicz |
| 2020/0312318 A1 | 10/2020 | Olson et al. |
| 2020/0335187 A1 | 10/2020 | Lefkofsky et al. |
| 2020/0379711 A1 | 12/2020 | Graham et al. |
| 2020/0379712 A1 | 12/2020 | Carrigan |

(56) References Cited

U.S. PATENT DOCUMENTS

| | | |
|---|---|---|
| 2020/0379713 A1 | 12/2020 | Carrigan |
| 2020/0379714 A1 | 12/2020 | Graham et al. |
| 2020/0379716 A1 | 12/2020 | Carrigan et al. |
| 2020/0379729 A1 | 12/2020 | Graham et al. |
| 2020/0379730 A1 | 12/2020 | Graham et al. |
| 2020/0395012 A1 | 12/2020 | Kim et al. |
| 2021/0011588 A1 | 1/2021 | Coffman et al. |
| 2021/0011613 A1 | 1/2021 | Pisula et al. |
| 2021/0043189 A1 | 2/2021 | Pyun |
| 2021/0064317 A1 | 3/2021 | Juenger et al. |
| 2021/0065134 A1 | 3/2021 | Chhabra et al. |
| 2021/0099829 A1 | 4/2021 | Soto et al. |
| 2021/0158830 A1 | 5/2021 | Boehlke |
| 2021/0181903 A1 | 6/2021 | Carrigan et al. |
| 2021/0255816 A1 | 8/2021 | Behzadi et al. |
| 2021/0255819 A1 | 8/2021 | Graham et al. |
| 2021/0263702 A1 | 8/2021 | Carrigan |
| 2021/0266274 A1 | 8/2021 | Liu et al. |
| 2021/0321197 A1 | 10/2021 | Annamraju |
| 2021/0323406 A1 | 10/2021 | So et al. |
| 2021/0349680 A1 | 11/2021 | Kim et al. |
| 2021/0352172 A1 | 11/2021 | Kim et al. |
| 2021/0392223 A1 | 12/2021 | Coffman et al. |
| 2021/0407507 A1 | 12/2021 | Zhou et al. |
| 2022/0004356 A1 | 1/2022 | Kim et al. |
| 2022/0043626 A1 | 2/2022 | Carrigan |
| 2022/0100367 A1 | 3/2022 | Carrigan et al. |
| 2022/0137759 A1 | 5/2022 | Yang et al. |
| 2022/0180862 A1 | 6/2022 | Sharifi et al. |
| 2022/0279063 A1 | 9/2022 | Coffman et al. |
| 2022/0286549 A1 | 9/2022 | Coffman et al. |
| 2022/0303383 A1 | 9/2022 | Coffman et al. |
| 2022/0350482 A1 | 11/2022 | Carrigan et al. |
| 2023/0041125 A1 | 2/2023 | Kim et al. |
| 2023/0073844 A1 | 3/2023 | Coffman et al. |
| 2023/0084551 A1 | 3/2023 | Coffman et al. |
| 2023/0104819 A1 | 4/2023 | Coffman et al. |
| 2023/0106600 A1 | 4/2023 | Coffman et al. |
| 2023/0106761 A1 | 4/2023 | Coffman et al. |
| 2023/0168797 A1 | 6/2023 | Chaudhri et al. |
| 2023/0266866 A1 | 8/2023 | Bates et al. |
| 2023/0376268 A1 | 11/2023 | Carrigan et al. |
| 2023/0393809 A1 | 12/2023 | Carrigan et al. |
| 2023/0409191 A1 | 12/2023 | Carrigan et al. |
| 2024/0080642 A1 | 3/2024 | Carrigan et al. |
| 2024/0295948 A1 | 9/2024 | Yang et al. |
| 2024/0319860 A1 | 9/2024 | Chaudhri et al. |

FOREIGN PATENT DOCUMENTS

| | | |
|---|---|---|
| AU | 2014100584 A4 | 7/2014 |
| CA | 2532145 A1 | 7/1995 |
| CN | 1263425 A | 8/2000 |
| CN | 1274439 A | 11/2000 |
| CN | 1341889 A | 3/2002 |
| CN | 1797295 A | 7/2006 |
| CN | 1863281 A | 11/2006 |
| CN | 101107668 A | 1/2008 |
| CN | 101309311 A | 11/2008 |
| CN | 101359291 A | 2/2009 |
| CN | 100530059 C | 8/2009 |
| CN | 101567858 A | 10/2009 |
| CN | 101625620 A | 1/2010 |
| CN | 101861562 A | 10/2010 |
| CN | 101976171 A | 2/2011 |
| CN | 102281294 A | 12/2011 |
| CN | 102301323 A | 12/2011 |
| CN | 102414755 A | 4/2012 |
| CN | 102508707 A | 6/2012 |
| CN | 102740146 A | 10/2012 |
| CN | 102750066 A | 10/2012 |
| CN | 102902453 A | 1/2013 |
| CN | 102905181 A | 1/2013 |
| CN | 102968267 A | 3/2013 |
| CN | 103069378 A | 4/2013 |
| CN | 103260079 A | 8/2013 |
| CN | 103593154 A | 2/2014 |
| CN | 103793138 A | 5/2014 |
| CN | 103870255 A | 6/2014 |
| CN | 103914238 A | 7/2014 |
| CN | 104106036 A | 10/2014 |
| CN | 104166458 A | 11/2014 |
| CN | 105208511 A | 12/2015 |
| CN | 105388998 A | 3/2016 |
| CN | 105549947 A | 5/2016 |
| CN | 105657465 A | 6/2016 |
| CN | 105745863 A | 7/2016 |
| CN | 105794231 A | 7/2016 |
| CN | 105900376 A | 8/2016 |
| CN | 105940678 A | 9/2016 |
| CN | 106030700 A | 10/2016 |
| CN | 106062810 A | 10/2016 |
| CN | 106134209 A | 11/2016 |
| CN | 106170783 A | 11/2016 |
| CN | 103914238 B | 2/2017 |
| CN | 106383645 A | 2/2017 |
| CN | 106416142 A | 2/2017 |
| CN | 106797415 A | 5/2017 |
| CN | 107077288 A | 8/2017 |
| CN | 107250949 A | 10/2017 |
| CN | 107637073 A | 1/2018 |
| CN | 107683470 A | 2/2018 |
| CN | 107949879 A | 4/2018 |
| CN | 104012150 B | 5/2018 |
| CN | 108289239 A | 7/2018 |
| CN | 108292203 A | 7/2018 |
| CN | 108958608 A | 12/2018 |
| CN | 109196825 A | 1/2019 |
| CN | 109302531 A | 2/2019 |
| CN | 109314795 A | 2/2019 |
| CN | 109347581 A | 2/2019 |
| CN | 109461462 A | 3/2019 |
| CN | 109584879 A | 4/2019 |
| CN | 109688442 A | 4/2019 |
| CN | 109584879 B | 7/2021 |
| CN | 113835583 A | 12/2021 |
| CN | 108958608 B | 7/2022 |
| EP | 0459174 A2 | 12/1991 |
| EP | 0564247 A1 | 10/1993 |
| EP | 0684543 A1 | 11/1995 |
| EP | 0844555 A2 | 5/1998 |
| EP | 0871177 A2 | 10/1998 |
| EP | 0880091 A2 | 11/1998 |
| EP | 0881563 A2 | 12/1998 |
| EP | 1133119 A2 | 9/2001 |
| EP | 1186987 A2 | 3/2002 |
| EP | 1469374 A1 | 10/2004 |
| EP | 1615109 A1 | 1/2006 |
| EP | 1942401 A1 | 7/2008 |
| EP | 2018032 A1 | 1/2009 |
| EP | 2409214 A1 | 1/2012 |
| EP | 2420925 A2 | 2/2012 |
| EP | 2629291 A1 | 8/2013 |
| EP | 2733579 A2 | 5/2014 |
| EP | 2750062 A2 | 7/2014 |
| EP | 2770673 A1 | 8/2014 |
| EP | 2892240 A1 | 7/2015 |
| EP | 2993909 A1 | 3/2016 |
| EP | 3032537 A2 | 6/2016 |
| EP | 3038427 A1 | 6/2016 |
| EP | 3057342 A1 | 8/2016 |
| EP | 3073703 A1 | 9/2016 |
| EP | 3138300 A1 | 3/2017 |
| EP | 3163495 A1 | 5/2017 |
| EP | 3276905 A1 | 1/2018 |
| EP | 3379853 A1 | 9/2018 |
| EP | 3420441 A1 | 1/2019 |
| FR | 3069679 A1 | 2/2019 |
| GB | 2341698 A | 3/2000 |
| GB | 0412212 | 7/2004 |
| GB | 2402105 A | 12/2004 |
| IN | 1038/MUM/2005 | 6/2007 |
| JP | 8-147138 A | 6/1996 |
| JP | 8-166783 A | 6/1996 |

(56) References Cited

FOREIGN PATENT DOCUMENTS

| | | |
|---|---|---|
| JP | 9-97154 A | 4/1997 |
| JP | 9-258947 A | 10/1997 |
| JP | 10-198517 A | 7/1998 |
| JP | 10-232757 A | 9/1998 |
| JP | 11-272391 A | 10/1999 |
| JP | 2000-101879 A | 4/2000 |
| JP | 2000-105772 A | 4/2000 |
| JP | 2000-163193 A | 6/2000 |
| JP | 2000-231371 A | 8/2000 |
| JP | 2000-284879 A | 10/2000 |
| JP | 2001-67099 A | 3/2001 |
| JP | 2001 202176 A | 7/2001 |
| JP | 2001-306375 A | 11/2001 |
| JP | 2002-58082 A | 2/2002 |
| JP | 2002-82745 A | 3/2002 |
| JP | 2002-288690 A | 10/2002 |
| JP | 2003-43978 A | 2/2003 |
| JP | 2003-52019 A | 2/2003 |
| JP | 2003-62975 A | 3/2003 |
| JP | 2003-264621 A | 9/2003 |
| JP | 2003-330586 A | 11/2003 |
| JP | 2003-330613 A | 11/2003 |
| JP | 2004-38895 A | 2/2004 |
| JP | 2004-192573 A | 7/2004 |
| JP | 2004-348601 A | 12/2004 |
| JP | 2005-44036 A | 2/2005 |
| JP | 2005-507112 A | 3/2005 |
| JP | 2005-190108 A | 7/2005 |
| JP | 2006-166248 A | 6/2006 |
| JP | 2006-185154 A | 7/2006 |
| JP | 2006-295753 A | 10/2006 |
| JP | 2008-26439 A | 2/2008 |
| JP | 2008-99330 A | 4/2008 |
| JP | 2009-17486 A | 1/2009 |
| JP | 2011-60281 A | 3/2011 |
| JP | 2013-98613 A | 5/2013 |
| JP | 2014-71835 A | 4/2014 |
| JP | 2014-87126 A | 5/2014 |
| JP | 2014-170982 A | 9/2014 |
| JP | 2015-61318 A | 3/2015 |
| JP | 2015-533441 A | 11/2015 |
| JP | 2016-38615 A | 3/2016 |
| JP | 2016-157292 A | 9/2016 |
| JP | 2017-143357 A | 8/2017 |
| JP | 2018-7158 A | 1/2018 |
| JP | 2018-200624 A | 12/2018 |
| KR | 10-2003-0030384 A | 4/2003 |
| KR | 10-2005-0072071 A | 7/2005 |
| KR | 10-2007-0101893 A | 10/2007 |
| KR | 10-2009-0125377 A | 12/2009 |
| KR | 10-2010-0036351 A | 4/2010 |
| KR | 10-2015-0031010 A | 3/2015 |
| KR | 10-2015-0121177 A | 10/2015 |
| KR | 10-2016-0012008 A | 2/2016 |
| KR | 10-2016-0092363 A | 8/2016 |
| KR | 10-2016-0141847 A | 12/2016 |
| KR | 10-2017-0027435 A | 3/2017 |
| KR | 10-2017-0027999 A | 3/2017 |
| KR | 10-2017-0082022 A | 7/2017 |
| KR | 10-2017-0124954 A | 11/2017 |
| KR | 10-2018-0085931 A | 7/2018 |
| KR | 10-2019-0022883 A | 3/2019 |
| KR | 10-2011177 B1 | 8/2019 |
| KR | 10-2020-0039030 A | 4/2020 |
| TW | 201403363 A | 1/2014 |
| WO | 2003/036457 A2 | 5/2003 |
| WO | 2003/062975 A1 | 7/2003 |
| WO | 2003/062976 A1 | 7/2003 |
| WO | 2006/020304 A2 | 2/2006 |
| WO | 2006/020305 A2 | 2/2006 |
| WO | 2008/027924 A2 | 3/2008 |
| WO | 2008/030976 A2 | 3/2008 |
| WO | 2008/033853 A2 | 3/2008 |
| WO | 2008/085742 A2 | 7/2008 |
| WO | 2009/005563 A1 | 1/2009 |
| WO | 2009/010827 A2 | 1/2009 |
| WO | 2009/067670 A1 | 5/2009 |
| WO | 2009/086599 A1 | 7/2009 |
| WO | 2009/097592 A1 | 8/2009 |
| WO | 2010/087988 A1 | 8/2010 |
| WO | 2010/107661 A1 | 9/2010 |
| WO | 2012/004288 A1 | 1/2012 |
| WO | 2012/006494 A1 | 1/2012 |
| WO | 2012/104288 A1 | 8/2012 |
| WO | 2012/166352 A1 | 12/2012 |
| WO | 2013/049346 A1 | 4/2013 |
| WO | 2013/153405 A2 | 10/2013 |
| WO | 2013/169846 A1 | 11/2013 |
| WO | 2013/169875 A2 | 11/2013 |
| WO | 2014/030320 A1 | 2/2014 |
| WO | 2014/107469 A2 | 7/2014 |
| WO | 2014/151089 A1 | 9/2014 |
| WO | 2015/076930 A1 | 5/2015 |
| WO | 2015/102572 A1 | 7/2015 |
| WO | 2015/124831 A1 | 8/2015 |
| WO | 2015/134692 A1 | 9/2015 |
| WO | 2015/185123 A1 | 12/2015 |
| WO | 2016/033400 A1 | 3/2016 |
| WO | 2016/036472 A1 | 3/2016 |
| WO | 2016/036541 A2 | 3/2016 |
| WO | 2016/040405 A1 | 3/2016 |
| WO | 2016/057117 A1 | 4/2016 |
| WO | 2016/200603 A1 | 12/2016 |
| WO | 2016/204186 A1 | 12/2016 |
| WO | 2017/058442 A1 | 4/2017 |
| WO | 2017/112003 A1 | 6/2017 |
| WO | 2017/218143 A1 | 12/2017 |
| WO | 2017/218192 A1 | 12/2017 |
| WO | 2017/218199 A1 | 12/2017 |
| WO | 2018/048510 A1 | 3/2018 |
| WO | 2018/084802 A1 | 5/2018 |
| WO | 2018/098136 A1 | 5/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2020/063762 A1 | 4/2020 |

OTHER PUBLICATIONS

S. Ochs, "Getting started with Apple Music: 12 things to do first," Macworld website, dated Jun. 30, 2015, downloaded from https://www.macworld.com/article/225812/getting-started-with-apple-music-12-things-to-do-first.html (Year: 2015).*
Applicant-Initiated Interview Summary received for U.S. Appl. No. 16/922,675, dated Nov. 15, 2022, 2 pages.
Decision to Grant received for Danish Patent Application No. PA202170320, dated Nov. 10, 2022, 2 pages.
Office Action received for Australian Patent Application No. 2022200515, dated Nov. 2, 2022, 2 pages.
Applicant-Initiated Interview Summary received for U.S. Appl. No. 17/509,356, dated Feb. 3, 2023, 3 pages.
Corrected Notice of Allowance received for U.S. Appl. No. 16/922,675, dated Jan. 20, 2023, 3 pages.
Notice of Allowance received for Japanese Patent Application No. 2022-125792, dated Jan. 27, 2023, 4 pages (1 page of English Translation and 3 pages of Official Copy).
Notice of Allowance received for Korean Patent Application No. 10-2022-7006175, dated Jan. 12, 2023, 7 pages (2 pages of English Translation and 5 pages of Official Copy).
Applicant-Initiated Interview Summary received for U.S. Appl. No. 17/747,804, dated Mar. 17, 2023, 4 pages.
Non-Final Office Action received for U.S. Appl. No. 17/476,404, dated Mar. 30, 2023, 29 pages.
Non-Final Office Action received for U.S. Appl. No. 17/835,110, dated Apr. 3, 2023, 28 pages.
Non-Final Office Action received for U.S. Appl. No. 18/077,971, dated Apr. 3, 2023, 24 pages.
Notice of Allowance received for U.S. Appl. No. 16/922,675, dated Mar. 22, 2023, 8 pages.

(56) References Cited

OTHER PUBLICATIONS

Notice of Allowance received for U.S. Appl. No. 18/077,905, dated Mar. 24, 2023, 18 pages.
Office Action received for Australian Patent Application No. 2022241590, dated Mar. 17, 2023, 5 pages.
Office Action received for Chinese Patent Application No. 201811539259.8, dated Mar. 13, 2023, 16 pages (8 pages of English Translation and 8 pages of Official Copy).
Office Action received for Indian Patent Application No. 202215025360, dated Mar. 29, 2023, 6 pages.
Office Action received for Indian Patent Application No. 202215025361, dated Mar. 29, 2023, 6 pages.
Office Action received for Indian Patent Application No. 202215025363, dated Mar. 29, 2023, 6 pages.
Office Action received for Indian Patent Application No. 202215025364, dated Mar. 29, 2023, 6 pages.
Applicant-Initiated Interview Summary received for U.S. Appl. No. 17/752,582, dated Apr. 17, 2023, 3 pages.
Corrected Notice of Allowance received for U.S. Appl. No. 16/922,675, dated Apr. 14, 2023, 6 pages.
Corrected Notice of Allowance received for U.S. Appl. No. 18/077,905, dated Apr. 10, 2023, 2 pages.
Corrected Notice of Allowance received for U.S. Appl. No. 18/077,905, dated Apr. 19, 2023, 2 pages.
Intention to Grant received for European Patent Application No. 18728002.9, dated Apr. 12, 2023, 9 pages.
International Preliminary Report on Patentability received for PCT Patent Application No. PCT/US2021/048358, dated Apr. 6, 2023, 15 pages.
Notice of Allowance received for U.S. Appl. No. 17/509,356, dated Apr. 7, 2023, 11 pages.
Office Action received for European Patent Application No. 20720310.0, dated Apr. 11, 2023, 8 pages.
Brief Communication Regarding Oral Proceedings received for European Patent Application No. 18728002.9, mailed on Nov. 28, 2022, 7 pages.
International Preliminary Report on Patentability received for PCT Patent Application No. PCT/US2021/031760, dated Nov. 24, 2022, 11 pages.
Invitation to Pay Search Fees received for European Patent Application No. 21728781.2, dated Dec. 2, 2022, 3 pages.
Notice of Allowance received for U.S. Appl. No. 16/917,659, dated Dec. 1, 2022, 11 pages.
Office Action received for Australian Patent Application No. 2022241590, dated Nov. 18, 2022, 8 pages.
Applicant-Initiated Interview Summary received for U.S. Appl. No. 17/476,404, dated Jul. 27, 2022, 6 pages.
Brief Communication Regarding Oral Proceedings received for European Patent Application No. 20158824.1, mailed on May 30, 2022, 1 page.
Corrected Notice of Allowance received for U.S. Appl. No. 16/803,849, dated Jul. 7, 2022, 3 pages.
Corrected Notice of Allowance received for U.S. Appl. No. 16/803,849, dated Jun. 8, 2022, 3 pages.
Corrected Notice of Allowance received for U.S. Appl. No. 17/027,373, dated Jul. 12, 2022, 2 pages.
Decision to Grant received for European Patent Application No. 19207753.5, dated Jun. 2, 2022, 3 pages.
Non-Final Office Action received for U.S. Appl. No. 16/922,675, dated Jun. 8, 2022, 21 pages.
Notice of Allowance received for Japanese Patent Application No. 2020-159840, dated Jul. 8, 2022, 4 pages (1 page of English Translation and 3 pages of Official Copy).
Notice of Allowance received for Japanese Patent Application No. 2021-571464, dated May 30, 2022, 4 pages (1 page of English Translation and 3 pages of Official Copy).
Notice of Allowance received for Japanese Patent Application No. 2022-079682, dated Jul. 15, 2022, 4 pages (1 page of English Translation and 3 pages of Official Copy).
Notice of Allowance received for Korean Patent Application No. 10-2020-0123805, dated Jun. 19, 2022, 5 pages (2 pages of English Translation and 3 pages of Official Copy).
Notice of Allowance received for Korean Patent Application No. 10-2022-7008567, dated Jul. 4, 2022, 9 pages (2 pages of English Translation and 7 pages of Official Copy).
Notice of Allowance received for U.S. Appl. No. 16/917,659, dated Jul. 8, 2022, 11 pages.
Notice of Allowance received for U.S. Appl. No. 17/027,373, dated Jun. 3, 2022, 8 pages.
Notice of Allowance received for U.S. Appl. No. 17/461,103, dated Jun. 20, 2022, 6 pages.
Office Action received for European Patent Application No. 20158824.1, dated Jun. 13, 2022, 5 pages.
Office Action received for Korean Patent Application No. 10-2022-7006175, dated May 27, 2022, 7 pages (3 pages of English Translation and 4 pages of Official Copy).
Summons to Attend Oral Proceedings received for European Patent Application No. 18728002.9, mailed on Jun. 3, 2022, 15 pages.
Non-Final Office Action received for U.S. Appl. No. 17/476,404, dated Sep. 14, 2022, 31 pages.
Corrected Notice of Allowance received for U.S. Appl. No. 17/461,103, dated Aug. 3, 2022, 2 pages.
Intention to Grant received for Danish Patent Application No. PA202170320, dated Jul. 27, 2022, 2 pages.
Intention to Grant received for European Patent Application No. 20158824.1 dated Aug. 11, 2022, 10 pages.
Non-Final Office Action received for U.S. Appl. No. 17/314,948, dated Aug. 1, 2022, 33 pages.
Notice of Allowance received for U.S. Appl. No. 17/027,373, dated Aug. 2, 2022, 2 pages.
Farmboyreef,"Apple watch controlling your tv", Available online at: https://www.youtube.com/watch?v=xaJPG0Wm3Tg, Jun. 23, 2015, 3 pages.
Gil Lory, "How to control Apple TV with your Apple Watch", Available online at: https://www.imore.com/how-control-your-apple-tv-remote-app%ADapple-watch], Jun. 6, 2016, 24 pages.
Hobbyistsoftwareltd,"VLC Remote", Online available at: https://watchaware.com/watch-apps/297244048, 2016, 7 pages.
Klein Matt, "How to Add, Remove, and Rearrange Apps on the Apple Watch's Dock", Available online at: https://www.howtogeek.com/279796/how-to-add-remove-and-rearrange-apps-on-the-apple-watch%E2%80%99s-dock/, Nov. 18, 2016, 10 pages.
Nikolov Anton, "Design principle: Consistency", Available online at: https://uxdesign.cc/design-principle-consistency-6b0cf7e7339f, Apr. 8, 2017, 9 pages.
Ojeda-Zapata Julio, "Five Apps That Play Podcasts Directly from Your Apple Watch", Available online at: https://tidbits.com/2018/04/09/five-apps-that-play-podcasts-directly-from-your-apple-watch/, Apr. 9, 2018, 12 pages.
Pairing Your Apple Watch With Your AppleTV, Available online at: https://www.youtube.com/watch?v=C4t8YFSJ-UY, Apr. 27, 2015, 3 pages.
Singh Ajit, "Mytunz: Free Iphone Media Player App With Sleep Timer, Gesture Control", Available online at: https://www.ilovefreesoftware.com/01/iphone/mytunz-free-iphone-media-player-app.html, Jul. 1, 2014, 6 pages.
Whitney Lance, "How to Listen to Music on Your Apple Watch", Available Online at: https://medium.com/pcmag-access/how-to-listen-to-music-on-your-apple-watch-f48a6c20dd52#:~:text=On%20your%20iPhone%2C%20go%20to,,%E2%80%9D%20Tap%20on%20Add%20Music., Mar. 2, 2018, 13 pages.
Non-Final Office Action received for U.S. Appl. No. 17/867,317, dated Feb. 28, 2023, 18 pages.
Notice of Allowance received for U.S. Appl. No. 16/888,775, dated Feb. 21, 2023, 5 pages.
Office Action received for Australian Patent Application No. 2022204555, dated Feb. 17, 2023, 5 pages.
Office Action received for Chinese Patent Application No. 201911288715.0, dated Jan. 20, 2023, 23 pages (11 pages of English Translation and 12 pages of Official Copy).
Advisory Action received for U.S. Appl. No. 10/308,315, dated Jul. 10, 2006, 3 pages.

(56) References Cited

OTHER PUBLICATIONS

Advisory Action received for U.S. Appl. No. 13/038,217, dated Dec. 8, 2014, 3 pages.
Advisory Action received for U.S. Appl. No. 15/730,610, dated Oct. 24, 2019, 5 pages.
Advisory Action received for U.S. Appl. No. 16/583,989, dated Sep. 22, 2020, 5 pages.
Appeal Brief received for U.S. Appl. No. 11/522,167 dated Nov. 23, 2010, 65 pages.
Applicant Initiated Interview Summary received for U.S. Appl. No. 16/583,989, dated Aug. 3, 2020, 6 pages.
Applicant Initiated Interview Summary received for U.S. Appl. No. 16/583,989, dated Mar. 25, 2020, 4 pages.
Applicant Initiated Interview Summary received for U.S. Appl. No. 16/583,994, dated Apr. 3, 2020, 5 pages.
Applicant Initiated Interview Summary received for U.S. Appl. No. 16/584,490, dated Jul. 28, 2020, 4 pages.
Applicant Initiated Interview Summary received for U.S. Appl. No. 16/702,968, dated Jul. 1, 2020, 5 pages.
Applicant Initiated Interview Summary received for U.S. Appl. No. 16/917,659, dated Jan. 28, 2022, 2 pages.
Applicant Initiated Interview Summary received for U.S. Appl. No. 17/176,908, dated Jun. 14, 2022, 6 pages.
Applicant-Initiated Interview Summary received for U.S. Appl. No. 15/730,610, dated Aug. 25, 2020, 6 pages.
Applicant-Initiated Interview Summary received for U.S. Appl. No. 15/910,263, dated Nov. 18, 2020, 6 pages.
Applicant-Initiated Interview Summary received for U.S. Appl. No. 16/263,280, dated Apr. 26, 2021, 2 pages.
Applicant-Initiated Interview Summary received for U.S. Appl. No. 16/263,280, dated Nov. 25, 2020, 3 pages.
Applicant-Initiated Interview Summary received for U.S. Appl. No. 16/583,981, dated Mar. 9, 2020, 5 pages.
Applicant-Initiated Interview Summary received for U.S. Appl. No. 16/583,981, dated Sep. 14, 2020, 6 pages.
Applicant-Initiated Interview Summary received for U.S. Appl. No. 16/583,994, dated May 28, 2021, 5 pages.
Applicant-Initiated Interview Summary received for U.S. Appl. No. 16/583,994, dated Nov. 24, 2020, 4 pages.
Applicant-Initiated Interview Summary received for U.S. Appl. No. 16/584,490, dated Jan. 31, 2020, 4 pages.
Applicant-Initiated Interview Summary received for U.S. Appl. No. 16/702,968, dated Sep. 28, 2020, 6 pages.
Applicant-Initiated Interview Summary received for U.S. Appl. No. 16/723,583, dated Dec. 28, 2020, 6 pages.
Applicant-Initiated Interview Summary received for U.S. Appl. No. 16/803,849, dated Aug. 21, 2020, 5 pages.
Applicant-Initiated Interview Summary received for U.S. Appl. No. 16/803,849, dated Dec. 21, 2020, 5 pages.
Applicant-Initiated Interview Summary received for U.S. Appl. No. 16/803,849, dated Feb. 28, 2022, 9 pages.
Applicant-Initiated Interview Summary received for U.S. Appl. No. 16/803,849, dated Oct. 12, 2021, 6 pages.
Applicant-Initiated Interview Summary received for U.S. Appl. No. 16/807,604, dated Dec. 21, 2020, 7 pages.
Applicant-Initiated Interview Summary received for U.S. Appl. No. 16/807,604, dated Jul. 24, 2020, 5 pages.
Applicant-Initiated Interview Summary received for U.S. Appl. No. 16/836,571, dated Jul. 7, 2021, 6 pages.
Applicant-Initiated Interview Summary received for U.S. Appl. No. 16/922,675, dated Dec. 16, 2020, 3 pages.
Applicant-Initiated Interview Summary received for U.S. Appl. No. 16/922,675, dated Nov. 2, 2020, 3 pages.
Applicant-Initiated Interview Summary received for U.S. Appl. No. 16/922,675, dated Sep. 3, 2021, 2 pages.
Applicant-Initiated Interview Summary received for U.S. Appl. No. 17/026,818, dated Dec. 15, 2020, 7 pages.
Applicant-Initiated Interview Summary received for U.S. Appl. No. 17/026,818, dated Mar. 8, 2021, 4 pages.
Applicant-Initiated Interview Summary received for U.S. Appl. No. 17/031,833, dated Dec. 21, 2020, 5 pages.
Applicant-Initiated Interview Summary received for U.S. Appl. No. 17/031,833, dated May 24, 2021, 6 pages.
Applicant-Initiated Interview Summary received for U.S. Appl. No. 17/168,069, dated Nov. 17, 2021, 2 pages.
Applicant-Initiated Interview Summary received for U.S. Appl. No. 17/223,794, dated Sep. 7, 2021, 3 pages.
Applicant-Initiated Interview Summary received for U.S. Appl. No. 17/461,103, dated Jan. 26, 2022, 6 pages.
Applicant-Initiated Interview Summary received for U.S. Appl. No. 17/476,404, dated Mar. 18, 2022, 2 pages.
Board Decision received for Chinese Patent Application No. 201580046339.8, dated Jun. 22, 2021, 12 pages (1 page of English Translation and 11 pages of Official Copy).
Board Opinion received for Chinese Patent Application No. 201580046339.8, dated Mar. 19, 2021, 11 pages (3 pages of English Translation and 8 pages of Official Copy).
Board Opinion received for Chinese Patent Application No. 201910164962.3, dated Sep. 16, 2021, 16 pages (6 pages of English Translation and 10 pages of Official Copy).
Brief Communication Regarding Oral Proceedings received for European Patent Application No. 18197583.0, mailed on Feb. 18, 2021, 2 pages.
Corrected Notice of Allowance received for U.S. Appl. No. 14/830,629, dated Feb. 13, 2019, 3 pages.
Corrected Notice of Allowance received for U.S. Appl. No. 15/730,610, dated Nov. 27, 2020, 3 pages.
Corrected Notice of Allowance received for U.S. Appl. No. 15/910,263, dated Feb. 10, 2021, 3 pages.
Corrected Notice of Allowance received for U.S. Appl. No. 15/910,263, dated Mar. 17, 2021, 3 pages.
Corrected Notice of Allowance received for U.S. Appl. No. 15/910,263, dated Mar. 18, 2021, 3 pages.
Corrected Notice of Allowance received for U.S. Appl. No. 16/263,280, dated Aug. 5, 2021, 4 pages.
Corrected Notice of Allowance received for U.S. Appl. No. 16/583,981, dated Apr. 6, 2021, 3 pages.
Corrected Notice of Allowance received for U.S. Appl. No. 16/583,981, dated May 17, 2021, 3 pages.
Corrected Notice of Allowance received for U.S. Appl. No. 16/583,994, dated Jul. 6, 2021, 3 pages.
Corrected Notice of Allowance received for U.S. Appl. No. 16/702,968, dated Jun. 8, 2021, 3 pages.
Corrected Notice of Allowance received for U.S. Appl. No. 16/702,968, dated Jun. 16, 2021, 4 pages.
Corrected Notice of Allowance received for U.S. Appl. No. 16/702,968, dated Jun. 28, 2021, 4 pages.
Corrected Notice of Allowance received for U.S. Appl. No. 16/702,968, dated May 26, 2021, 4 pages.
Corrected Notice of Allowance received for U.S. Appl. No. 16/702,968, dated May 28, 2021, 4 pages.
Corrected Notice of Allowance received for U.S. Appl. No. 16/807,604, dated Jul. 26, 2021, 3 pages.
Corrected Notice of Allowance received for U.S. Appl. No. 16/807,604, dated Jun. 28, 2021, 3 pages.
Corrected Notice of Allowance received for U.S. Appl. No. 16/807,604, dated May 28, 2021, 3 pages.
Corrected Notice of Allowance received for U.S. Appl. No. 16/807,604, dated Oct. 4, 2021, 5 pages.
Corrected Notice of Allowance received for U.S. Appl. No. 16/807,604, dated Oct. 14, 2021, 3 pages.
Corrected Notice of Allowance received for U.S. Appl. No. 16/807,604, dated Oct. 22, 2021, 3 pages.
Corrected Notice of Allowance received for U.S. Appl. No. 16/836,571, dated Dec. 6, 2021, 5 pages.
Corrected Notice of Allowance received for U.S. Appl. No. 16/836,571, dated Mar. 25, 2022, 2 pages.
Corrected Notice of Allowance received for U.S. Appl. No. 16/836,571, dated Nov. 4, 2021, 4 pages.
Corrected Notice of Allowance received for U.S. Appl. No. 16/836,571, dated Nov. 18, 2021, 3 pages.

(56) References Cited

OTHER PUBLICATIONS

Corrected Notice of Allowance received for U.S. Appl. No. 16/836,571, dated Oct. 12, 2021, 4 pages.
Corrected Notice of Allowance received for U.S. Appl. No. 16/922,675, dated Mar. 4, 2022, 6 pages.
Corrected Notice of Allowance received for U.S. Appl. No. 17/031,833, dated Aug. 2, 2021, 3 pages.
Corrected Notice of Allowance received for U.S. Appl. No. 17/168,069, dated Feb. 9, 2022, 2 pages.
Corrected Notice of Allowance received for U.S. Appl. No. 17/461,103, dated Apr. 14, 2022, 2 pages.
Corrected Notice of Allowance received for U.S. Appl. No. 17/461,103, dated May 10, 2022, 2 pages.
"Customize Notifications and Content on Your Galaxy Phone's Lock Screen", Online Available at: https://www.samsung.com/us/support/answer/ANS00062636, Oct. 4, 2017, 5 pages.
Decision on Appeal received for U.S. Appl. No. 12/566,673, dated Dec. 18, 2019, 10 pages.
Decision to Grant received for Danish Patent Application No. PA201770392, dated Oct. 24, 2018, 2 pages.
Decision to Grant received for Danish Patent Application No. PA201770401, dated Oct. 24, 2018, 2 pages.
Decision to Grant received for Danish Patent Application No. PA201770403, dated Oct. 24, 2018, 2 pages.
Decision to Grant received for Danish Patent Application No. PA201770404, dated Nov. 11, 2019, 3 pages.
Decision to Grant received for Danish Patent Application No. PA201770406, dated May 15, 2020, 2 pages.
Decision to Grant received for Danish Patent Application No. PA202070560, dated Oct. 21, 2021, 2 pages.
Decision to Grant received for European Patent Application No. 10712824.1, dated May 17, 2018, 3 pages.
Decision to Grant received for European Patent Application No. 18197583.0, dated Feb. 3, 2022, 3 pages.
Decision to Grant received for European Patent Application No. 18197589.7, dated Jun. 10, 2021, 2 pages.
Decision to Refuse received for European Patent Application No. 07842262.3, dated Dec. 21, 2018, 8 pages.
Decision to Refuse received for European Patent Application No. 10177096.4, dated Feb. 13, 2019, 4 pages.
Digital Video Editor, "IBM Technical Disclosure Bulletin", vol. 35, No. 2, ip.com Journal, ip.com Inc., West Henrietta, XP013097273, Jul. 1, 1992, 6 pages.
Examiner-Initiated Interview Summary received for U.S. Appl. No. 17/027,373, dated Mar. 31, 2022, 4 pages.
Examiner's Answer to Appeal Brief received for U.S. Appl. No. 11/522,167 dated Feb. 15, 2011, 13 pages.
Examiner's Answer to Appeal Brief received for U.S. Appl. No. 12/566,673, dated Nov. 17, 2017, 10 pages.
Extended European Search Report for European Application No. 10177099.8, dated Oct. 18, 2010, 7 pages.
Extended European Search Report received for European Patent Application No. 10177096.4, dated Oct. 18, 2010, 9 pages.
Extended European Search Report received for European Patent Application No. 18197583.0, dated Jun. 4, 2019, 20 pages.
Extended European Search Report received for European Patent Application No. 18197589.7, dated Jan. 7, 2019, 9 pages.
Extended European Search Report received for European Patent Application No. 19207753.5, dated Dec. 18, 2019, 9 pages.
Extended European Search Report received for European Patent Application No. 20158824.1, dated Aug. 10, 2020, 13 pages.
Extended European Search Report received for European Patent Application No. 21197457.1, dated Nov. 15, 2021, 8 pages.
Final Office Action received for U.S. Appl. No. 09/293,507, dated Apr. 24, 2002, 12 pages.
Final Office Action received for U.S. Appl. No. 09/293,507, dated Feb. 14, 2001, 10 pages.
Final Office Action received for U.S. Appl. No. 10/308,315, dated Apr. 6, 2005, 10 pages.
Final Office Action received for U.S. Appl. No. 10/308,315, dated Mar. 9, 2006, 10 pages.
Final Office Action received for U.S. Appl. No. 10/308,315, dated Mar. 23, 2007, 12 pages.
Final Office Action received for U.S. Appl. No. 11/522,167, dated Aug. 5, 2009, 9 pages.
Final Office Action received for U.S. Appl. No. 11/522,167, dated Jul. 23, 2010, 11 pages.
Final Office Action received for U.S. Appl. No. 11/522,167, dated Jun. 3, 2013, 18 pages.
Final Office Action received for U.S. Appl. No. 11/522,167, dated Oct. 15, 2008, 10 pages.
Final Office Action received for U.S. Appl. No. 11/983,059, dated Jun. 6, 2011, 11 pages.
Final Office Action received for U.S. Appl. No. 12/566,673, dated Aug. 12, 2016, 28 pages.
Final Office Action received for U.S. Appl. No. 13/489,245, dated Mar. 28, 2014, 23 pages.
Final Office Action received for U.S. Appl. No. 13/489,245, dated Oct. 16, 2019, 25 pages.
Final Office Action received for U.S. Appl. No. 13/489,245, dated Sep. 27, 2018, 25 pages.
Final Office Action received for U.S. Appl. No. 14/045,544, dated May 6, 2016, 26 pages.
Final Office Action received for U.S. Appl. No. 14/830,629, dated Apr. 16, 2018, 27 pages.
Final Office Action received for U.S. Appl. No. 15/730,610, dated Aug. 6, 2019, 28 pages.
Final Office Action received for U.S. Appl. No. 15/910,263, dated Aug. 28, 2019, 32 pages.
Final Office Action received for U.S. Appl. No. 16/263,280, dated Mar. 4, 2021, 13 pages.
Final Office Action received for U.S. Appl. No. 16/583,981, dated Apr. 16, 2020, 19 pages.
Final Office Action received for U.S. Appl. No. 16/583,989, dated Jul. 10, 2020, 23 pages.
Final Office Action received for U.S. Appl. No. 16/583,994, dated Jul. 23, 2020, 16 pages.
Final Office Action received for U.S. Appl. No. 16/584,490, dated May 1, 2020, 48 pages.
Final Office Action received for U.S. Appl. No. 16/702,968, dated Jul. 27, 2020, 21 pages.
Final Office Action received for U.S. Appl. No. 16/723,583, dated Feb. 5, 2021, 15 pages.
Final Office Action received for U.S. Appl. No. 16/803,849, dated Nov. 2, 2021, 37 pages.
Final Office Action received for U.S. Appl. No. 16/803,849, dated Sep. 24, 2020, 29 pages.
Final Office Action received for U.S. Appl. No. 16/807,604, dated Aug. 19, 2020, 35 pages.
Final Office Action received for U.S. Appl. No. 16/922,675, dated Dec. 3, 2020, 21 pages.
Final Office Action received for U.S. Appl. No. 16/922,675, dated Nov. 30, 2020, 12 pages.
Final Office Action received for U.S. Appl. No. 17/026,818, dated Jan. 29, 2021, 21 pages.
Final Office Action received for U.S. Appl. No. 17/031,833, dated Jan. 26, 2021, 17 pages.
Final Office Action received for U.S. Appl. No. 17/476,404, dated May 5, 2022, 30 pages.
"Free Virtual Classic Analogue Mono Synth", Samsara Cycle Audio Releases DEISK-O, Jan. 2, 2011, 3 pages.
Intention to Grant received for Danish Patent Application No. PA201770392, dated Aug. 31, 2018, 2 pages.
Intention to Grant received for Danish Patent Application No. PA201770392, dated Jul. 2, 2018, 2 pages.
Intention to Grant received for Danish Patent Application No. PA201770401, dated Jun. 14, 2018, 2 Pages.
Intention to Grant received for Danish Patent Application No. PA201770401, dated Sep. 17, 2018, 2 pages.
Intention to Grant received for Danish Patent Application No. PA201770403, dated May 7, 2018, 2 pages.

(56) References Cited

OTHER PUBLICATIONS

Intention to Grant received for Danish Patent Application No. PA201770403, dated Oct. 3, 2018, 2 pages.
Intention to Grant received for Danish Patent Application No. PA201770404, dated Sep. 23, 2019, 3 pages.
Intention to Grant received for Danish Patent Application No. PA201770406, dated Feb. 6, 2020, 3 pages.
Intention to Grant received for Danish Patent Application No. PA201770408, dated Nov. 30, 2018, 3 pages.
Intention to Grant received for Danish Patent Application No. PA202070560, dated Apr. 26, 2021, 2 pages.
Intention to Grant received for Danish Patent Application No. PA202070617, dated Nov. 15, 2021, 2 pages.
Intention to Grant received for European Patent Application No. 10712824.1, dated Jan. 5, 2018, 9 pages.
Intention to Grant received for European Patent Application No. 13184872.3, dated Feb. 11, 2019, 7 pages.
Intention to Grant received for European Patent Application No. 18197583.0, dated Jan. 17, 2022, 9 pages.
Intention to Grant received for European Patent Application No. 18197583.0, dated Jul. 23, 2021, 9 pages.
Intention to Grant received for European Patent Application No. 18197589.7, dated Jan. 21, 2021, 8 pages.
Intention to Grant received for European Patent Application No. 19207753.5, dated Jan. 28, 2022, 8 pages.
Intention to Grant received for European Patent Application No. 19207753.5, dated Sep. 3, 2021, 8 pages.
International Preliminary Report on Patentability received for PCT Patent Application No. PCT/US00/010441, dated Feb. 14, 2001, 3 pages.
International Preliminary Report on Patentability received for PCT Patent Application No. PCT/US2015/045965, dated Dec. 27, 2016, 10 pages.
International Preliminary Report on Patentability received for PCT Patent Application No. PCT/US2018/032158, dated Nov. 21, 2019, 12 pages.
International Preliminary Report on Patentability received for PCT Patent Application No. PCT/US2018/032904, dated Nov. 28, 2019, 14 pages.
International Preliminary Report on Patentability received for PCT Patent Application No. PCT/US2020/026044, dated Dec. 9, 2021, 18 pages.
International Preliminary Report on Patentability received for PCT Patent Application No. PCT/US2020/035446, dated Dec. 9, 2021, 14 pages.
International Preliminary Report on Patentability received for PCT Patent Application No. PCT/US2020/035488, dated Dec. 9, 2021, 16 pages.
International Search Report and Written Opinion received for PCT Patent Application No. PCT/USOO/10441, dated Jul. 11, 2000, 2 pages.
International Search Report and Written Opinion received for PCT Patent Application No. PCT/US2018/032158, dated Nov. 2, 2018, 19 pages.
International Search Report and Written Opinion received for PCT Patent Application No. PCT/US2018/032904, dated Oct. 1, 2018, 21 pages.
International Search Report and Written Opinion received for PCT Patent Application No. PCT/US2020/026044, dated Sep. 9, 2020, 26 pages.
International Search Report and Written Opinion received for PCT Patent Application No. PCT/US2020/035446, dated Nov. 10, 2020, 20 pages.
International Search Report and Written Opinion received for PCT Patent Application No. PCT/US2020/035488, dated Nov. 17, 2020, 21 pages.
International Search Report and Written Opinion received for PCT Patent Application No. PCT/US2021/031760, dated Sep. 16, 2021, 18 pages.
International Search Report and Written Opinion received for PCT Patent Application No. PCT/US2021/048358, dated Feb. 24, 2022, 21 pages.
Invitation to Pay Addition Fees and Partial International Search Report received for PCT Patent Application No. PCT/US2018/032904, mailed on Jul. 31, 2018, 18 pages.
Invitation to Pay Additional Fees received for PCT Patent Application No. PCT/US2018/032158, dated Sep. 10, 2018, 16 pages.
Invitation to Pay Additional Fees received for PCT Patent Application No. PCT/US2020/026044, dated Jun. 25, 2020, 12 pages.
Invitation to Pay Additional Fees received for PCT Patent Application No. PCT/US2020/035446, dated Sep. 11, 2020, 12 pages.
Invitation to Pay Additional Fees received for PCT Patent Application No. PCT/US2020/035488, dated Sep. 23, 2020, 15 pages.
Invitation to Pay Additional Fees received for PCT Patent Application No. PCT/US2021/048358, dated Dec. 23, 2021, 14 pages.
Invitation to Pay Search Fees received for European Patent Application No. 18728002.9, mailed on Sep. 2, 2020, 8 pages.
Invitation to Pay Search Fees received for European Patent Application No. 18733381.0, dated Jun. 30, 2021, 4 pages.
Minutes of the Oral Proceedings received for European Patent Application No. 00923491.5, mailed on May 11, 2011., 69 pages.
Minutes of the Oral Proceedings received for European Patent Application No. 18197583.0, mailed on Mar. 9, 2021, 6 pages.
Non-Final Office Action received for U.S. Appl. No. 17/476,404, dated Feb. 8, 2022, 26 pages.
Non-Final Office Action received for U.S. Appl. No. 09/293,507, dated Aug. 1, 2001, 13 pages.
Non-Final Office Action received for U.S. Appl. No. 09/293,507, dated Jun. 22, 2000, 11 pages.
Non-Final Office Action received for U.S. Appl. No. 09/293,508, dated Jun. 30, 2000, 10 pages.
Non-Final Office Action received for U.S. Appl. No. 10/308,315, dated Aug. 8, 2005, 12 pages.
Non-Final Office Action received for U.S. Appl. No. 10/374,013, dated Feb. 1, 2007, 8 pages.
Non-Final Office Action received for U.S. Appl. No. 11/521,740, dated Dec. 27, 2007, 8 pages.
Non-Final Office Action received for U.S. Appl. No. 11/522,167, dated Dec. 6, 2012, 15 pages.
Non-Final Office Action received for U.S. Appl. No. 11/522,167, dated Feb. 5, 2009, 9 pages.
Non-Final Office Action received for U.S. Appl. No. 11/522,167, dated Jan. 20, 2010, 10 pages.
Non-Final Office Action received for U.S. Appl. No. 11/522,167, dated May 2, 2007, 8 pages.
Non-Final Office Action received for U.S. Appl. No. 11/522,167, dated Oct. 19, 2007, 10 pages.
Non-Final Office Action received for U.S. Appl. No. 11/983,059, dated Dec. 30, 2010, 11 pages.
Non-Final Office Action received for U.S. Appl. No. 13/489,245, dated Apr. 8, 2019, 27 pages.
Non-Final Office Action received for U.S. Appl. No. 13/489,245, dated Dec. 27, 2017, 22 pages.
Non-Final Office Action received for U.S. Appl. No. 13/489,245, dated Nov. 20, 2013, 25 Pages.
Non-Final Office Action received for U.S. Appl. No. 14/045,544, dated Oct. 6, 2015, 20 pages.
Non-Final Office Action received for U.S. Appl. No. 14/830,629, dated Dec. 1, 2016, 20 pages.
Non-Final Office Action received for U.S. Appl. No. 14/830,629, dated Jun. 15, 2017, 24 pages.
Non-Final Office Action received for U.S. Appl. No. 15/274,963, dated Mar. 13, 2018, 23 pages.
Non-Final Office Action received for U.S. Appl. No. 15/730,610, dated Apr. 15, 2020, 36 pages.
Non-Final Office Action received for U.S. Appl. No. 15/730,610, dated Feb. 1, 2019, 22 pages.
Non-Final Office Action received for U.S. Appl. No. 15/910,263, dated Jun. 15, 2020, 38 pages.
Non-Final Office Action received for U.S. Appl. No. 15/910,263, dated Mar. 4, 2019, 26 pages.

(56) References Cited

OTHER PUBLICATIONS

Non-Final Office Action received for U.S. Appl. No. 16/263,280, dated Jul. 27, 2020, 11 pages.
Non-Final Office Action received for U.S. Appl. No. 16/583,981, dated Dec. 6, 2019, 14 pages.
Non-Final Office Action received for U.S. Appl. No. 16/583,989, dated Jan. 24, 2020, 20 pages.
Non-Final Office Action received for U.S. Appl. No. 16/583,994, dated Dec. 23, 2020, 17 pages.
Non-Final Office Action received for U.S. Appl. No. 16/583,994, dated Dec. 30, 2019, 14 pages.
Non-Final Office Action received for U.S. Appl. No. 16/584,490, dated Dec. 10, 2019, 27 pages.
Non-Final Office Action received for U.S. Appl. No. 16/702,968, dated Apr. 8, 2020, 20 pages.
Non-Final Office Action received for U.S. Appl. No. 16/723,583, dated Aug. 13, 2020, 13 pages.
Non-Final Office Action received for U.S. Appl. No. 16/803,849, dated Jul. 13, 2020, 23 pages.
Non-Final Office Action received for U.S. Appl. No. 16/803,849, dated May 14, 2021, 34 pages.
Non-Final Office Action received for U.S. Appl. No. 16/807,604, dated Jun. 2, 2020, 28 pages.
Non-Final Office Action received for U.S. Appl. No. 16/836,571, dated Mar. 25, 2021, 28 pages.
Non-Final Office Action received for U.S. Appl. No. 16/917,659, dated Jan. 14, 2022, 10 pages.
Non-Final Office Action received for U.S. Appl. No. 16/922,675, dated Aug. 13, 2020, 17 pages.
Non-Final Office Action received for U.S. Appl. No. 16/922,675, dated May 4, 2021, 23 pages.
Non-Final Office Action received for U.S. Appl. No. 17/026,818, dated Nov. 25, 2020, 20 pages.
Non-Final Office Action received for U.S. Appl. No. 17/027,373, dated Feb. 2, 2022, 17 pages.
Non-Final Office Action received for U.S. Appl. No. 17/031,833, dated Dec. 7, 2020, 13 pages.
Non-Final Office Action received for U.S. Appl. No. 17/168,069, dated Jul. 21, 2021, 17 pages.
Non-Final Office Action received for U.S. Appl. No. 17/176,908, dated Feb. 24, 2022, 28 pages.
Non-Final Office Action received for U.S. Appl. No. 17/223,794, dated Jun. 16, 2021, 32 pages.
Non-Final Office Action received for U.S. Appl. No. 17/461,103, dated Nov. 22, 2021, 15 pages.
Non-Final Office Action received for U.S. Appl. No. 10/308,315, dated Jul. 28, 2004., 10 pages.
Notice of Acceptance received for Australian Patent Application No. 2018223051, dated Oct. 30, 2018, 3 pages.
Notice of Acceptance received for Australian Patent Application No. 2018236872, dated Jul. 9, 2019, 3 pages.
Notice of Acceptance received for Australian Patent Application No. 2019268111, dated Feb. 18, 2021, 3 pages.
Notice of Acceptance received for Australian Patent Application No. 2020239711, dated Dec. 16, 2021, 3 pages.
Notice of Acceptance received for Australian Patent Application No. 2020282362, dated Jan. 4, 2022, 3 pages.
Notice of Acceptance received for Australian Patent Application No. 2020285524, dated Dec. 17, 2021, 3 pages.
Notice of Acceptance received for Australian Patent Application No. 2021203669, dated May 25, 2022, 3 pages.
Notice of Acceptance received for Australian Patent Application No. 2021204454, dated Feb. 25, 2022, 3 pages.
Notice of Acceptance received for Australian Patent Application No. 2022201369, dated Mar. 17, 2022, 3 pages.
Notice of Acceptance received for Australian Patent Application No. 2022202458, dated May 6, 2022, 3 pages.
Notice of Allowance and Search Report received for Taiwanese Patent Application No. 104128687, dated Jun. 7, 2016, 4 pages (1 page of English Translation and 3 pages of Official copy).
Notice of Allowance received for Canadian Patent Application No. 2,882,403, dated Oct. 31, 2018, 1 page.
Notice of Allowance received for Chinese Patent Application No. 201410449822.8, dated Mar. 5, 2019, 2 pages (1 page of English Translation and 1 page of official copy).
Notice of Allowance received for Chinese Patent Application No. 201811539260.0, dated Mar. 15, 2021, 2 pages (1 page of English Translation and 1 page of Official Copy).
Notice of Allowance received for Chinese Patent Application No. 201880001436.9, dated May 8, 2020, 3 pages (2 pages of English Translation and 1 page of Official Copy).
Notice of Allowance received for Chinese Patent Application No. 202010125114.4, dated Nov. 24, 2021, 2 pages (1 page of English Translation and 1 page of Official Copy).
Notice of Allowance received for Danish Patent Application No. PA201770408, dated Feb. 8, 2019, 2 pages.
Notice of Allowance received for Japanese Patent Application No. 2016-001259, dated Jul. 27, 2018, 4 pages (1 page of English Translation and 3 pages of Official Copy).
Notice of Allowance received for Japanese Patent Application No. 2016-017400, dated Dec. 16, 2016, 3 pages of Official Copy Only.
Notice of Allowance received for Japanese Patent Application No. 2021-563716, dated Mar. 14, 2022, 4 pages (1 page of English Translation and 3 pages of Official Copy).
Notice of Allowance received for Korean Patent Application No. 1020167025395, dated Oct. 26, 2016, 5 pages (2 pages of English Translation and 3 pages of Official Copy).
Notice of Allowance received for Korean Patent Application No. 10-2021-7035472, dated Nov. 23, 2021, 4 pages (2 pages of English Translation and 2 pages of Official Copy).
Notice of Allowance received for Korean Patent Application No. 10-2021-7039234, dated Dec. 20, 2021, 4 pages (1 page of English Translation and 3 pages of Official Copy).
Notice of Allowance received for U.S. Appl. No. 16/702,968, dated Apr. 21, 2021, 20 pages.
Notice of Allowance received for U.S. Appl. No. 09/293,507, dated Jul. 25, 2002, 6 pages.
Notice of Allowance received for U.S. Appl. No. 09/293,508, dated Feb. 13, 2001, 5 pages.
Notice of Allowance received for U.S. Appl. No. 10/308,315, dated Aug. 27, 2007, 6 pages.
Notice of Allowance received for U.S. Appl. No. 10/374,013, dated Aug. 27, 2007, 6 pages.
Notice of Allowance received for U.S. Appl. No. 10/374,445, dated May 5, 2006, 7 pages.
Notice of Allowance received for U.S. Appl. No. 10/374,831, dated Sep. 10, 2004, 8 pages.
Notice of Allowance received for U.S. Appl. No. 11/521,740, dated Jul. 24, 2008, 7 pages.
Notice of Allowance received for U.S. Appl. No. 11/983,059, dated Feb. 10, 2012, 8 pages.
Notice of Allowance received for U.S. Appl. No. 12/395,537 dated Jun. 29, 2016, 14 pages.
Notice of Allowance received for U.S. Appl. No. 12/566,673, dated Feb. 26, 2020, 7 pages.
Notice of Allowance received for U.S. Appl. No. 14/830,629, dated Oct. 17, 2018, 8 pages.
Notice of Allowance received for U.S. Appl. No. 15/274,963, dated Jul. 6, 2018, 10 pages.
Notice of Allowance received for U.S. Appl. No. 15/730,610, dated Oct. 21, 2020, 29 pages.
Notice of Allowance received for U.S. Appl. No. 15/910,263, dated Feb. 18, 2021, 3 pages.
Notice of Allowance received for U.S. Appl. No. 15/910,263, dated Jan. 22, 2021, 33 pages.
Notice of Allowance received for U.S. Appl. No. 16/263,280, dated Jun. 8, 2021, 8 pages.
Notice of Allowance received for U.S. Appl. No. 16/263,280, dated Sep. 17, 2021, 8 pages.
Notice of Allowance received for U.S. Appl. No. 16/583,981, dated Mar. 26, 2021, 10 pages.
Notice of Allowance received for U.S. Appl. No. 16/583,989, dated Apr. 1, 2021, 5 pages.

(56) References Cited

OTHER PUBLICATIONS

Notice of Allowance received for U.S. Appl. No. 16/583,989, dated Dec. 24, 2020, 7 pages.
Notice of Allowance received for U.S. Appl. No. 16/583,994, dated Jun. 24, 2021, 10 pages.
Notice of Allowance received for U.S. Appl. No. 16/584,490, dated Aug. 27, 2020, 13 pages.
Notice of Allowance received for U.S. Appl. No. 16/584,490, dated Mar. 26, 2021, 13 pages.
Notice of Allowance received for U.S. Appl. No. 16/803,849, dated May 17, 2022, 12 pages.
Notice of Allowance received for U.S. Appl. No. 16/807,604, dated Apr. 30, 2021, 25 pages.
Notice of Allowance received for U.S. Appl. No. 16/836,571, dated Feb. 14, 2022, 31 pages.
Notice of Allowance received for U.S. Appl. No. 16/836,571, dated Sep. 8, 2021, 25 pages.
Notice of Allowance received for U.S. Appl. No. 16/888,775, dated Jan. 12, 2022, 5 pages.
Notice of Allowance received for U.S. Appl. No. 16/888,775, dated Jul. 26, 2021, 5 pages.
Notice of Allowance received for U.S. Appl. No. 16/888,775, dated Jun. 3, 2021, 11 pages.
Notice of Allowance received for U.S. Appl. No. 16/922,675, dated Feb. 10, 2022, 8 pages.
Notice of Allowance received for U.S. Appl. No. 16/922,675, dated Jan. 21, 2021, 7 pages.
Notice of Allowance received for U.S. Appl. No. 16/922,675, dated Sep. 27, 2021, 10 pages.
Notice of Allowance received for U.S. Appl. No. 17/026,818, dated May 13, 2021, 10 pages.
Notice of Allowance received for U.S. Appl. No. 17/031,833, dated Jun. 25, 2021, 15 pages.
Notice of Allowance received for U.S. Appl. No. 17/031,833, dated Sep. 20, 2021, 6 pages.
Notice of Allowance received for U.S. Appl. No. 17/168,069, dated Jan. 19, 2022, 12 pages.
Notice of Allowance received for U.S. Appl. No. 17/168,069, dated Mar. 22, 2022, 5 pages.
Notice of Allowance received for U.S. Appl. No. 17/461,103, dated Mar. 17, 2022, 10 pages.
Notice of Non-Compliant Amendment received for U.S. Appl. No. 11/522,167, dated May 14, 2008, 4 pages.
Office Action received for Australian Patent Application No. 2018236870, dated Jul. 29, 2019, 7 pages.
Office Action received for Australian Patent Application No. 2018236870, dated Nov. 21, 2018, 10 pages.
Office Action received for Australian Patent Application No. 2018236870, dated Oct. 31, 2019, 8 pages.
Office Action received for Australian Patent Application No. 2018236872, dated Nov. 23, 2018, 4 pages.
Office Action received for Australian Patent Application No. 2019268111, dated Oct. 27, 2020, 7 pages.
Office Action received for Australian Patent Application No. 2020239711, dated Sep. 13, 2021, 5 pages.
Office Action received for Australian Patent Application No. 2020282362, dated Nov. 25, 2021, 3 pages.
Office Action received for Australian Patent Application No. 2021203669, dated Apr. 5, 2022, 3 pages.
Office Action received for Australian Patent Application No. 2021204454, dated Aug. 9, 2021, 7 pages.
Office Action received for Canadian Patent Application No. 2,882,403, dated Sep. 15, 2017, 5 pages.
Office Action received for Chinese Patent Application No. 201410449822.8, dated Dec. 2, 2016, 9 pages (5 pages of English Translation and 4 pages of Official Copy).
Office Action received for Chinese Patent Application No. 201410449822.8, dated May 4, 2018, 12 pages (5 pages of English Translation and 7 pages of Official copy).
Office Action received for Chinese Patent Application No. 201410449822.8, dated Nov. 20, 2018, 11 pages (4 pages of English Translation and 7 Pages of Official Copy).
Office Action received for Chinese Patent Application No. 201410449822.8, dated Sep. 30, 2017, 20 Pages (11 pages of English Translation and 9 pages of Official Copy).
Office Action received for Chinese Patent Application No. 201580046339.8, dated Feb. 26, 2019, 18 pages (6 pages of English Translation and 12 pages of Official Copy).
Office Action received for Chinese Patent Application No. 201580046339.8, dated Jun. 3, 2020, 19 pages (10 pages of English Translation and 9 pages of Official Copy).
Office Action received for Chinese Patent Application No. 201580046339.8, dated Oct. 19, 2020, 12 pages (4 pages of English Translation and 8 pages of Official Copy).
Office Action received for Chinese Patent Application No. 201580046339.8, dated Oct. 31, 2019, 9 pages (3 pages of English Translation and 6 pages of Official Copy).
Office Action received for Chinese Patent Application No. 201811539259.8, dated Apr. 3, 2020, 10 pages (6 pages of English Translation and 4 pages of Official Copy).
Office Action received for Chinese Patent Application No. 201811539259.8, dated Sep. 3, 2020, 10 pages (6 pages of English Translation and 4 pages of Official Copy).
Office Action received for Chinese Patent Application No. 201811539259.8, dated Sep. 18, 2019, 12 pages (6 pages of English Translation and 6 pages of Official Copy).
Office Action received for Chinese Patent Application No. 201811539260.0, dated Jun. 3, 2020, 8 pages (5 pages of English Translation and 3 pages of Official Copy).
Office Action received for Chinese Patent Application No. 201811539260.0, dated Nov. 4, 2020, 9 pages (5 pages of English Translation and 4 pages of Official Copy).
Office Action received for Chinese Patent Application No. 201811539260.0, dated Oct. 8, 2019, 14 pages (7 pages of English Translation and 7 pages of Official Copy).
Office Action received for Chinese Patent Application No. 201880001436.9, dated Apr. 28, 2019, 19 pages (11 pages of English Translation and 8 pages of Official copy).
Office Action received for Chinese Patent Application No. 201880001436.9, dated Nov. 6, 2019, 24 pages (15 pages of English Translation and 9 pages of Official Copy).
Office Action received for Chinese Patent Application No. 201910164962.3, dated Apr. 8, 2020, 25 pages (13 pages of English Translation and 12 pages of Official Copy).
Office Action received for Chinese Patent Application No. 201910164962.3, dated Jan. 12, 2021, 14 pages (7 pages of English Translation and 7 pages of Official Copy).
Office Action received for Chinese Patent Application No. 201910164962.3, dated Sep. 18, 2020, 19 pages (6 pages of English Translation and 13 pages of Official Copy).
Office Action received for Chinese Patent Application No. 201911128105.4, dated Apr. 8, 2021, 10 pages (5 pages of English Translation and 5 pages of Official Copy).
Office Action received for Chinese Patent Application No. 201911128105.4, dated Jan. 4, 2021, 14 pages (7 pages of English Translation and 7 pages of Official Copy).
Office Action received for Chinese Patent Application No. 201911128105.4, dated Jul. 3, 2020, 18 pages (9 pages of English Translation and 9 pages of Official Copy).
Office Action received for Chinese Patent Application No. 202010125114.4, dated Aug. 21, 2020, 16 pages (8 pages of English Translation and 8 pages of Official Copy).
Office Action received for Chinese Patent Application No. 202010125114.4, dated Jun. 7, 2021, 7 pages (4 pages of English Translation and 3 pages of Official Copy).
Office Action received for Chinese Patent Application No. 202010125114.4, dated Mar. 1, 2021, 15 pages (9 pages of English Translation and 6 pages of Official Copy).
Office Action received for Danish Patent Application No. PA201770392, dated Apr. 17, 2018, 2 pages.
Office Action received for Danish Patent Application No. PA201770392, dated Dec. 8, 2017, 4 pages.

(56) References Cited

OTHER PUBLICATIONS

Office Action received for Danish Patent Application No. PA201770392, dated Jun. 20, 2017, 11 pages.
Office Action received for Danish Patent Application No. PA201770401, dated Jan. 31, 2018, 3 pages.
Office Action received for Danish Patent Application No. PA201770401, dated May 17, 2018, 3 Pages.
Office Action received for Danish Patent Application No. PA201770402, dated Apr. 16, 2018, 5 pages.
Office Action received for Danish Patent Application No. PA201770402, dated Dec. 18, 2017, 6 pages.
Office Action received for Danish Patent Application No. PA201770402, dated Jun. 19, 2017, 11 pages.
Office Action received for Danish Patent Application No. PA201770403, dated Dec. 12, 2017, 3 pages.
Office Action received for Danish Patent Application No. PA201770403, dated Jun. 16, 2017, 8 pages.
Office Action received for Danish Patent Application No. PA201770404, dated Aug. 8, 2018, 4 pages.
Office Action received for Danish Patent Application No. PA201770404, dated Dec. 1, 2017, 5 pages.
Office Action received for Danish Patent Application No. PA201770404, dated Feb. 21, 2019, 2 pages.
Office Action received for Danish Patent Application No. PA201770404, dated May 1, 2019, 2 pages.
Office Action received for Danish Patent Application No. PA201770406, dated Feb. 27, 2018, 7 pages.
Office Action received for Danish Patent Application No. PA201770406, dated Jan. 25, 2019, 8 pages.
Office Action received for Danish Patent Application No. PA201770406, dated Jun. 22, 2017, 11 pages.
Office Action received for Danish Patent Application No. PA201770406, dated Mar. 26, 2019, 3 pages.
Office Action received for Danish Patent Application No. PA201770406, dated Nov. 11, 2019, 4 pages.
Office Action received for Danish Patent Application No. PA201770408, dated Dec. 21, 2017, 6 pages.
Office Action received for Danish Patent Application No. PA201770408, dated Jun. 20, 2017, 9 pages.
Office Action received for Danish Patent Application No. PA201770408, dated May 3, 2018, 7 pages.
Office Action received for Danish Patent Application No. PA201770410, dated Apr. 9, 2018, 5 pages.
Office Action received for Danish Patent Application No. PA201770410, dated Jun. 23, 2017, 9 pages.
Office Action received for Danish Patent Application No. PA201770410, dated Nov. 22, 2018, 5 pages.
Office Action received for Danish Patent Application No. PA201870060, dated Jan. 15, 2019, 4 pages.
Office Action received for Danish Patent Application No. PA201870060, dated Jul. 25, 2019, 2 pages.
Office Action received for Danish Patent Application No. PA201870419, dated Feb. 27, 2020, 8 pages.
Office Action received for Danish Patent Application No. PA201870419, dated Sep. 30, 2019, 4 pages.
Office Action received for Danish Patent Application No. PA201870598, dated May 1, 2019, 3 pages.
Office Action received for Danish Patent Application No. PA201870598, dated Nov. 8, 2019, 4 pages.
Office Action received for Danish Patent Application No. PA201970533, dated Apr. 20, 2021, 2 pages.
Office Action received for Danish Patent Application No. PA201970533, dated Jul. 17, 2020, 6 pages.
Office Action received for Danish Patent Application No. PA202070560, dated Dec. 11, 2020, 7 pages.
Office Action received for Danish Patent Application No. PA202070560, dated Mar. 10, 2021, 7 pages.
Office Action received for Danish Patent Application No. PA202070617, dated Sep. 24, 2021, 4 pages.
Office Action received for Danish Patent Application No. PA202170320, dated May 3, 2022, 3 pages.
Office Action received for European Patent Application No. 00923491.5, dated Jan. 11, 2010, 6 pages.
Office Action received for European Patent Application No. 00923491.5, dated Mar. 12, 2007, 9 pages.
Office Action received for European Patent Application No. 00923491.5, dated Sep. 11, 2007, 5 pages.
Office Action received for European Patent Application No. 07842262.3, dated Feb. 16, 2017, 6 Pages.
Office Action received for European Patent Application No. 10177096.4, dated Feb. 20, 2012, 6 pages.
Office Action received for European Patent Application No. 10177096.4, dated Jul. 26, 2017, 8 pages.
Office Action received for European Patent Application No. 10177096.4, dated Jun. 7, 2018, 14 pages.
Office Action received for European Patent Application No. 10177096.4, dated Mar. 21, 2013., 9 pages.
Office Action received for European Patent Application No. 10177099.8, dated Feb. 20, 2012, 5 pages.
Office Action received for European Patent Application No. 13184872.3, dated May 18, 2018, 8 pages.
Office Action received for European Patent Application No. 18197583.0, dated Feb. 28, 2020, 8 pages.
Office Action received for European Patent Application No. 18197589.7, dated Oct. 1, 2019, 5 pages.
Office Action received for European Patent Application No. 18728002.9, dated Dec. 14, 2020, 15 pages.
Office Action received for European Patent Application No. 18733381.0, dated Oct. 29, 2021, 9 pages.
Office Action received for European Patent Application No. 19207753.5, dated May 10, 2021, 4 pages.
Office Action received for European Patent Application No. 19207753.5, dated Nov. 12, 2020, 5 pages.
Office Action received for European Patent Application No. 20158824.1, dated May 18, 2021, 10 pages.
Office Action received for Indian Patent Application No. 202014041529, dated Dec. 6, 2021, 6 pages.
Office Action received for Japanese Patent Application No. 2016-001259, dated Feb. 23, 2018, 11 pages (6 pages of English Translation and 5 pages of Official Copy).
Office Action received for Japanese Patent Application No. 2016-001259, dated Jan. 6, 2017, 6 pages (3 pages of English Translation and 3 pages of Official Copy).
Office Action received for Japanese Patent Application No. 2016-001259, dated Nov. 13, 2017, 10 Pages (5 pages of English translation and 5 pages of official copies).
Office Action received for Japanese Patent Application No. 2018-119170, dated May 10, 2019, 8 pages (4 pages of English Translation and 4 pages of Official Copy).
Office Action received for Japanese Patent Application No. 2020-159840, dated Dec. 10, 2021, 13 pages (7 pages of English Translation and 6 pages of Official Copy).
Office Action received for Japanese Patent Application No. 2020-159840, dated Mar. 28, 2022, 6 pages (3 pages of English Translation and 3 pages of Official Copy).
Office Action received for Korean Patent Application No. 10-2013-7028487, dated Jun. 13, 2016, 6 pages (3 pages of English Translation and 3 pages of Official Copy).
Office Action received for Korean Patent Application No. 10-2022-7008567, dated Mar. 28, 2022, 5 pages (2 pages of English Translation and 3 pages of Official Copy).
"On-Line Definition for Playback", American Heritage Dictionary of the English Language, 4th Edition, 2000, 1 page.
Partial European Search Report received for European Patent Application No. 20158824.1, dated May 8, 2020, 14 pages.
Partial European Search Report received for European Patent Application No. 18197583.0, dated Jan. 14, 2019, 18 pages.
"Quick Time Movie Player Ver. 2.1.2.59, Current Time Indicator Dragging Operation", Ver. 2.1.2.59, 1996, 1 page.
"RealOne Playerversion 2.0 Screen Dumps", 2002, 4 pages.
Restriction Requirement received for U.S. Appl. No. 10/374,013, dated Oct. 6, 2006, 4 pages.

(56) References Cited

OTHER PUBLICATIONS

Result of Consultation received for European Patent Application No. 18197583.0, dated Feb. 24, 2021, 3 pages.
Result of Consultation received for European Patent Application No. 18197589.7, dated Dec. 1, 2020, 9 pages.
Result of Consultation received for European Patent Application No. 18197589.7, dated Dec. 17, 2020, 6 pages.
Result of Consultation received for European Patent Application No. 20158824.1, dated May 17, 2022, 7 pages.
Search Report received for European Patent Application No. 00923491.5, dated Jun. 2, 2006, 6 pages.
Search Report received for European Patent Application No. 00923491.5, dated Mar. 6, 2006, 4 pages.
Search Report and Opinion received for Danish Patent Application No. PA201770401, dated Jun. 19, 2017, 6 pages.
Search Report and Opinion received for Danish Patent Application No. PA201870060 dated Apr. 30, 2018, 7 pages.
Search Report and Opinion received for Danish Patent Application No. PA201870419, dated Aug. 27, 2018, 7 pages.
Search Report and Opinion received for Danish Patent Application No. PA201870419, dated Sep. 10, 2018, 9 pages.
Search Report and Opinion received for Danish Patent Application No. PA201870598, dated Dec. 5, 2018, 8 pages.
Search Report and Opinion received for Danish Patent Application No. PA201970533, dated Oct. 25, 2019, 9 pages.
Search Report and Opinion received for Danish Patent Application No. PA202070617, dated Dec. 23, 2020, 8 pages.
Search Report and Opinion received for Danish Patent Application No. PA202170320, dated Oct. 6, 2021, 9 pages.
Search Report received for Danish Patent Application No. PA201770404, dated Jun. 20, 2017, 8 Pages.
Search Report received for Danish Patent Application No. PA201770409, dated Jun. 20, 2017, 9 Pages.
"Smart Home App—What is the Widget"', Online Available at: https://support.vivint.com/s/article/Vivint-Smart-Home-App-What-is-the-Widget, Jan. 26, 2019, 4 pages.
Summon to Attend Oral Proceeding received for European Patent Application No. 10177099.8 mailed on Mar. 20, 2013, 9 pages.
Summons to Attend Oral Proceedings received for European Patent Application 20158824.1, mailed on Dec. 7, 2021, 6 pages.
Summons to attend Oral proceedings received for European Patent Application No. 00923491.5, mailed on Jan. 27, 2011, 10 pages.
Summons to Attend Oral Proceedings received for European Patent Application No. 07842262.3, mailed on Jun. 25, 2018, 9 pages.
Summons to Attend Oral Proceedings received for European Patent Application No. 18197583.0, mailed on Aug. 14, 2020, 12 pages.
Summons to attend Oral proceedings received for European Patent Application No. 18197589.7, mailed on Apr. 9, 2020, 7 pages.
Summons to Attend Oral Proceedings received for European Patent Application No. 10177096.4, mailed on Sep. 21, 2018, 12 pages.
Summons to Oral Proceedings received for German Patent Application No. 112007002143.8 mailed on Nov. 28, 2018, 13 pages (6 pages of English Translation and 7 pages of Official Copy).
Supplemental Notice of Allowance received for U.S. Appl. No. 16/584,490, dated Apr. 13, 2021, 2 pages.
Supplemental Notice of Allowance received for U.S. Appl. No. 17/168,069, dated Apr. 20, 2022, 2 pages.
Supplemental Notice of Allowance received for U.S. Appl. No. 17/168,069, dated Feb. 2, 2022, 2 pages.
"The Single Keyboard Piano", available at: <http://moocowmusic.com/PianistPro/Manual/ManualSingleKeyboardPiano.html>, Sep. 26, 2010, 4 pages.
"Windows Media Player for Windows XP version 8.0", 2001, 2 pages.
Androidcentral, "How do i respond to group messages from notification bar?", Available online at: https://forums.androidcentral.com/ask-question/952030-how-do-i-respond-group-messages-notification-bar.html, Mar. 25, 2019, 3 pages.

Petternitter, "User Restricted Collaborative Playlists—The Spotify Community", Downloaded from: https://community.spotify.com/t5/Archived-Ideas/User-restricted-collaborative-playlists/idi-p/70721. May 28, 2012, 4 pages.
Office Action received for European Patent Application No. 07842262.3, dated Sep. 8, 2011, 5 pages.
Office Action received for Korean Patent Application No. 10-2013-7028487, dated Feb. 18, 2016, 8 pages (4 English Translation and 4 pages of Official Copy).
Office Action Received for Korean Patent Application No. 10-2013-7028487, dated Jun. 5, 2015, 9 pages (4 pages of English Translation and 5 pages of Official Copy).
Notice of allowance received for Korean Patent Application No. 10-2013-7028489, dated Jan. 25, 2016, 5 pages (2 pages of English Translation and 3 pages of Official Copy).
Office Action received for Korean Patent Application No. 10-2013-7028489, dated Jun. 4, 2015, 4 pages (1 page of English Translation and 3 pages of Official Copy).
Office Action received for European Patent Application No. 10712824.1, dated Jun. 23, 2014, 7 pages.
Office Action received for European Patent Application No. 10712824.1, dated Mar. 1, 2016, 11 pages.
Final Office Action received for U.S. Appl. No. 11/459,591, dated Jan. 13, 2009, 11 pages.
Non-Final Office Action received for U.S. Appl. No. 11/459,591, dated Jul. 29, 2008, 15 pages.
Notice of Allowance received for U.S. Appl. No. 11/459,591, dated May 21, 2009, 9 pages.
Final Office Action received for U.S. Appl. No. 11/767,409, dated Jul. 17, 2012, 24 pages.
Final Office Action received for U.S. Appl. No. 11/767,409, dated Mar. 16, 2011, 15 pages.
Non-Final Office Action received for U.S. Appl. No. 11/767,409, dated Aug. 29, 2011, 18 pages.
Non-Final Office Action received for U.S. Appl. No. 11/767,409, dated Feb. 9, 2012, 20 pages.
Non-Final Office Action received for U.S. Appl. No. 11/767,409, dated Nov. 23, 2010, 12 pages.
Notice of Allowance received for U.S. Appl. No. 11/767,409, dated Jun. 12, 2013, 14 pages.
Restriction Requirement received for U.S. Appl. No. 11/767,409, dated Sep. 21, 2010, 8 pages.
Final Office Action received for U.S. Appl. No. 12/215,651, dated Jul. 6, 2012, 27 pages.
Non-Final Office Action received for U.S. Appl. No. 12/215,651, dated Aug. 15, 2013, 27 pages.
Non-Final Office Action received for U.S. Appl. No. 12/215,651, dated Feb. 2, 2012, 18 pages.
Notice of Allowance received for U.S. Appl. No. 12/215,651, dated Feb. 6, 2014, 5 pages.
Restriction Requirement received for U.S. Appl. No. 12/215,651, dated Sep. 28, 2011, 11 pages.
Advisory Action received for U.S. Appl. No. 12/395,537, dated Apr. 26, 2012, 4 pages.
Final Office Action received for U.S. Appl. No. 12/395,537, dated Feb. 3, 2012, 15 pages.
Final Office Action received for U.S. Appl. No. 12/395,537, dated Jun. 29, 2015, 17 pages.
Final Office Action received for U.S. Appl. No. 12/395,537, dated Nov. 14, 2013, 22 pages.
Non-Final Office Action received for U. S. U.S. Appl. No. 12/395,537, dated Dec. 14, 2015, 18 pages.
Non-Final Office Action received for U.S. Appl. No. 12/395,537, dated Aug. 15, 2011, 17 pages.
Non-Final Office Action received for U.S. Appl. No. 12/395,537, dated Jan. 5, 2015, 20 pages.
Non-Final Office Action received for U.S. Appl. No. 12/395,537, dated Jul. 8, 2013, 22 pages.
Restriction Requirement received for U.S. Appl. No. 12/395,537, dated May 9, 2011, 6 pages.
Final Office Action received for U.S. Appl. No. 12/395,541, dated Dec. 28, 2011, 16 pages.

(56) References Cited

OTHER PUBLICATIONS

Non-Final Office Action received for U.S. Appl. No. 12/395,541, dated Jul. 26, 2011, 15 pages.
Non-Final Office Action received for U.S. Appl. No. 12/395,541, dated Mar. 14, 2013, 23 pages.
Notice of Allowance received for U.S. Appl. No. 12/395,541, dated Aug. 22, 2013, 8 pages.
Notice of Allowance received for U.S. Appl. No. 12/395,541, dated Sep. 12, 2013, 2 pages.
Restriction Requirement received for U.S. Appl. No. 12/395,541, dated May 27, 2011, 6 pages.
Final Office Action received in U.S. Appl. No. 12/547,401, dated Jun. 28, 2010, 19 pages.
Non-Final Office Action received in U.S. Appl. No. 12/547,401, dated Feb. 11, 2013, 13 pages.
Non-Final Office Action received in U.S. Appl. No. 12/547,401, dated Jan. 8, 2010, 12 pages.
Notice of Allowance received for U.S. Appl. No. 12/547,401, dated Jul. 22, 2013, 8 pages.
Final Office Action received for U.S. Appl. No. 12/566,669, dated Nov. 23, 2012, 29 pages.
Non-Final Office Action received for U.S. Appl. No. 12/566,669, dated Apr. 17, 2014, 27 pages.
Non-Final Office Action received for U.S. Appl. No. 12/566,669, dated Jun. 19, 2012, 30 pages.
Notice of Allowance received for U.S. Appl. No. 12/566,669, dated Nov. 6, 2014, 12 pages.
Final Office Action received for U.S. Appl. No. 12/566,671, dated Dec. 20, 2012, 20 pages.
Non-Final Office Action received for U.S. Appl. No. 12/566,671, dated May 23, 2012, 21 pages.
Notice of Allowance received for U.S. Appl. No. 12/566,671, dated Apr. 12, 2013, 11 pages.
Notice of Allowance received for U.S. Appl. No. 12/566,671, dated Dec. 18, 2013, 11 pages.
Non-Final Office Action received for U.S. Appl. No. 12/566,672, dated Nov. 8, 2012, 11 pages.
Notice of Allowance received for U.S. Appl. No. 12/566,672, dated Jun. 24, 2013, 8 pages.
Notice of Allowance received for U.S. Appl. No. 12/566,672, dated Mar. 1, 2013, 7 pages.
Advisory Action received for U.S. Appl. No. 12/566,673, dated Jun. 12, 2013, 3 pages.
Final Office Action received for U.S. Appl. No. 12/566,673, dated Jan. 17, 2013, 22 pages.
Final Office Action received for U.S. Appl. No. 12/566,673, dated Mar. 25, 2014, 19 pages.
Non-Final Office Action received for U.S. Appl. No. 12/566,673, dated Jun. 7, 2012, 17 pages.
Non-Final Office Action received for U.S. Appl. No. 12/566,673, dated Mar. 26, 2015, 19 pages.
Non-Final Office Action received for U.S. Appl. No. 12/566,673, dated Sep. 13, 2013, 18 pages.
Non-Final Office Action received for U.S. Appl. No. 12/566,673, dated Dec. 16, 2015, 23 pages.
Decision to Grant received for European Patent Application No. 12181537.7, dated Mar. 3, 2016, 2 pages.
Extended European Search Report (includes Partial European Search Report and European Search Opinion) received for European Patent Application No. 12181537.7, dated Mar. 27, 2014, 7 pages.
Intention to Grant Received for European Patent Application No. 12181537.7, dated Sep. 22, 2015, 7 pages.
Final Office Action received for U.S. Appl. No. 13/038,217, dated May 6, 2014, 11 pages.
Non-Final Office Action received for U.S. Appl. No. 13/038,217, dated Sep. 13, 2013, 16 pages.
Final Office Action received for U.S. Appl. No. 13/333,890, dated Feb. 13, 2014, 19 pages.
Final Office Action received for U.S. Appl. No. 13/333,890, dated Oct. 2, 2015, 21 pages.
Non-Final Office Action received for U.S. Appl. No. 13/333,890, dated Aug. 30, 2013, 20 pages.
Non-Final Office Action received for U.S. Appl. No. 13/333,890, dated Jun. 5, 2015, 20 pages.
Non-Final Office Action received for U.S. Appl. No. 13/333,890, dated May 1, 2013, 26 pages.
Final Office Action received for U.S. Appl. No. 13/333,900, dated Dec. 19, 2014, 15 pages.
Final Office Action received for U.S. Appl. No. 13/333,900, dated Nov. 7, 2013, 14 pages.
Non-Final Office Action received for U.S. Appl. No. 13/333,900, dated Mar. 19, 2013, 17 pages.
Non-Final Office Action received for U.S. Appl. No. 13/333,900, dated May 23, 2014, 19 pages.
Notice of Allowance received for U.S. Appl. No. 13/333,900, dated Sep. 15, 2015, 7 pages.
Notice of Allowance received for U.S. Appl. No. 13/333,900, dated Apr. 13, 2015, 9 pages.
Notice of Allowance received for U.S. Appl. No. 13/333,900, dated Dec. 1, 2015, 2 pages.
Extended European Search Report (includes Partial European Search Report and European Search Opinion) received for European Patent Application No. 13184872.3, dated Dec. 5, 2013, 9 pages.
Notice of Allowance Received for Canadian Patent Application No. 2,661,200, dated Aug. 20, 2014, 1 page.
Office Action Received for Canadian Patent Application No. 2,661,200, dated Jan. 3, 2013, 5 pages.
Office Action received for Canadian Patent Application No. 2,661,200, dated Jun. 9, 2010, 3 pages.
Office Action Received for Canadian Patent Application No. 2,661,200, dated Nov. 1, 2011, 4 pages.
Office Action received for Canadian Patent Application No. 2,661,200, dated Nov. 14, 2013, 2 pages.
Office Action received for Canadian Patent Application No. 2,882,403, dated Apr. 2, 2015, 5 pages.
Notice of Grant received for Chinese Patent Application No. 200780033722.5, dated Jun. 19, 2014, 4 pages.
Notice of Allowance received for Chinese Patent Application No. 201210308569.5, dated May 31, 2016, 4 pages (2 pages of English Translation and 2 pages of Official Copy).
Office Action received for Chinese Patent Application No. 201210308569.5, dated Feb. 5, 2016, 3 pages.
Office Action received for Chinese Patent Application No. 201210308569.5, dated Nov. 19, 2014, 24 pages (8 pages of English Translation and 16 pages of Official Copy).
Office Action received for Chinese Patent Application No. 201210308569.5, dated Sep. 1, 2015, 39 pages (22 pages of English Translation and 17 pages of Official Copy).
Office Action Received for Japanese Patent Application No. 2012500842, dated Jan. 31, 2014, 5 pages (3 pages of English Translation and 2 pages of Official Copy).
Notice of Allowance received for Japanese Patent Application No. 2012-500842, dated Jun. 20, 2014, 3 pages.
Decision to Grant received for Japanese Patent Application No. 2014-017726, dated Dec. 7, 2015, 6 pages (3 pages of English Translation and 3 pages of official copy).
Notice of Allowance received for Japanese Patent Application No. 2014-148065, dated Jan. 12, 2016, 6 pages (3 pages English Translation and 3 pages Official copy).
Office Action received for Japanese Patent Application No. 2014-148065, dated Sep. 7, 2015, 5 pages (2 pages of English Translation and 3 pages of Official Copy).
Office Action received for Japanese Patent Application No. 2014-17726, dated Feb. 9, 2015, 4 pages.
Akshay, "Control your SmartThings compatible devices on the Gear S2 and S3 with the Smarter Things app", Online available at: https://iotgadgets.com/2017/09/control-smartthings-compatible-devices-gear-s2-s3-smarter-things-app/, Sep. 7, 2017, 4 pages.
Alba Davey, "Samsung Shape: for $400, Your Music Can Follow You Around the House", Online available at: https://www.popularmechanics.com/technology/audio/a9536/samsung-shape-for-400-your-music-can-follow-you-aroundnd-15997831/, Oct. 3, 2013, 5 pages.

(56) References Cited

OTHER PUBLICATIONS

Apple, "Iphone User's Guide", iPhone first generation, Available at: <http://pocketpccentral.net/iphone/products/1 g_iphone.htm>, Jun. 29, 2007, 124 pages.
Bennett Stephen, "ES2: Logic's Most Sophisticated Virtual Analogue Synth", Logic Notes & Techniques, Jun. 2007, 6 pages.
Bove Tony, "iPod & iTunes for Dummies", Wiley Publishing, Inc., 6th Edition, 2008, pp. 143-182.
Boxer David, "Change the permissions of the Google Drive file or folder or Share the file or folder", Blake School Website, Online Available at: https://support.blakeschool.org/hc/en-us/articles/231790648-Change-the-permissions-of-the-Google-Drive-file-or-folder-or-Share-the-file-or-folder, Oct. 31, 2016, 2 pages.
Butler Travis, "Portable MP3: The Nomad Jukebox", available at <http://tidbits.com/article/6261>, Jan. 8, 2001, 4 pages.
Call Me, "Samsung R3 speaker gives you a delicious 360 degree sound experience—with WiFi and Bluetooth | Call me", 0:24 / 3:22, Available Online at: <https://www.youtube.com/watch?v=4Uv_sOhrlro>, Sep. 22, 2016, 3 pages.
Computeradv, "Sonos App Navigation & Menu on iPhone", Available online at: https://www.youtube.com/watch?v=Jhz9XvWQ204, Aug. 4, 2015, 1 page.
Crutnacker, "Amazon Echo Tips and Tricks: Playing Music Demonstration", Available Online at: https://www.youtube.com/watch?v=W_bqq2ynUII, Nov. 4, 2015, 1 page.
Detroitborg, "Apple Music: Walkthrough", YouTube Video, online available at: https://www.youtube.com/watch?v=NLgjodiAtbQ, Jun. 30, 2015, 1 page.
Enright Andrewc., "Dissatisfaction Sows Innovation", Available at <http://web.archive.org/web/20051225123312/http://thetreehouseandthecave.blogspot.com/2004/12/dissatisfaction-sows-innovation.html>, retrieved on Feb. 19, 2008, Dec. 29, 2004, 6 pages.
Enright Andrewc., "Meet Cover Flow", Available online at <http://web.archive.org/web/20060111073239/thetreehouseandthecave.blogspot.com/2005/08/meet-coverflow.html>, retrieved on Feb. 19, 2008, Aug. 13, 2005, 2 pages.
Enright Andrewc., "Visual Browsing on an iBook Ds", Available online at <http://web.archive.org/web/20060111175609/thetreehouseandthecave.blogspot.com/2004/12/visual-browsing-on-i book-ds.html>, Dec. 29, 2004, 2 pages.
Feng Lipeng, "Bound for computer lovers", Dec. 31, 2009, 2 pages.
Finkelstein Ellen, "Temporarily Override Object Snap Settings", AutoCAD Tips Blog, Apr. 9, 2007, 4 pages.
Fox 11 Los Angeles, "Review: Samsung Radiant R3 Wireless Speakers", Available Online at: <https://www.youtube com/watch?v=ZBICVE1WdKE>, Jan. 19, 2016, 3 pages.
Google, "Google Home Help, Listen to music", Datasheet [online], Available Online at: <https://web.archive.org/web/20170326051235/https:/support.google.com/googlehome/answer/7030379?hl=en&ref_topic=7030084>, Mar. 26, 2017, 3 pages.
Gookin Dan, "Lock Screen Settings on Your Android Phone", Online Available at: https://www.dummies.com/consumer-electronics/smartphones/droid/lock-screen-settings-on-your-android-phone/, Sep. 23, 2015, 6 pages.
Hoffberger Chase, "Spotify's Collaborative Playlists Let Friends Listen Together", Evolver.fm, available online at http://www.evolver.fm/2011/08/22/spotify-collaborative-playlists/, Aug. 22, 2011, 4 pages.
Howcast, "How to Create and Edit Playlists on iPhone", Youtube, Available online at: https://www.youtube.com/watch?v=YPOnKUvcso4, Mar. 13, 2014, 3 pages.
Itjungles, "iPhone 6: Howto Pair with Another Bluetooth Device", Available Online at: https://www.youtube.com/watch?v=9setanYtHAk, Aug. 5, 2015, 3 pages.
Jarvie, "Alexa plays me music", Available online at: https://www.youtube.com/watch?v=bR2ZC8Sy8YQ, Feb. 23, 2015, 1 page.
Kim et al., "An Energy Efficient Transmission Scheme for Real-Time Data in Wireless Sensor Networks", Sensors, vol. 15, in Sensors 2015, May 20, 2015, 25 pages.
Locklear Mallory, "Samsung to bring SmartThings control to its Gear smartwatches", Online available at: https://www.engadget.com/2018-01-08-samsung-smartthings-app-gear-smartwatches.html, Jan. 8, 2018, 12 pages.
Low Cherlynn, "So you bought a smartwatch. Now what?", Online available at: https://www.engadget.com/2018-02-06-how-to-set-up-your-smartwatch.html, Feb. 6, 2018, 19 pages.
Miser Brad, "Sams Teach Yourself iTunes® 10 in 10 Minutes", SAMS Publishing, Dec. 30, 2010, pp. 65 and 67-69.
NBC News, "NBC News—YouTube Democratic Debate (full)", Online available at:—https://www.youtube.com/watch?v=ti2Nokoq1J4, Jan. 17, 2016, 1 page.
Noriega Josh, "How to Store and Listen to Music Directly from Your Android Wear Smartwatch", Guiding Tech, Available online at: https://www.guidingtech.com/55254/listen-music-android-wear-smartwatch, Jan. 15, 2016, 16 pages.
International Preliminary Report on Patentability received for PCT Patent Application No. PCT/US2006/062714, dated Jul. 8, 2008, 6 pages.
International Preliminary Report on Patentability received for PCT Patent Application No. PCT/US2007/078180, dated Mar. 17, 2009, 6 pages.
International Search Report and Written Opinion received for PCT Patent Application No. PCT/US2007/078180, dated Mar. 3, 2008, 8 pages.
International Preliminary Report on Patentability received for PCT Patent Application No. PCT/US2010/027088, dated Sep. 29, 2011, 7 pages.
International Search Report and Written Opinion received for PCT Patent Application No. PCT/US2010/027088, dated Jun. 18, 2010, 8 pages.
International Preliminary Report on Patentability received for PCT Patent Application No. PCT/US2012/025314, dated Sep. 12, 2013, 8 pages.
International Search Report and Written Opinion received for PCT Patent Application No. PCT/US2012/025314, dated May 14, 2012, 10 pages.
International Search Report and Written Opinion received for PCT Patent Application No. PCT/US2015/045965, dated Feb. 1, 2016, 20 pages.
Plaisant et al., "Touchscreen Toggle Switches: Push or slide? Design Issues and Usability Study", Technical Report CAR-TR-521, CS-TR-2557, Nov. 1990, pp. 1-10.
Rev. Some Culture, "It's super easy for middle-aged and elderly people to learn compute", Jul. 31, 2013, 2 pages.
Richards, "TN Audio Mixer and Master Volume Control with Automatic Configuration", Technical Disclosure Bulletin, vol. 37, No. 01, Jan. 1, 1994, pp. 485-486.
Rossignol Joe, "iOS 10 Concept Simplifies Lock Screen With Collapsed Notifications", Available online at : https://www.macrumors.com/2016/06/16/ios-10-collapsed-notifications-concept/, Jun. 16, 2016, 10 pages.
Samsung, "Control an individual smart device on your watch", Online Available at: https://www.samsung.com/us/support/troubleshooting/TSG01003208/, Nov. 9, 2018, 1 page.
Samsung, "Problems with SmartThings on your Samsung Smartwatch", Online Available at: https://www.samsung.com/us/support/troubleshooting/TSG01003169/#smartthings-error-on-samsung-smartwatch, Nov. 9, 2018, 10 pages.
Samsung, "Samsung—User manual—Galaxy Watch", Online available at: https://content.abt.com/documents/90234/SM-R810NZDAXAR-use.pdf, Aug. 24, 2018, 102 pages.
Samsung, "Samsung R3 Wireless 360° Smart Speaker (Black)", User Manual ver. 1.0 (English), User manual [online], Available Online at: <https://www.samsung.com/uk/support/model/WAM3500/XU/>, Dec. 16, 2016, 3 pages.
Sandrahoutz, "How Do I Delete a Playlist from a Synced Ipod but Not Remove it From the Library in itunes", Apple Communities Website, Available online at: https://discussions.apple.com/thread/7503609, Mar. 23, 2016, 2 pages.
Sangeet007, "PartyShare—turn your Xperia into a jukebox", Available at: https://forum.xda-developers.com/crossdevice-dev/sony/app-partyshare-xperia-jukebox-t2877807, Sep. 15, 2014, 5 pages.

(56) References Cited

OTHER PUBLICATIONS

Sawyer Brian, "Get with the CoverFlow", Available online at <https://briansawyer.net/2005/12/08/get-with-the-coverflow/>, Dec. 9, 2005, pp. 1-2.
Seifert Dan, "Google Home review: Home is where the smart is", The Verge, Available Online at: <https://www.theverge.com/2016/11/3/13504658/google-home-review-speaker-assistant-amazon-echo-competitor>, Nov. 3, 2016, 11 pages.
Seifi Joe, "Pianist Pro Review", available at <http://www.appsafari.com/productivity/11529/pianist-pro/>, Apr. 24, 2010, 9 pages.
Senicar et al., "User-Centred Design and Development of an Intelligent Light Switch for Sensor Systems", Technical Gazette, vol. 26, No. 2, available online at: https://hrcak.srce.hr/file/320403, 2019, pp. 339-345.
Sharepoint at Rackspace, "Sharepoint 2013: How to Edit a List or Library Using Quick Edit", Available online at: https://www.youtube.com/watch?v=foZXcFC1k80, Oct. 10, 2014, 1 page.
Smarttricks, "Top 3 Music Player for Android", Available online at: <https://www.youtube.com/watch?v=He7RTn4CL34>, Feb. 22, 2017, 4 pages.
Sonos, "Sonos Controller App for iPad Product Guide", Available online at:—https://www.sonos.com/documents/productguides/en/iPadGuide_EN.pdf, Nov. 2014, 47 pages.
Stroud Forrest, "Screen Lock Meaning & Definition", Online Available at: https://www.webopedia.com/definitions/screen-lock, Jan. 30, 2014, 3 pages.
Supertunetv, "Ipod Nano 6G—Sync Selected Playlist iTunes", Youtube, Available online at: https://www.youtube.com/watch?v=xU 3rYRabt_I, Sep. 10, 2012, 3 pages.
Tedeschi Bob, "Stoking a Music Fan's Fancy with Apps That Rock", available at <http://www.nytimes.com/2010/05/20/technology/personaltech/20smart.html>, May 19, 2010, 3 pages.
Whitehouse Ben, "Coverflow: Better Digital Music Navigation", Whitehouse&Company, Online Available at <http://wandco.com/2005/08/coverflow-better-digital-music-navigation/>, Aug. 15, 2005, pp. 1-3.
Whitwam Ryan, "How to Sync and Play Music on Your Android Wear Watch", Available online at: https://www .greenbot.com/article/2997520/how-to-sync-and-play-music-on-your-android-wear-watch.html, Nov. 2, 2015, 4 pages.
Woolsey Amanda, "Apple Watch Tips—How to Add and Play Music", Available online at: <https://www.youtube.com/watch?v=E0QEuqMaoi8>, Apr. 26, 2015, 3 pages.
WZ Science Alliance, "Very simple geriatrics computer and Internet bestselling upgrade", Sep. 30, 2013, 3 pages.
Yamaguchi Yuu, "Useful Freeware and Shareware Information", Pick Up Onlineware, 23th MdN, vol. 146, MdN Corporation, Jun. 6, 2006, 4 pages.
Corrected Notice of Allowance received for U.S. Appl. No. 16/922,675, dated Jan. 9, 2023, 3 pages.
Extended European Search Report received for European Patent Application No. 22195584.2, dated Jan. 5, 2023, 13 pages.
Extended European Search Report received for European Patent Application No. 22201007.6, dated Jan. 12, 2023, 7 pages.
Notice of Allowance received for Chinese Patent Application No. 202111612841.4, dated Jan. 5, 2023, 3 pages (2 pages of English Translation & 1 pages of Official Copy).
Notice of Allowance received for Japanese Patent Application No. 2022-102840, dated Aug. 19, 2022, 4 pages (1 page of English Translation and 3 pages of Official Copy).
Office Action received for Chinese Patent Application No. 202111612841.4, dated Jul. 22, 2022, 13 pages (7 pages of English Translation and 6 pages of Official Copy).
Office Action received for European Patent Application No. 21197457.1, dated Sep. 2, 2022, 8 pages.
Final Office Action received for U.S. Appl. No. 17/314,948, dated Mar. 7, 2023, 31 pages.
Intention to Grant received for Danish Patent Application No. PA202270464, dated Feb. 20, 2023, 2 pages.
Non-Final Office Action received for U.S. Appl. No. 17/747,804, dated Mar. 1, 2023, 14 pages.
Non-Final Office Action received for U.S. Appl. No. 17/752,582, dated Mar. 6, 2023, 17 pages.
Notice of Acceptance received for Australian Patent Application No. 2022200901, dated Mar. 9, 2023, 3 pages.
Office Action received for Chinese Patent Application No. 202111652452.4, dated Feb. 11, 2023, 28 pages (13 pages of English Translation and 15 pages of Official Copy).
Office Action received for European Patent Application No. 20760624.5, dated Mar. 7, 2023, 13 pages.
Office Action received for European Patent Application No. 21728781.2, dated Mar. 1, 2023, 13 pages.
Supplemental Notice of Allowance received for U.S. Appl. No. 16/888,775, dated Mar. 1, 2023, 2 pages.
Philips Support Website, "How to switch to preferred audio language in Philips TV from a broadcast with multiple languages audio stream?", Available Online at: https://www.usa.philips.eom/c-f/XC000010105/how-to-switch-to-preferred-audio-language-in-philips-tv-from-a-broadcast-with-multiple-languages-audio-stream, Dec. 29, 2016, 5 pages.
Invitation to Pay Search Fees received for European Patent Application No. 20760624.5, dated Jan. 2, 2023, 3 pages.
Minutes of Oral Proceedings received for European Patent Application No. 18728002.9, mailed on Dec. 22, 2022, 7 pages.
Non-Final Office Action received for U.S. Appl. No. 17/509,356, dated Dec. 22, 2022, 16 pages.
Notice of Acceptance received for Australian Patent Application No. 2022200515, dated Dec. 21, 2022, 3 pages.
Office Action received for Danish Patent Application No. PA202270464, dated Dec. 20, 2022, 3 pages.
Corrected Notice of Allowance received for U.S. Appl. No. 18/077,905, dated Apr. 26, 2023, 3 pages.
Corrected Notice of Allowance received for U.S. Appl. No. 18/077,905, dated May 4, 2023, 2 pages.
Final Office Action received for U.S. Appl. No. 17/747,804, dated Apr. 28, 2023, 17 pages.
Notice of Allowance received for Chinese Patent Application No. 202080039642.6, dated Apr. 17, 2023, 6 pages (2 pages of English Translation and 4 pages of Official Copy).
Applicant-Initiated Interview Summary received for U.S. Appl. No. 17/476,404, dated Dec. 20, 2022, 2 pages.
Brief Communication Regarding Oral Proceedings received for European Patent Application No. 18728002.9, mailed on Dec. 7, 2022, 1 page.
Cohn, Emily, "Sonos Just Fixed the Most Annoying Thing About Its iPhone App", online available at: https://www.businessinsider.com/sonos-mobile-app-works-on-lock-screen-2016-6, Jun. 27, 2016, 2 pages.
Decision to Grant received for European Patent Application No. 20158824.1, dated Dec. 15, 2022, 3 pages.
Fingas, Jon, "Sonos Puts Speaker Controls on Your iPhone's Lock Screen", online available at https://www.engadget.com/2016-06-21-sonos-ios-lock-screen-controls.html, Jun. 21, 2016, 3 pages.
Kazmucha, Allyson, "Sonos Controller App for iPhone and iPad Review", online available at https://www.imore.com/sonos-controller-app-iphone-and-ipad-review, Mar. 1, 2018, 4 pages.
Notice of Allowance received for U.S. Appl. No. 16/922,675, dated Dec. 8, 2022, 9 pages.
Office Action received for Australian Patent Application No. 2022200901, dated Dec. 19, 2022, 4 pages.
Office Action received for Australian Patent Application No. 2022201532, dated Dec. 19, 2022, 5 pages.
Supplemental Notice of Allowance received for U.S. Appl. No. 16/917,659, dated Dec. 21, 2022, 3 pages.
Corrected Notice of Allowance received for U.S. Appl. No. 17/027,373, dated Oct. 26, 2022, 2 pages.
Notice of Allowance received for Korean Patent Application No. 10-2022-0091730, dated Oct. 4, 2022, 5 pages (2 pages of English Translation and 3 pages of Official Copy).
Office Action received for Danish Patent Application No. PA202270464, dated Oct. 25, 2022, 9 pages.

(56) References Cited

OTHER PUBLICATIONS

Applicant-Initiated Interview Summary received for U.S. Appl. No. 17/314,948, dated Oct. 21, 2022, 6 pages.
Notice of Allowance received for U.S. Appl. No. 16/888,775, dated Oct. 19, 2022, 6 pages.
Notice of Allowance received for U.S. Appl. No. 17/027,373, dated Oct. 3, 2022, 5 pages.
Office Action received for Chinese Patent Application No. 202080039642.6, dated Sep. 5, 2022, 12 pages (6 pages of English Translation and 6 pages of Official Copy).
Office Action received for Chinese Patent Application No. 202111652452.4, dated Aug. 29, 2022, 23 pages (12 pages of English Translation and 11 pages of Official Copy).
Office Action received for European Patent Application No. 20720310.0, dated Oct. 4, 2022, 9 pages.
Intention to Grant received for European Patent Application No. 21197457.1, mailed on Jul. 9, 2024, 12 pages.
Non-Final Office Action received for U.S. Appl. No. 18/228,597, mailed on Jul. 8, 2024, 17 pages.
Notice of Allowance received for Chinese Patent Application No. 202010728711.6, mailed on Jul. 1, 2024, 2 pages (1 page of English Translation and 1 page of Official Copy).
Office Action received for Australian Patent Application No. 2023204647, mailed on Jul. 5, 2024, 3 pages.
Office Action received for Chinese Patent Application No. 201911128105.4, mailed on Mar. 19, 2024, 9 pages (1 page of English Translation and 8 pages of Official Copy).
Office Action received for Japanese Patent Application No. 2023-028786, mailed on Mar. 22, 2024, 10 pages (5 pages of English Translation and 5 pages of Official Copy).
Office Action received for Chinese Patent Application No. 202110902807.4, mailed on Mar. 28, 2024, 6 pages (3 pages of English Translation and 3 pages of Official Copy).
Office Action received for Indian Patent Application No. 202118049678, mailed on Apr. 18, 2024, 8 pages.
Result of Consultation received for European Patent Application No. 20720310.0, mailed on Apr. 17, 2024, 9 pages.
Minutes of the Oral Proceedings received for European Patent Application No. 20720310.0, mailed on Jun. 7, 2024, 7 pages.
Non-Final Office Action received for U.S. Appl. No. 17/747,804, mailed on Jun. 04. 2024, 20 pages.
Result of Consultation received for European Patent Application No. 20720310.0, mailed on Jun. 4, 2024, 3 pages.
Applicant-Initiated Interview Summary received for U.S. Appl. No. 17/978,930, mailed on Apr. 26, 2024, 4 pages.
Notice of Acceptance received for Australian Patent Application No. 2023204396, mailed on Apr. 15, 2024, 3 pages.
Office Action received for Chinese Patent Application No. 202080039832.8, mailed on Mar. 23, 2024, 22 pages (12 pages of English Translation and 10 pages of Official Copy).
Office Action received for Japanese Patent Application No. 2022-149476, mailed on Apr. 16, 2024, 8 pages (4 pages of English Translation and 4 pages of Official Copy).
Applicant-Initiated Interview Summary received for U.S. Appl. No. 17/970,417, mailed on Jun. 26, 2024, 2 pages.
Applicant-Initiated Interview Summary received for U.S. Appl. No. 18/229,989, mailed on Jun. 28, 2024, 2 pages.
Create Confirmation Dialog Box—Matlab Ulconfirm, Online available at: https://www.mathworks.com/help/matlab/ref/uiconfirm.html, 2017, 19 pages.
Non-Final Office Action received for U.S. Appl. No. 18/234,613, mailed on Jul. 1, 2024, 19 pages.
Window confirm(), Online available at: https://www.w3schools.com/jsref/met_win_confirm.asp, 2014, 5 pages.
Applicant-Initiated Interview Summary received for U.S. Appl. No. 17/978,930, mailed on Mar. 13, 2024, 3 pages.
International Search Report and Written Opinion received for PCT Patent Application No. PCT/US2023/032084, mailed on Nov. 27, 2023, 10 pages.
Office Action received for Chinese Patent Application No. 202010728844.3, mailed on Jan. 27, 2024, 16 pages (8 pages of English Translation and 8 pages of Official Copy).
Office Action received for European Patent Application No. 22201007.6, mailed on Mar. 13, 2024, 4 pages.
Invitation to Pay Search Fees received for European Patent Application No. 21789897.2, mailed on Mar. 14, 2024, 3 pages.
Brief Communication Regarding Oral Proceedings received for European Patent Application No. 21197457.1, mailed on May 23, 2024, 5 pages.
Non-Final Office Action received for U.S. Appl. No. 18/229,989, mailed on May 31, 2024, 18 pages.
Notice of Allowance received for Chinese Patent Application No. 201911128105.4. mailed on May 24, 2024, 2 pages (1 page of English Translation and 1 page of Official Copy).
Intention to Grant received for European Patent Application No. 21728781.2, mailed on Dec. 12, 2023, 9 pages.
Final Office Action received for U.S. Appl. No. 17/970,417, mailed on Sep. 18, 2024, 24 pages.
Office Action received for Australian Patent Application No. 2023204647, mailed on Sep. 19, 2024, 2 pages.
Office Action received for Chinese Patent Application No. 202310794146.7, mailed on Aug. 30, 2024, 18 pages (11 pages of English Translation and 7 pages of Official Copy).
Minutes of the Oral Proceedings received for European Patent Application No. 21197457.1, mailed on Jul. 3, 2024, 9 pages.
Office Action received for Chinese Patent Application No. 202311305998.1, mailed on May 29, 2024, 13 pages (7 pages of English Translation and 6 pages of Official Copy).
Office Action received for European Patent Application No. 23190753.6, mailed on Jun. 25, 2024. 10 pages.
Notice of Allowance received for Japanese Patent Application No. 2022-129377, mailed on Apr. 26, 2024, 4 pages (1 page of English Translation and 3 pages of Official Copy).
Notice of Allowance received for U.S. Appl. No. 17/978,930, mailed on Aug. 19, 2024, 9 pages.
Office Action received for Chinese Patent Application No. 202311321231.8, mailed on Jul. 28, 2024, 9 pages (5 pages of English Translation and 4 pages of Official Copy).
Result of Consultation received for European Patent Application No. 22201007.6, mailed on Aug. 20, 2024, 3 pages.
Intention to Grant received for European Patent Application No. 23168537.1, mailed on Jul. 25, 2024, 8 pages.
Notice of Allowance received for U.S. Appl. No. 18/229,989, mailed on Jul. 24, 2024, 5 pages.
Corrected Notice of Allowance received for U.S. Appl. No. 17/506,197, mailed on Feb. 7, 2024, 4 pages.
Extended European Search Report received for European Patent Application No. 23203414.0, mailed on Jan. 26, 2024, 10 pages.
Notice of Allowance received for U.S. Appl. No. 17/506,197, mailed on Jan. 29, 2024, 8 pages.
Office Action received for Indian Patent Application No. 202117048581, mailed on Feb. 1, 2024, 6 pages.
Final Office Action received for U.S. Appl. No. 17/978,930, mailed on Apr. 5, 2024, 28 pages.
Non-Final Office Action received for U.S. Appl. No. 17/970,417, mailed on Apr. 10, 2024, 16 pages.
Notice of Allowance received for Chinese Patent Application No. 202211558100.7, mailed on Mar. 29, 2024, 3 pages (2 pages of English Translation and 1 page of Official Copy).
Office Action received for Chinese Patent Application No. 201911128105.4, mailed on Mar. 16, 2024, 7 pages (4 pages of English Translation and 3 pages of Official Copy).
Office Action received for Chinese Patent Application No. 202010728711.6, mailed on Feb. 1, 2024, 30 pages (18 pages of English Translation and 12 pages of Official Copy).
Office Action received for Chinese Patent Application No. 202311321231.8, mailed on Mar. 10, 2024, 15 pages (9 pages of English Translation and 6 pages of Official Copy).
Office Action received for Korean Patent Application No. 10-2022-7032414, mailed on Mar. 26, 2024, 11 pages (5 pages of English Translation and 6 pages of Official Copy).

(56) References Cited

OTHER PUBLICATIONS

Brief Communication Regarding Oral Proceedings received for European Patent Application No. 21197457.1, mailed on Jun. 19, 2024, 1 page.
Non-Final Office Action received for U.S. Appl. No. 18/443,185, mailed on Aug. 28, 2024, 17 pages.
Office Action received for Japanese Patent Application No. 2023-028786, mailed on Aug. 23, 2024, 10 pages (5 pages of English Translation and 5 pages of Official Copy).
Decision to Grant received for European Patent Application No. 21728781.2, mailed on Feb. 8, 2024, 3 pages.
Non-Final Office Action received for U.S. Appl. No. 17/978,930, mailed on Feb. 12, 2024, 25 pages.
Office Action received for Chinese Patent Application No. 202211558100.7, mailed on Jan. 8, 2024, 12 pages (6 pages of English Translation and 6 pages of Official Copy).
Extended European Search Report received for European patent Application No. 23191379.9, mailed on Sep. 18, 2023, 8 pages.
Office Action received for European Patent Application No. 20746429.8, mailed on Sep. 20, 2023, 10 pages.
"A Small Revolution in Touch Screens—Evaluation and Testing of LGKF600", China Academic Journal Electronic Publishing House, Feb. 1, 2008, pp. 60-62 (Official Copy Only). See Communication under Rule 37 CFR § 1.98(a) (3).
Intention to Grant received for European Patent Application No. 20720310.0, mailed on Jun. 13, 2024, 13 pages.
Notice of Allowance received for Chinese Patent Application No. 202110902807.4, mailed on May 21, 2024, 4 pages (1 page of English Translation and 3 pages of Official Copy).
Notice of Allowance received for Korean Patent Application No. 10-2023-0001668, mailed on May 22, 2024, 6 pages (2 pages of English Translation and 4 pages of Official Copy).
Office Action received for Australian Patent Application No. 2023204396, mailed on Jan. 8, 2024, 5 pages.
Office Action received for Chinese Patent Application No. 202110902807.4, mailed on Dec. 15, 2023, 12 pages (5 pages of English Translation and 7 pages of Official Copy).
Summons to Attend Oral Proceedings received for European Patent Application No. 20720310.0, mailed on Jan. 3, 2024, 12 pages.
Office Action received for Korean Patent Application No. 10-2023-7008877, mailed on Nov. 29, 2023, 7 pages (3 pages of English Translation and 4 pages of Official Copy).
Extended European Search Report received for European Patent Application No. 23190753.6, mailed on Nov. 22, 2023, 13 pages.
Notice of Acceptance received for Australian Patent Application No. 2022241590, mailed on Nov. 14, 2023, 3 pages.
Office Action received for Japanese Patent Application No. 2022-129377, mailed on Nov. 10, 2023, 6 pages (3 pages of English Translation and 3 pages of Official Copy).
Office Action received for Korean Patent Application No. 10-2023-0001668, mailed on Nov. 3, 2023, 5 pages (2 pages of English Translation and 3 pages of Official Copy).
Summons to Attend Oral Proceedings received for European Patent Application No. 21197457.1, mailed on Nov. 23, 2023, 12 pages.
Decision to Grant received for European Patent Application No. 18728002.9, mailed on Aug. 31, 2023, 4 pages.
Final Office Action received for U.S. Appl. No. 17/476,404, mailed on Sep. 12, 2023, 30 pages.
Non-Final Office Action received for U.S. Appl. No. 17/506,197, mailed on Sep. 14, 2023, 13 pages.
Notice of Allowance received for U.S. Appl. No. 17/867,317, mailed on Aug. 30, 2023, 6 pages.
Office Action received for Chinese Patent Application No. 202110902807.4, mailed on Jul. 4, 2023, 15 pages (6 pages of English Translation and 9 pages of Official Copy).
Office Action received for European Patent Application No. 22201007.6, mailed on Jul. 18, 2024, 4 pages.
Notice of Allowance received for Chinese Patent Application No. 201911288715.0, mailed on Jul. 12, 2023, 5 pages (1 page of English Translation and 4 pages of Official Copy).
Summons to Attend Oral Proceedings received for European Patent Application No. 18733381.0, mailed on Jul. 25, 2023, 7 pages.
Notice of Allowance received for Korean Patent Application No. 10-2023-7008877, mailed on Feb. 20, 2024, 7 pages (2 pages of English Translation and 5 pages of Official Copy).
Office Action received for Chinese Patent Application No. 201880031407.7, mailed on Jan. 12, 2024, 15 pages (7 pages of English Translation and 8 pages of Official Copy).
Advisory Action received for U.S. Appl. No. 17/747,804, mailed on Jun. 23, 2023, 6 pages.
Applicant-Initiated Interview Summary received for U.S. Appl. No. 17/306,354, mailed on Jun. 28, 2023, 3 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/747,804, mailed on May 31, 2023, 4 pages.
Applicant-Initiated Interview Summary received for U.S. Appl. No. 17/867,317, mailed on May 30, 2023, 4 pages.
Corrected Notice of Allowance received for U.S. Appl. No. 17/509,356, mailed on Jun. 13, 2023, 2 pages.
Corrected Notice of Allowance received for U.S. Appl. No. 17/509,356, mailed on May 24, 2023, 2 pages.
Corrected Notice of Allowance received for U.S. Appl. No. 17/752,582, mailed on Jul. 17, 2023, 3 pages.
Decision to Grant received for Danish Patent Application No. PA202270464, mailed on May 9, 2023, 1 page.
Extended European Search Report received for European Patent Application No. 23168537.1, mailed on Jul. 25, 2023, 13 pages.
Intention to Grant received for European Patent Application No. 21728781.2, mailed on Jul. 28, 2023, 9 pages.
Non-Final Office Action received for U.S. Appl. No. 17/306,354, mailed on Jun. 2, 2023, 21 pages.
Notice of Acceptance received for Australian Patent Application No. 2022201532, mailed on May 22, 2023, 3 pages.
Notice of Acceptance received for Australian Patent Application No. 2022204555, mailed on May 11, 2023, 3 pages.
Notice of Allowance received for U.S. Appl. No. 16/922,675, mailed on Jul. 19, 2023, 13 pages.
Notice of Allowance received for U.S. Appl. No. 17/306,354, mailed on Jul. 24, 2023, 7 pages.
Notice of Allowance received for U.S. Appl. No. 17/752,582, mailed on Jun. 13, 2023, 18 pages.
Notice of Allowance received for U.S. Appl. No. 17/867,317, mailed on Jul. 6, 2023, 11 pages.
Office Action received for Australian Patent Application No. 2022218540, mailed on Aug. 3, 2023, 5 pages.
Office Action received for Australian Patent Application No. 2022241590, mailed on Aug. 15, 2023, 6 pages.
Office Action received for Australian Patent Application No. 2022241590, mailed on Jun. 7, 2023, 7 pages.
Office Action received for Chinese Patent Application No. 201811539259.8, mailed on May 24, 2023, 25 pages (5 pages of English Translation and 20 pages of Official Copy).
Office Action received for Chinese Patent Application No. 202111652452.4, mailed on May 19, 2023, 15 pages (8 pages of English Translation and 7 pages of Official Copy).
Office Action received for European Patent Application No. 20720310.0, mailed on Jul. 25, 2023, 11 pages.
Office Action received for European Patent Application No. 21197457.1, mailed on May 30, 2023, 8 pages.
Applicant-Initiated Interview Summary received for U.S. Appl. No. 18/228,597, mailed on Aug. 8, 2024, 4 pages.
Examiner-Initiated Interview Summary received for U.S. Appl. No. 18/234,613, mailed on Aug. 9, 2024, 2 pages.
Notice of Allowance received for Japanese Patent Application No. 2022-149476, mailed on Aug. 2, 2024, 4 pages (1 page of English Translation and 3 pages of Official Copy).
Supplemental Notice of Allowance received for U.S. Appl. No. 18/229,989, mailed on Aug. 7, 2024, 2 pages.
Applicant-Initiated Interview Summary received for U.S. Appl. No. 17/506,197, mailed on Oct. 25, 2023, 2 pages.
Non-Final Office Action received for U.S. Appl. No. 18/102,025, mailed on Oct. 10, 2023, 12 pages.

(56) References Cited

OTHER PUBLICATIONS

Notice of Acceptance received for Australian Patent Application No. 2022218540, mailed on Oct. 16, 2023, 3 pages.

Notice of Allowance received for Chinese Patent Application No. 202111483033.2, mailed on Oct. 7, 2023, 4 pages (1 page of English Translation and 3 pages of Official Copy).

Notice of Allowance received for U.S. Appl. No. 18/077,891, mailed on Oct. 19, 2023, 18 pages.

Office Action received for European Patent Application No. 22201007.6, mailed on Oct. 9, 2023, 5 pages.

Office Action received for European Patent Application No. 21789897.2, mailed on May 23, 2024, 12 pages,.

Applicant-Initiated Interview Summary received for U.S. Appl. No. 18/443,185. mailed on Sep. 24, 2024, 2 pages.

Office Action received for Australian Patent Application No. 2023266353, mailed on Sep. 19, 2024, 2 Pages.

\* cited by examiner

1118
In response to receiving the user selection of the second affordance:

1120
Replace display of the second user interface with display of the first user interface associated with the first application without replacing display of the second affordance with the first affordance.

1122
Cease to display the first affordance.

1124
Display, on the display, a home user interface, where the home user interface includes the second affordance associated with the first application at a first location of the display different from a second location of the display.

1126
Receive user selection of the second affordance associated with the first application.

1128
In response to receiving the user selection of the second affordance associated with the first application:

1130
Replace display of the home user interface with display of the first user interface associated with the first application.

1132
Ceases to display the second affordance at the first location of the display.

1134
Display the first affordance associated with the second application at the second location of the display.

*FIG. 11B*

USER INTERFACES FOR PLAYING AND MANAGING AUDIO ITEMS

CROSS-REFERENCE TO RELATED APPLICATION

This application is a continuation of U.S. application Ser. No. 17/176,908, filed Feb. 16, 2021, entitled "USER INTERFACES FOR PLAYING AND MANAGING AUDIO ITEMS," which is a continuation of U.S. application Ser. No. 15/730,610, filed Oct. 11, 2017, entitled "USER INTERFACES FOR PLAYING AND MANAGING AUDIO ITEMS," which claims priority to U.S. Provisional Application Ser. No. 62/505,760, filed May 12, 2017, entitled "USER INTERFACES FOR PLAYING AND MANAGING AUDIO ITEMS," each of which are hereby incorporated by reference in their entirety for all purposes.

FIELD

The present disclosure relates generally to computer user interfaces, and more specifically to techniques for playing and managing audio items.

BACKGROUND

Playing and managing audio items, such as music, using electronic devices is a common occurrence. Further, audio items are often played and managed across multiples devices. Sometimes, a device belonging to a user does not store all of the audio items belonging to the user.

BRIEF SUMMARY

Attempting to play and manage audio items while engaging in a physical activity such as commuting or exercising, in particular using a portable electronic device having a limited amount of display real estate, can still be a cumbersome task. This is even more so when owning more than one electronic device and audio items must be played and managed across devices. Therefore, faster, more efficient methods and interfaces for playing and managing audio items are needed.

Some techniques for playing and managing audio items using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for playing and managing audio items. Such methods and interfaces optionally complement or replace other methods for playing and managing audio items. Such methods and interfaces reduce the cognitive burden on a user and produce a more efficient human-machine interface. For battery-operated computing devices, such methods and interfaces conserve power and increase the time between battery charges. Such methods and interfaces also reduce the number of unnecessary, extraneous, or repetitive input required at computing devices, such as smartphones and smartwatches.

In accordance with some embodiments, a method performed at an electronic device with a touch-sensitive display is described. The method comprises: displaying, on the display, a first user interface, wherein the first user interface includes a scrollable plurality of audio playlist items associated with a plurality of audio playlists; receiving a first user input on a first audio playlist item of the plurality of audio playlist items; in response to receiving the first user input on the first audio playlist item: displaying, on the display, a second user interface, wherein the second user interface includes an indication of a first audio item of a first audio playlist associated with the first audio playlist item, and displaying, on the display, a plurality of indicia icons, wherein a first indicia icon associated with the second user interface includes an indication that the second user interface is currently displayed; receiving a second user input on the second user interface; and in response to receiving the second user input on the second user interface: displaying, on the display, a third user interface, wherein the third user interface includes a plurality of audio items of the first audio playlist, and updating display of the plurality of indicia icons, wherein a second indicia icon associated with the third user interface includes the indication that the third user interface is currently displayed.

In accordance with some embodiments, a non-transitory computer-readable storage medium is described. The non-transitory computer-readable storage medium storing one or more programs configured to be executed by one or more processors of an electronic device with a touch-sensitive display, the one or more programs including instructions for: displaying, on the display, a first user interface, wherein the first user interface includes a scrollable plurality of audio playlist items associated with a plurality of audio playlists; receiving a first user input on a first audio playlist item of the plurality of audio playlist items; in response to receiving the first user input on the first audio playlist item: displaying, on the display, a second user interface, wherein the second user interface includes an indication of a first audio item of a first audio playlist associated with the first audio playlist item, and displaying, on the display, a plurality of indicia icons, wherein a first indicia icon associated with the second user interface includes an indication that the second user interface is currently displayed; receiving a second user input on the second user interface; and in response to receiving the second user input on the second user interface: displaying, on the display, a third user interface, wherein the third user interface includes a plurality of audio items of the first audio playlist, and updating display of the plurality of indicia icons, wherein a second indicia icon associated with the third user interface includes the indication that the third user interface is currently displayed.

In accordance with some embodiments, a transitory computer-readable storage medium is described. The transitory computer-readable storage medium storing one or more programs configured to be executed by one or more processors of an electronic device with a touch-sensitive display, the one or more programs including instructions for: displaying, on the display, a first user interface, wherein the first user interface includes a scrollable plurality of audio playlist items associated with a plurality of audio playlists; receiving a first user input on a first audio playlist item of the plurality of audio playlist items; in response to receiving the first user input on the first audio playlist item: displaying, on the display, a second user interface, wherein the second user interface includes an indication of a first audio item of a first audio playlist associated with the first audio playlist item, and displaying, on the display, a plurality of indicia icons, wherein a first indicia icon associated with the second user interface includes an indication that the second user interface is currently displayed; receiving a second user input on the second user interface; and in response to receiving the second user input on the second user interface: displaying, on the display, a third user interface, wherein the third user interface includes a plurality of audio items of the first audio playlist, and updating display of the plurality of indicia icons, wherein a second indicia icon associated with the third user interface includes the indication that the third user interface is currently displayed.

In accordance with some embodiments, an electronic device is described. The electronic device comprises: a touch-sensitive display; one or more processors; and memory storing one or more programs configured to be executed by the one or more processors, the one or more programs including instructions for: displaying, on the display, a first user interface, wherein the first user interface includes a scrollable plurality of audio playlist items associated with a plurality of audio playlists; receiving a first user input on a first audio playlist item of the plurality of audio playlist items; in response to receiving the first user input on the first audio playlist item: displaying, on the display, a second user interface, wherein the second user interface includes an indication of a first audio item of a first audio playlist associated with the first audio playlist item, and displaying, on the display, a plurality of indicia icons, wherein a first indicia icon associated with the second user interface includes an indication that the second user interface is currently displayed; receiving a second user input on the second user interface; and in response to receiving the second user input on the second user interface: displaying, on the display, a third user interface, wherein the third user interface includes a plurality of audio items of the first audio playlist, and updating display of the plurality of indicia icons, wherein a second indicia icon associated with the third user interface includes the indication that the third user interface is currently displayed.

In accordance with some embodiments, an electronic device is described. The electronic device comprises: a touch-sensitive display; means for displaying, on the display, a first user interface, wherein the first user interface includes a scrollable plurality of audio playlist items associated with a plurality of audio playlists; means for receiving a first user input on a first audio playlist item of the plurality of audio playlist items; means, in response to receiving the first user input on the first audio playlist item, for: displaying, on the display, a second user interface, wherein the second user interface includes an indication of a first audio item of a first audio playlist associated with the first audio playlist item, and displaying, on the display, a plurality of indicia icons, wherein a first indicia icon associated with the second user interface includes an indication that the second user interface is currently displayed; means for receiving a second user input on the second user interface; and means, in response to receiving the second user input on the second user interface, for: displaying, on the display, a third user interface, wherein the third user interface includes a plurality of audio items of the first audio playlist, and updating display of the plurality of indicia icons, wherein a second indicia icon associated with the third user interface includes the indication that the third user interface is currently displayed.

In accordance with some embodiments, a method performed at an electronic device with a touch-sensitive display is described. The method comprises: displaying, on the display, an ordered stack of audio playlist items in a first position, wherein the ordered stack of audio playlist items includes a first item, a second item, and a third item, and wherein the first item is displayed in the first position; receiving a first input in a first direction; in response to receiving the first input, displaying, on the display, the ordered stack of audio playlist items in a second position, wherein the second item is displayed in the second position; receiving a second input in the first direction; and in response to receiving the second input: in accordance with a determination that the second item is a terminal item in the ordered stack of audio playlist items, displaying, on the display, at least one menu affordance of a plurality of menu affordances, and in accordance with a determination that the second item is an intermediate item in the ordered stack of audio playlist items, displaying, on the display, the ordered stack of audio playlist items in a third position, wherein the third item is displayed in the third position.

In accordance with some embodiments, a non-transitory computer-readable storage medium is described. The non-transitory computer-readable storage medium storing one or more programs configured to be executed by one or more processors of an electronic device with a touch-sensitive display, the one or more programs including instructions for: displaying, on the display, an ordered stack of audio playlist items in a first position, wherein the ordered stack of audio playlist items includes a first item, a second item, and a third item, and wherein the first item is displayed in the first position; receiving a first input in a first direction; in response to receiving the first input, displaying, on the display, the ordered stack of audio playlist items in a second position, wherein the second item is displayed in the second position; receiving a second input in the first direction; and in response to receiving the second input: in accordance with a determination that the second item is a terminal item in the ordered stack of audio playlist items, displaying, on the display, at least one menu affordance of a plurality of menu affordances, and in accordance with a determination that the second item is an intermediate item in the ordered stack of audio playlist items, displaying, on the display, the ordered stack of audio playlist items in a third position, wherein the third item is displayed in the third position.

In accordance with some embodiments, a transitory computer-readable storage medium is described. The transitory computer-readable storage medium storing one or more programs configured to be executed by one or more processors of an electronic device with a touch-sensitive display, the one or more programs including instructions for: displaying, on the display, an ordered stack of audio playlist items in a first position, wherein the ordered stack of audio playlist items includes a first item, a second item, and a third item, and wherein the first item is displayed in the first position; receiving a first input in a first direction; in response to receiving the first input, displaying, on the display, the ordered stack of audio playlist items in a second position, wherein the second item is displayed in the second position; receiving a second input in the first direction; and in response to receiving the second input: in accordance with a determination that the second item is a terminal item in the ordered stack of audio playlist items, displaying, on the display, at least one menu affordance of a plurality of menu affordances, and in accordance with a determination that the second item is an intermediate item in the ordered stack of audio playlist items, displaying, on the display, the ordered stack of audio playlist items in a third position, wherein the third item is displayed in the third position.

In accordance with some embodiments, an electronic device is described. The electronic device comprises: a touch-sensitive display; one or more processors; and memory storing one or more programs configured to be executed by the one or more processors, the one or more programs including instructions for: displaying, on the display, an ordered stack of audio playlist items in a first position, wherein the ordered stack of audio playlist items includes a first item, a second item, and a third item, and wherein the first item is displayed in the first position; receiving a first input in a first direction; in response to receiving the first input, displaying, on the display, the ordered stack of audio playlist items in a second position, wherein the second item is displayed in the second position; receiving a second input in the first direction; and in response to receiving the second input: in accordance with a determination that the second item is a terminal item in the ordered stack of audio playlist items, displaying, on the display, at least one menu affordance of a plurality of menu affordances, and in accordance with a determination that the second item is an intermediate item in the ordered stack of audio playlist items, displaying, on the display, the ordered stack of audio playlist items in a third position, wherein the third item is displayed in the third position.

In accordance with some embodiments, an electronic device is described. The electronic device comprises: a touch-sensitive display; means for displaying, on the display, an ordered stack of audio playlist items in a first position, wherein the ordered stack of audio playlist items includes a first item, a second item, and a third item, and wherein the first item is displayed in the first position; means for receiving a first input in a first direction; means, in response to receiving the first input, for displaying, on the display, the ordered stack of audio playlist items in a second position, wherein the second item is displayed in the second position; means for receiving a second input in the first direction; and means, in response to receiving the second input, for: in accordance with a determination that the second item is a terminal item in the ordered stack of audio playlist items, displaying, on the display, at least one menu affordance of a plurality of menu affordances, and in accordance with a determination that the second item is an intermediate item in the ordered stack of audio playlist items, displaying, on the display, the ordered stack of audio playlist items in a third position, wherein the third item is displayed in the third position.

In accordance with some embodiments, a method performed at an electronic device with a touch-sensitive display is described. The method comprises: receiving user input initiating a first application while a second application different from the first application is active on the electronic device; displaying, on the display, a first user interface associated with the first application and a first affordance associated with the second application; receiving user selection of the first affordance; in response to receiving the user selection of the first affordance: replacing display of the first user interface with display of a second user interface associated with the second application, wherein the first application remains active on the electronic device, and replacing display of the first affordance with display of a second affordance associated with the first application.

In accordance with some embodiments, a non-transitory computer-readable storage medium is described. The non-transitory computer-readable storage medium storing one or more programs configured to be executed by one or more processors of an electronic device with a touch-sensitive display, the one or more programs including instructions for: receiving user input initiating a first application while a second application different from the first application is active on the electronic device; displaying, on the display, a first user interface associated with the first application and a first affordance associated with the second application; receiving user selection of the first affordance; in response to receiving the user selection of the first affordance: replacing display of the first user interface with display of a second user interface associated with the second application, wherein the first application remains active on the electronic device, and replacing display of the first affordance with display of a second affordance associated with the first application.

In accordance with some embodiments, a transitory computer-readable storage medium is described. The transitory computer-readable storage medium storing one or more programs configured to be executed by one or more processors of an electronic device with a touch-sensitive display, the one or more programs including instructions for: receiving user input initiating a first application while a second application different from the first application is active on the electronic device; displaying, on the display, a first user interface associated with the first application and a first affordance associated with the second application; receiving user selection of the first affordance; in response to receiving the user selection of the first affordance: replacing display of the first user interface with display of a second user interface associated with the second application, wherein the first application remains active on the electronic device, and replacing display of the first affordance with display of a second affordance associated with the first application.

In accordance with some embodiments, an electronic device is described. The electronic device comprises: a touch-sensitive display; one or more processors; and memory storing one or more programs configured to be executed by the one or more processors, the one or more programs including instructions for: receiving user input initiating a first application while a second application different from the first application is active on the electronic device; displaying, on the display, a first user interface associated with the first application and a first affordance associated with the second application; receiving user selection of the first affordance; in response to receiving the user selection of the first affordance: replacing display of the first user interface with display of a second user interface associated with the second application, wherein the first application remains active on the electronic device, and replacing display of the first affordance with display of a second affordance associated with the first application.

In accordance with some embodiments, an electronic device is described. The electronic device comprises: a touch-sensitive display; means for receiving user input initiating a first application while a second application different from the first application is active on the electronic device; means for displaying, on the display, a first user interface associated with the first application and a first affordance associated with the second application; means for receiving user selection of the first affordance; means in response to receiving the user selection of the first affordance, for: replacing display of the first user interface with display of a second user interface associated with the second application, wherein the first application remains active on the electronic device, and replacing display of the first affordance with display of a second affordance associated with the first application.

In accordance with some embodiments, a method performed at an electronic device with a touch-sensitive display and a wireless communication radio is described. The method comprises: displaying, on the display, a user interface including a plurality of item groups and a plurality of selection affordances associated with the plurality of item groups, wherein a selection affordance has a first state and a second state, and wherein data of the plurality of item groups are stored on the electronic device; receiving user input on a first selection affordance associated with a first item group; in accordance with a determination that the first selection affordance is in the first state, designating the first item group; in accordance with a determination that the first selection affordance is in the second state, forgoing designating the first item group; subsequent to detecting, via the wireless communication radio, an external device: in accordance with a determination that the first item group is designated, automatically transmitting data of the items associated with the first item group to the external device to be stored on the external device, and in accordance with a determination that the first item group is not designated, forgoing to automatically transmit data of the items associated with the first item group to the external device to be stored on the external device.

In accordance with some embodiments, a non-transitory computer-readable storage medium is described. The non-transitory computer-readable storage medium storing one or more programs configured to be executed by one or more processors of an electronic device with a touch-sensitive display and a wireless communication radio, the one or more programs including instructions for: displaying, on the display, a user interface including a plurality of item groups and a plurality of selection affordances associated with the plurality of item groups, wherein a selection affordance has a first state and a second state, and wherein data of the plurality of item groups are stored on the electronic device; receiving user input on a first selection affordance associated with a first item group; in accordance with a determination that the first selection affordance is in the first state, designating the first item group; in accordance with a determination that the first selection affordance is in the second state, forgoing designating the first item group; subsequent to detecting, via the wireless communication radio, an external device: in accordance with a determination that the first item group is designated, automatically transmitting data of the items associated with the first item group to the external device to be stored on the external device, and in accordance with a determination that the first item group is not designated, forgoing to automatically transmit data of the items associated with the first item group to the external device to be stored on the external device.

In accordance with some embodiments, a transitory computer-readable storage medium is described. The transitory computer-readable storage medium storing one or more programs configured to be executed by one or more processors of an electronic device with a touch-sensitive display and a wireless communication radio, the one or more programs including instructions for: displaying, on the display, a user interface including a plurality of item groups and a plurality of selection affordances associated with the plurality of item groups, wherein a selection affordance has a first state and a second state, and wherein data of the plurality of item groups are stored on the electronic device; receiving user input on a first selection affordance associated with a first item group; in accordance with a determination that the first selection affordance is in the first state, designating the first item group; in accordance with a determination that the first selection affordance is in the second state, forgoing designating the first item group; subsequent to detecting, via the wireless communication radio, an external device: in accordance with a determination that the first item group is designated, automatically transmitting data of the items associated with the first item group to the external device to be stored on the external device, and in accordance with a determination that the first item group is not designated, forgoing to automatically transmit data of the items associated with the first item group to the external device to be stored on the external device.

In accordance with some embodiments, an electronic device is described. The electronic device comprises: a touch-sensitive display; a wireless communication radio; one or more processors; and memory storing one or more programs configured to be executed by the one or more processors, the one or more programs including instructions for: displaying, on the display, a user interface including a plurality of item groups and a plurality of selection affordances associated with the plurality of item groups, wherein a selection affordance has a first state and a second state, and wherein data of the plurality of item groups are stored on the electronic device; receiving user input on a first selection affordance associated with a first item group; in accordance with a determination that the first selection affordance is in the first state, designating the first item group; in accordance with a determination that the first selection affordance is in the second state, forgoing designating the first item group; subsequent to detecting, via the wireless communication radio, an external device: in accordance with a determination that the first item group is designated, automatically transmitting data of the items associated with the first item group to the external device to be stored on the external device, and in accordance with a determination that the first item group is not designated, forgoing to automatically transmit data of the items associated with the first item group to the external device to be stored on the external device.

In accordance with some embodiments, an electronic device is described. The electronic device comprises: a touch-sensitive display; a wireless communication radio; means for displaying, on the display, a user interface including a plurality of item groups and a plurality of selection affordances associated with the plurality of item groups, wherein a selection affordance has a first state and a second state, and wherein data of the plurality of item groups are stored on the electronic device; means for receiving user input on a first selection affordance associated with a first item group; means, in accordance with a determination that the first selection affordance is in the first state, for designating the first item group; means, in accordance with a determination that the first selection affordance is in the second state, for forgoing designating the first item group; means, subsequent to detecting, via the wireless communication radio, an external device, for: in accordance with a determination that the first item group is designated, automatically transmitting data of the items associated with the first item group to the external device to be stored on the external device, and in accordance with a determination that the first item group is not designated, forgoing to automatically transmit data of the items associated with the first item group to the external device to be stored on the external device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for playing and managing audio items, thereby increasing the effectiveness, efficiency, and user satisfaction with such devices. Such methods and interfaces may complement or replace other methods for playing and managing audio items.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 11A-11B are a flow diagram illustrating methods of easily transitioning amongst active applications, in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for playing and managing audio items. When playing and managing audio items (e.g., songs, radio stations, podcasts), a user is often engaged in a physical activity (e.g., walking, exercising, commuting, driving). When engaged in such physical activities, the user cannot easily devote full attention to playing and managing audio items. Such techniques can reduce the cognitive burden on a user who accesses audio items, thereby enhancing productivity. Further, such techniques can reduce processor and battery power otherwise wasted on redundant user inputs.

Figure 6A:
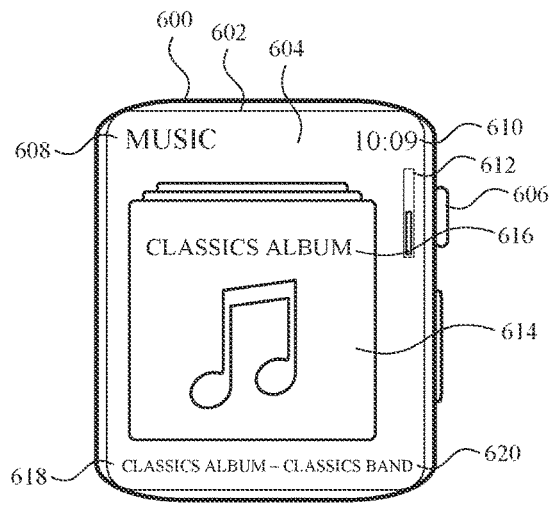
FIGS. 6A-6S illustrate exemplary user interfaces for navigating an application for playing and managing audio items and managing storage of the audio items, in accordance with some embodiments.
Figure 6S:
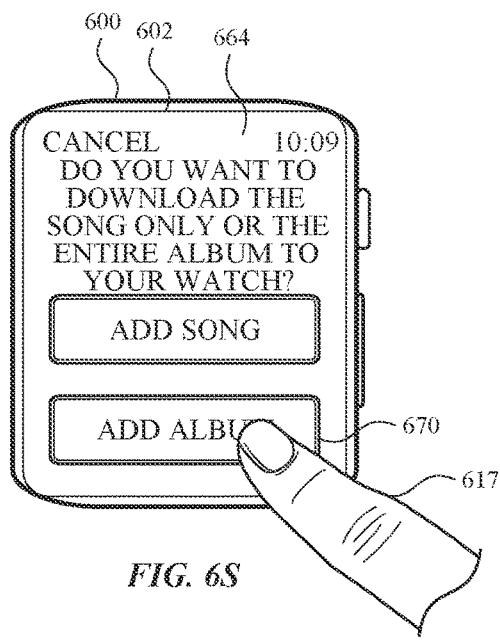
Figure 7A:
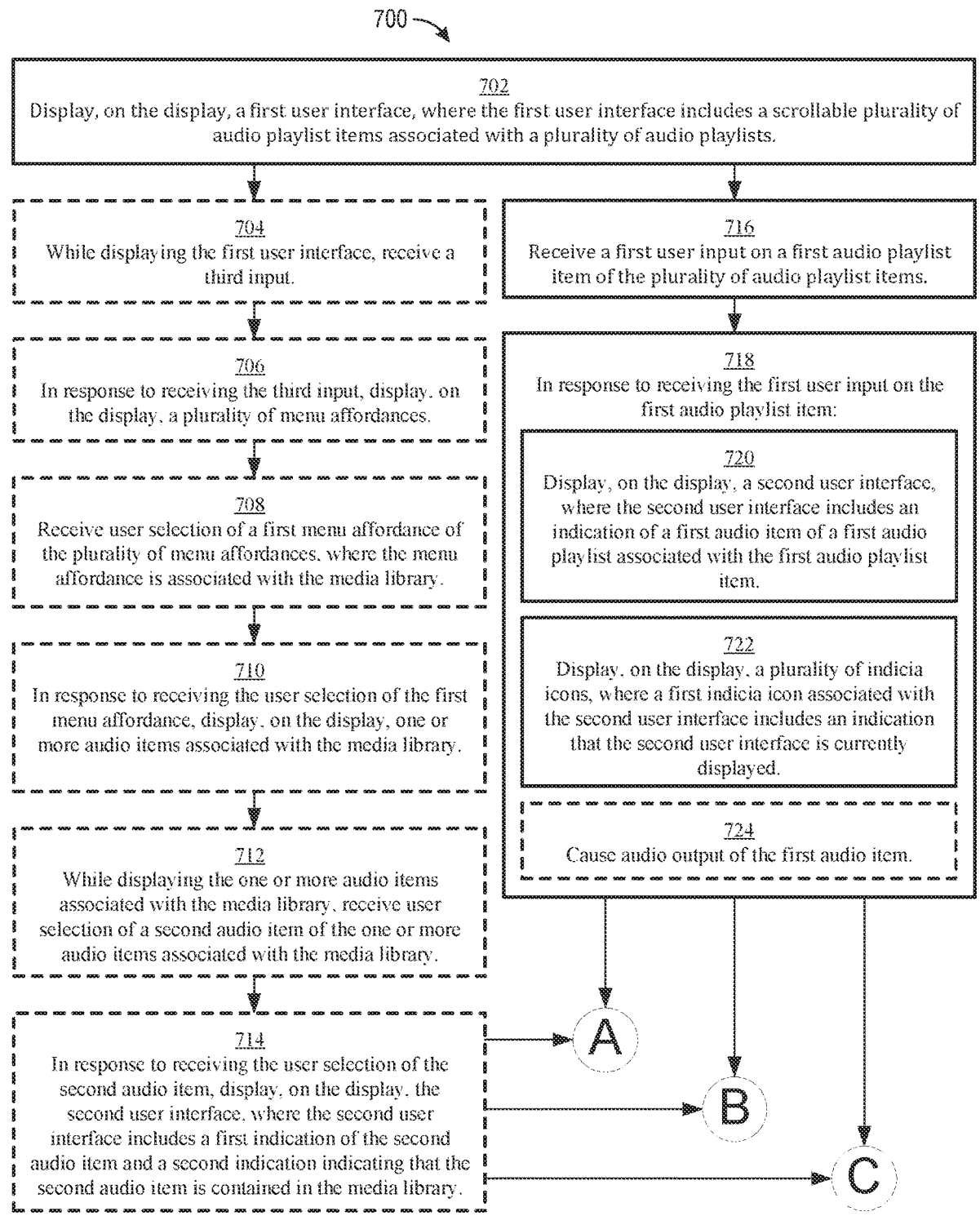
FIGS. 7A-7C are a flow diagram illustrating methods of navigating an application for playing and managing audio items and managing storage of the audio items, in accordance with some embodiments.
Figure 7B:
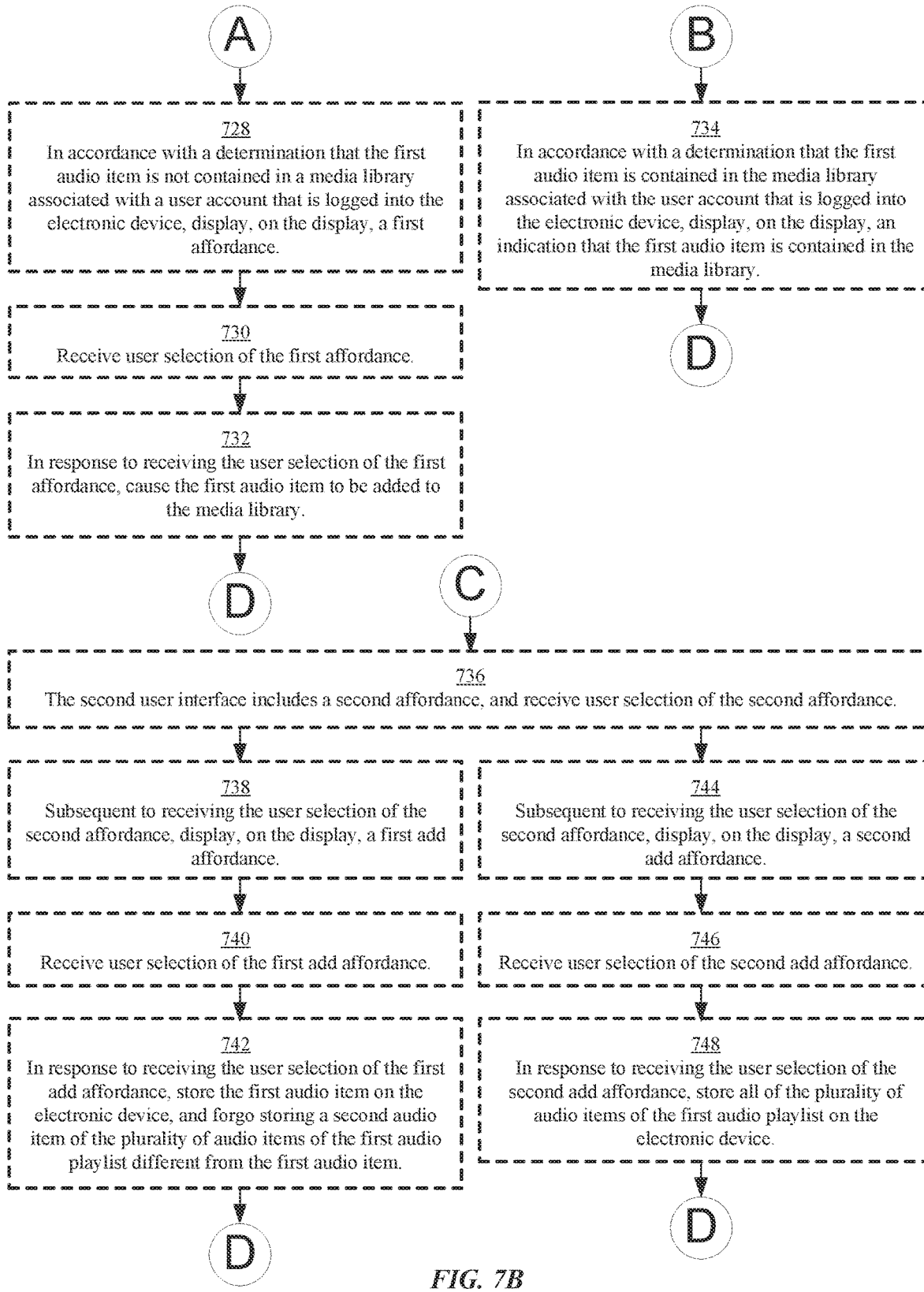
Figure 7C:
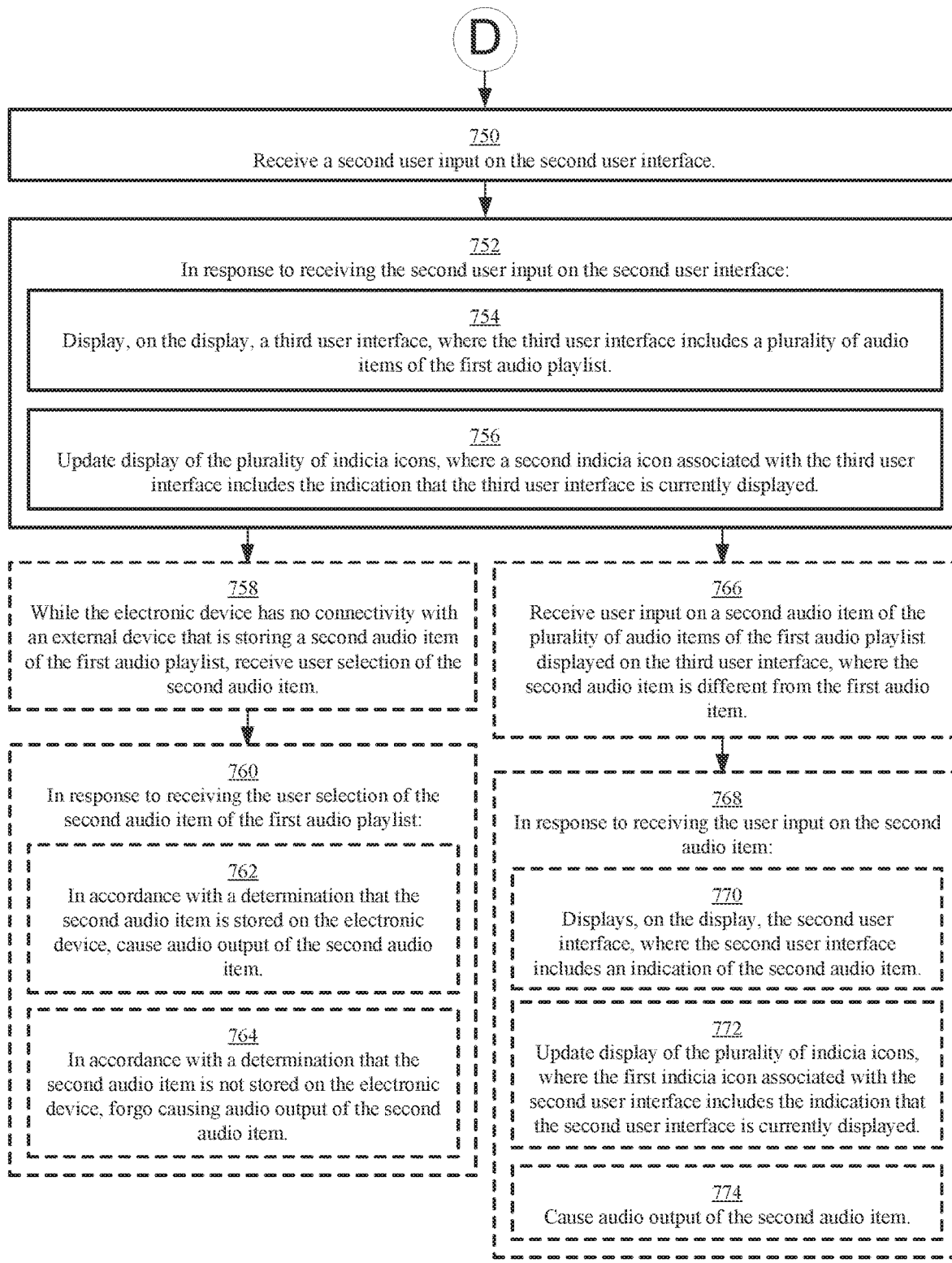
Figure 8A:
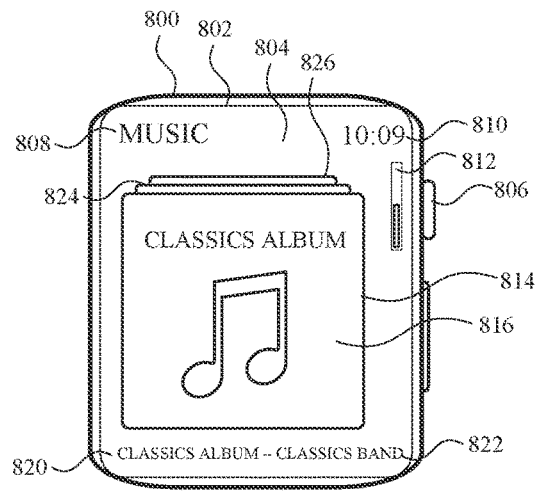
FIGS. 8A-8AC illustrate exemplary user interfaces for navigating an application for playing and managing audio items using different techniques, in accordance with some embodiments.
Figure 11A:
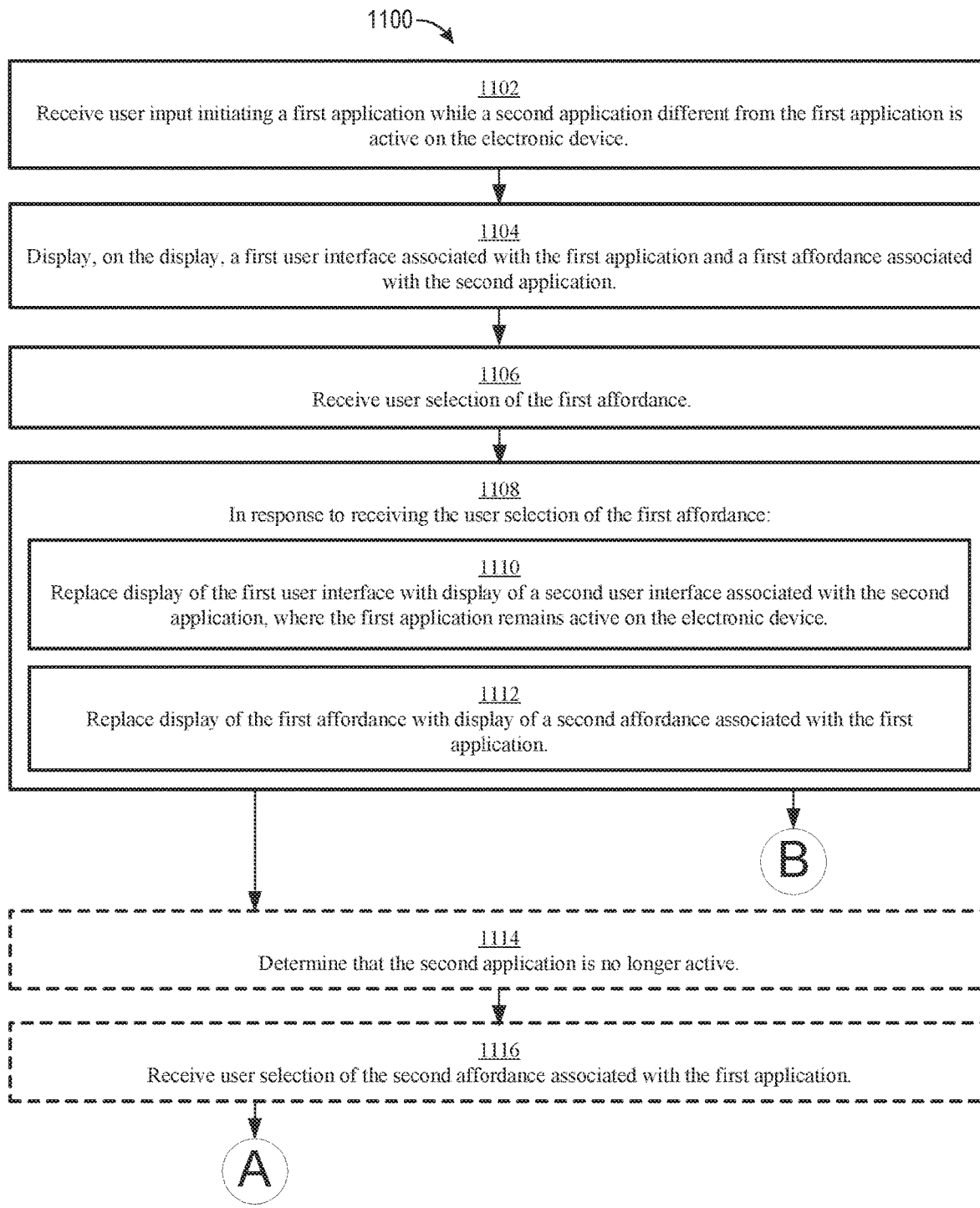
Figure 12A:
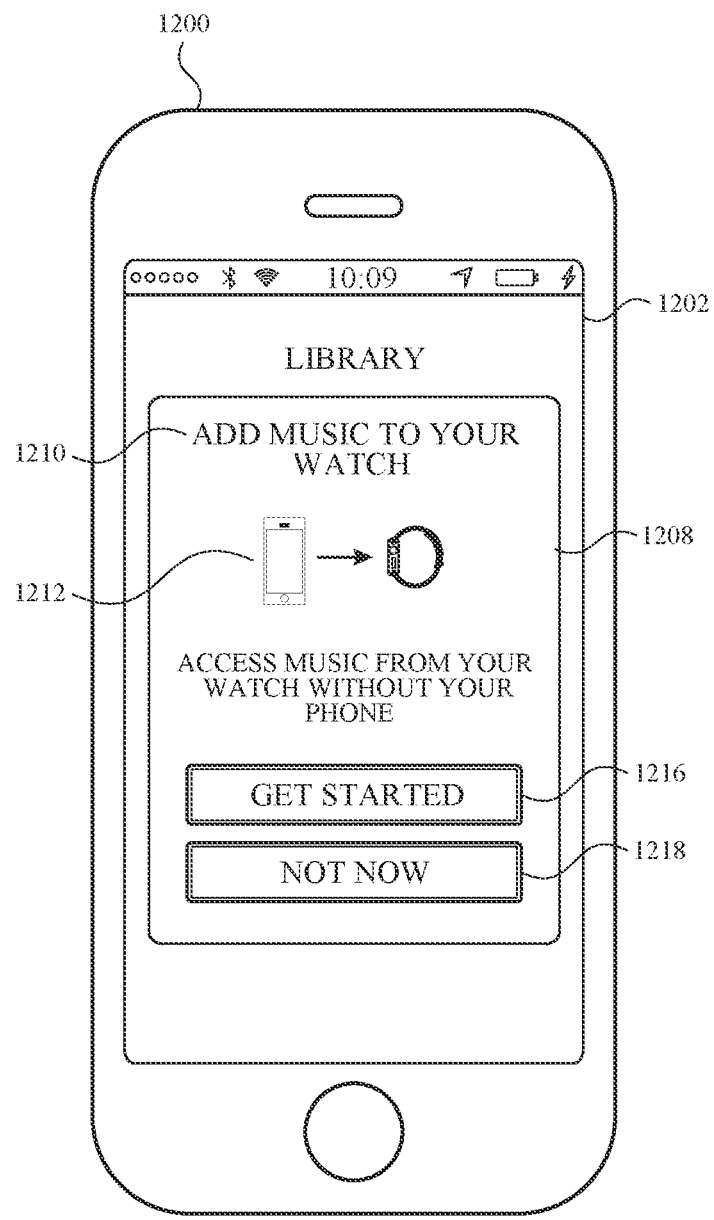
FIGS. 12A-12AE illustrate exemplary user interfaces for configuring and managing automatic transmission of audio-related data from one device to another device, in accordance with some embodiments.
Figure 13A:
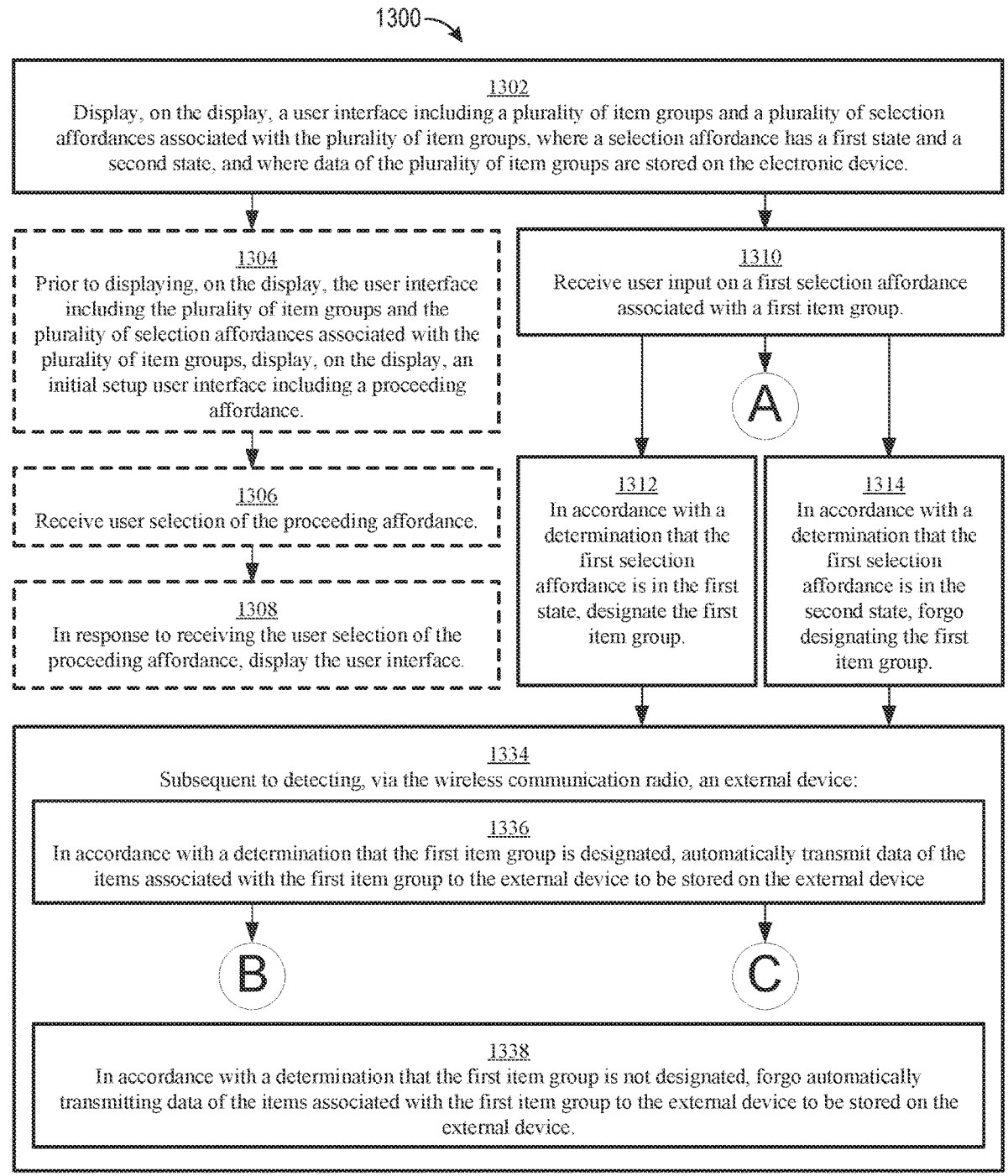
FIGS. 13A-13C are a flow diagram illustrating methods of configuring and managing automatic transmission of audio-related data from one device to another device, in accordance with some embodiments.
Figure 13B:
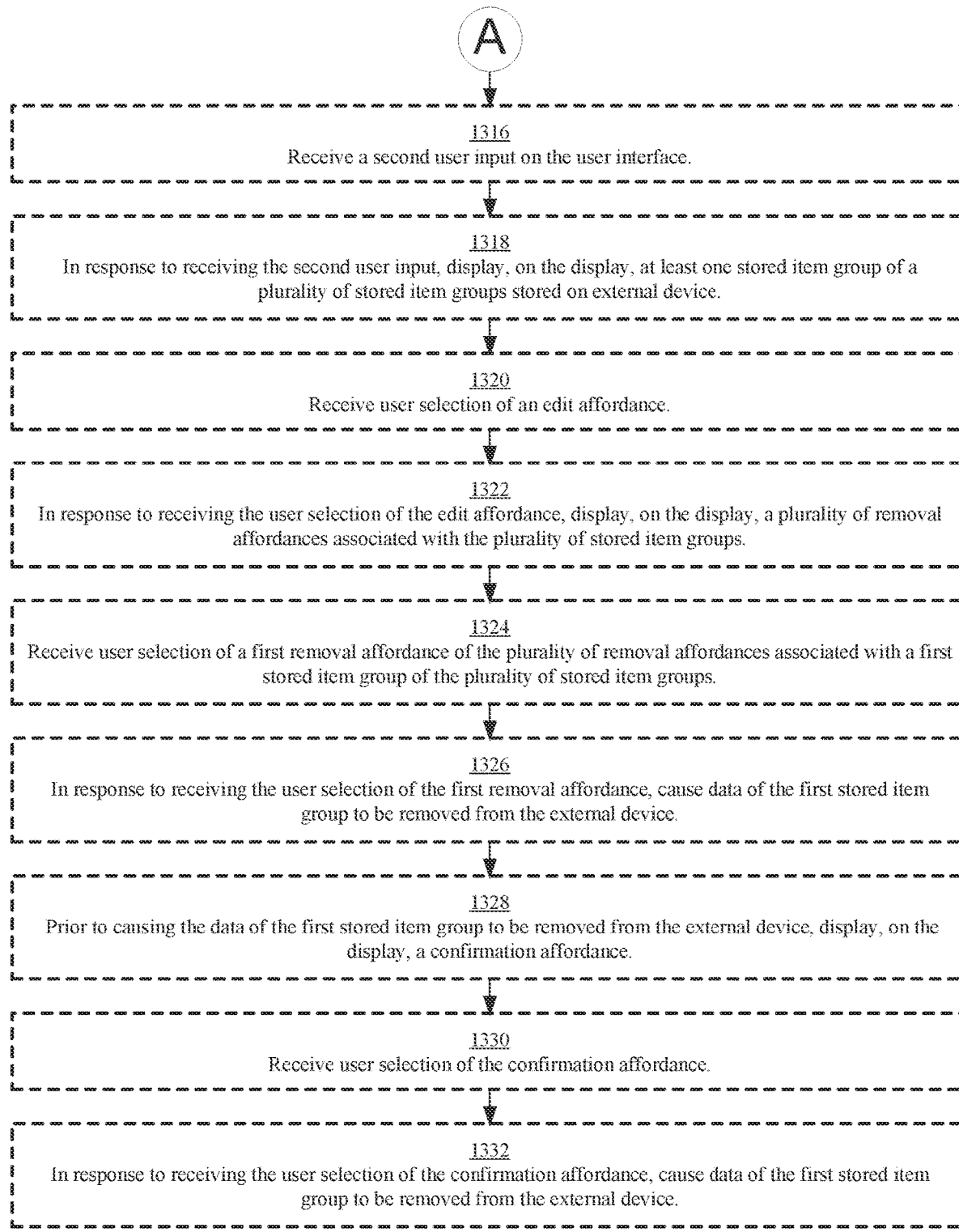
Figure 13C:
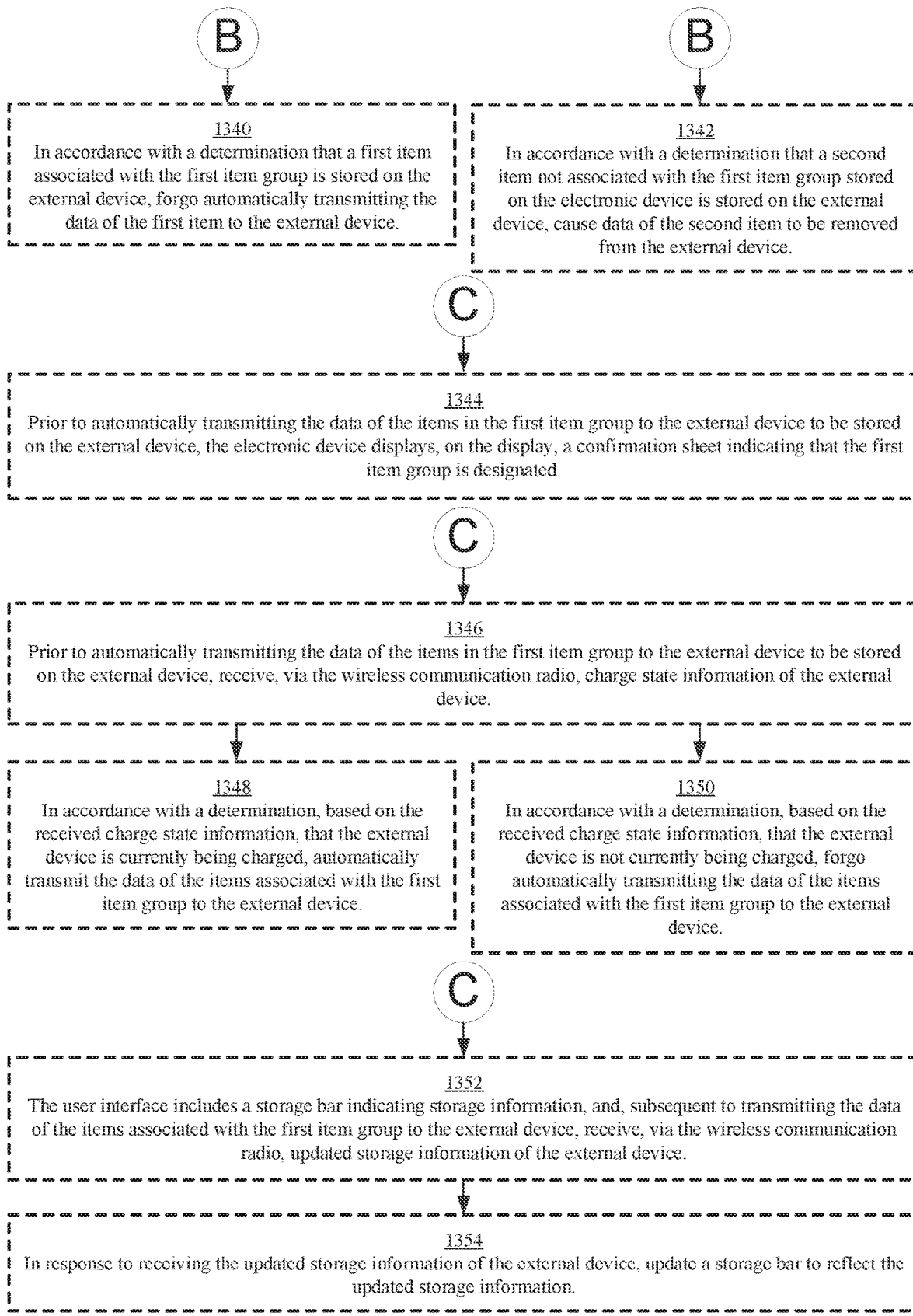

Below, FIGS. 1A-1B, 2, 3, 4A-4B, and 5A-5B provide a description of exemplary devices for performing the techniques for managing event notifications. FIGS. 6A-6S illustrate exemplary user interfaces for navigating an application for playing and managing audio items and managing storage of the audio items, in accordance with some embodiments. FIGS. 7A-7C are a flow diagram illustrating methods of navigating an application for playing and managing audio items and managing storage of the audio items, in accordance with some embodiments. FIGS. 8A-8AC illustrate exemplary user interfaces for navigating an application for playing and managing audio items using different techniques, in accordance with some embodiments. FIGS. 9A-9D are a flow diagram illustrating methods of user interfaces for navigating an application for playing and managing audio items using different techniques, in accordance with some embodiments. FIGS. 10A-10H illustrate exemplary user interfaces for easily transitioning amongst active applications, in accordance with some embodiments. FIGS. 11A-11B are a flow diagram illustrating methods of easily transitioning amongst active applications, in accordance with some embodiments. FIGS. 12A-12AE illustrate exemplary user interfaces for configuring and managing automatic transmission of audio-related data from one device to another device, in accordance with some embodiments. FIGS. 13A-13C are a flow diagram illustrating methods of configuring and managing automatic transmission of audio-related data from one device to another device, in accordance with some embodiments.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
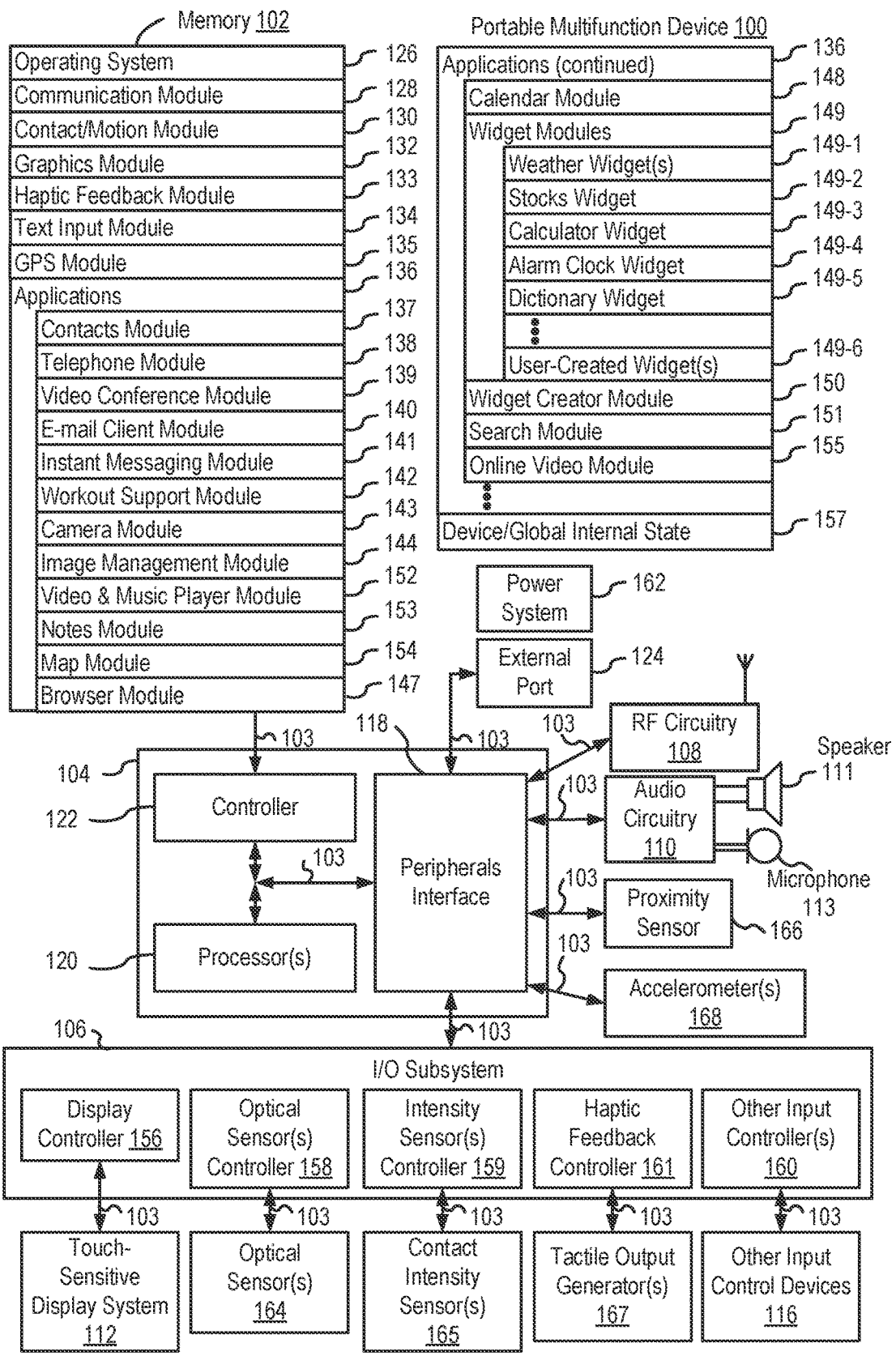
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11 ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
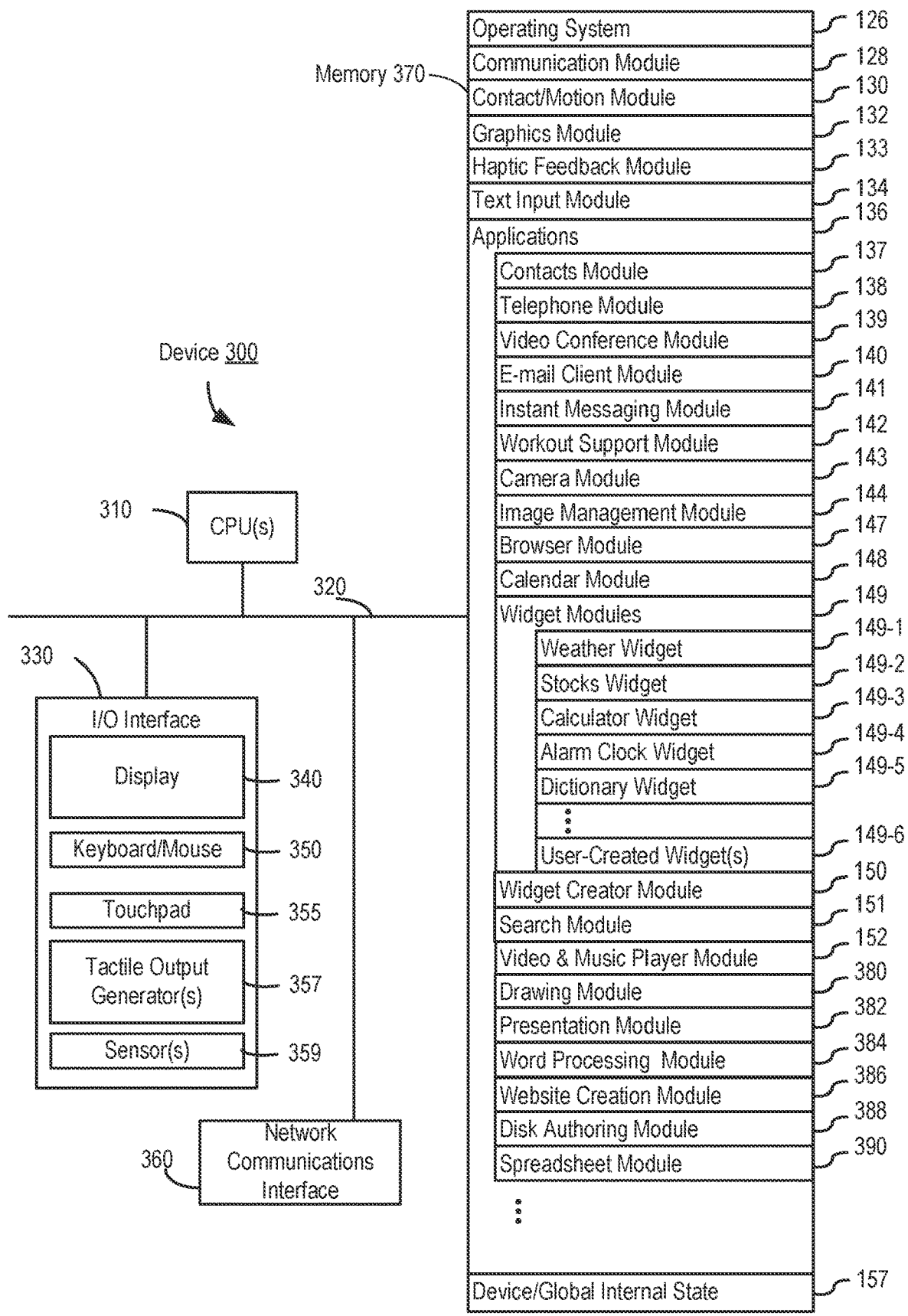
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
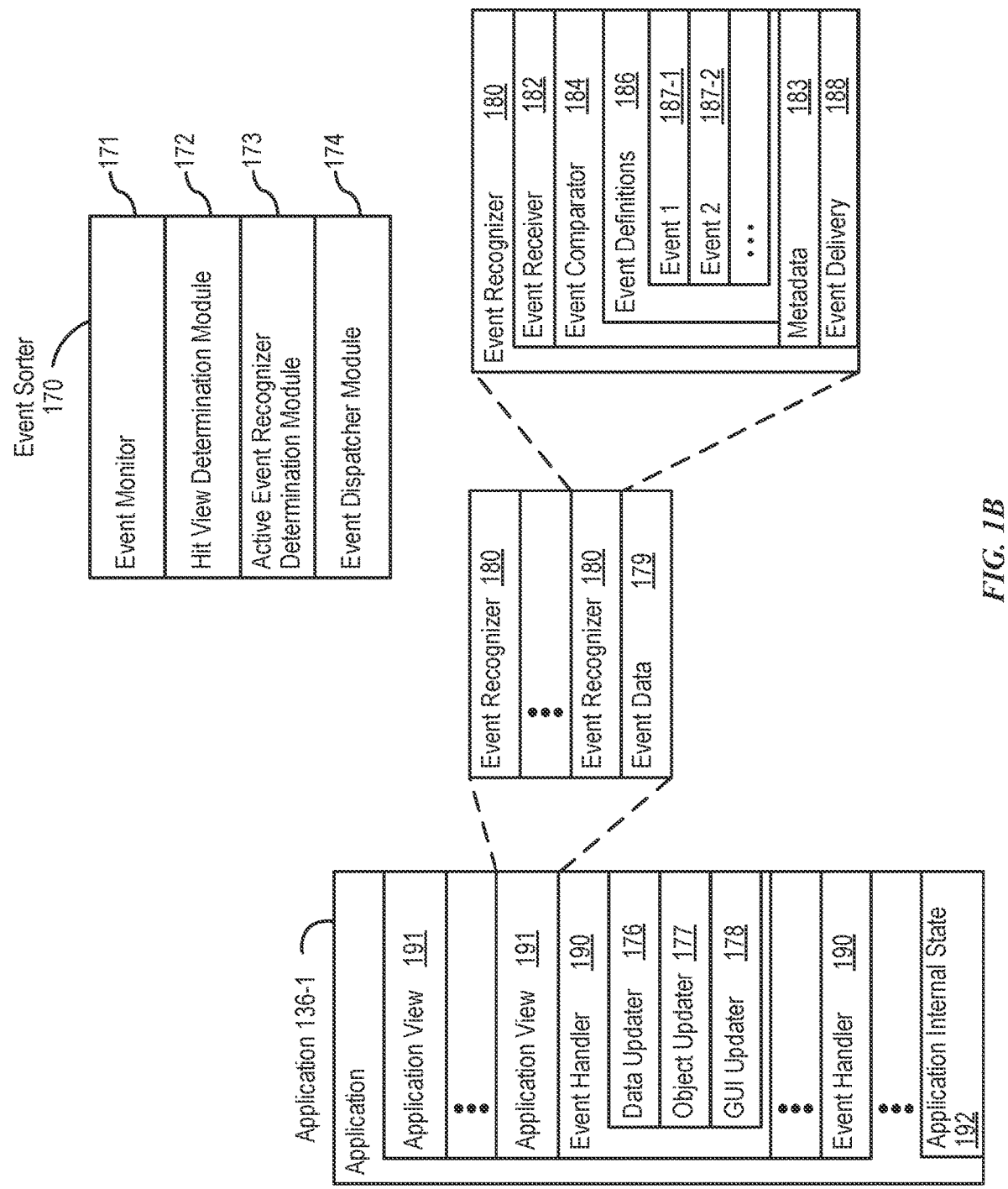
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
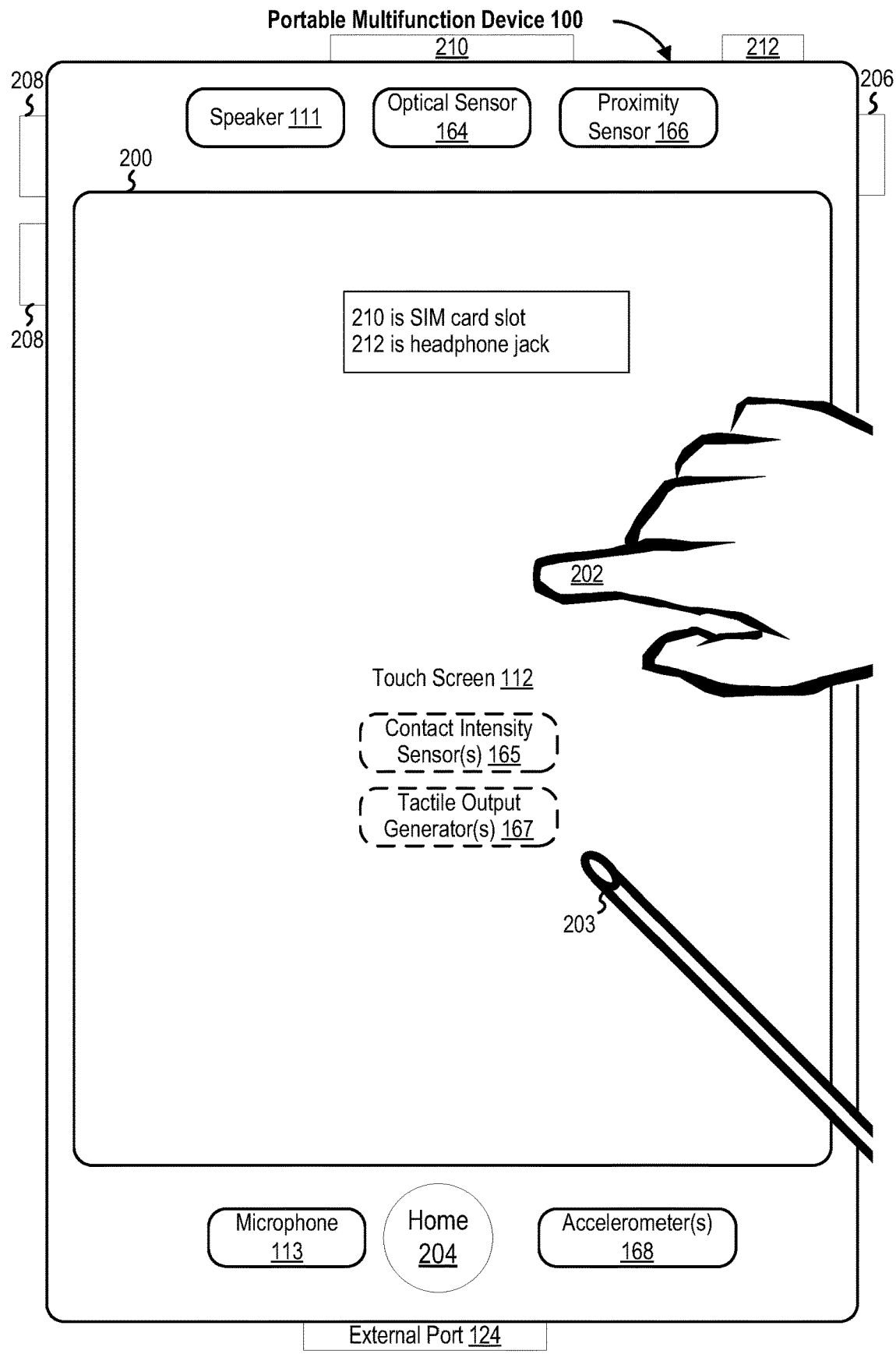
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
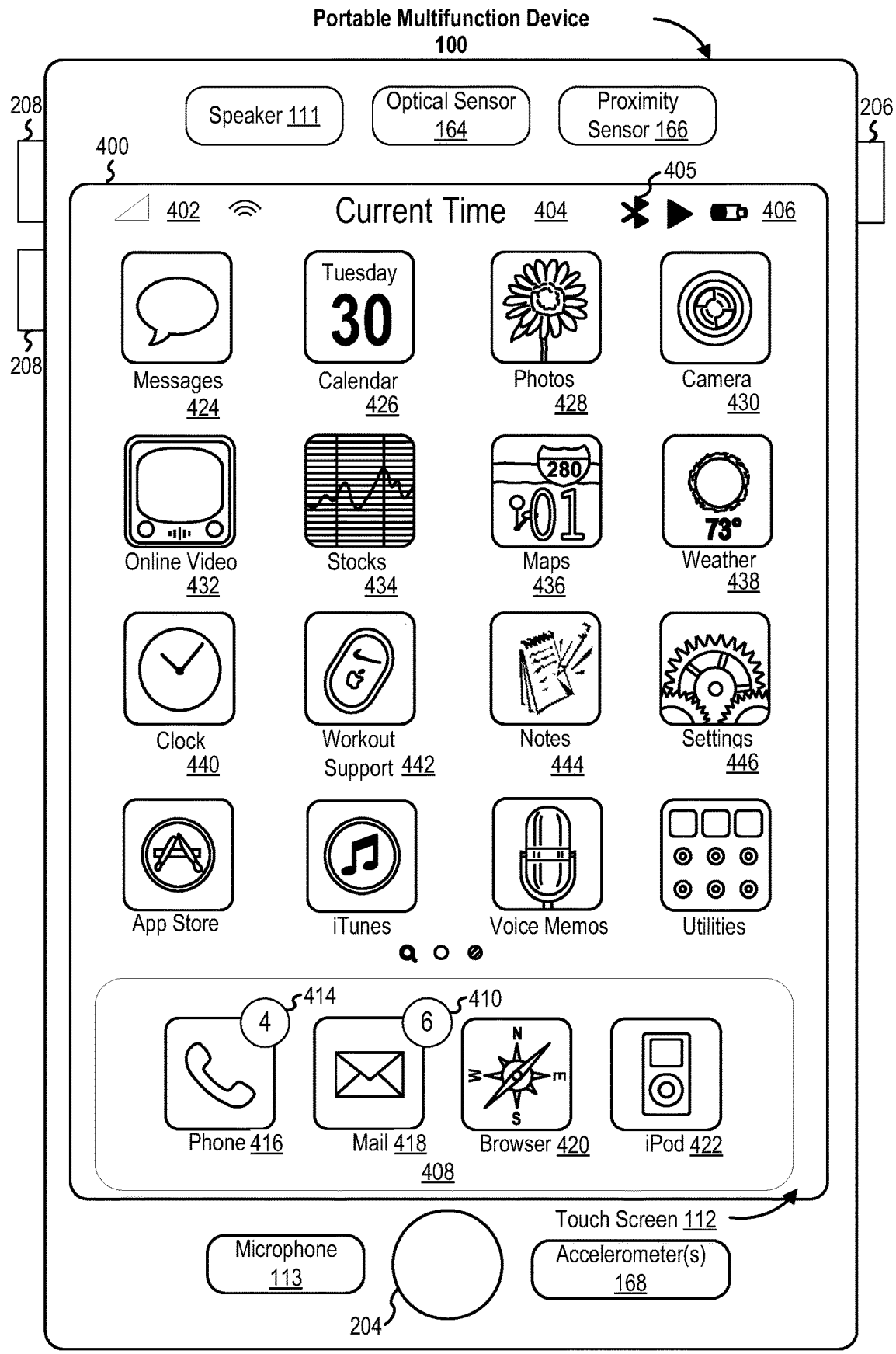
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
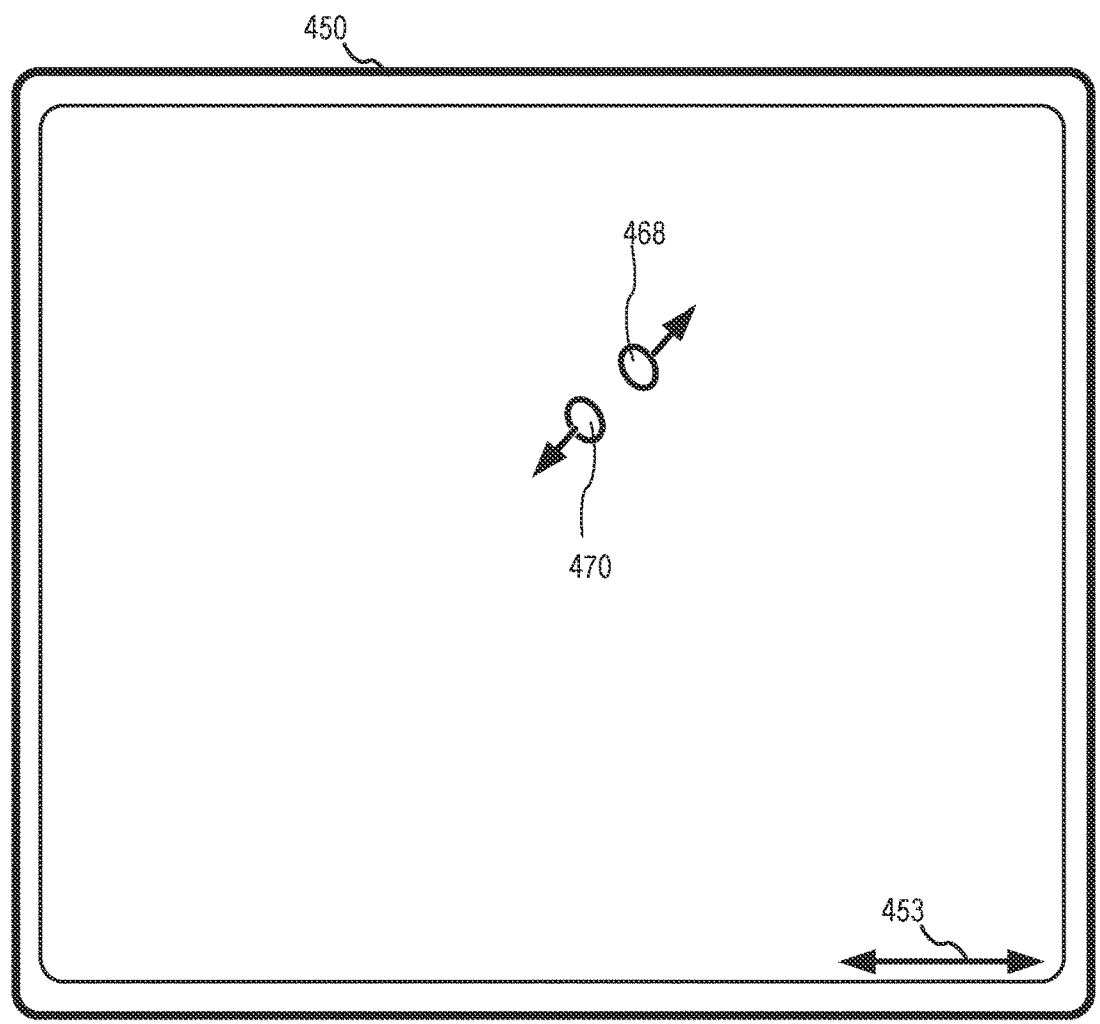
FIG. 4B illustrates an exemplary user interface for a multifunction device with a touch-sensitive surface that is separate from the display in accordance with some embodiments.
Figure 4B:
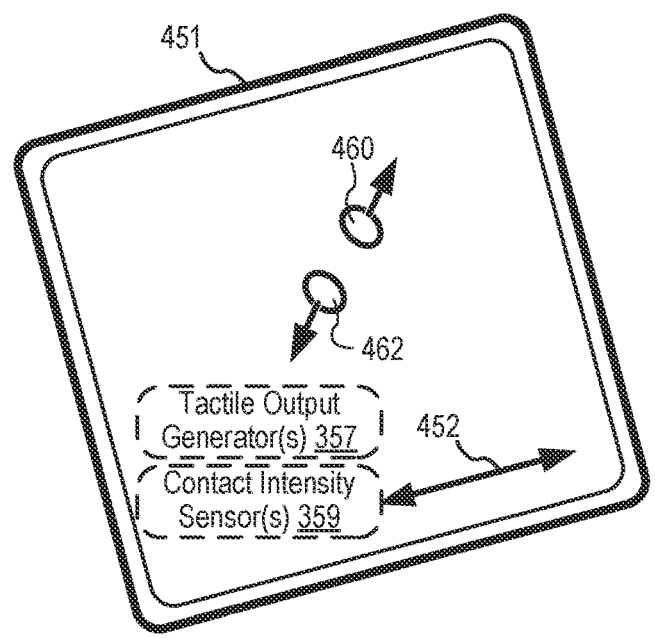

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
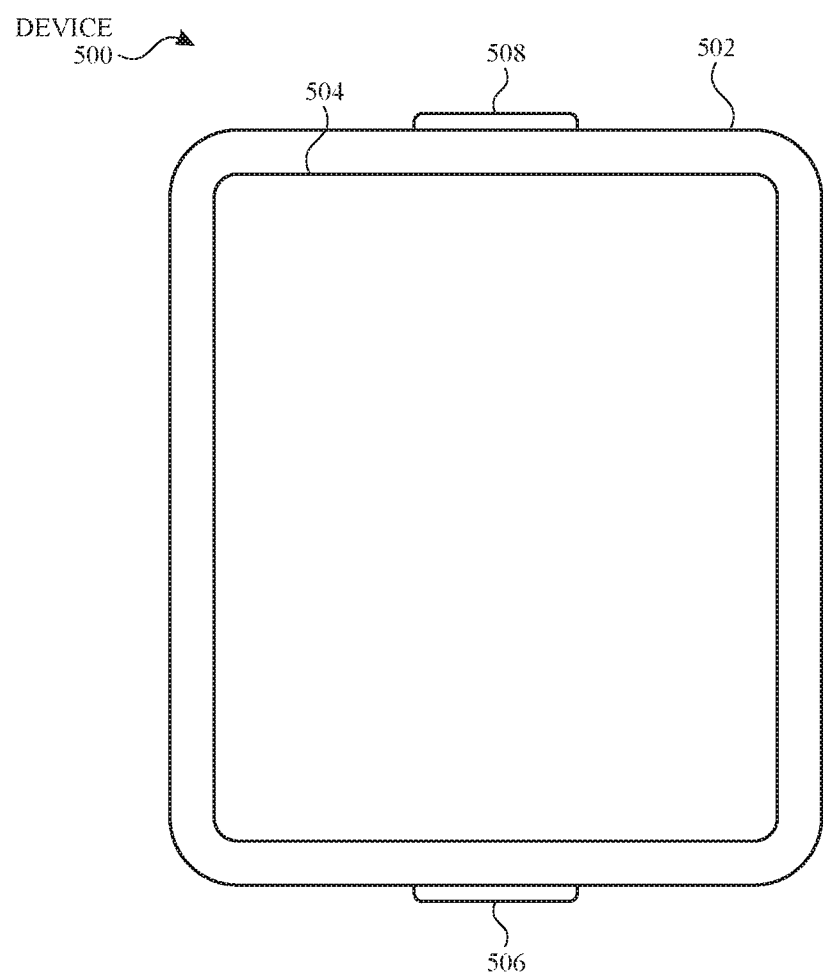
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications:

International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
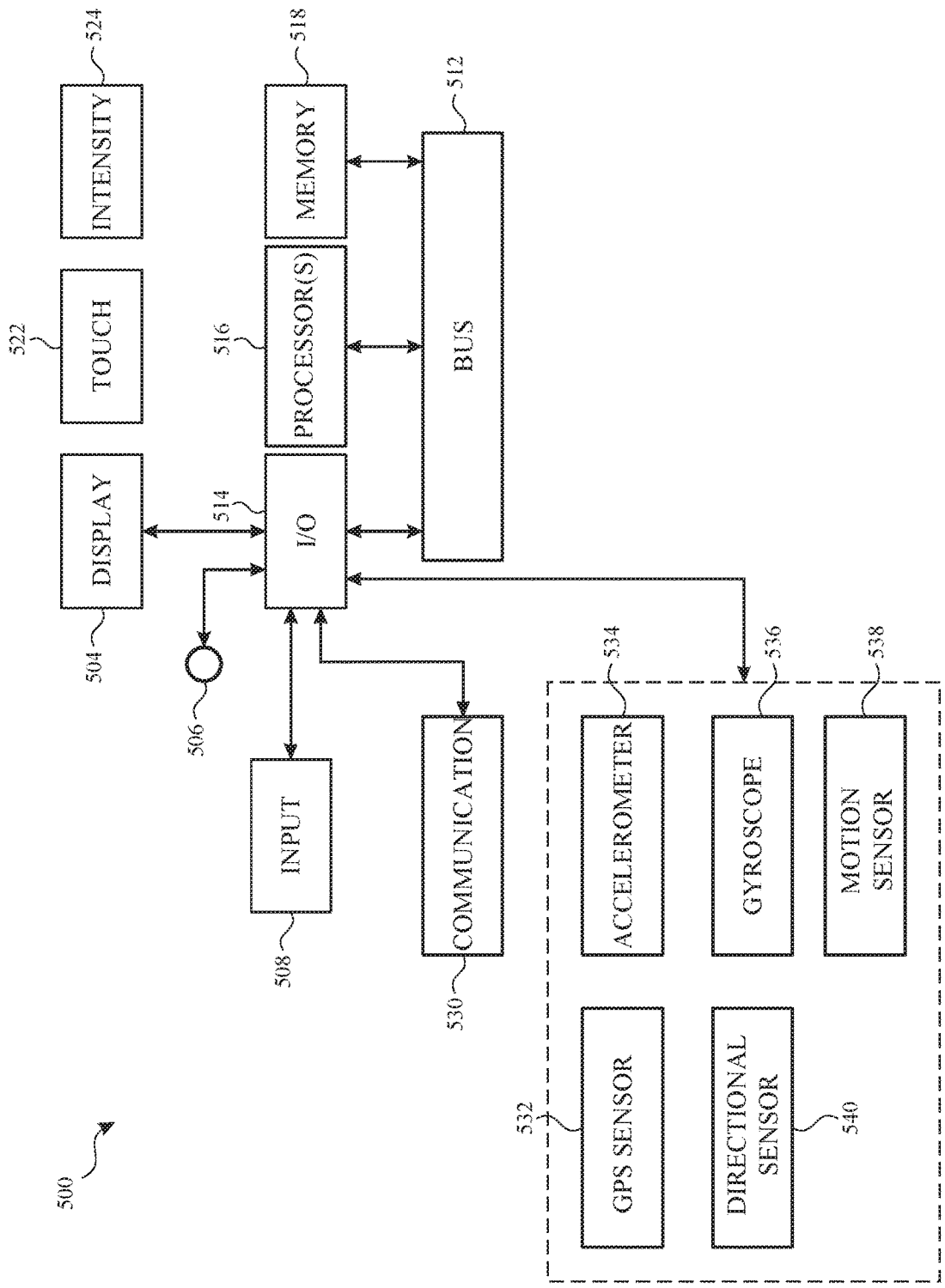
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, and 1300 (FIGS. 7A-7C, 9A-9D, 11A-11B, and 13A-13C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6S illustrate exemplary user interfaces for playing and managing audio items, in accordance with some embodiments. The user interfaces in these figures are used to illustrate the processes described below, including the processes in FIGS. 7A-7C.

FIG. 6A illustrates an electronic device 600 (e.g., portable multifunction device 100, device 300, or device 500). In the non-limiting exemplary embodiment depicted in FIGS. 6A-6S, electronic device 600 is a smartwatch. In other embodiments, electronic device 600 can be a different type of electronic device, such as a different type of wearable device or a smartphone.

As shown in FIG. 6A, electronic device 600 has a touch-sensitive display 602. In some embodiments, electronic device 600 also has a rotatable input mechanism 606 for navigating the displayed user interface. For example, rotatable input mechanism 606 can be used to scroll (upwards and downwards) the displayed user interface. For another example, the rotatable input mechanism 606 can be used to zoom in and zoom out of the displayed user interface. For another example, the rotatable input mechanism 606 can be used to zoom in to a displayed icon corresponding to an application and launch the application corresponding to the zoomed-in icon.

In FIG. 6A, electronic device 600 displays, on the touch-sensitive display 602, a portion of a navigation user interface 604 of an application (e.g., a music application) for playing audio items (e.g., a song, an audio file, a podcast, a radio channel, a recording). Navigation user interface 604 enables a user of electronic device 600 to navigate through audio playlists, albums, artists, and tracks that can be managed and played using electronic device 600. In some embodiments, navigation user interface 604 includes an indication 608 (e.g., "MUSIC" for a music application) that the currently-displayed application is an application for playing audio items. In some embodiments, navigation user interface 604 includes a time indication 610 of the current time. In some embodiments, navigation user interface 604 includes a scroll bar 612 indicating the portion (or region) of navigation user interface 604 that is currently being displayed on touch-sensitive display 602. For example, in FIG. 6A, scroll bar 612 indicates that the very bottom portion of navigation user interface 604 is currently displayed.

Navigation user interface 604 also includes a graphical depiction of a stack of audio group items 614 corresponding to audio items that can be played through electronic device 600 (e.g., via internal speakers of electronic device 600 or via an external device, such as headphones paired with electronic device 600, an external speaker paired with electronic device 600, or speakers of a different device, such as a smartphone, tablet, laptop computer, or desktop computer, paired with electronic device 600). In some embodiments, as shown in FIG. 6A, the stack of audio group items 614 is located at a bottom region of navigation user interface 604. In some embodiments, as shown in FIG. 6A, the stack of audio group items 614 is organized based on albums (e.g., a musical album, a collection of podcasts, a collection of listings from a radio channel), and each stack item of the stack of audio group items 614 corresponds to an album. For example, the first stack item 616 of the stack corresponds to a "Classics Album." In some embodiments, the stack of audio group items 614 are organized based on playlists created by a user of electronic device 600, and each stack item of the stack of audio group items 614 corresponds to a playlist. In some embodiments, the stack of audio group items 614 are organized based on artists, and each stack item of the stack of audio group items 614 corresponds to an artist. In some embodiments, navigation user interface 604 optionally displays, below the stack of audio group items 614, a textual indication 618 of an album, playlist, or radio station corresponding to the first record of the stack and a textual indication 620 of an artist associated with the album, playlist, or radio station.

Figure 6B:
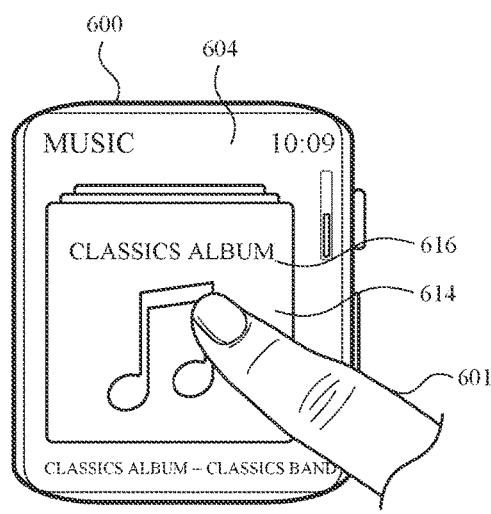
Figure 6C:
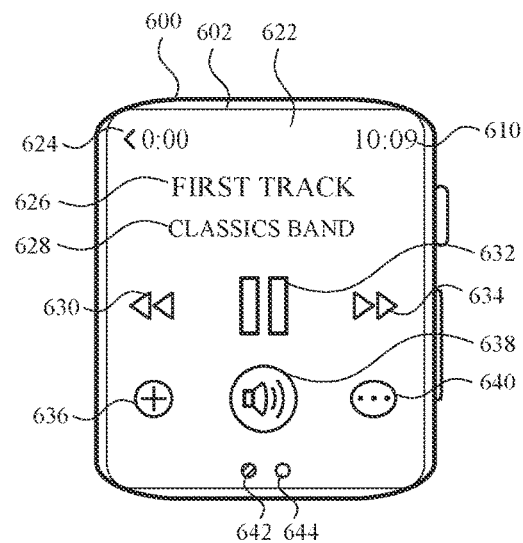

In FIG. 6B, while displaying navigation user interface 604, electronic device 600 receives a tap gesture 601 by a user of electronic device 600 on first stack item 616 of the stack of records 614. In FIG. 6C, in response to receiving tap gesture 601 on first stack item 616, electronic device 600 displays, on touch-sensitive display 602, a control user interface 622 of the application for playing audio items (e.g., a music application). In some embodiments, in addition to displaying control user interface 622, electronic device 600 causes audio output (e.g., via internal speakers of electronic device 600 or via an external device, such as headphones paired with electronic device 600, an external speaker paired with electronic device 600, or speakers of a different device, such as a smartphone, tablet, laptop computer, or desktop computer, paired with electronic device 600) of a first audio item associated with the album corresponding to the selected stack item 616. In some embodiments, electronic device 600 displays control user interface 622 but does not cause audio output of the first audio item associated with the album corresponding to the selected stack item 616.

Control user interface 622 includes an indication 626 (e.g., the title) of the currently-playing audio item (e.g., "First Track"). In some examples, the audio item is the first listed audio item in the album (e.g., "Classics Album") corresponding to the selected stack item 616. In some embodiments, control user interface 622 also includes an indication 628 of the artist (e.g., "Classics Band") associated with the currently-playing audio item (e.g., "First Track").

In some embodiments, control user interface 622 displays a selectable indication 624 which indicates a progress time (e.g., "0:00") of the currently-playing audio item (e.g., "First Track"). In some embodiments, in response to detecting user selection of selectable indication 624, electronic device 600 replaces display of the current user interface with display of the previous user interface (e.g., replaces display of control user interface 622 with display of navigation user interface 604. In some embodiments, selectable indication 624 replaces display of indication 608. In some embodiments, electronic device 600 maintains display of time indication 610.

Control user interface 622 further includes a rewind icon 630, a play/pause icon 632, and a forwards icon 634. In some embodiments, play/pause icon 632 is displayed in "pause" mode, as depicted in FIG. 6C, when the audio item (e.g., "First Track") is currently being played. In some embodiments, play/pause icon 632 is displayed in "play" mode when the audio item (e.g., "First Track") is currently not being played. In some embodiments, user activation of rewind icon 630 causes the currently-playing audio item (e.g., "First Track") to rewind by a predetermined increment of time (e.g., 3 seconds, 5 seconds, 10 seconds, etc.). In some embodiments, user activation of rewind icon 630 causes the currently-playing audio item (e.g., "First Track") to be played from the beginning of the file. In some embodiments, user activation of rewind icon 630 causes a previous listed audio item in the album (e.g., "Classics Album") to be played. In some embodiments, user activation of forwards icon 634 causes the currently-playing audio item (e.g., "First Track") to jump forwards by a predetermined increment of time (e.g., 3 seconds, 5 seconds, 10 seconds, etc.). In some embodiments, user activation of forwards icon 634 causes a subsequent listed audio item in the album (e.g., "Classics Album") to be played.

Control user interface 622 further includes an add-to-library icon 636, a volume control icon 638, and a show-more icon 640. Volume control icon 638 enables the user to manipulate the output volume setting. In some embodiments, user activation of volume control icon 638 causes display of a volume bar for increasing or decreasing the volume. Add-to-library icon 636 is described in greater detail below with reference to FIGS. 6L-6M and show-more icon 640 is described in greater detail below with reference to FIGS. 6N-6Q.

Control user interface 622 further includes a first indicia icon 642 corresponding to control user interface 622 and second indicia icon 644 corresponding to a user interface different from control user interface 642. In FIG. 6C, first indicia icon 642 is highlighted (e.g., visually darkened, visually marked) to be visually distinguished relative to second indicia icon 644 in order to indicate to the user that the currently-displayed user interface is control user interface 622 (as opposed to a different user interface).

Figure 6D:
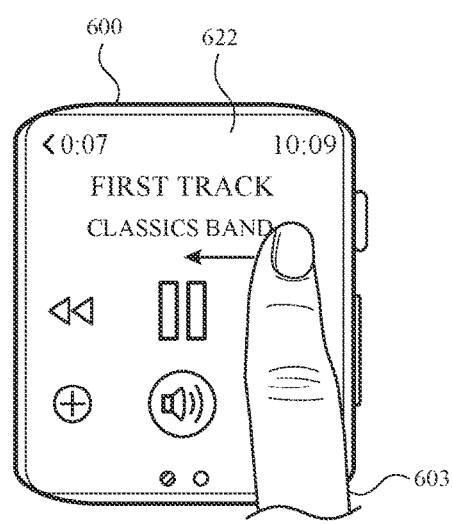
Figure 6E:
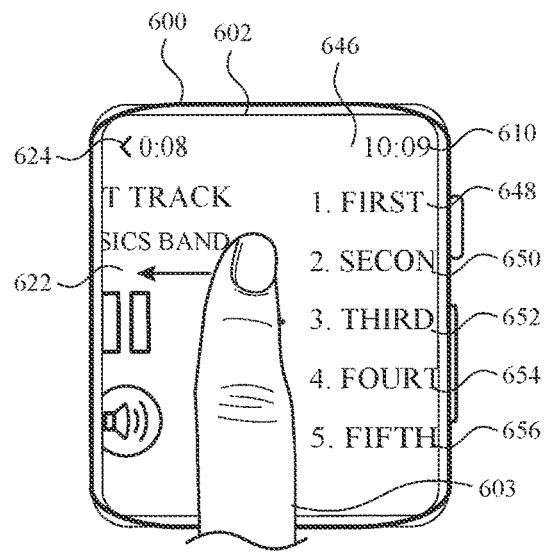
Figure 6F:
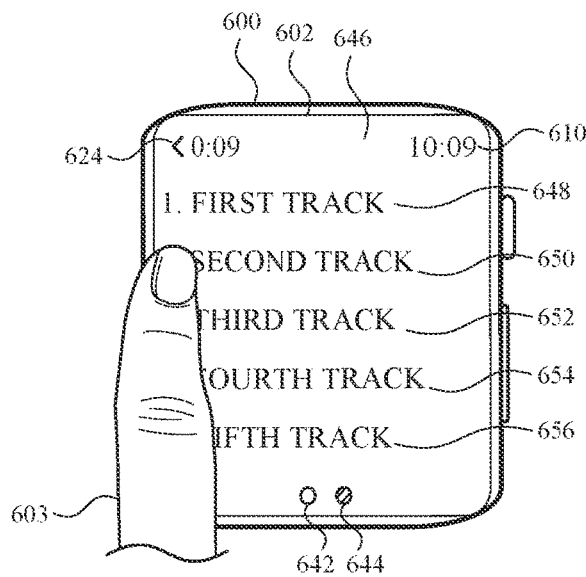

In FIG. 6D, electronic device 600 receives a user input on control user interface 622. In some embodiments, as shown in the transition of FIG. 6D through FIG. 6F, the user input is a swipe gesture 603 in a right-to-left horizontal direction, beginning on control user interface 622 and moving in a leftwards direction on touch-sensitive display 602. In some embodiments, as shown in FIG. 6E, as swipe gesture 603 is being detected, control user interface 622 is gradually removed from display towards a side (e.g., the left side) of touch-sensitive display 602, and a track list user interface 646 moves into display from an opposite side (e.g., the right side) of touch-sensitive display 602. Thus, swipe gesture 603 causes electronic device 600 to smoothly transition from control user interface 622 to track list user interface 646. In some embodiments, during the transition of control user interface 622 to track list user interface 646, electronic device maintains causing audio output of the currently-playing audio item (e.g., "First Track"). In some embodiments, during the transition of control user interface 622 to track list user interface 646, electronic device 600 maintains display of selectable indication 624 indicating the time progress of the currently-playing audio item (e.g., "First Track") and time indication 610.

Figure 6G:
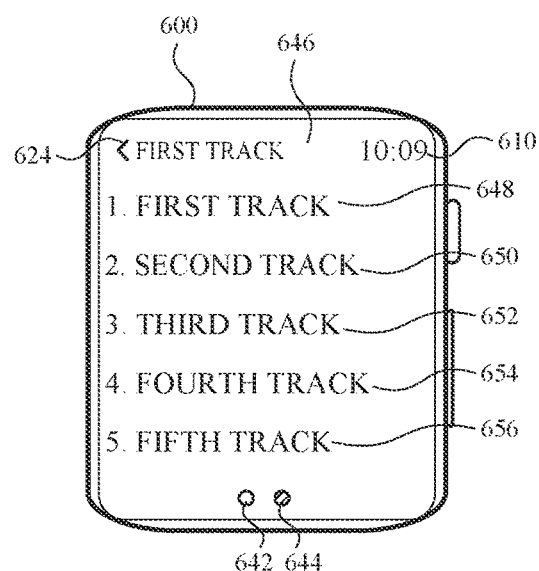

As shown in FIG. 6G, track list user interface 646 includes display of a list of selectable titles 648-656 associated with audio items in the currently-selected album (or playlist or radio station) (e.g., "Classics Album"), including the title 648 corresponding to the currently-playing audio item (e.g., "First Track"). In some embodiments, as shown in FIG. 6G, track list user interface 646 updates display of selectable indication 624 to indicate the title of the currently-playing audio item (e.g., "First Track"). In some embodiments, user activation of selectable indication 624 causes electronic device 600 to replace display of track list user interface 646 with control user interface 622. In some embodiments, electronic device 600 maintains display of time indication 610 in track list user interface 646.

Track list user interface 646 also includes display of first indicia icon 642 corresponding to control user interface 622 and second indicia icon 644 corresponding to track list user interface 646. Because track list user interface 646 is being displayed, second indicia icon 644, instead of first indicia icon 642, is highlighted (e.g., visually darkened, visually marked) to be visually distinguished relative to first indicia icon 642 in order to indicate to the user that the currently-displayed user interface is track list user interface 646 (as opposed to control user interface 622).

Figure 6H:
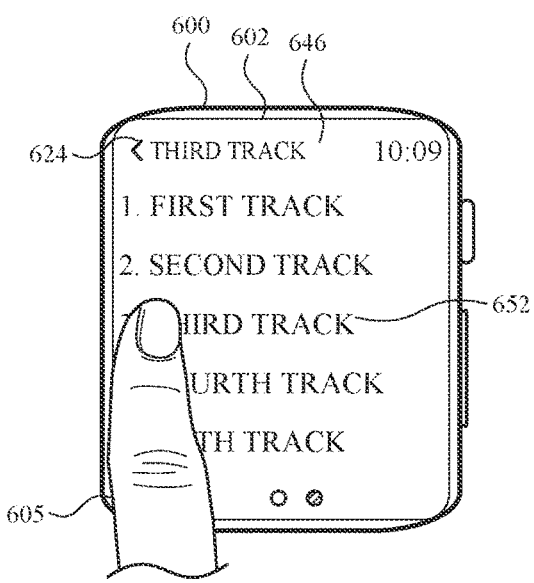

In FIG. 6H, electronic device 600 receives user selection, via touch-sensitive display 602 (or, alternatively, a voice input via a mic or rotation input via rotatable input mechanism 606), of an audio item of the current album (e.g., "Classics Album") different from the currently-playing audio item (e.g., "First Track"). For example, electronic device 600 detects tap gesture 605 on selectable title 652 corresponding to the third audio item (e.g., "Third Track") of the current album (e.g., "Classics Album"). In response to detecting tap gesture 605 on selectable title 652, electronic device 600 causes audio output (e.g., via internal speakers of electronic device 600 or via an external device, such as headphones paired with electronic device 600, an external speaker paired with electronic device 600, or speakers of a different device, such as a smartphone, tablet, laptop computer, or desktop computer, paired with electronic device 600) of the audio item corresponding to selectable title 652 (e.g., "Third Track"). In some embodiments, selectable indication 624 is updated to indicate that the audio item corresponding to selectable title 652 is now playing.

Figure 6I:
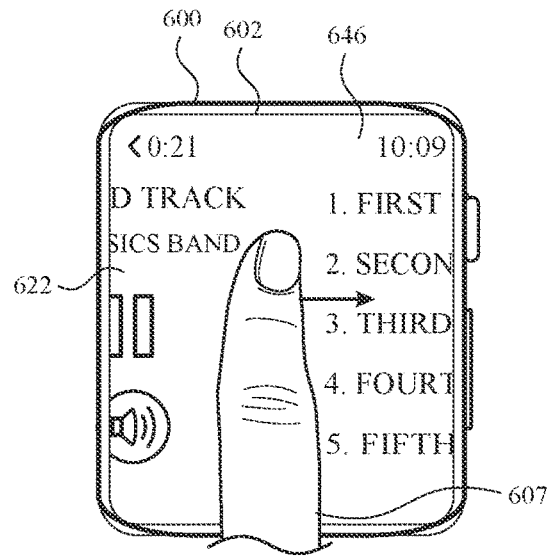
Figure 6J:
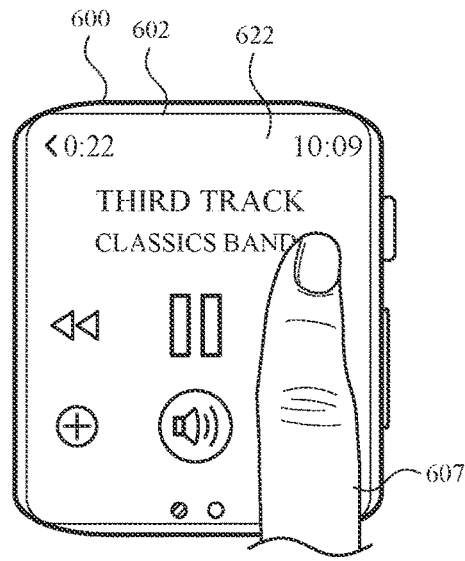
Figure 6K:
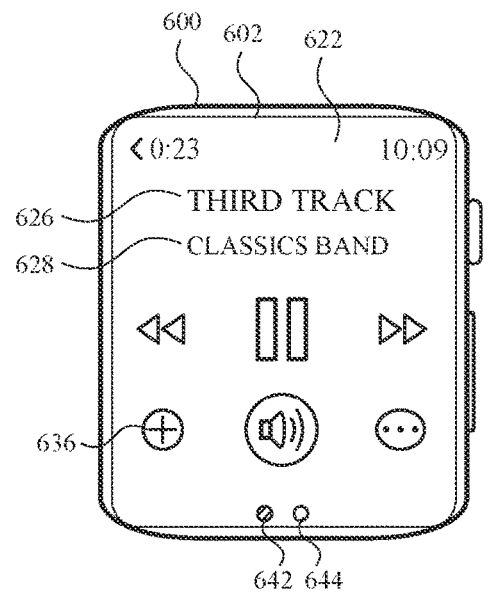

As shown in the transition of FIG. 6I through FIG. 6K, electronic device 600 detects a swipe gesture 607 in a left-to-right horizontal direction, beginning on track list user interface 646 and moving in a rightwards direction on touch-sensitive display 602. Through the transition, electronic device 600 smoothly replaces display of track list user interface 646 with control user interface 622. As shown in FIG. 6K, control user interface 622 displays indication 626 (e.g., the title) of the currently-playing audio item (e.g., "Third Track") and indication 628 of the artist (e.g., "Classics Band") associated with the currently-playing audio item (e.g., "Third Track"). As also shown in FIG. 6K, electronic device 600 updates display of first indicia icon 642 and second indicia icon 644 such that first indicia icon 642 (corresponding to control use interface 622) is highlighted (e.g., visually darkened, visually marked) relative to second indicia icon 644 (corresponding to track list user interface 646) to indicate to the user that the currently-displayed user interface is control user interface 622.

As shown in FIG. 6K, control user interface 622 includes display of add-to-library icon 636. In some embodiments, add-to-library icon has a first display mode (e.g., displayed with a "+" symbol) and a second display mode (e.g., displayed with a "✓" symbol). The first display mode indicates that the currently-playing audio item (e.g., "Third Track") is not contained in a media library (e.g., a music library, a library of audio items stored in and accessible from a cloud service) associated with a user account that is logged into electronic device 600, and the second display mode indicates that the currently-playing audio item (e.g., "Third Track") is contained in a media library (e.g., a music library, a library of audio items stored in and accessible from a cloud service) associated with a user account that is logged into electronic device 600. In FIG. 6K, the currently-playing audio item (e.g., "Third Track") is not contained in a media library associated with a user account of the user of electronic device 600, and thus add-to-library affordance is displayed in the first display mode (e.g., is displayed with a "+" symbol).

Figure 6L:
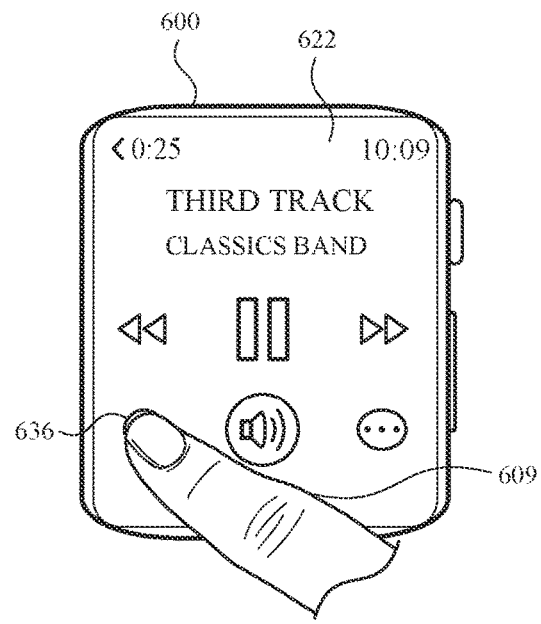

In FIG. 6L, while playing an audio item (e.g., "Third Track") that is not contained in a media library associated with a user account of the user, electronic device 600 detects, via touch-sensitive display 602 (or, alternatively, a voice input via a mic or rotation input via rotatable input mechanism 606), user selection of add-to-library icon 636 (in the first display mode). For example, as shown in FIG. 6L, the user selection is a tap gesture 609 on add-to-library icon 636. In response to detecting tap gesture 609 on add-to-library icon 636 (in the first display mode), electronic device 600 causes the current audio item (e.g., "Third Track") to be added to a media library.

Figure 6M:
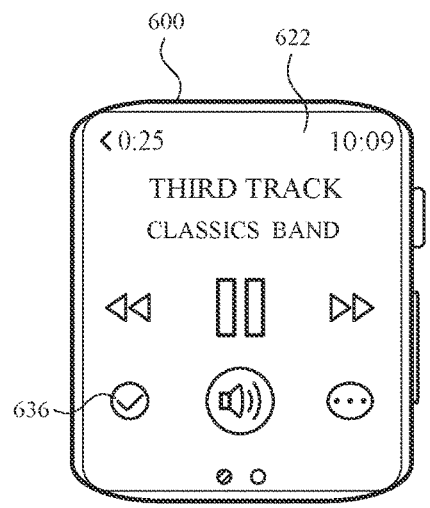

As shown in FIG. 6M, once the current audio (e.g., "Third Track") has been added to the media library, electronic device 600 changes the display mode of add-to-library icon 636 from the first display mode (e.g., displayed with a "+" symbol) to the second display mode (e.g., displayed with a "/" symbol). Add-to-library icon 636 in the second display indicates to the user that the current audio item is already contained in the media library. In some embodiments, when in the second display mode, upon receiving user selection of the add-to-library icon 636, electronic device 600 displays a notification (or a prompt) indicating to the user that the current audio item (e.g., "Third Track") is already contained in the media library. In some embodiments, when in the second display mode, add-to-library icon 636 is no longer selectable by the user.

Figure 6N:
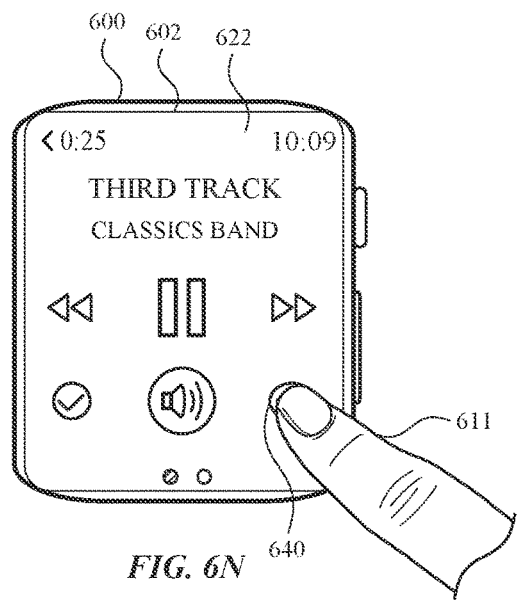

In FIG. 6N, while displaying control user interface 622, electronic device 600 detects, via touch-sensitive display 602 (or, alternatively, a voice input via a mic or rotation input via rotatable input mechanism 606), user selection of show-more icon 640. For example, the user selection is a tap gesture 611 on show-more icon 640. In some embodiments, as shown in FIG. 6N, show-more icon 640 is displayed with a "• • •" symbol (e.g., representing a "show more" option) to indicate that more user actions can be taken with respect to the current audio item (e.g., "Third Track").

Figure 6O:
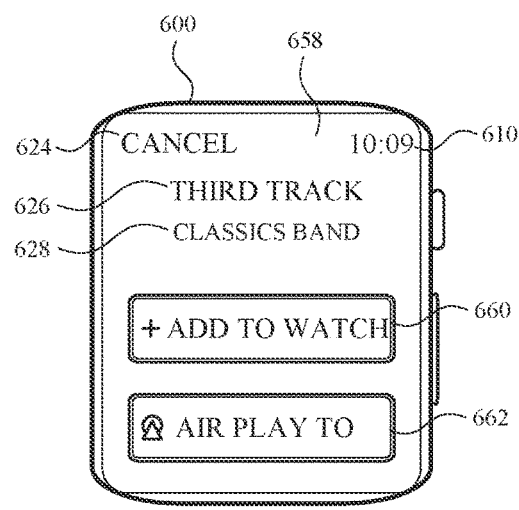

In some embodiments, in response to detecting tap gesture 611 on show-more icon 640, electronic device 600 displays (replaces display of control user interface 622 with) an additional options user interface 658, as shown in FIG. 6O. In some embodiments, in additional options user interface 658, selectable indication 624 indicates (e.g., by displaying "CANCEL") to the user that the user can select selectable indication 624 to leave additional options user interface 658 (and return to control user interface 622). In some embodiments, additional options user interface 658 maintains display of time indication 610. In some embodiments, additional options user interface 658 maintains display of indication 626 (e.g., the title) of the current audio item (e.g., "Third Track"). In some embodiments, additional options user interface 658 maintains display of indication 628 of the artist (e.g., "Classics Band") corresponding to the current audio item (e.g., "Third Track").

In some embodiments, as further shown in FIG. 6O, additional options user interface 658 includes an add-locally icon 660 and play-remotely icon 662. In some embodiments, add-locally icon 660 indicates (e.g., by displaying a textual indication, such as "Add to Watch") to the user that the current audio item (e.g., "Third Track") can be stored locally on electronic device 600. In some embodiments, play-remotely icon 662 indicates (e.g., via a textual indication, such as "AirPlay To" or "Stream To") to the user that the current audio item can be caused to play remotely at a different device (e.g., a smartphone, a laptop computer, a desktop computer) that is paired (e.g., connected with and recognized by) electronic device 600.

Figure 6P:
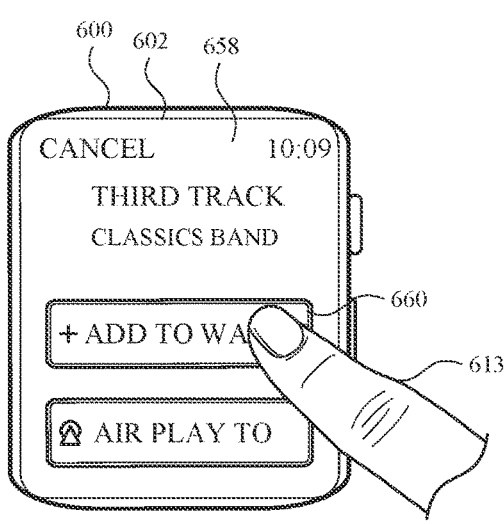

In FIG. 6P, while displaying additional options user interface 658, electronic device 600 detects, via touch-sensitive display 602 (or, alternatively, a voice input via a mic or rotation input via rotatable input mechanism 606), user selection of add-locally icon 660. For example, as shown in FIG. 6P, the user selection is a tap gesture 613 on add-locally icon 660.

Figure 6Q:
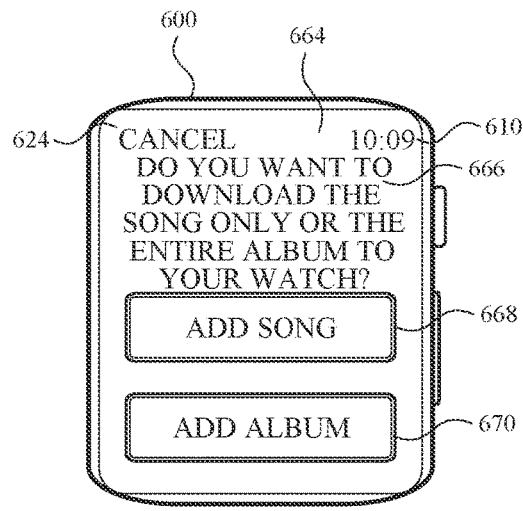

As shown in FIG. 6Q, in response to detecting tap gesture 613 on add-locally icon 660, electronic device 600 displays a second additional options user interface 664. In some embodiments, second additional options user interface 664 maintains display of selectable indication in the cancel mode. In some embodiments, user activation of selectable indication 624 on second additional options user interface 664 causes electronic device 600 to return to display of additional options user interface 658. In some embodiments, user activation of selectable indication 624 on second additional options user interface 664 causes electronic device 600 to return to display of control user interface 622.

As also shown in FIG. 6Q, second additional options user interface 664 includes an add-track-only icon 668 and an add-entire-album icon 670. Add-track-only icon 668 indicates (e.g., via a textual indication, such as "Add Song," "Add Track," "Add Audio item," etc.) to the user that only the current audio item (e.g., "Third Track"), but not other audio items associated with the current album (e.g., "Classics Album"), will be added (stored) locally on electronic device 600. Add-entire-album icon 670 indicates (e.g., via a textual indication, such as "Add Album," "Add Playlist," "Add Folder," etc.) that all audio items associated with the current album (or current playlist, current folder, current radio station, etc.), will be added (stored) locally on electronic device 600.

Figure 6R:
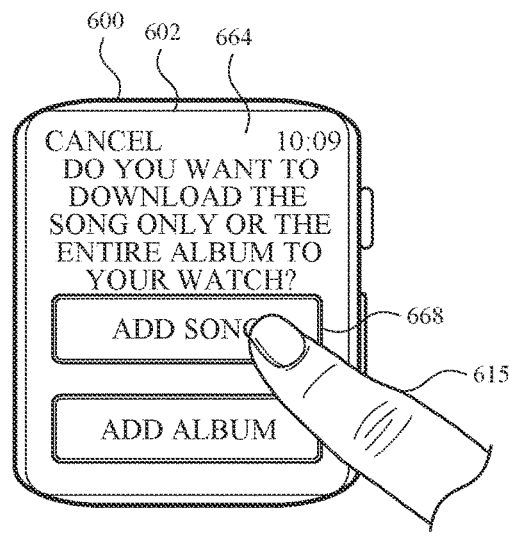

In some embodiments, as shown in FIG. 6R, while displaying second additional options user interface 664, electronic device 600 detects, via touch-sensitive display 602 (or, alternatively, a voice input via a mic or rotation input via rotatable input mechanism 606), user selection of add-track-only icon 668. For example, the user selection is a tap gesture 615 on add-track-only icon 668. In response to detecting user activation of add-track-only icon 668, electronic device 600 proceeds to add (store) the current audio item (e.g., "Third Track") locally on electronic device 600, but does not add (store) other audio items (e.g., "First Track," "Second Track," "Fourth Track," "Fifth Track") of the current album (e.g., "Classics Album") locally on electronic device 600, even if one or more of the other audio items are not stored locally on electronic device 600.

In some embodiments, as shown in FIG. 6S, while displaying second additional options user interface 664, electronic device 600 receives, via touch-sensitive display 602 (or, alternatively, a voice input via a mic or rotation input via rotatable input mechanism 606), user selection of add-entire-album 670. For example, the user input is a tap gesture 617 on add-entire-album 670. In response to detecting user activation of add-entire-album 670, electronic device 600 proceeds to add (store) all audio items (e.g., "First Track," "Second Track," "Third Track," "Fourth Track," "Fifth Track") in the current album (e.g., "Classics Album") locally on electronic device 600.

FIGS. 7A-7C are a flow diagram illustrating a method for playing and managing audio items using an electronic device in accordance with some embodiments. Method 700 is performed at a device (e.g., 100, 300, 500, 600) with a touch-sensitive display (e.g., touch-sensitive display 602). Some operations in method 700 are, optionally, combined, the order of some operations is, optionally, changed, and some operations are, optionally, omitted.

As described below, method 700 provides an intuitive way for playing and managing audio items. The method reduces the cognitive burden on a user for playing and managing audio items, thereby creating a more efficient human-machine interface. For battery-operated computing devices, enabling a user to play and manage audio files faster and more efficiently conserves power and increases the time between battery charges.

At block 702, the electronic device (e.g., 600) displays, on the display (e.g., 602), a first user interface (e.g., 604), where the first user interface includes a scrollable plurality of audio playlist items (e.g., 614) associated with a plurality of audio playlists. In some examples, the scrollable plurality of audio playlist items (e.g., 614) is a stack of records. In some examples, the scrollable plurality of audio playlist items (e.g., 614) is a stack of audio tracks. In some examples, the scrollable plurality of audio playlist items (e.g., 614) is a collection of titles or albums. In some examples, the scrollable plurality of audio playlist items (e.g., 614) is a collection of radio items, news items, or podcasts. In some examples, the scrollable plurality of audio playlist items (e.g., 614) is a collection of audio recordings. Displaying a user interface that includes a scrollable plurality of audio playlist items associated with a plurality of audio playlists provides a visual feedback that enables a user to visualize (and thus experience the sensation of) flipping through a real stack of playlist items. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 704, while displaying the first user interface (e.g., 604), the electronic device (e.g., 600) receives a third input. In some examples, the third input is a touch gesture on the touch-sensitive display (e.g., 602) corresponding to a scroll in an upwards direction. In some examples, the third input is a touch gesture on the touch-sensitive display (e.g., 602) corresponding to a scroll in a downwards direction. In some examples, the third input is a movement of a rotatable crown (e.g., 606) of the electronic device (e.g., 600) in a clockwise direction. In some examples, the third input is a movement of a rotatable crown (e.g., 606) of the electronic device (e.g., 600) in a counter-clockwise direction. In some embodiments, at block 706, in response to receiving the third input, the electronic device (e.g., 600) displays, on the display (e.g., 602), a plurality of menu affordances. In some embodiments, at block 708, the electronic device (e.g., 600) receives user selection of a first menu affordance (e.g., a "library" menu) of the plurality of menu affordances (e.g., a "now playing" menu, a "search" menu, or a "library" menu), where the menu affordance is associated with the media library. In some embodiments, at block 710, in response to receiving the user selection of the first menu affordance (e.g., the "library" menu), the electronic device (e.g., 600) displays, on the display (e.g., 602), one or more audio items associated with (e.g., contained in) the media library.

In some embodiments, at block 712, while displaying the one or more audio items associated with the media library, the electronic device (e.g., 600) receives user selection of a second audio item of the one or more audio items associated with the media library. In some embodiments, at block 714, in response to receiving the user selection of the second audio item, the electronic device (e.g., 600) displays, on the display, the second user interface (e.g., 622) (e.g., a control user interface of a music application), where the second user interface (e.g., 622) includes a first indication (e.g., 626) (e.g., a title of the audio item or an artist/album associated with the audio item) of the second audio item and a second indication (e.g., 636) indicating that the second audio item is contained in the media library.

At block 716, the electronic device (e.g., 600) receives a first user input (e.g., 601) on a first audio playlist item of the plurality of audio playlist items (e.g., 614). In some examples, the first user input (e.g., 601) is a touch gesture detectable by the touch-sensitive display (e.g., 602), such as a tap.

At block 718, in response to receiving the first user input (e.g., 601) on the first audio playlist item, the electronic device (e.g., 600), at block 720, displays, on the display (e.g., 602), a second user interface (e.g., 622) (e.g., a control user interface of a music application), where the second user interface (e.g., 622) includes an indication (e.g., 626) of a first audio item of a first audio playlist associated with the first audio playlist item, and, at block 722, displays, on the display, a plurality of indicia icons (e.g., 642, 644), where a first indicia icon (e.g., 642) associated with the second user interface includes an indication (e.g., highlighting or marking of the indicia icon) that the second user interface is currently displayed. Thus, the first indicia icon (e.g., 642) is visually distinguished from other indicia icons that are not associated with the second user interface (e.g., 622). Displaying a plurality of indicia icons, where the first indicia icon associated with the second user interface includes the indication that the second user interface is currently displayed, provides the user with feedback about the currently-displayed user interface and about other user interfaces that the user can navigate to relative to the currently-displayed user interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 724, in response to receiving the first user input (e.g., 601) on the first audio playlist item (e.g., 616), the electronic device (e.g., 600) causes audio output of the first audio item. For example, the electronic device (e.g., 600) causes the audio output of the first audio item via internal speakers of the electronic device or via an external device, such as headphones paired with the electronic device, an external speaker paired with the electronic device, or the speakers of a different device (e.g., a smartphone, tablet, laptop computer, or desktop computer) paired with the electronic device. Causing audio output of the first audio item in response to receiving the first user input on the first audio playlist item allows the user to quickly and easily listen to and recognize an audio item within the audio playlist item without having to manually view and select an audio item within the audio playlist item. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 728, in accordance with a determination that the first audio item is not contained in a media library associated with a user account that is logged into the electronic device (e.g., 600), the electronic device displays, on the display (e.g., 602), a first affordance (e.g., 636). In some examples, the media library is a library of audio items stored in and accessible from a cloud service. In some examples, the first affordance (e.g., 636) is displayed with a "+" to indicate that selecting the affordance will cause the first audio item to be added to the media library. In some embodiments, at block 730, the electronic device (e.g., 600) receives user selection of the first affordance (e.g., 636). In some embodiments, at block 732, in response to receiving the user selection of the first affordance (e.g., 636), the electronic device (e.g., 600) causes the first audio item to be added to the media library.

Displaying, in accordance with a determination that the audio item is not contained in a media library associated with a user account that is logged into the device, the affordance provides the user with feedback about the current state of the audio item and whether or not the user would want to take additional action regarding the audio item. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 734, in accordance with a determination that the first audio item is contained in the media library associated with the user account that is logged into the electronic device (e.g., 600), the electronic device displays, on the display (e.g., 602), an indication (e.g., 636) that the first audio item is contained in the media library. In some examples, the first affordance (e.g., 636) is displayed with a "/" (instead of a "+") to indicate that the first audio item is already contained in the media library. Displaying the indication that the audio item is contained in the media library provides the user with visual feedback about the current state of the audio item. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 736, the second user interface (e.g., 622) (e.g., a control user interface of a music application) includes a second affordance (e.g., 640), and the electronic device (e.g., 600) receives user selection of the second affordance. In some examples, the second affordance (e.g., 640) is displayed with a "• • •" (e.g., representing a "show more" option) to indicate that more actions can be taken with respect to the first audio item. In some embodiments, at block 738, subsequent to receiving the user selection of the second affordance (e.g., 640), the electronic device (e.g., 600) displays, on the display (e.g., 602), a first add affordance (e.g., 660, 668). In some examples, the first add affordance (e.g., 668) indicates to the user that the current audio item can be stored locally on the electronic device (e.g., 600). In some embodiments, at block 740, the electronic device (e.g., 600) receives user selection of the first add affordance (e.g., 660, 668). In some embodiments, at block 742, in response to receiving the user selection of the first add affordance (e.g., 660, 668), the electronic device (e.g., 600) stores the first audio item on the electronic device, and forgoes storing a second audio item of the plurality of audio items of the first audio playlist different from the first audio item. For example, the electronic device (e.g., 600) stores only the current audio item of the playlist but does not store all other audio items of the playlist.

In some embodiments, at block 744, subsequent to receiving the user selection of the second affordance (e.g., 670), the electronic device (e.g., 600) displays, on the display (e.g., 602), a second add affordance (e.g., 670). In some examples, the second add affordance (e.g., 670) indicates to the user that all the audio items of the current playlist can be stored locally on the device (e.g., 600). In some embodiments, at block 746, the electronic device (e.g., 600) receives user selection of the second add affordance (e.g., 670). In some embodiments, at block 748, in response to receiving the user selection of the second add affordance (e.g., 670), the electronic device (e.g., 600) stores all of the plurality of audio items of the first audio playlist on the electronic device.

At block 750, the electronic device (e.g., 600) receives a second user input on the second user interface (e.g., 622). In some examples, the second user input is a swipe gesture (e.g., 607) in a horizontal direction on the second user interface (e.g., 622). In some examples, the second user input is a swipe gesture in a vertical direction on the second user interface.

At block 752, in response to receiving the second user input (e.g., 607) on the second user interface, the electronic device (e.g., 600), at block 754, displays, on the display (e.g., 602), a third user interface (e.g., 646) (e.g., a user interface showing the list of tracks in the playlist that is associated with the currently-playing track), where the third user interface includes a plurality of audio items (e.g., 648-656) of the first audio playlist and, at block 756, updates display of the plurality of indicia icons, where a second indicia icon (e.g., 644) associated with the third user interface (e.g., 646) includes the indication (e.g., highlighting or marking of the indicia icon) that the third user interface is currently displayed.

Updating display of the plurality of indicia icons, where the first indicia icon associated with the second user interface includes the indication that the second user interface is currently displayed, provides the user with feedback about the currently-displayed user interface and about other user interfaces that the user can navigate to relative to the currently-displayed user interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 758, while the electronic device (e.g., 600) has no connectivity with an external device (e.g., a smartphone, tablet, laptop computer, or desktop computer) that is storing a second audio item of the first audio playlist, the electronic device receives user selection of the second audio item. In some embodiments, at block 760, in response to receiving the user selection of the second audio item of the first audio playlist, the electronic device (e.g., 600), at block 762, in accordance with a determination that the second audio item is stored on the electronic device, causes audio output of the second audio item, and, at block 764, in accordance with a determination that the second audio item is not stored on the electronic device, forgoes causing audio output of the second audio item. For example, the electronic device (e.g., 600) causes the audio output of the second audio item via internal speakers of the electronic device or via an external device, such as headphones paired with the electronic device, an external speaker paired with the electronic device, or the speakers of a different device (e.g., a smartphone, tablet, laptop computer, or desktop computer) paired with the electronic device.

Causing audio output of the audio item in accordance with a determination that the audio item is stored on the device and forgoing causing audio output of the audio item in accordance with a determination that the audio item is not stored on the device provides the user with feedback indicative of whether or not the audio item is stored on the device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 766, the electronic device (e.g., 600) receives user input (e.g., 605) on a second audio item (e.g., a different track from the current track) of the plurality of audio items of the first audio playlist displayed on the third user interface, where the second audio item is different from the first audio item. In some embodiments, at block 768, in response to receiving the user input (e.g., 605) on the second audio item, at the electronic device (e.g., 600), at block 770, displays, on the display (e.g., 602), the second user interface (e.g., 622), where the second user interface includes an indication (e.g., 626) of the second audio item. In some embodiments, at block 772, the electronic device (e.g., 600) also updates display of the plurality of indicia icons, where the first indicia icon (e.g., 642) associated with the second user interface (e.g., 622) includes the indication (e.g., highlighting or marking of the indicia icon) that the second user interface is currently displayed. In some embodiments, at block 774, the electronic device (e.g., 600) also causes audio output of the second audio item. For example, the electronic device (e.g., 600) causes the audio output of the second audio item via internal speakers of the electronic device or via an external device, such as headphones paired with the electronic device, an external speaker paired with the electronic device, or the speakers of a different device (e.g., a smartphone, tablet, laptop computer, or desktop computer) paired with the electronic device.

Updating display of the plurality of indicia icons, where the first indicia icon associated with the second user interface includes the indication that the second user interface is currently displayed, provides the user with feedback about the currently-displayed user interface and about other user interfaces that the user can navigate to relative to the currently-displayed user interface. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIGS. 7A-7C) are also applicable in an analogous manner to the methods described below. For example, methods 900, 1100, and 1300 optionally include one or more of the characteristics of the various methods described above with reference to method 700. For example, the method of navigating the displayed stack of stack items described in method 900 can be used to navigate audio items and select audio items to be played through electronic device 600. For another example, the method of quickly and efficiently switching between user interfaces of active applications described in method 1100 can be used to switch amongst active applications on electronic device 600. For another example, the method of updating data associated with audio files using a different device as described in method 1300 can be used to update locally stored data on electronic device 600. For brevity, these details are not repeated below.

FIGS. 8A-8AC illustrate exemplary user interfaces for playing and managing audio items, in accordance with some embodiments. The user interfaces in these figures are used to illustrate the processes described below, including the processes in FIGS. 9A-9D.

FIG. 8A illustrates the face of an electronic device 800 (e.g., portable multifunction device 100, device 300, or device 500). In this non-limiting exemplary embodiment depicted in FIGS. 8A-8AC, electronic device 800 is a smartwatch. In other embodiments, electronic device 600 can be a different type of electronic device, such as a different type of wearable device or a smartphone.

As shown in FIG. 8A, electronic device 800 has a touch-sensitive display 802. In some embodiments, electronic device 800 also has a rotatable input mechanism 806 for navigating the displayed user interface. For example, rotatable input mechanism 806 can be used to scroll (upwards and downwards) the displayed user interface. For another example, the rotatable input mechanism 806 can be used to zoom in and zoom out of the displayed user interface. For another example, the rotatable input mechanism 806 can be used to zoom in to a displayed icon corresponding to an application and launch the application corresponding to the zoomed-in icon.

In FIG. 8A, electronic device 800 is displaying, on the touch-sensitive display 802, a portion of a navigation user interface 804 of an application (e.g., a music application) for playing audio items (e.g., a song, an audio file, a podcast, a radio channel). Navigation user interface 804 enables a user of electronic device 800 to navigate through audio playlists, albums, artists, and/or tracks that can be managed and played using electronic device 800. In some embodiments, navigation user interface 804 includes an indication 808 (e.g., "MUSIC" for a music application) that the currently-displayed application is an application for playing audio items (e.g., songs, podcasts, radio channels). In some embodiments, navigation user interface 804 includes a time indication 810 of the current time. In some embodiments, navigation user interface 804 includes a scroll bar 812 indicating the portion (or region) of navigation user interface 804 that is currently being displayed on touch-sensitive display 802. For example, in FIG. 8A, scroll bar 812 indicates that the very bottom portion of navigation user interface 804 is currently displayed.

Navigation user interface 804 also includes a graphical depiction of a stack of audio group items 814 corresponding to audio items that can be played through electronic device 800 (e.g., via internal speakers of electronic device 800 or via an external device, such as headphones paired with electronic device 800, an external speaker paired with electronic device 800, or speakers of a different device, such as a smartphone, tablet, laptop computer, or desktop computer, paired with electronic device 800).

As shown in FIG. 8A, the stack of audio group items 814 is located at a bottom region of navigation user interface 804. In some embodiments, as shown in FIG. 8A, the stack of audio group items 814 is organized based on albums (e.g., a musical album, a collection of podcasts, a collection of listings from a radio channel), and each stack item of the stack of audio group items 814 corresponds to an album. For example, the first stack item 816 of stack 814, which is shown at the top of stack 814, corresponds to a "Classics Album." In some embodiments, the stack of audio group items 814 are organized based on playlists created by a user of electronic device 800, and each stack item of the stack of audio group items 814 corresponds to a playlist. In some embodiments, the stack of audio group items 814 are organized based on artists, and each stack item of the stack of audio group items 814 corresponds to an artist.

As further shown in FIG. 8A, the stack of audio group items 814 includes one or more additional records, in addition to first stack item 816 of the stack. For example, stack 814 further includes at least a second audio record 824 and a third audio record 826. In some embodiments a portion of the one or more additional records are displayed beneath first stack item 816. This configuration of stack 814 provides a graphical depiction of album records being piled on top or one another in a piled "stack."

In some embodiments, navigation user interface 804 optionally displays, below the stack of audio group items 814, a textual indication 820 of an album, playlist, or radio station corresponding to the first record of the stack and a textual indication 822 of an artist associated with the album, playlist, or radio station.

Figure 8B:
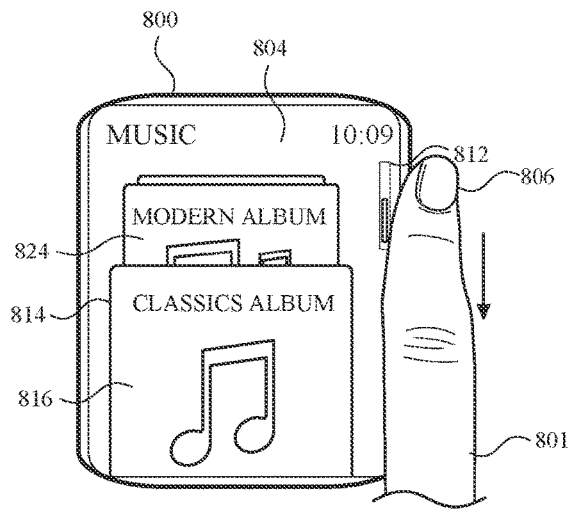

In FIG. 8B, while displaying stack 814 of navigation user interface 804, electronic device 800 receives, via touch-sensitive display 802 (or alternatively, a voice input via a mic or rotation input via rotatable input mechanism 806), user input navigating navigation user interface 804. For example, in FIG. 8B, the user input is a scrolling 803 of rotatable input mechanism 806 in a counter-clockwise direction.

Figure 8C:
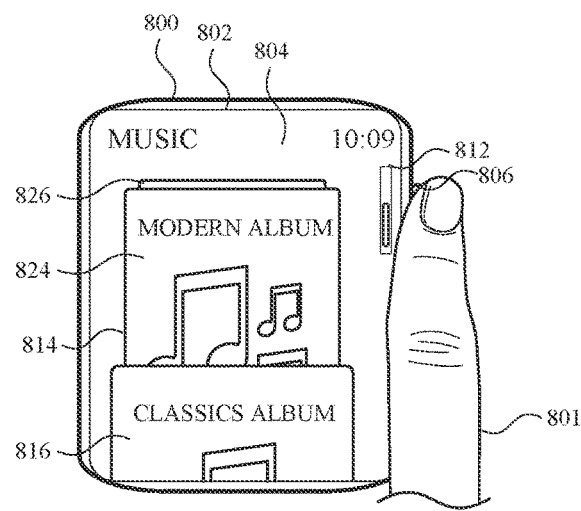
Figure 8D:
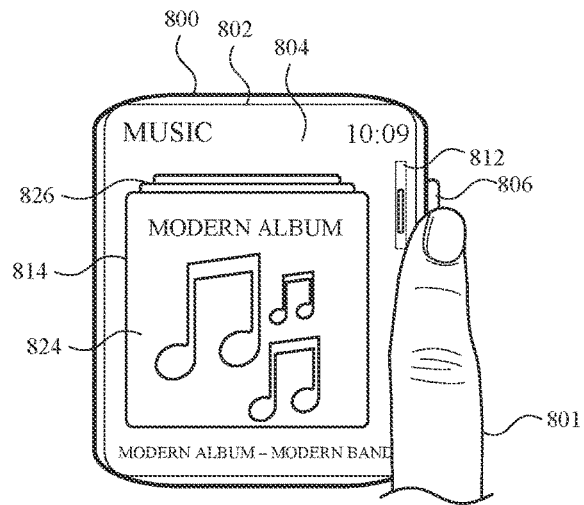

As shown in the transition of FIG. 8B through FIG. 8E, while detecting scrolling 803 of rotatable input mechanism 806 in the counter-clockwise direction, as shown in the transition of FIG. 8B through FIG. 8E, electronic device 800 replaces display of first stack item 816 at the top of stack 814 with second audio record 824 (e.g., "Modern Album"). In some embodiments, electronic device 800 graphically depicts this transition to reminisce a "flipping through" of records within stack 814. In some embodiments, as depicted in FIGS. 8B-8D, electronic device 800 dynamically depicts first stack item 816 sliding down from the top of stack 814 towards a bottom edge of touch-sensitive display 802 and relocating to the back of stack 814. In some embodiments, electronic device 800 dynamically depicts first stack item 816 flipping forward from the top of stack 814 and rotating based on its bottom edge to the end (i.e., bottom) of stack 814.

In some embodiments, while detecting scrolling 803 of rotatable input mechanism 806 and displaying the "flipping through" animation of stack 814, electronic device 800 continually updates display of scroll bar 812 to indicate an amount of scrolling of navigation user interface 804 that resulted from scrolling 803 of rotatable input mechanism 806. In the transition from FIG. 8B to FIG. 8E, because stack 814 was displayed at the very bottom of navigation user interface 804 and scrolling 803 corresponded to an upwards scroll on navigation user interface 804, scroll bar 812 indicates an amount of the scrolling of navigation user interface 804 in an upwards direction.

Figure 8E:
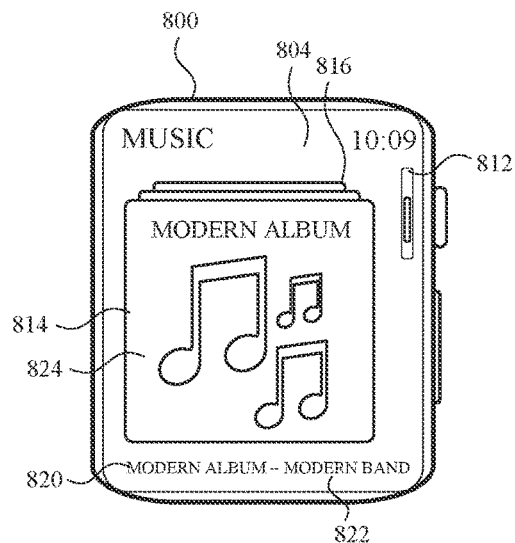

As shown in FIG. 8E, once scrolling 803 of rotatable input mechanism 806 fully replaces the top stack item (e.g., first stack item 816) of stack 814 with the next stack item (e.g., second audio record 824), stack 814 within navigation user interface 804 depicts stack 814 with the next stack item (e.g., second audio record 824) as the top stack item. The previous top stack item, first stack item 816, is now located the bottom of stack 814. In some embodiments, as shown in FIG. 8E, a portion (e.g., a topo portion) of first stack item 816 remains visible in stack 814 as the last stack item in the stack. In some embodiments, navigation user interface 804 updates display of textual indication 820 to the album, playlist, or radio station corresponding to the second audio record (e.g., "Modern Album") and textual indication 822 to the artist (e.g., "Modern Band") associated with the album, playlist, or radio station corresponding to the second audio record (e.g., "Modern Album").

Figure 8F:
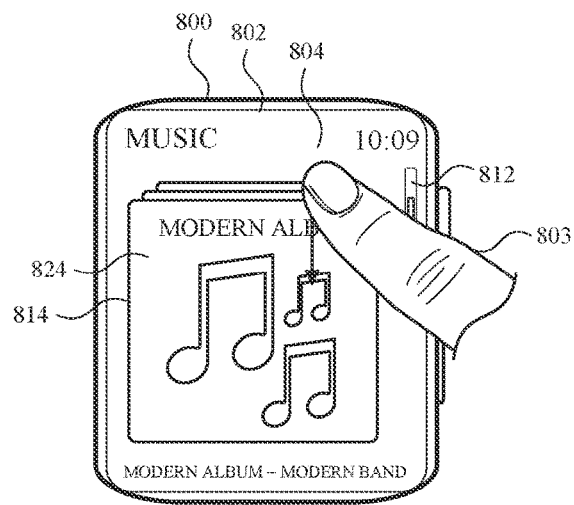
Figure 8G:
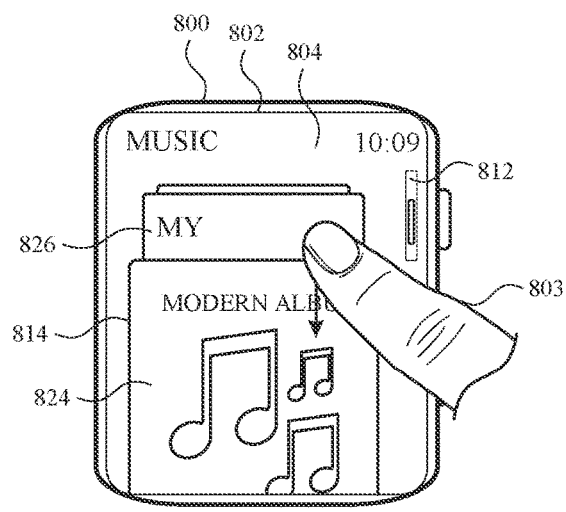
Figure 8H:
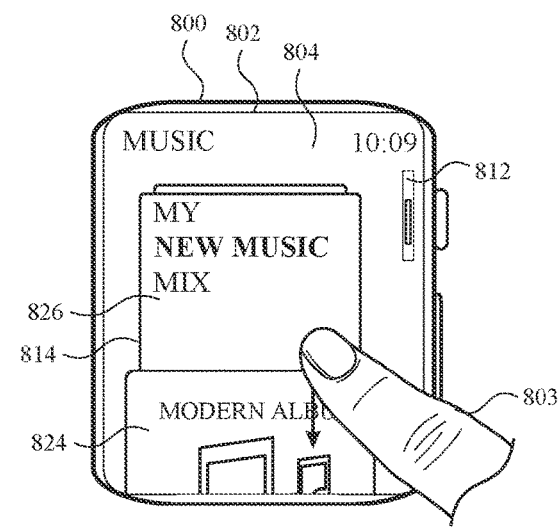

In FIG. 8F, while displaying stack 814 with the top stack item as second stack item 824, electronic device 800 receives, via touch-sensitive display 802 (or alternatively, a voice input via a mic or rotation input via rotatable input mechanism 806), user input of on stack 814. For example, as illustrated in the transition from FIG. 8F through FIG. 8I, the user input is a scrolling (or sliding) gesture 803 in a downwards direction on stack 814 that replaces the top stack item of stack 814 from second stack item 824 to third stack item 826. In some embodiments, the transition stack 814 depicted in FIGS. 8F-8I involves the same "flipping through" animation corresponding to the transition illustrated in FIGS. 8B-8E (replacing first stack item 816 with second stack item 824 at the top of stack 814). In some embodiments, while detecting scrolling gesture 803 and displaying the "flipping through" animation of stack 814, electronic device 800 continually updates display of scroll bar 812 to indicate an amount of scrolling of navigation user interface 804 that resulted from scrolling gesture 803 on stack 814. In some embodiments, scrolling gesture 803 corresponds to "flipping through" stack 814 from the top of the stack towards the bottom of the stack, and "flipping through" stack 814 in the top to bottom direction corresponds to an upwards scroll of navigation user interface 804 (or alternatively, a downwards scroll of navigation user interface 804).

Figure 8I:
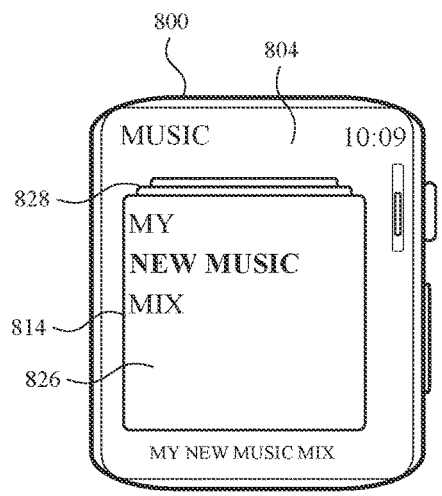

In FIG. 8I, subsequent to navigating ("flipping through") stack 814 from first stack item 816 to second stack item 824, then from second stack item 824 to third stack item 826, electronic device 800 displays stack 814 with third stack item 826 as the top stack item. In some embodiments, a user account (of the user) logged into electronic device 800 is associated with one or more additional albums (or playlists, artists, radio stations, etc.), and thus stack 814 includes one or more additional stack items, in addition to first stack item 816, second stack item 824, and first stack item 826, corresponding to the one or more additional albums.

In some embodiments, as displayed in the transition from FIG. 8J through FIG. 8Q, further scrolling (e.g., "flipping through") of stack 814 (via scrolling of rotatable input mechanism 806, scrolling gesture on touch-sensitive display 802, or a different input mechanism, such as a voice input command) enables the user to view the one or more additional stack items in stack 814.

Figure 8J:
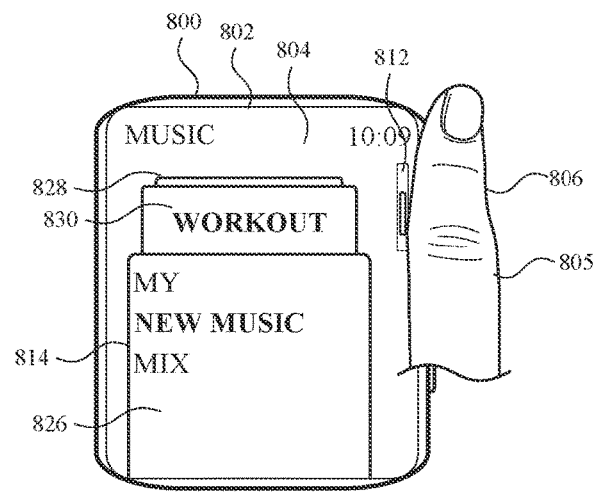

For example, in FIG. 8J, electronic device 800 receives scrolling 805 of rotatable input mechanism 806 in the counter-clockwise direction. In some embodiments, scrolling of rotatable input mechanism 806 in the counter-clockwise direction corresponds to scrolling of navigation user interface 804 in an upwards direction. Scrolling 805 of rotatable input mechanism 806 causes further navigation (e.g., "flipping through") of stack 814, as third stack item 826 flips away from the top of stack 814, revealing fourth stack item 830 (e.g., a stack item corresponding to a "Workout" album). In some embodiments, as shown in FIG. 8J, additional stack items 828 beneath fourth stack item 830 is at least partially visible. Further, electronic device 800 continually updates display of scroll bar 812 to correspond with the continued navigation (e.g., "flipping through") of stack 814. In some embodiments, because the scrolling 805 of rotatable input mechanism 806 corresponds to an upwards scrolling of navigation user interface 804, scroll bar 812 of FIG. 8J indicates that navigation user interface 804 is further scrolled in the upwards direction relative to scroll bar 812 of FIG. 8I.

Figure 8K:
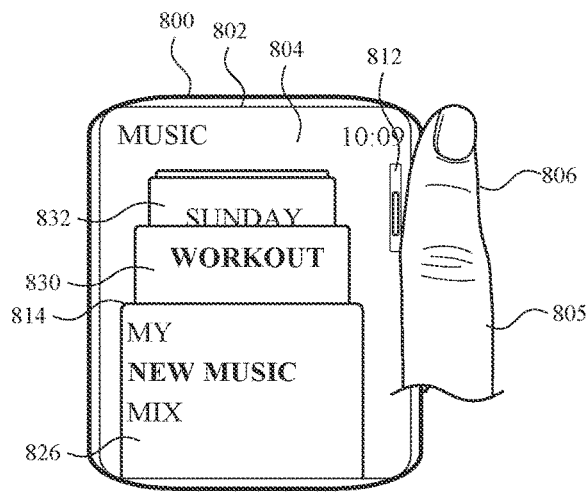

In FIG. 8K, electronic device 800 continues to receive scrolling 805 of rotatable input mechanism 806 in the same counter-clockwise direction. The continued scrolling 805 of rotatable input mechanism 806 continues to cause navigation (e.g., "flipping through") of stack 814, as third stack item 826 flips further away from the top of stack 814, fourth stack item 830 also flips away from the top of stack 814, revealing fifth stack item 832 (e.g., a stack item corresponding to a "Sunday Chill List" album). Further, electronic device 800 continually updates display of scroll bar 812 to correspond with the continued navigation (e.g., "flipping through") of stack 814. In some embodiments, because the scrolling 805 of rotatable input mechanism 806 corresponds to an upwards scrolling of navigation user interface 804, scroll bar 812 of FIG. 8K indicates that navigation user interface 804 is further scrolled in the upwards direction relative to scroll bar 812 of FIG. 8J.

Figure 8L:
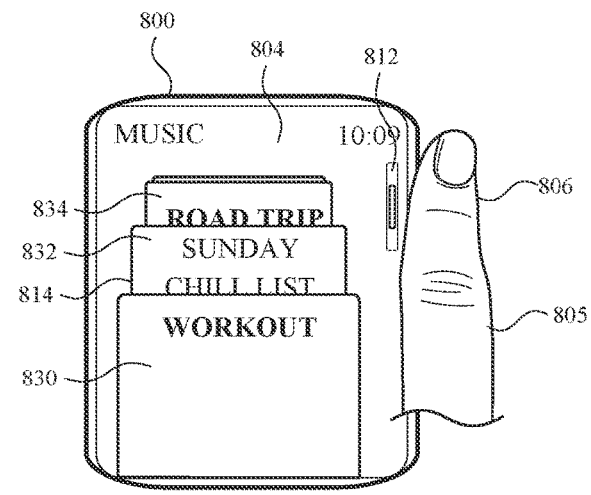

In FIG. 8L, electronic device 800 continues to receive more scrolling 805 of rotatable input mechanism 806 in the same counter-clockwise direction. The additional continued scrolling 805 of rotatable input mechanism 806 causes further navigation (e.g., continued "flipping through") of stack 814, as third stack item 826 is completely flipped away and to the back of stack 814, fourth stack item 830 further flips away from the top of stack 814, fifth stack item 832 also flips away from the top of stack 814, revealing sixth stack item 834 (e.g., a stack item corresponding to a "Road Trip Favorites" album). In some embodiments, sixth stack item is the sixth and final stack item in stack 814 (e.g., if first stack item 816 is considered the "first" stack item of stack 814, sixth stack item 834 is the "last" stack item of stack 814). Further, electronic device 800 continually updates display of scroll bar 812 to correspond with the continued navigation (e.g., "flipping through") of stack 814. In some embodiments, because the scrolling 805 of rotatable input mechanism 806 corresponds to an upwards scrolling of navigation user interface 804, scroll bar 812 of FIG. 8L indicates that navigation user interface 804 is further scrolled in the upwards direction relative to scroll bar 812 of FIG. 8K.

Figure 8M:
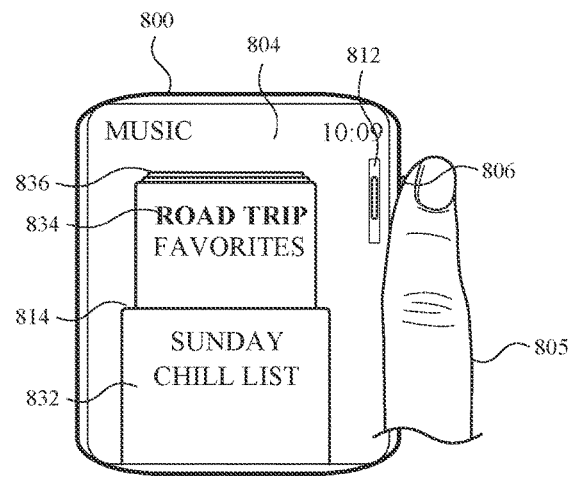

In FIG. 8M, electronic device 800 continues to receive scrolling 805 of rotatable input mechanism 806 in the same counter-clockwise direction. The continued scrolling 805 of rotatable input mechanism 806 causes continued navigation (e.g., continued "flipping through") of stack 814, as fourth stack item 830 is completely flipped away and to the back of stack 814, fifth stack item 832 further flips away from the top of stack 814, and sixth stack item 834 (e.g., the "last" stack item of the stack) is increasingly revealed. In some embodiments, as shown in FIG. 8M, the flipped stack items 836, which correspond to stack items that have been "flipped" to the back of stack 814 via scrolling inputs 801, 803, and 805 (e.g., first stack item 816, second stack item 824, third stack item 826, fourth stack item 830) are partially visible in the stack. Further, electronic device 800 continually updates display of scroll bar 812 to correspond with the continued navigation (e.g., "flipping through") of stack 814. In some embodiments, because the scrolling 805 of rotatable input mechanism 806 corresponds to an upwards scrolling of navigation user interface 804, scroll bar 812 of FIG. 8M indicates that navigation user interface 804 is further scrolled in the upwards direction relative to scroll bar 812 of FIG. 8L.

Figure 8N:
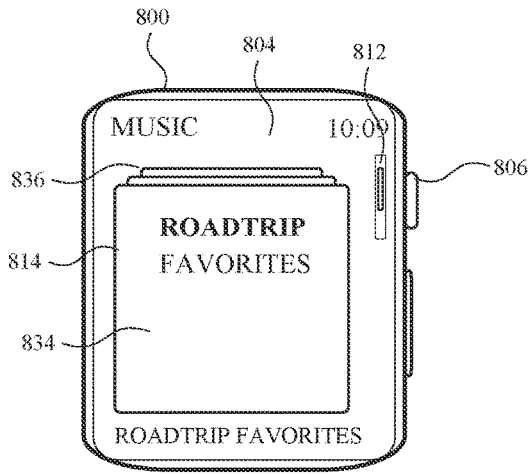

In FIG. 8N, in response to receiving scrolling 805 of rotatable input mechanism 806, electronic device 800 displays sixth stack item 834 in stack 814. In some embodiments, electronic device 800 recognizes that sixth stack item 834 is the "last" stack item of stack 814. In some embodiments, electronic device 800 recognizes sixth stack item 834 as being the "last" stack item based on first stack item 816 having been the top-most stack item and sixth stack item 834 having been the bottom-most stack item of stack 814 prior to the device receiving scrolling 801. In some embodiments, electronic device 800 recognizes sixth stack item 834 as being the "last" stack item based on a predetermined (or pre-configured) label of each stack item. In some embodiments, electronic device 800 recognizes sixth stack item 834 as being the "last" stack item based on a structured ordering of the stack items (e.g., alphanumeric-based ordering based on a name, such as album name, playlist name, artist name, folder name, or radio station name) corresponding to the album (or playlist, artist, folder, radio station) associated with the stack item.

Figure 8O:
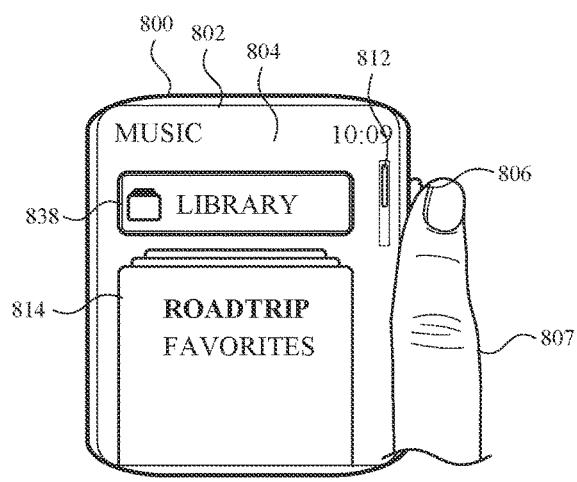

In FIG. 8O, electronic device 800 receives a user input corresponding to further navigation of navigation user interface 804 in an upwards direction. For example, as shown in FIG. 8O, the user input is a scrolling 807 of rotatable input mechanism 806 in the counter-clockwise (or alternatively, clockwise) direction that corresponds to a navigation (e.g., scrolling) of navigation user interface 804 in an upwards direction. Because sixth stack item 834 is the "last" item of stack 814, scrolling 807 causes (instead of continuing to "flip through" stack 814) navigation user interface 804 to transition from display of stack 814 to display of one or more menu icons (e.g., library menu icon 838) of navigation user interface 804. Further, electronic device 800 continually updates display of scroll bar 812 to correspond with the navigation (e.g., scrolling) of navigation user interface in the upwards direction.

Figure 8P:
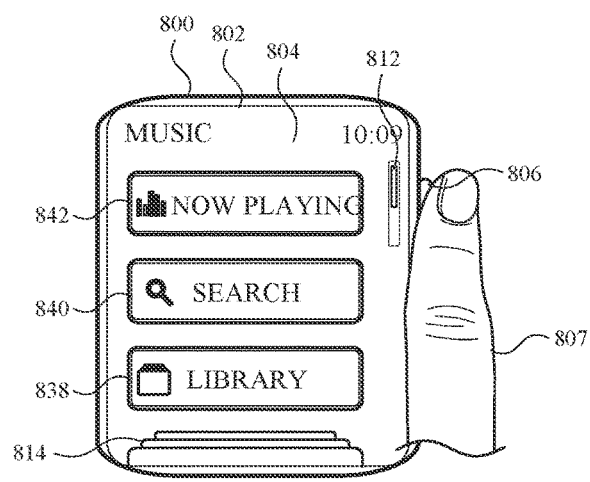

In FIG. 8P, electronic device 800 receives continues to receive scrolling 807 of rotatable input mechanism 806 in the counter-clockwise (or alternatively, clockwise) direction that corresponds to a navigation (e.g., scrolling) of navigation user interface 804 in an upwards direction until navigation user interface 804 reaches the top of navigation user interface 804 (e.g., the opposite end of navigation user interface 804 from the region displaying stack 814). Further upwards navigation (e.g., scrolling) of navigation user interface 804 causes display of additional menu icons (e.g., search menu icon 840, now playing menu icon 842, stations menu icon). Further, electronic device 800 continually updates display of scroll bar 812 to correspond with the navigation (e.g., scrolling) of navigation user interface in the upwards direction until scroll bar 812 indicates that the user interface has been navigated to the very top.

Figure 8Q:
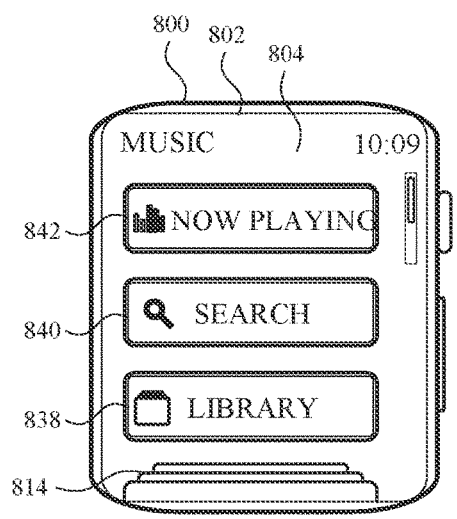

FIG. 8Q illustrates navigation user interface 804 navigated to the top of the user interface and displaying the menu icons region. In some embodiments, navigation user interface 804 includes library menu icon 838, search menu icon 840, and now playing menu icon 842. In some embodiments, in addition or instead of library menu icon 838, navigation user interface includes a (radio) stations icon. In some embodiments, at least a portion (e.g., a top portion) of stack 814 is still visible in the menu icons region of navigation user interface 804.

In some embodiments, in response to detecting user selection of now playing menu icon 842, electronic device 800 displays (e.g., replaces navigation user interface 804 with) control user interface 888, which includes an indication of the currently-playing audio item. In some embodiments.

In some embodiments, in response to detecting user selection of the stations icon, electronic device 800 displays a stations list user interface that includes a list of available radio stations by genre. In some embodiments, in response to detecting user selection of a genre from the displayed list, electronic device 800 displays a list of (radio) stations corresponding to the selected genre. In some embodiments, in response to detecting user selection of a station from the list of presented stations, electronic device 800 displays control user interface 888 (which includes an indication of the selected station) and causes audio output of the selected station.

In some embodiments, in response to detecting user selection of search menu icon 840, electronic device 800 displays a search user interface that includes a dictate icon and a scribble icon. In some embodiments, in response to detecting user selection of the dictate icon, electronic device 800 enables a user to search for an audio item using dictation. In some embodiments, in response to detecting user selection of the scribble icon, electronic device 800 enables a user to search for an audio item using "scribble" input (e.g., handwriting input) on touch-sensitive display 802 of electronic device 800. In some embodiments, when a first letter (e.g., "A") is entered in a search, electronic device 800 provides selectable suggestions corresponding to the entered letter. In some embodiments, once the user returns to the search function, the search mode is automatically selected to be the previously-used mode (e.g., dictation mode or scribble mode). In some embodiments, electronic device 800 enables the user to configure a default setting between the dictation mode and the scribble mode. In some embodiments, when a search is performed (using either dictation mode or scribble mode), electronic device 800 displays a list of audio items which, when selected, causes the device to display control user interface 888 and cause audio output of the selected audio item.

Figure 8R:
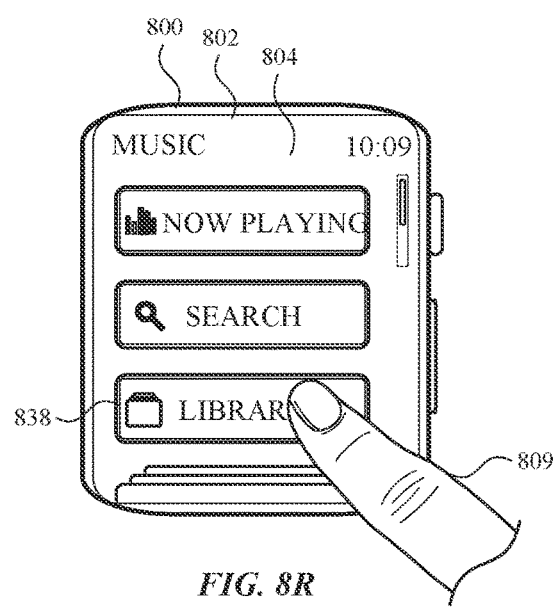
Figure 8S:
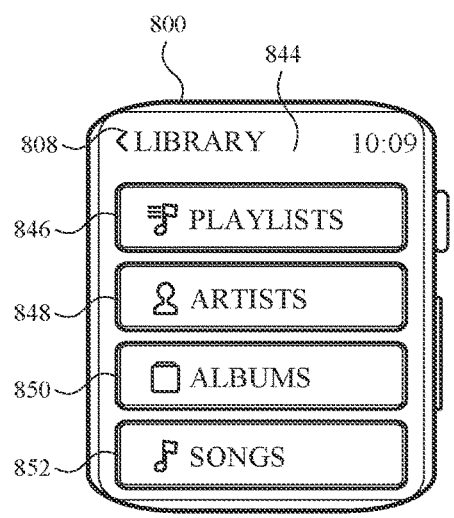

In FIG. 8R, electronic device 800 detects, via touch-sensitive display 802 (or alternatively, a voice input via a mic or rotation input via rotatable input mechanism 806), user activation of library menu icon 838. For example, the user activation is a tap gesture 809 on library menu icon 838. As shown in FIG. 8S, in response to detecting tap gesture 809, electronic device 800 displays (e.g., replaces display of navigation user interface 804 with) a library user interface 844 that includes a plurality of library icons. In some embodiments, library user interface 844 includes a first library icon 846 (e.g., "Playlists"), a second library icon 848 (e.g., "Artists"), a third library icon 850 (e.g., "Albums"), and a fourth library icon 852 (e.g., "Songs"). In some embodiments, in library user interface 844, electronic device 800 maintains display of selectable indication 808. In some embodiments, in library user interface 844, selectable indication 808 includes an indication that the currently-displayed user interface is library user interface 844 (e.g., a textual indication stating "LIBRARY"). Further, in some embodiments, in library user interface 844, user selection of selectable indication 808 causes electronic device 800 to display (e.g., replace display of library user interface 844 with) navigation user interface 804.

Figure 8T:
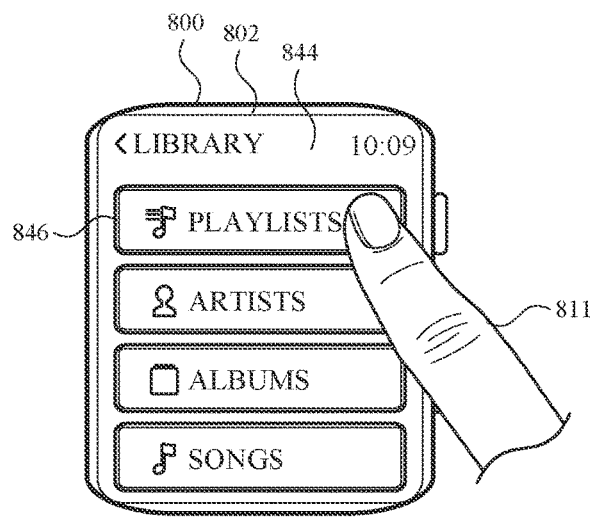
Figure 8U:
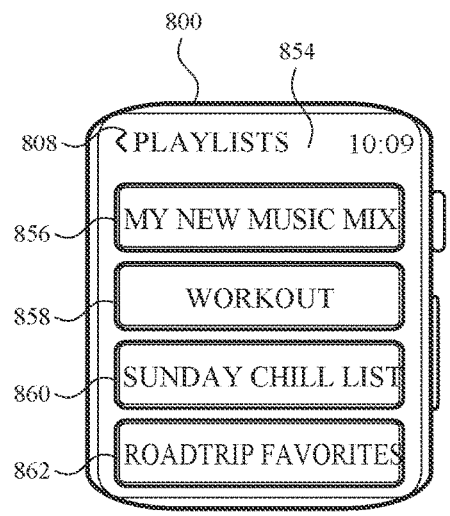

In FIG. 8T, electronic device 800 detects, via touch-sensitive display 802 (or alternatively, a voice input via a mic or rotation input via rotatable input mechanism 806), user activation of first library icon 846 (e.g., "Playlists"). For example, as shown in FIG. 8T, the user activation is a tap gesture 811 on first library icon 846. As shown in FIG. 8U, in response to detecting tap gesture 811, electronic device 800 displays (e.g., replaces display of library user interface 800 with) a playlists user interface 854 that includes a plurality of playlist items corresponding to the albums corresponding to the stack items in stack 814. For example, playlist user interface 854 includes a first playlist item 856 (e.g., "My New Music Mix") corresponding to third stack item 826, a second playlist item 858 (e.g., "Workout") corresponding to fourth stack item 830, a third playlist item 860 (e.g., "Sunday Chill List") corresponding to fifth stack item 832, and a fourth playlist item 862 (e.g., "Roadtrip Favorites") corresponding to sixth stack item 834. In some embodiments, in playlist user interface 8854, electronic device 800 maintains display of selectable indication 808. In some embodiments, in playlist user interface 854, selectable indication 808 includes an indication that the currently-displayed user interface is playlist user interface 854 (e.g., a textual indication stating "PLAYLISTS"). Further, in some embodiments, in playlist user interface 854, user selection of selectable indication 808 causes electronic device 800 to display (e.g., replace display of playlist user interface 854 with) library user interface 844.

Figure 8V:
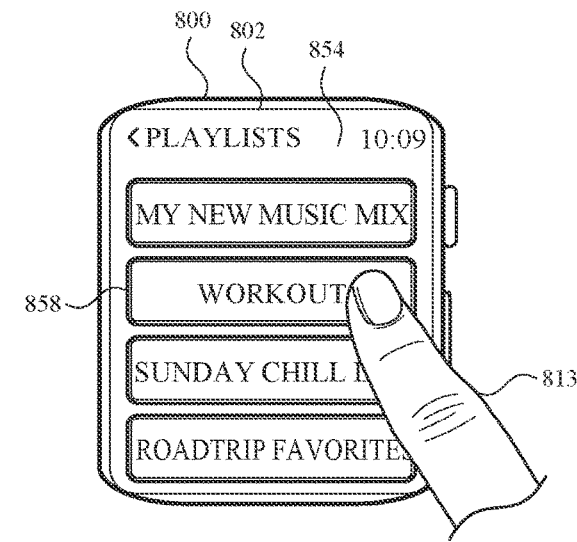
Figure 8W:
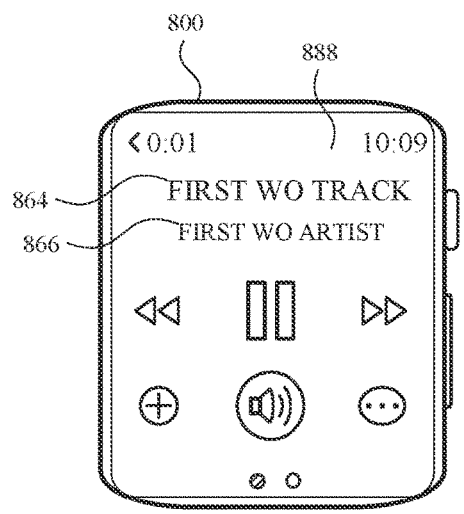

In FIG. 8V, electronic device 800 detects, via touch-sensitive display 802 (or alternatively, a voice input via a mic or rotation input via rotatable input mechanism 806), user activation of second playlist item 858 (e.g., "Workout"). For example, as shown in FIG. 8V, the user activation is a tap gesture 813 on second playlist item 858. As shown in FIG. 8W, in response to detecting the user activation of second playlist item 858, electronic device 800 displays (e.g., replaces display of playlist user interface 854 with) a control user interface 888 that corresponds to control user interface 622 described above with reference to FIGS. 6C-6S. As with control user interface 622, control user interface 888 includes display of an indication 864 of the currently-playing audio item (e.g., "First WO Track") and an indication 866 of an artist (e.g., "First WO Artist") corresponding to the currently-playing audio item. In some embodiments, electronic device 800 automatically causes audio output (e.g., via internal speakers of electronic device 800 or via an external device, such as headphones paired with electronic device 800, an external speaker paired with electronic device 800, or speakers of a different device, such as a smartphone, tablet, laptop computer, or desktop computer, paired with electronic device 800) of a first audio item associated with second playlist item 858 (which, in the embodiment depicted in FIG. 8W, is "First WO Track"). In some embodiments, in response to detecting the user activation of second playlist item 858, electronic device displays (e.g., replaces display of playlist user interface 854 with) a tracks user interface (e.g., tracks user interface 878 depicted in FIG. 8AA).

Figure 8X:
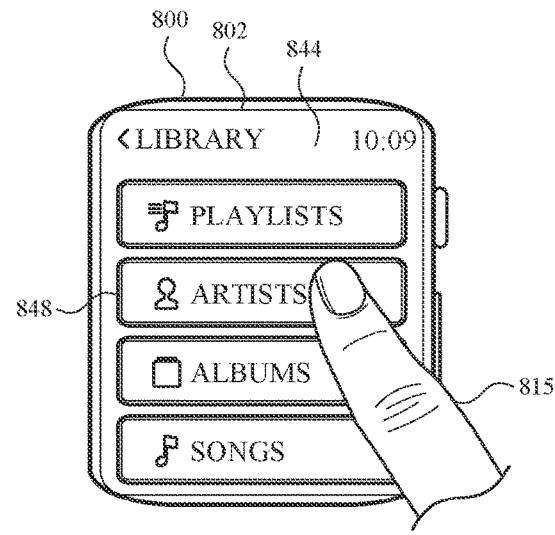
Figure 8Y:
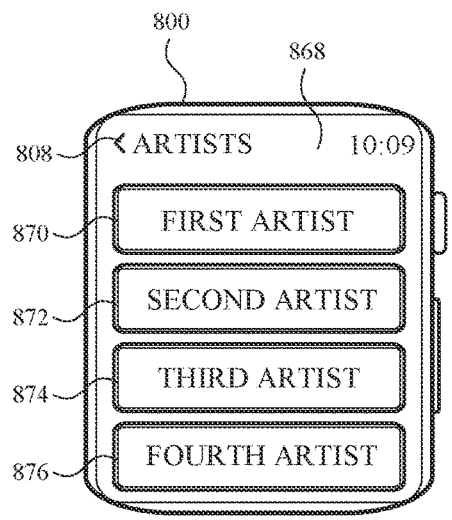

FIG. 8X illustrates electronic device 800 displaying library user interface 844 and, while displaying library user interface 844, detecting, via touch-sensitive display 802 (or alternatively, a voice input via a mic or rotation input via rotatable input mechanism 806), user activation of second library icon 848 (e.g., "Artists"). For example, the user activation is a tap gesture 815 on second library icon 848. As shown in FIG. 8Y, in response to detecting tap gestures 815 on second library icon 848 (e.g., "Artists"), electronic device 800 displays (e.g., replaces display of library user interface 844 with) a artists user interface 868 that includes a first artist icon 870 (e.g., displaying "First Artist," an indication of the name of the first artist), a second artist icon 872 (e.g., displaying "Second Artist," an indication of the name of the second artist), a third artist icon 874 (e.g., displaying "Third Artist," an indication of the name of the third artist), and a fourth artist icon 876 (e.g., displaying "Fourth Artist," an indication of the name of the fourth artist). In some embodiments, in artists user interface 868, electronic device 800 maintains display of selectable indication 808. In some embodiments, in artists user interface 868, selectable indication 808 includes an indication that the currently-displayed user interface is artists user interface 868 (e.g., a textual indication stating "ARTISTS"). Further, in some embodiments, in artists user interface 868, user selection of selectable indication 808 causes electronic device 800 to display (e.g., replace display of artists user interface 868 with) library user interface 844.

Figure 8Z:
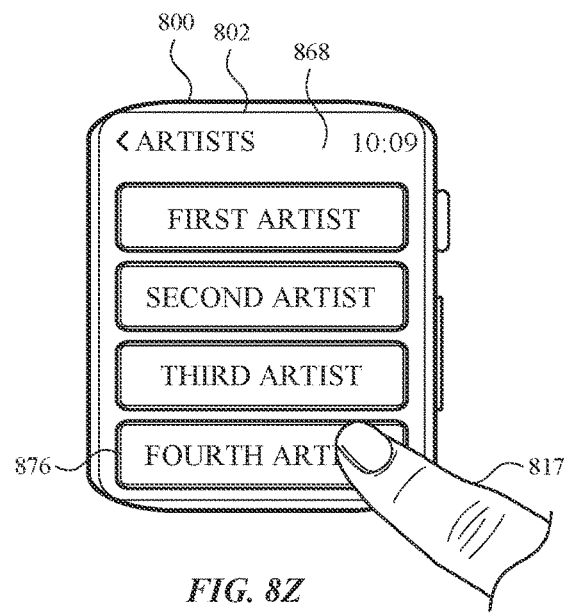
Figure 8A:
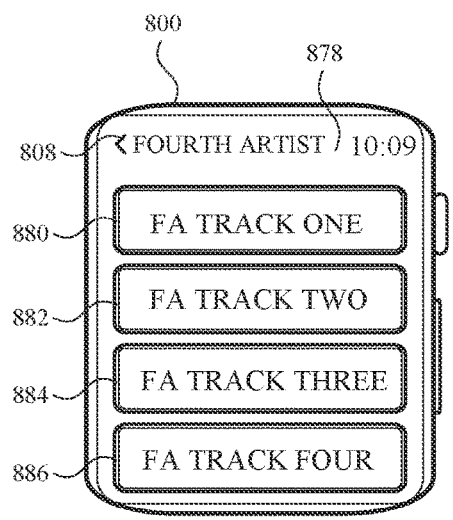
Figure 8A:
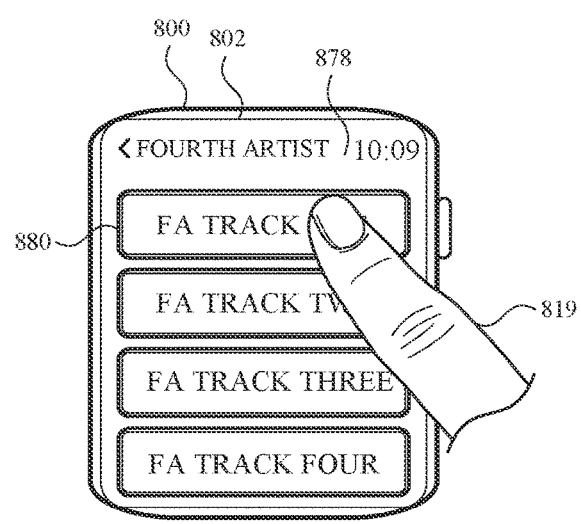
Figure 8A:
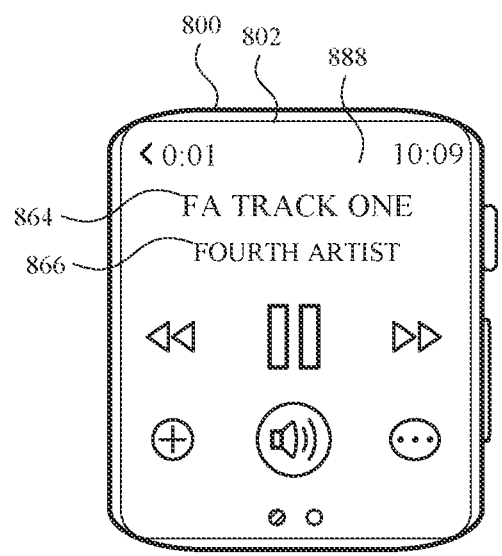
Figure 9A:
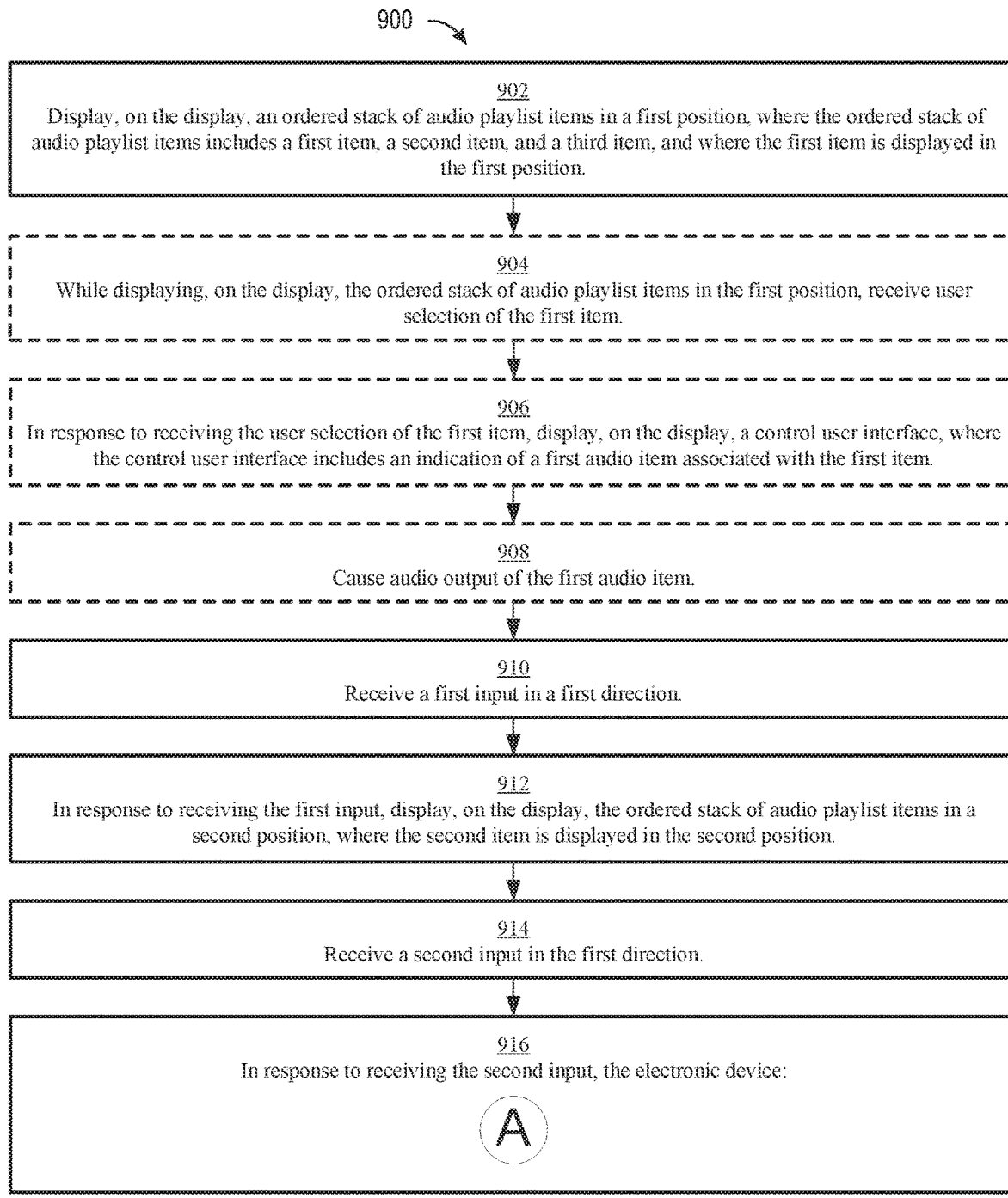
FIGS. 9A-9D are a flow diagram illustrating methods of user interfaces for navigating an application for playing and managing audio items using different techniques, in accordance with some embodiments.
Figure 9B:
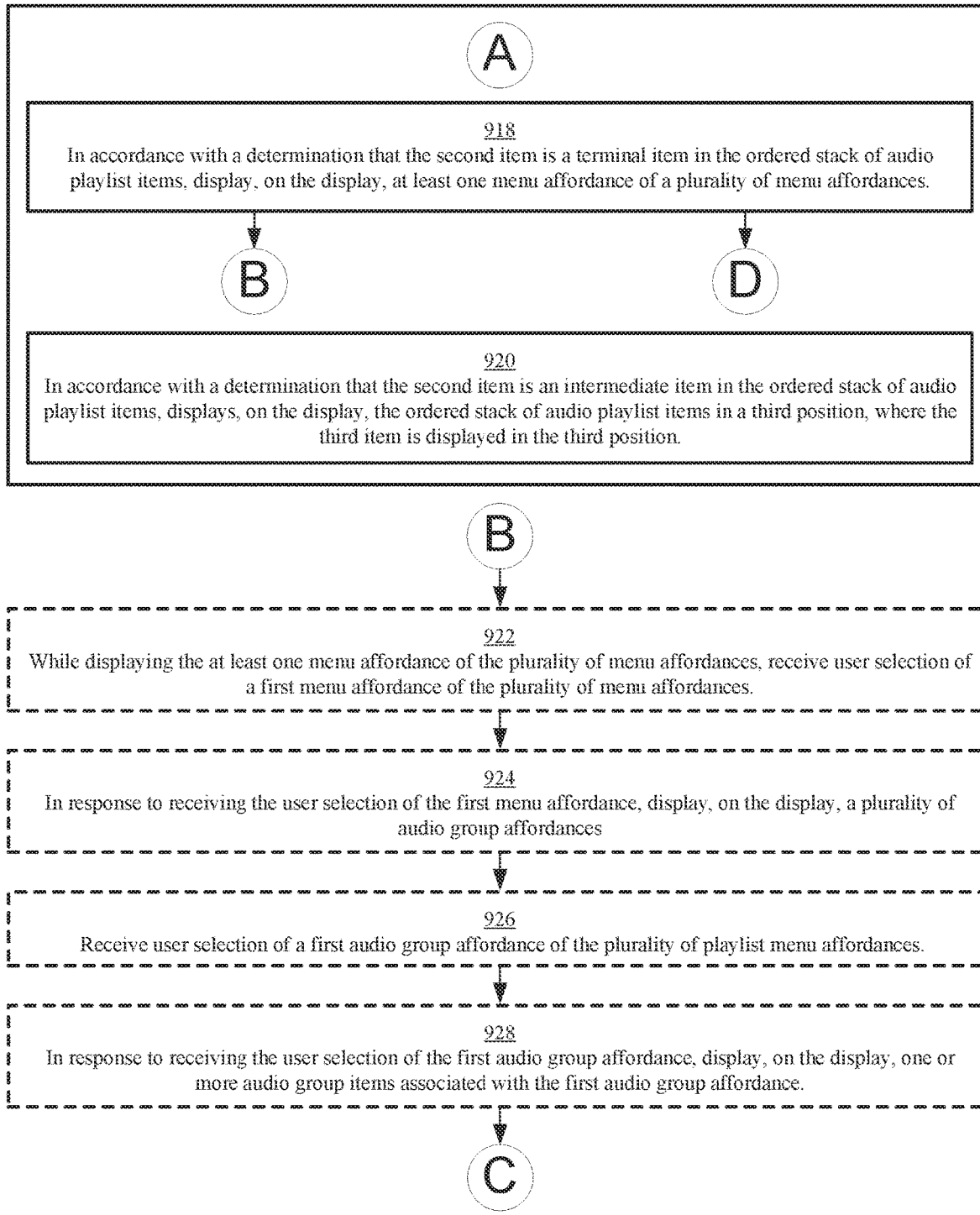
Figure 9C:
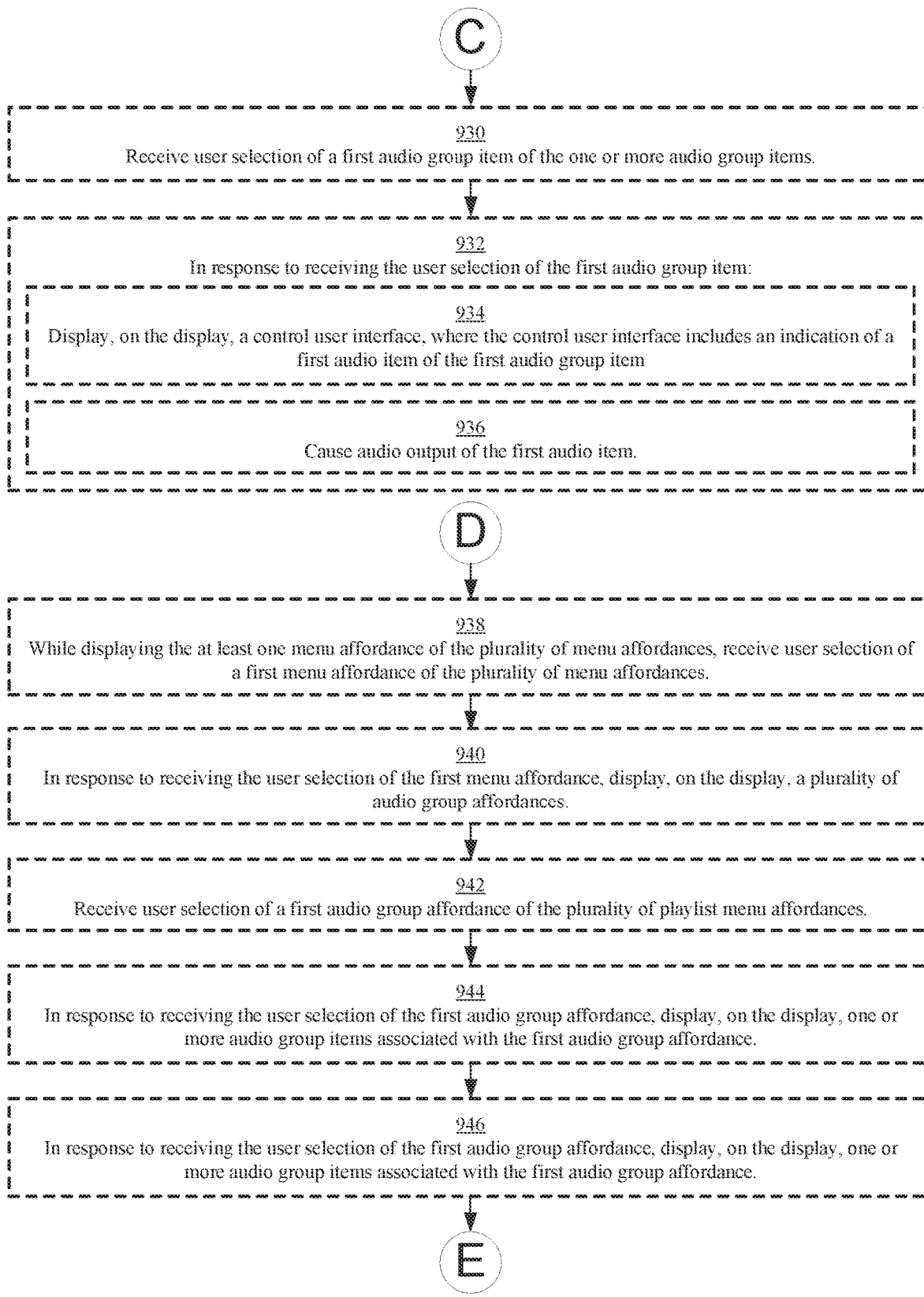
Figure 9D:
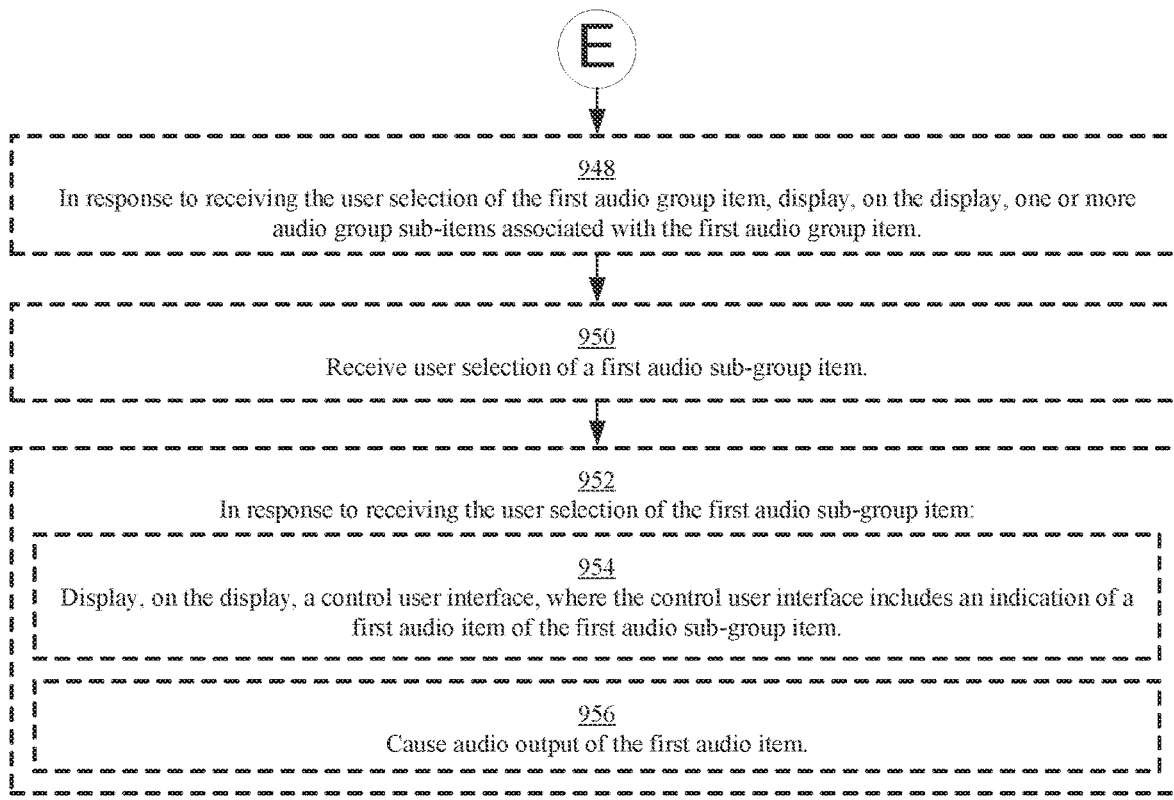

In FIG. 8Z, electronic device 800 detects, via touch-sensitive display 802 (or alternatively, a voice input via a mic or rotation input via rotatable input mechanism 806), user activation of fourth artist icon 876 (e.g., "Fourth Artist"). For example, as shown in FIG. 8Z, the user activation is a tap gesture 817 on fourth artist icon 876. As shown in FIG. 8AA, in response to detecting the user activation of fourth artist icon 876, electronic device 800 displays (e.g., replaces display of artist user interface 868 with) a tracks user interface 878 that includes one or more track items corresponding to audio items associated with the fourth artist. For example, as shown in FIG. 8AA, tracks user interface 878 includes a first track item 880 (e.g., displaying "FA Track One," an indication of the name of the first track), a second track item 882 (e.g., displaying "FA Track Two," an indication of the name of the second track), a third track item 884 (e.g., displaying "FA Track Three," an indication of the name of the third track), and a fourth track item 886 (e.g., displaying "FA Track Four," an indication of the name of the fourth track). In some embodiments, in tracks user interface 878, electronic device 800 maintains display of selectable indication 808. In some embodiments, in tracks user interface 878, selectable indication 808 includes an indication that the currently-displayed user interface is tracks user interface 878 (e.g., a textual indication stating the name of the artist, such as "FOURTH ARTIST"). Further, in some embodiments, in tracks user interface 878, user selection of selectable indication 808 causes electronic device 800 to display (e.g., replace display of tracks user interface 878 with) artists user interface 868.

In FIG. 8AB, electronic device 800 detects, via touch-sensitive display 802 (or alternatively, a voice input via a mic or rotation input via rotatable input mechanism 806), user activation of first track item 880 (e.g., "FA Track One"). For example, as shown in FIG. 8AB, the user activation is a tap gesture 819 on first track item 880. As shown in FIG. 8AC, in response to detecting tap gesture 819, electronic device 800 displays (e.g., replaces display of tracks user interface 878 with) control user interface 888 that corresponds to control user interface 622 described above with reference to FIGS. 6C-6S. As with control user interface 622, control user interface 888 includes indication 864 of the currently-playing audio item (e.g., "FA Track One") and indication 866 of an artist (e.g., "Fourth Artist") corresponding to the currently-playing audio item.

FIGS. 9A-9D are a flow diagram illustrating a method for playing and managing audio items using an electronic device in accordance with some embodiments. Method 900 is performed at a device (e.g., 100, 300, 500) with a touch-sensitive display. Some operations in method 900 are, optionally, combined, the order of some operations is, optionally, changed, and some operations are, optionally, omitted.

As described below, method 900 provides an intuitive way for playing and managing audio items. The method reduces the cognitive burden on a user for playing and managing audio items, thereby creating a more efficient human-machine interface. For battery-operated computing devices, enabling a user to play and manage audio items faster and more efficiently conserves power and increases the time between battery charges.

At block 902, the electronic device (e.g., 800) displays, on the display (e.g., 802), an ordered stack (e.g., 814) of audio playlist items in a first position, where the ordered stack of audio playlist items includes a first item (e.g., 816), a second item, and a third item, and where the first item is displayed in the first position. In some examples, the ordered stack of audio playlist items (e.g., 814) is a stack of records. In some examples, the ordered stack of audio playlist items (e.g., 814) is a stack of audio tracks. In some examples, the ordered stack of audio playlist items (e.g., 814) is a collection of titles or albums. In some examples, the ordered stack of audio playlist items (e.g., 814) is a collection of radio items, news items, or podcasts. In some examples, the ordered stack of audio playlist items (e.g., 814) is a collection of audio recordings.

Displaying the ordered stack of audio playlist items provides a visual feedback that enables the user to visualize (and thus experience the sensation of) flipping through a real stack of playlist items. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 904, while displaying, on the display (e.g., 802), the ordered stack of audio playlist items (e.g., 814) in the first position, the electronic device (e.g., 800) receives user selection of the first item. In some embodiments, at block 906, in response to receiving the user selection of the first item, the electronic device (e.g., 800) displays, on the display (e.g., 802), a control user interface (e.g., 888) (e.g., a main user interface of a music application), where the control user interface includes an indication of a first audio item (e.g., a first track of the selected playlist) associated with the first item. In some embodiments, at block 908, the electronic device (e.g., 800) causes audio output of the first audio item. For example, the electronic device (e.g., 800) causes the audio output of the second audio item via internal speakers of the electronic device or via an external device, such as headphones paired with the electronic device, an external speaker paired with the electronic device, or the speakers of a different device (e.g., a smartphone, tablet, laptop computer, or desktop computer) paired with the electronic device.

At block 910, the electronic device (e.g., 800) receives a first input (e.g., 801, 803, 805) in a first direction. In some embodiments, the electronic device (e.g., 800) includes a rotatable input mechanism (e.g., 806) (e.g., a physical rotatable crown of the electronic device for navigating the display of the electronic device), and the first input is based on a movement of the rotatable input mechanism in the first direction (which can either be rotation in a clockwise direction or in a counter-clockwise direction), and the second input is based on a (additional) continued movement of the rotatable input mechanism in the first direction. In some embodiments, the first input is a gesture on the touch-sensitive display (e.g., 802) corresponding to a request to scroll in the first direction (e.g., an upwards direction or a downwards direction), and the second input is an additional finger scroll in the first direction.

Having the first input be based on the movement of the rotatable input mechanism in the first direction and the second input be based on the continued movement of the rotatable input mechanism in the first direction provides an improved input technique for navigating a user interface that seamlessly transition from one navigation mode to a different navigation mode. Providing a seamless transition between different navigation modes within a user interface using the same input technique and reducing the number of inputs needed to perform the technique enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 912, in response to receiving the first input, the electronic device (e.g., 800) displays, on the display (e.g., 802), the ordered stack of audio playlist items (e.g., 814) in a second position, where the second item is displayed in the second position.

At block 914, the electronic device (e.g., 800) receives a second (additional) input in the first direction.

At block 916, in response to receiving the second input, the electronic device (e.g., 800), at block 918, in accordance with a determination that the second item is a terminal item (e.g., the first item in the stack or the last item in the stack) in the ordered stack of audio playlist items (e.g., 814), displays, on the display (e.g., 802), at least one menu affordance of a plurality of menu affordances, and, at block 920, in accordance with a determination that the second item is an intermediate item (e.g., any item in the stack that is not the first or the last item) in the ordered stack of audio playlist items (e.g., 814), displays, on the display (e.g., 802), the ordered stack of audio playlist items in a third position, where the third item is displayed in the third position. In some examples, the plurality of menu affordances are a plurality of quick access menus (e.g., 842, 840, 838), such as a "now playing" menu, a "search" menu, and a "library" menu.

Displaying at least one menu affordance of the plurality of menu affordances in accordance with a determination that the second item is a terminal item and displaying the ordered stack of audio playlist items in a third position in accordance with a determination that the second item is an intermediate item allows for the user to seamlessly transition between viewing the plurality of menu affordances and viewing the ordered stack of audio playlist items without providing addition input or providing a request to change navigation modes. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the terminal item (e.g., an audio playlist item that is in the first or last position of the ordered stack) is the first of the audio playlist items in the ordered stack of audio playlist items (e.g., 814). In some examples, the terminal item (e.g., an audio playlist item that is in the first or last position of the ordered stack) is the last of the audio playlist items in the ordered stack of audio playlist items (e.g., 814). In some examples, the intermediate item (e.g., an audio playlist item that is not in the first or last position of the ordered stack) is located between a first of the audio playlist items in the ordered stack of audio playlist items (e.g., 814) and a last of the audio playlist items in the ordered stack of audio playlist items.

In some embodiments, at block 922, while displaying the at least one menu affordance of the plurality of menu affordances (e.g., 842, 840, 838) (e.g., a "now playing" menu, a "search" menu, a "library" menu), the electronic device (e.g., 800) receives user selection of a first menu affordance (e.g., the "library" menu) of the plurality of menu affordances. In some embodiments, at block 924, in response to receiving the user selection of the first menu affordance (e.g., the "library" menu), the electronic device (e.g., 800) displays, on the display, a plurality of audio group affordances (e.g., a list of available playlists, artists, albums, songs). In some embodiments, at block 926, the electronic device receives user selection (e.g., 811) of a first audio group affordance (e.g., 846) (e.g., playlists) of the plurality of playlist menu affordances. In some embodiments, at block 928, in response to receiving the user selection of the first audio group affordance (e.g., playlists), the electronic device displays, on the display, one or more audio group items (e.g., 856, 858, 860, 862) (e.g., one or more playlists) associated with the first audio group affordance. In some embodiments, at block 930, the electronic device receives user selection (e.g., 813) of a first audio group item (e.g., 858) (e.g., a particular playlist) of the one or more audio group items. In some embodiments, at block 932, in response to receiving the user selection of the first audio group item, the electronic device (e.g., 800), at block 934, displays, on the display, a control user interface (e.g., 888) (e.g., a control music interface of a music application), where the control user interface includes an indication of a first audio item (e.g., 864) (e.g., a song associated with the selected playlist) of the first audio group item, and, at block 936, causes audio output of the first audio item. For example, the electronic device causes the audio output of the first audio item via internal speakers of the electronic device or via an external device, such as headphones paired with the electronic device, an external speaker paired with the electronic device, or the speakers of a different device (e.g., a smartphone, tablet, laptop computer, or desktop computer) paired with the electronic device.

In some embodiments, at block 938, while displaying the at least one menu affordance of the plurality of menu affordances (e.g., 842, 840, 838) (e.g., a "now playing" menu, a "search" menu, a "library" menu), the electronic device (e.g., 800) receives user selection (e.g., 809) of a first menu affordance (e.g., 838) (e.g., the "library" menu) of the plurality of menu affordances. In some embodiments, at block 940, in response to receiving the user selection of the first menu affordance (e.g., the "library" menu), the electronic device (e.g., 800) displays, on the display, a plurality of audio group affordances (e.g., 846, 848, 850, 852) (e.g., a list of available playlists, artists, albums, songs). In some embodiments, at block 942, the electronic device (e.g., 800) receives user selection (e.g., 815) of a first audio group affordance (e.g., 848) (e.g., artists) of the plurality of playlist menu affordances. In some embodiments, at block 944, in response to receiving the user selection of the first audio group affordance (e.g., artists), the electronic device displays, on the display, one or more audio group items (e.g., one or more different artists) associated with the first audio group affordance.

In some embodiments, at block 946, the electronic device (e.g., 800) receives user selection (e.g., 817) of a first audio group item (e.g., 876) (e.g., a particular artist) of the one or more audio group items. In some embodiments, at block 948, in response to receiving the user selection of the first audio group item, the electronic device (e.g., 800) displays, on the display (e.g., 802), one or more audio group sub-items (e.g., albums associated with the selected artist) associated with the first audio group item. In some embodiments, at block 950, the electronic device (e.g., 800) receives user selection of a first audio sub-group item (e.g., a particular album associated with the selected artist). In some embodiments, at block 952, in response to receiving the user selection of the first audio sub-group item (e.g., the particular album), the electronic device (e.g., 800), at block 954, displays, on the display, a control user interface (e.g., 888) (e.g., a control music interface of a music application), where the control user interface includes an indication of a first audio item (e.g., a song associated with the selected album) of the first audio sub-group item, and, at block 956, causes audio output of the first audio item. For example, the electronic device causes the audio output of the first audio item via internal speakers of the electronic device or via an external device, such as headphones paired with the electronic device, an external speaker paired with the electronic device, or the speakers of a different device (e.g., a smartphone, tablet, laptop computer, or desktop computer) paired with the electronic device.

Note that details of the processes described above with respect to method 900 (e.g., FIGS. 9A-9D) are also applicable in an analogous manner to the methods described above and below. For example, methods 700, 1100, and 1300 optionally include one or more of the characteristics of the various methods described above with reference to method 900. For example, the method of navigating and selecting an audio item to play described in method 700 can be used to select audio items to be played through electronic device 800. For another example, the method of quickly and efficiently switching between user interfaces of active applications described in method 1100 can be used to switch amongst active applications on electronic device 800. For another example, the method of updating data associated with audio files using a different device as described in method 1300 can be used to update locally stored data on electronic device 800. For brevity, these details are not repeated below.

FIGS. 10A-10H illustrate exemplary user interfaces for playing and managing audio items, in accordance with some embodiments. The user interfaces in these figures are used to illustrate the processes described below, including the processes in FIGS. 11A-11B.

Figure 10A:
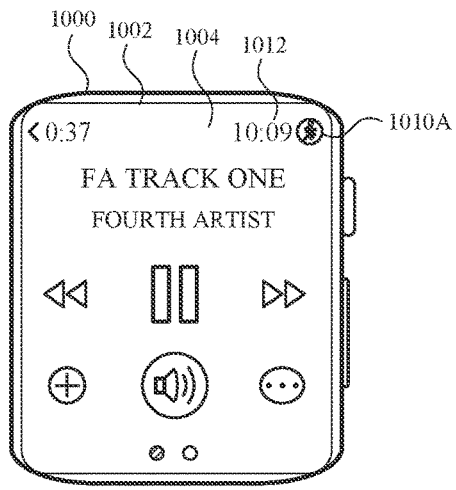
FIGS. 10A-10H illustrate exemplary user interfaces for easily transitioning amongst active applications, in accordance with some embodiments.

FIG. 10A illustrates the face of an electronic device 1000 (e.g., portable multifunction device 100, device 300, or device 500). In this non-limiting exemplary embodiment depicted in FIGS. 10A-10H, electronic device 600 is a smartwatch. In other embodiments, electronic device 1000 can be a different type of electronic device, such as a different type of wearable device or a smartphone.

As shown in FIG. 10A, electronic device 1000 displays, on touch-sensitive display 1002, a control user interface 1004 of an application (e.g., music application) for playing audio items (e.g., songs, podcasts, radio channels). Control user interface 1004 of FIG. 10A corresponds to control user interface 622 described with reference to FIGS. 6C-6S. In addition, control user interface 1004 includes a quick access menu corresponding to an application (e.g., a workout application, a music application) that is active on electronic device 1000. For example, quick access menu can correspond to any application that can run on electronic device 1000. In some embodiments, quick access menu 1010 is displayed adjacent to time indication 1012 at a first location (e.g., a top-right corner region) on display 1002.

In some embodiments, quick access menu can correspond to a music application. In some embodiments, a music application is active on electronic device 1000 if the device is causing (e.g., via internal speakers or via an external device, such as headphones paired with the device, an external speaker paired with the device, a different device, such as a smartphone, tablet, laptop computer, or desktop computer, paired with the device) audio output of an audio item (e.g., a song, a media item, live radio, podcast) using the music application, even when the application itself is not currently being displayed on electronic device 1000. In some embodiments, a music application is also deemed active when the application is pausing audio output of an audio item (e.g., a song, a media item, live radio, podcast), even when the application itself is not currently being displayed on electronic device 1000. In some embodiments, a music application is inactive when the application has stopped (instead of paused) causing audio output of an audio item (e.g., a song, a media item, live radio, podcast).

In some embodiments, quick access menu can correspond to a workout application. In some embodiments, a workout application is active when a workout routine (e.g., distance traveled, time traveled, steps taken, distance remaining to goal, time remaining to goal) is enabled and running on the application, even when the application itself is not currently being displayed on electronic device 1000. In some embodiments, a workout application is inactive when no workout tracking features (e.g., distance traveled, time traveled, steps taken, distance remaining to goal, time remaining to goal) are enabled on the application.

As mentioned above, FIG. 10A illustrates control user interface 1004 of a music application. In FIG. 10A, electronic device 1000 is causing (e.g., via internal speakers of electronic device 1000 or via an external device, such as headphones paired with electronic device 1000, an external speaker paired with electronic device 1000, or speakers of a different device, such as a smartphone, tablet, laptop computer, or desktop computer, paired with electronic device 1000) audio output of, through the music application, a song titled "FA Track One." Thus, the music application is active on electronic device 1000 of FIG. 10A. In addition, a workout routine is also running on electronic device 1000, and thus a workout application is also active on the device. As such, FIG. 10A further illustrates electronic device 1000 displaying, on control user interface 1004 corresponding to the music application, quick access menu 1010 corresponding to a workout application.

Figure 10B:
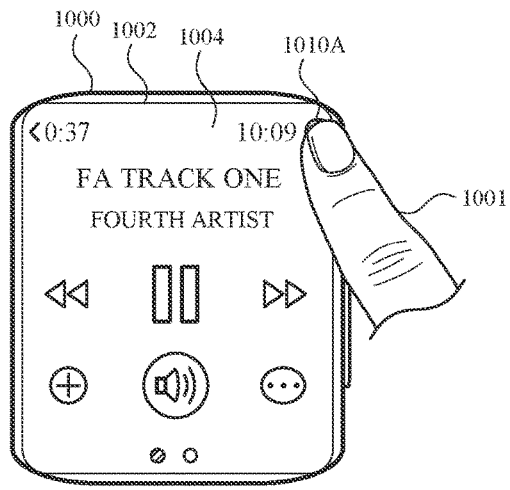

As shown in FIG. 10B, electronic device 1000 detects, via touch-sensitive display 1002 (or alternatively, a voice input via a mic), user activation of quick access menu 1010A corresponding to the workout application. For example, the user activation is a tap gesture 1001 on quick access menu 1010 corresponding to the workout application on control user interface 1004.

Figure 10C:
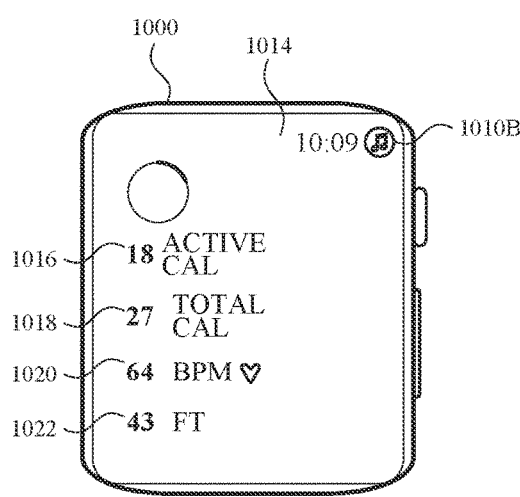

In FIG. 10C, in response to detecting tap gesture 1001 on quick access menu 1010A corresponding to the workout application on control user interface 1004, electronic device 1000 displays (e.g., replaces display of control user interface 1004 of the music application with) a main workout user interface 1014 of the workout application. In some embodiments, main workout user interface 1014 of the workout application includes representations of activity monitoring data, including, for example, active calorie data 1016, total calorie data 1018, bpm data 1020, and distance travelled data 1022, corresponding to the active workout routine.

While electronic device 1000 is now displaying main workout user interface 1014 of the workout application, the music application is still causing audio output of "FA Track One." Thus, the music application remains active on electronic device 1000. As such, in addition to displaying main workout user interface 1014, electronic device 1000 displays a quick access menu 1010B corresponding to the music application at the same location on display 1002 as the previous display of quick access menu 1010A corresponding to the workout application.

Figure 10D:
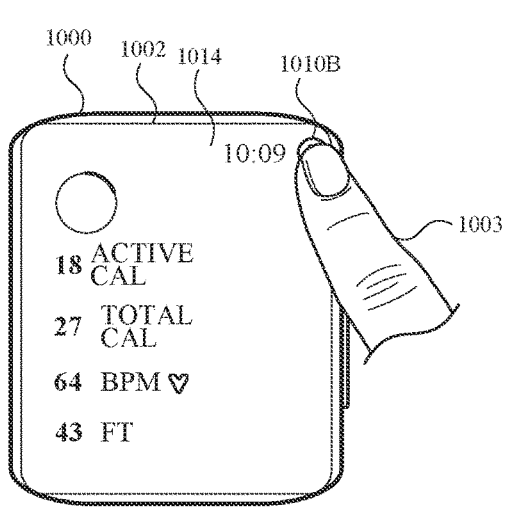

As shown in FIG. 10D, while the music application and the workout application remain active (e.g., the music application continues to cause audio output of tracks, the workout application continues to run the workout routine) on electronic device 1000, electronic device 1000 detects, via touch-sensitive display 1002 (or alternatively, a voice input via a mic), user activation of quick access menu 1010B corresponding to the music application. For example, as shown in FIG. 10D, the user activation is a tap gesture 1003 on quick access menu 1010B corresponding to the music application.

Figure 10E:
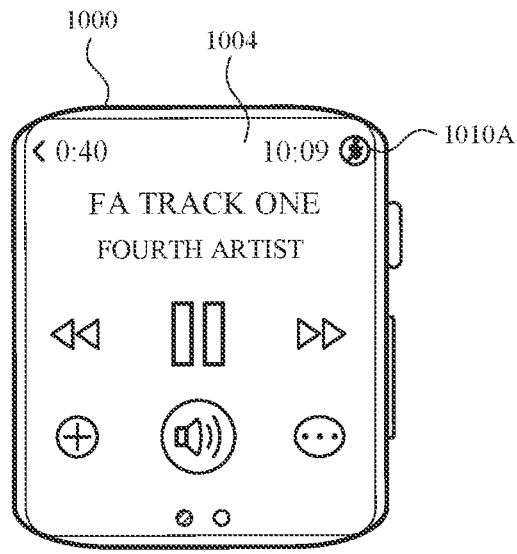

In FIG. 10E, in response to detecting tap gesture 1003 on quick access menu 1010B corresponding to the music application, electronic device 1000 displays (e.g., replaces display of main workout user interface 1014 corresponding to the workout application with) control user interface 1004 corresponding to the music application. Further, while displaying control user interface 1004, the workout routine remains running on the device. As such, in addition to displaying control user interface 1004, electronic device 1000 displays quick access menu 1010A corresponding to the workout application at the same location on display 1002 as the previous display of quick access menu 1010B corresponding to the music application.

Figure 10F:
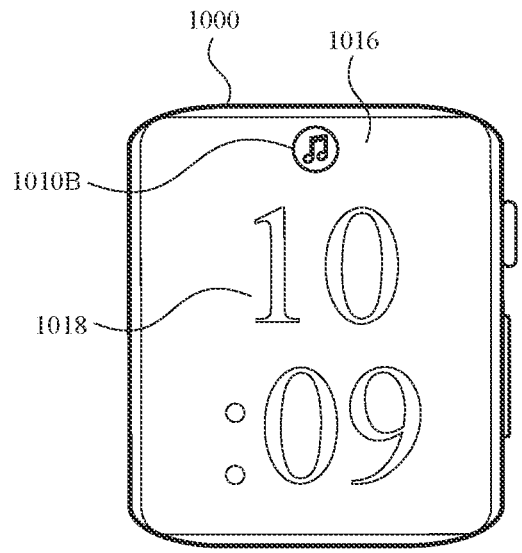
Figure 10G:
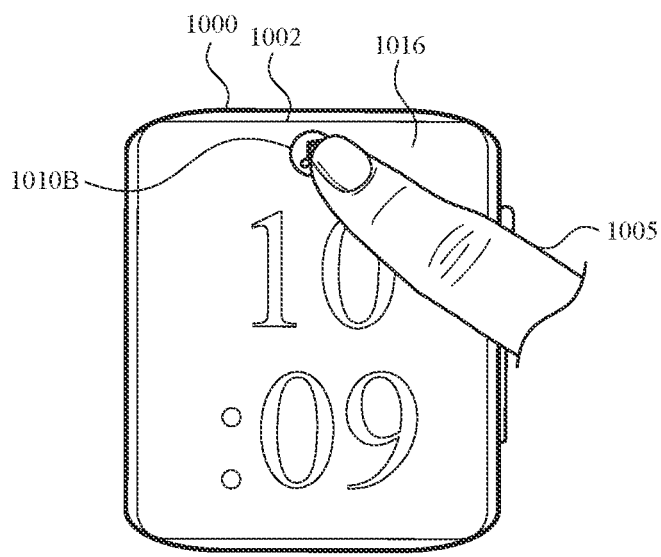

FIG. 10F illustrates electronic device 1000 displaying a time user interface 1016. Time user interface 10106 includes an indication 1018 of the current time. In some embodiments, the device is in a locked mode (e.g., in a user interface locked state) while displaying time user interface 1016. In some embodiments, the device is in an unlocked mode (e.g., in a user interface unlocked state) while displaying time user interface 1016.

In FIG. 10F, electronic device 1000 is causing (e.g., via internal speakers of electronic device 1000 or via an external device, such as headphones paired with electronic device 1000, an external speaker paired with electronic device 1000, or speakers of a different device, such as a smartphone, tablet, laptop computer, or desktop computer, paired with electronic device 1000) audio output of a track (e.g., "FA Track One") through the music application, but not workout routine is in progress. Thus, in FIG. 10F, the music application is active but the workout application is inactive on the device.

Because the music application is active on the device, electronic device 1000 also displays, at a second location (e.g., top-center region) of display 1002 different from the first location (e.g., top-right corner region), quick access menu 1010B corresponding to the music application. Subsequent to displaying quick access menu 1010B on time user interface 1016 at the second location, in FIG. 10G, electronic device 1000 detects, via touch-sensitive display 1002 (or alternatively, a voice input via a mic), user activation of quick access menu 1010B corresponding to the music application. For example, the user activation is a tap gesture 1005 on quick access menu 1010B corresponding to the music application on time user interface 1016.

In some embodiments, if electronic device 1000 is in a locked mode (e.g., in a user interface locked state) when tap gesture 1005 is detected, tap gesture 1005 also causes the device to convert from the locked mode to an unlocked mode (e.g., a user interface unlocked state). In some embodiments, if electronic device 1000 is in a locked mode (e.g., in a user interface locked state) when tap gesture 1005 is detected, tap gesture 1005 causes display of control user interface 1004 of the music application but does not cause the device to convert from the locked mode to an unlocked mode.

Figure 10H:
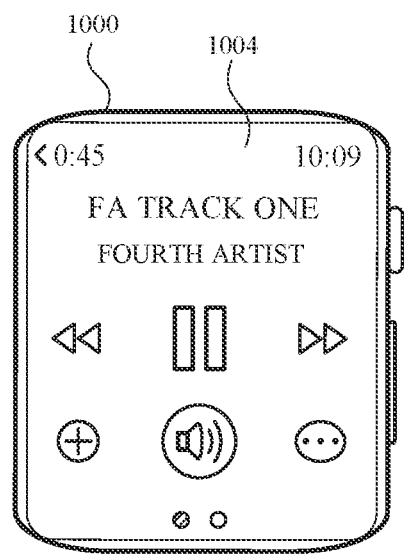

As shown in FIG. 10H, in response to detecting tap gesture 1005, electronic device 1000 displays (e.g., replaces display of time user interface 1016 with) control user interface 1004 of the music application. As also shown in FIG. 10H, because a workout routine is not currently active on electronic device 1000, control user interface 1004 does not include display of quick access menu 1010A corresponding to the workout application. Electronic device 1000 continues to cause (e.g., via internal speakers of electronic device 1000 or via an external device, such as headphones paired with electronic device 1000, an external speaker paired with electronic device 1000, or speakers of a different device, such as a smartphone, tablet, laptop computer, or desktop computer, paired with electronic device 1000) audio output of the currently-playing track (e.g., "FA Track One").

FIGS. 11A-11B are a flow diagram illustrating a method for playing and managing audio items using an electronic device in accordance with some embodiments. Method 1100 is performed at a device (e.g., 100, 300, 500) with a touch-sensitive display. Some operations in method 1100 are, optionally, combined, the order of some operations is, optionally, changed, and some operations are, optionally, omitted.

As described below, method 1100 provides an intuitive way for playing and managing music. The method reduces the cognitive burden on a user for playing and managing music, thereby creating a more efficient human-machine interface. For battery-operated computing devices, enabling a user to play and manage music faster and more efficiently conserves power and increases the time between battery charges.

At block 1102, the electronic device (e.g., 1000) receives user input initiating a first application while a second application different from the first application is active (e.g., running in the background) on the electronic device. In some examples, the first application is a music application, a video application, or a media application, and the second application is a workout application, an exercise application, or a health monitoring application (or vice versa).

In some embodiments, the first application is a music application, and the first application is active when the electronic device (e.g., 1000) is causing audio output of an audio item (e.g., a song, a media item, live radio, podcast) associated with the first application. For example, the electronic device (e.g., 1000) causes the audio output of an audio item via internal speakers of the electronic device or via an external device, such as headphones paired with the electronic device, an external speaker paired with the electronic device, or the speakers of a different device (e.g., a smartphone, tablet, laptop computer, or desktop computer) paired with the electronic device.

In some embodiments, the first application remains active when the first application causes the electronic device (e.g., 1000) to pause causing of the audio output of the audio item. In some examples, the first application causes the electronic device (e.g., 1000) to pause in response to receiving user input on a "pause" affordance of the music application to pause playing of the audio item. In some embodiments, the first application is inactive when the first application causes the electronic device (e.g., 1000) to stop causing audio output of the audio item. In some examples, the first application causes the electronic device (e.g., 1000) to stop causing audio output of the audio item in response to receiving user input on a "stop" affordance of the music application to stop playing of the audio item.

In some embodiments, the second application is a workout application, and the second application is active when a workout routine (e.g., distance traveled, time traveled, steps taken, distance remaining to goal, time remaining to goal) is enabled on the second application.

In some embodiments, the second application is inactive when all workout tracking features (e.g., distance traveled, time traveled, steps taken, distance remaining to goal, time remaining to goal) are disabled on the second application.

At block 1104, the electronic device (e.g., 1000) displays, on the display, a first user interface (e.g., 1004) associated with the first application and a first affordance (e.g., 1010A) associated with the second application. In some examples, the first user interface (e.g., 1004) is the home screen of music application. In some examples, the first user interface (e.g., 1004) is the home screen of a video player application. In some examples, the first user interface (e.g., 1004) is the home screen of a media application. In some examples, the first affordance (e.g., 1010A) is a mini-icon for a workout application. In some examples, the first affordance (e.g., 1010A) is a mini-icon for an exercise application. In some examples, the first affordance (e.g., 1010A) is a mini-icon for a health monitoring application.

Displaying the first user interface associated with the first application and the first affordance associated with the second application provides the user with a user interface that allows the user to, while viewing the first user interface of the first application, recognize that a second application is active on the device and that a selection of the first affordance can cause display of the second application. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1106, the electronic device (e.g., 1000) receives user selection (e.g., 1001) (e.g., a tap, a detectable touch gesture) of the first affordance.

At block 1108, in response to receiving the user selection (e.g., 1001) of the first affordance (e.g., 1010A), the electronic device (e.g., 1000), at block 1110, replaces display of the first user interface (e.g., 1004) with display of a second user interface (e.g., 1014) associated with the second application, where the first application remains active on the electronic device, and, at block 1112, replaces display of the first affordance (e.g., 1010A) with display of a second affordance (e.g., 1010B) associated with the first application. In some examples, the second user interface (e.g., 1014) is the home screen of a workout application. In some examples, the second user interface (e.g., 1014) is the home screen of a, exercise application. In some examples, the second user interface (e.g., 1014) is the home screen of a health monitoring application. In some examples, the second affordance (e.g., 1010B) is a mini-icon for a music application. In some examples, the second affordance (e.g., 1010B) is a mini-icon for a video player application. In some examples, the second affordance (e.g., 1010B) is a mini-icon for a media application.

Replacing display of the first user interface with display of the second user interface associated with the second application, where the first application remains active on the device, and replacing display of the first affordance with display of the second affordance associated with the first application in response to receiving the user selection of the first affordance allows a user to quickly and easily transition back and forth between viewing one active application (e.g., the first application) and viewing another active application (e.g., the second application). Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1114, the electronic device (e.g., 1000) determines that the second application is no longer active. In some examples, the electronic device (e.g., 1000) determines that the second application is no longer active based on user input ending or canceling an ongoing workout session. In some examples, the electronic device determines that the second application is no longer active based on expiration of an ongoing workout session. In some examples, the electronic device determines that the second application is no longer active based on user input stopping play of an audio item. In some examples, the electronic device determines that the second application is no longer active based on all tracks of a playlist having been played. In some embodiments, at block 1116, the electronic device (e.g., 1000) receives user selection of the second affordance (e.g., 1010B) (e.g., a quick access menu associated with the music application) associated with the first application. In some embodiments, at block 1118, in response to receiving the user selection of the second affordance (e.g., 1010B), the electronic device (e.g., 1000), at block 1120 replaces display of the second user interface (e.g., 1014) (e.g., of the workout application) with display of the first user interface (e.g., 1004) (e.g., of the music application) associated with the first application without replacing display of the second affordance (e.g., 1010B) with the first affordance (e.g., 1010A), and, at block 1122, ceases to display the first affordance. For example, the electronic device replaces display of the second user interface with display of the first user interface associated with the first application without replacing display of the second affordance with the first affordance and ceases to display the first affordance because the second application is no longer active.

Replacing display of the second user interface with display of the first user interface associated with the first application without replacing display of the second affordance with the first affordance ad ceasing to display the first affordance in response to receiving the user selection of the second affordance provides a visual feedback indicating to the user that the second application is no longer active on the device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1124, the electronic device (e.g., 1000) displays, on the display (e.g., 1002), a home user interface (e.g., 1016) (e.g., a main user interface of the device, a time user interface of the device), where the home user interface includes the second affordance (e.g., 1010B) (e.g., a quick access menu associated with the music application) associated with the first application (e.g., a music application) at a first location of the display different from a second location of the display. In some examples, the first location is a top-center region of the display (e.g., 1002), which can be a more readily visible portion of a display to a user. In some examples, the second location is a top-corner region of the display (e.g., 1002), which can allow for less interference with other elements of the displayed interface.

Displaying the second affordance associated with the first application on the home user interface provides a visual indication to the user while the user is viewing the home user interface that the first application is active on the device. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1126, the electronic device (e.g., 1000) receives user selection (e.g., 1005) of the second affordance (e.g., 1010B) associated with the first application. In some embodiments, at block 1128, in response to receiving the user selection of the second affordance associated with the first application, the electronic device (e.g., 1000), at block 1130, replaces display of the home user interface (e.g., 1016) with display of the first user interface (e.g., 1004) associated with the first application, at block 1132, ceases to display the second affordance (e.g., 1010B) (e.g., a quick access menu associated with the music application) at the first location of the display, and, at block 1134, displays the first affordance (e.g., 1010A) (e.g., a quick access menu associated with the workout application) associated with the second application at the second location of the display.

Note that details of the processes described above with respect to method 1100 (e.g., FIGS. 11A-11B) are also applicable in an analogous manner to the methods described above and below. For example, methods 800, 900, and 1300 optionally include one or more of the characteristics of the various methods described above with reference to method 1100. For example, the method of navigating and selecting an audio item to play described in method 700 can be used to select audio items to be played through electronic device 1000. For another example, the method of navigating the displayed stack of stack items described in method 900 can be used to navigate audio items and select audio items to be played through electronic device 1000. For another example, the method of updating data associated with audio files using a different device as described in method 1300 can be used to update locally stored data on electronic device 1000. For brevity, these details are not repeated below.

FIGS. 12A-12AE illustrate exemplary user interfaces for playing and managing audio items, in accordance with some embodiments. The user interfaces in these figures are used to illustrate the processes described below, including the processes in FIGS. 13A-13C.

FIG. 12A illustrates the face of an electronic device 1200 (e.g., portable multifunction device 100, device 300, or device 500). In this non-limiting exemplary embodiment depicted in FIGS. 12A-12AE, electronic device 1200 is a smartphone. In other embodiments, electronic device 1200 can be a different type of electronic device, such as a wearable device (e.g., a smartwatch).

In some embodiments, electronic device 1200 detects, via a wireless communication radio (e.g., a WiFi connection, a Bluetooth connection), an external device (e.g., a smartwatch). In some embodiments, the external device, such as a smartwatch, is paired with electronic device 1200 (e.g., both devices are associated with the same user account). In some embodiments, a user of electronic device 1200 has not yet configured automatic push (e.g., automatic transfer of files, such as audio files, audio playlists, audio albums, folders, etc., from electronic device 1200 to the external device) settings between electronic device 1200 and the external device.

As shown in FIG. 12A, in some embodiments, in response to establishing a communication link (via the wireless communication radio) between electronic device 1200 and the external device (e.g., a smartwatch), electronic device 1200 displays a setup user interface 1208 for configuring automatic push settings between electronic device 1200 and the external device. In some embodiments, setup user interface 1208 is displayed only when the user of the device has not yet configured automatic push settings on the device. In some embodiments, setup user interface 1208 includes a textual indication 1210 (e.g., "Add Music To Your Watch") and a graphical indication 1212 of the availability of automatic push settings and a request that the user configure automatic push settings between electronic device 1200 and the external device. Setup user interface 1208 also includes a proceed icon 1216 for proceeding with configuring automatic push settings and a cancel icon 1218 (e.g., "Not Now") for forgoing configuring automatic push settings at this time.

Figure 12B:
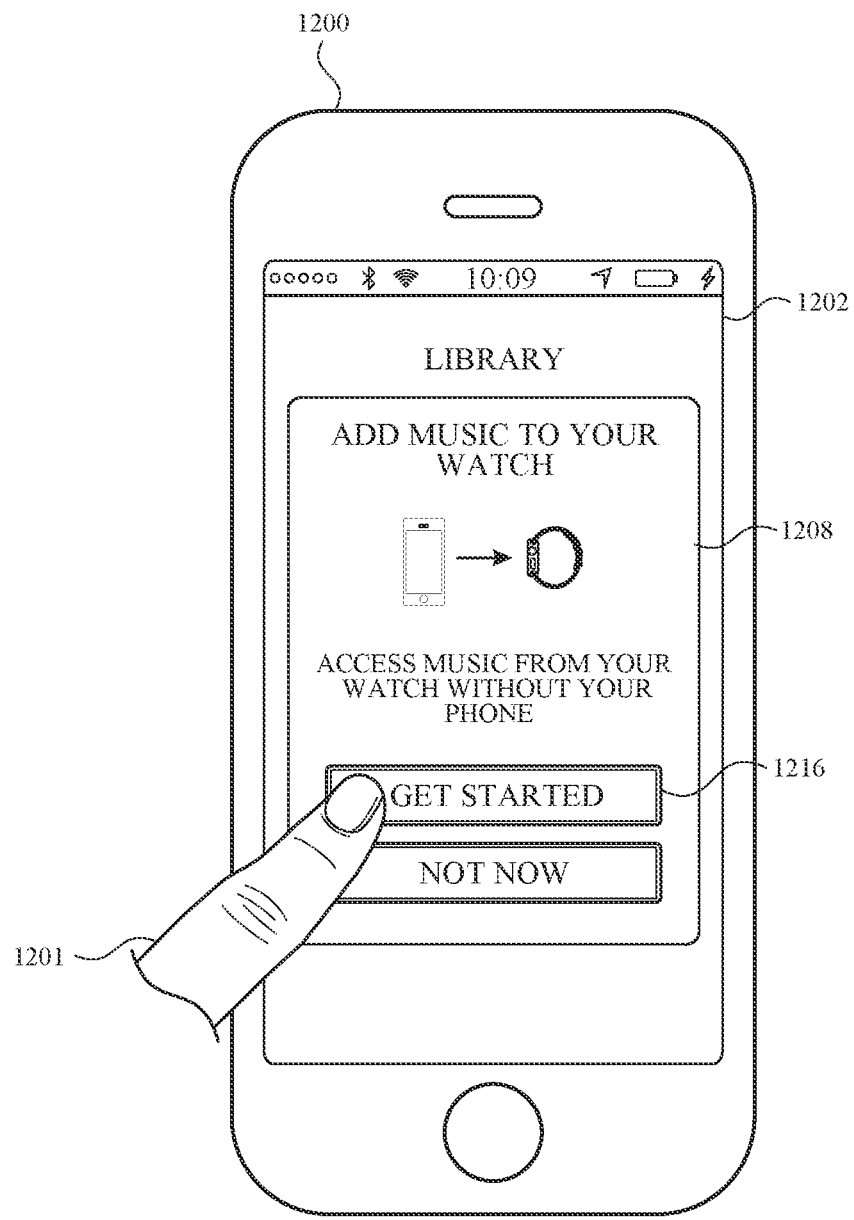

In FIG. 12B, electronic device 1200 detects, via touch-sensitive display 1202 (or alternatively, a voice input via a mic) user activation of proceed icon 1216. For example, the user activation is a tap gesture 1201 on proceed icon 1216.

Figure 12C:
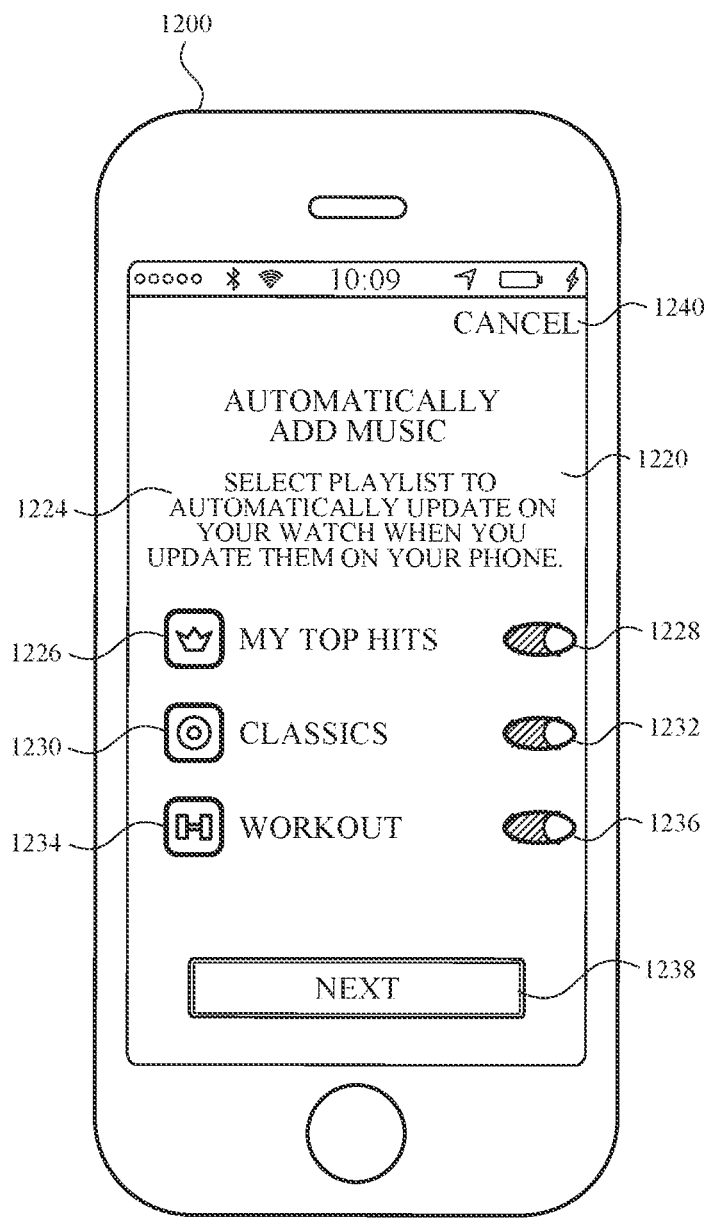

As shown in FIG. 12C, in response to detecting tap gesture 1201 on proceed icon 1216, electronic device 1200 displays (e.g., replaces display of setup user interface 1208 with) setup selection user interface 1220. In some embodiments, setup selection user interface 1220 includes a description 1224 of automatic push functionality and a cancel icon 1240 for forgoing configuring initial automatic push settings. In some embodiments, setup selection user interface 1220 also includes one or more playlists (or albums, artists, folders) available on (e.g., stored on) electronic device (or available via electronic device 1200 through a cloud service) to designate or de-designate for automatic push between electronic device 1200 and the external device (e.g., a smartwatch).

For example, in FIG. 12C, setup selection user interface 1220 includes a first playlist 1226 (e.g., "My Top Hits"), a second playlist 1230 (e.g., "Classics"), and a third playlist 1234 (e.g., "Workout"). In some embodiments, setup selection user interface also includes toggle icons 1228, 1232, 1236 associated with each available playlist. In some embodiments, a toggle icon is in the "designated" or "on" state when it is toggled to the right (as are toggle icons 1228, 1232, and 1236) and is in the "non-designated" or "off" state when it is toggled to the left. Thus, in FIG. 12C, all three playlists 1226, 1230, and 1234 are designated (via toggle icons 1228, 1232, and 1236) to be automatically pushed from electronic device 1200 to the external device. In some embodiments, setup selection user interface 1220 also includes a second proceed icon 1238 for proceeding with initial automatic push configuration.

Figure 12D:
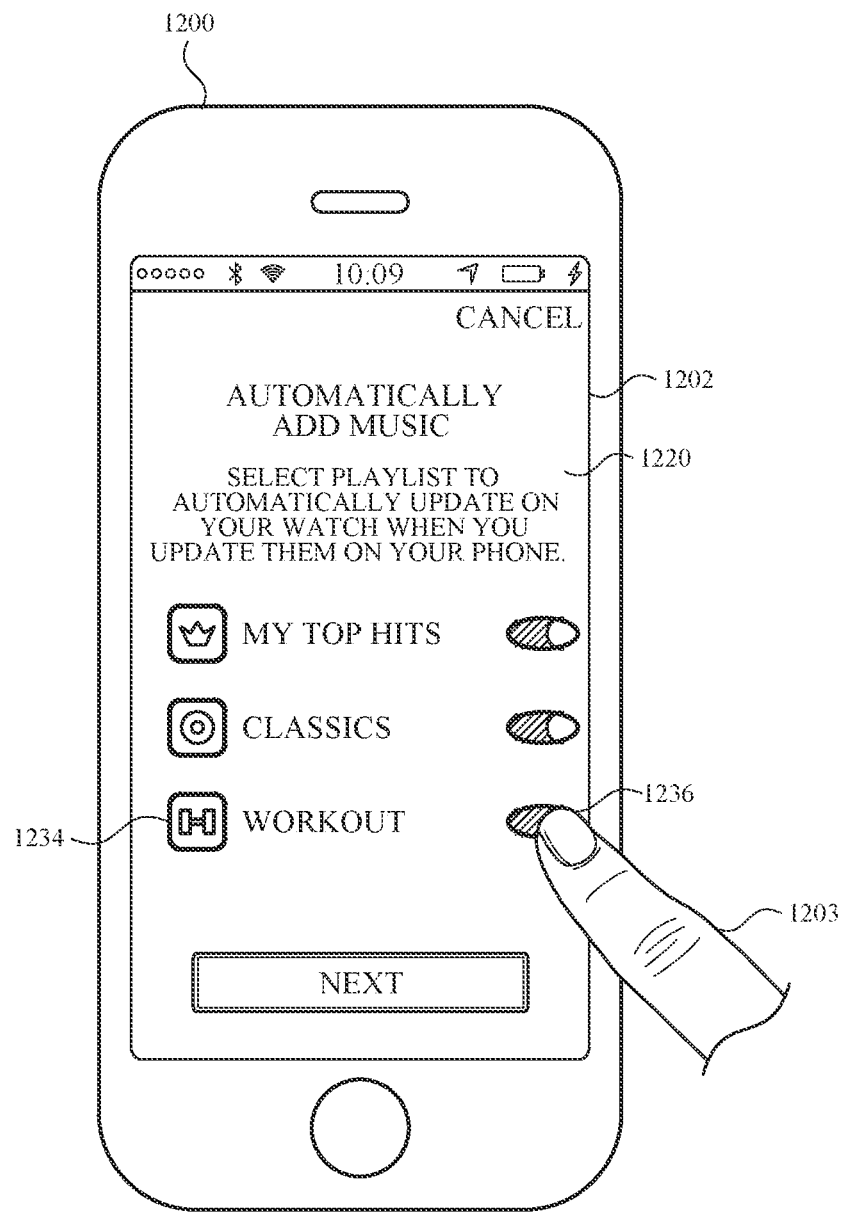
Figure 12E:
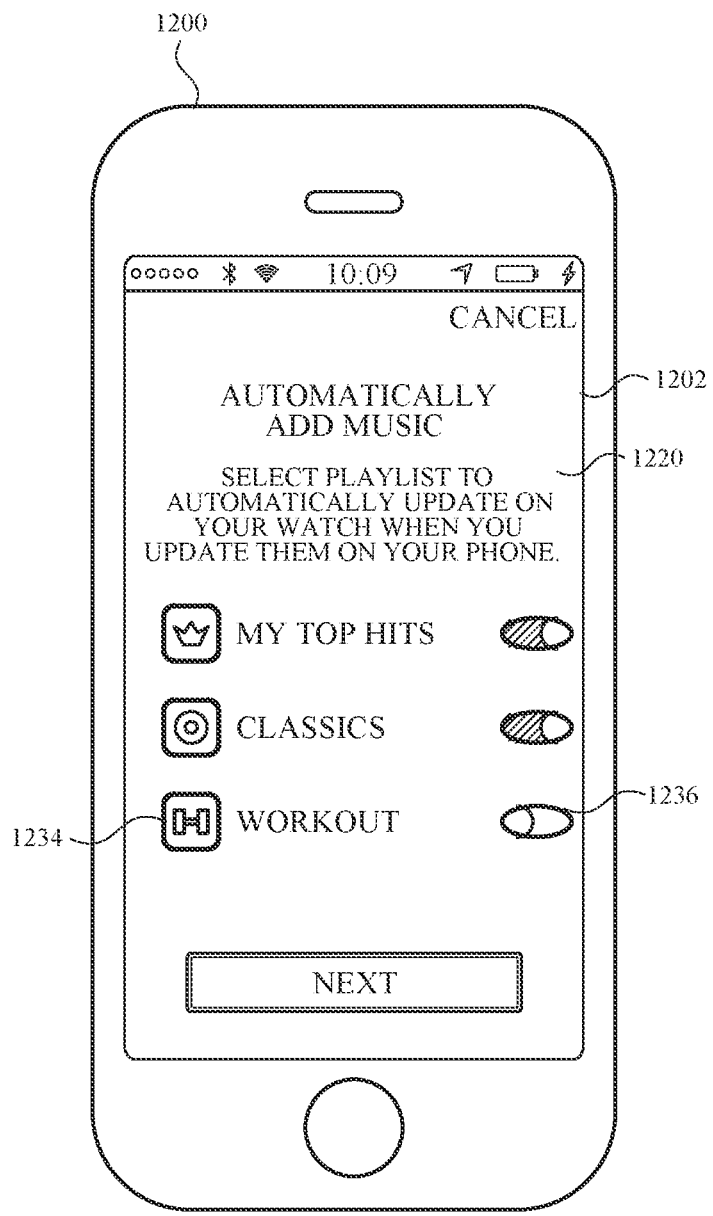

In FIG. 12D, electronic device 1200 detects, via touch-sensitive display 1202 (or alternatively, a voice input via a mic) user input on toggle icon 1236 corresponding to third playlist 1234 (e.g., "Workout"). For example, the user input is a tap gesture 1203 (or alternatively, a short swipe gesture) on toggle icon 1236 to de-designate third playlist 1234 for automatic push. As shown in FIG. 12E, tap gesture 1203 on toggle icon 1236 causes toggle icon 1236 to shift from the "designated" (or "on") state to the "non-designated" (or "off") state. Thus, as shown in FIG. 12E, following tap gesture 1203 on toggle icon 1236, third playlist 1234 (e.g., "Workout") is no longer designated for automatic push.

Figure 12F:
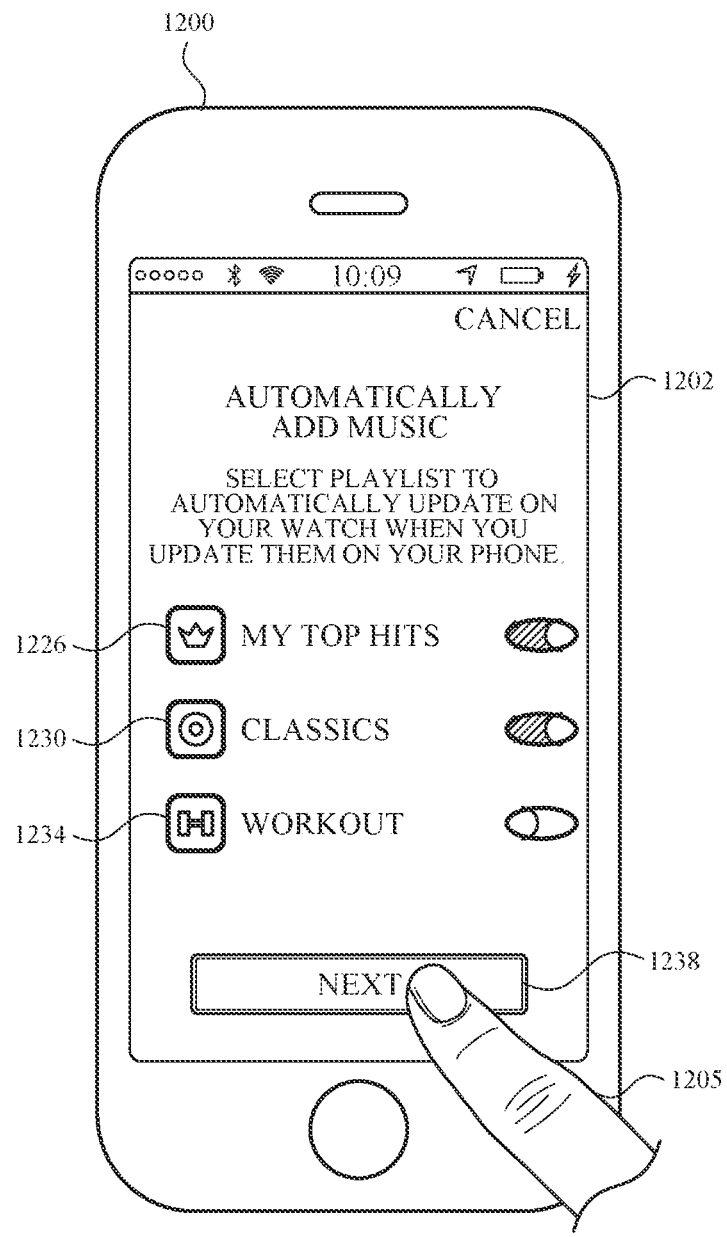

In FIG. 12F, with first playlist 1226 and second playlist 1230 designated for automatic push and third playlist 1234 no longer designated for automatic push, electronic device 1200 detects, via touch-sensitive display 1202 (or alternatively, a voice input via a mic) user activation of second proceed icon 1238 for proceeding with configuring automatic push. For example, the user activation is a tap gesture 1205 on proceed icon 1238.

Figure 12G:
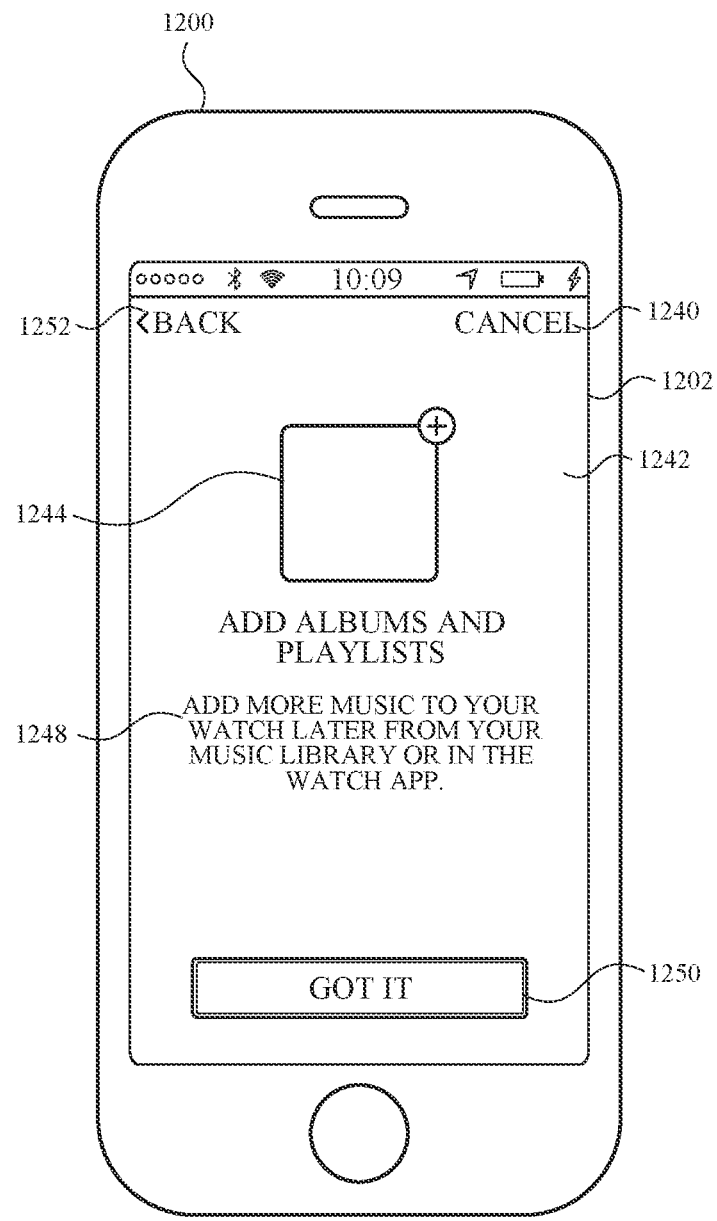

As shown in FIG. 12G, in response to detecting tap gesture 1205, electronic device 1200 displays (e.g., replaces display of setup selection user interface 1220 with) a setup confirmation user interface 1242 for completing initial automatic push configuration. In some embodiments, setup confirmation user interface 1242 maintains display of cancel icon 1240 for cancelling the setup and forgoing completing initial automatic push configuration. In some embodiments, setup confirmation user interface 1242 includes a back icon 1252 for returning to setup selection user interface 1220 (e.g., to change selection settings). In some embodiments, setup confirmation user interface 1242 includes a graphical indication 1244 and a textual indication 1248 that automatic push configuration settings can be changed and additional playlists (or tracks, albums, folders) can be added later on.

Figure 12H:
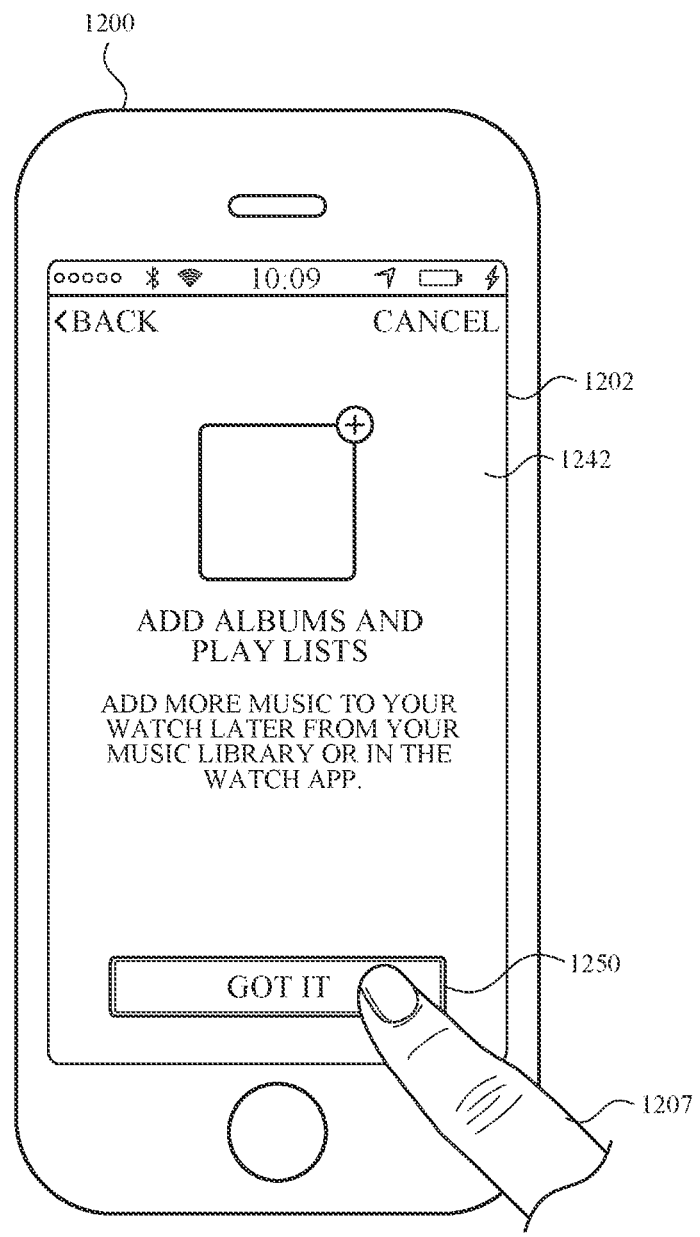

Setup confirmation user interface 1242 also includes a completing icon 1250 for affirming confirmation of the selected initial automatic push settings. In FIG. 12H, electronic device 1200 detects, via touch-sensitive display 1202 (or alternatively, a voice input via a mic), user selection of completing icon 1250. For example, as shown in FIG. 12H, the user selection is a tap gesture 1207 on completing icon 1250. In response detecting tap gesture 1207, electronic device 1200 stores and applies the setup settings and exits the setup process.

Figure 12I:
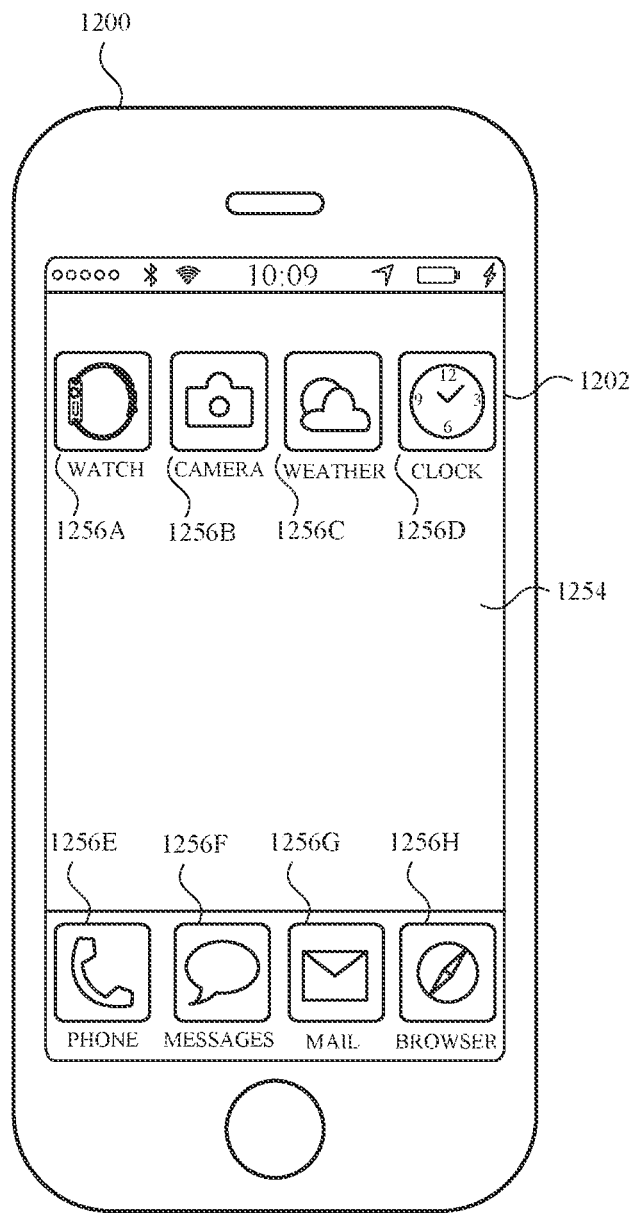

In FIG. 12I, electronic device 1200 displays, on touch-sensitive display 1202, a homescreen user interface 1254. In some embodiments, homescreen user interface 1254 includes one or more icons 1256A-H corresponding to one or more applications installed on electronic device 1200. In particular, homescreen user interface 1254 of electronic device 1200 includes an external device configuration icon 1256A (e.g., for configuring, changing settings of an external device linked to electronic device 1200, such as a paired smartwatch) corresponding to a configuration application for an external device linked with electronic device 1200 (e.g., two devices linked to the same user account).

Figure 12J:
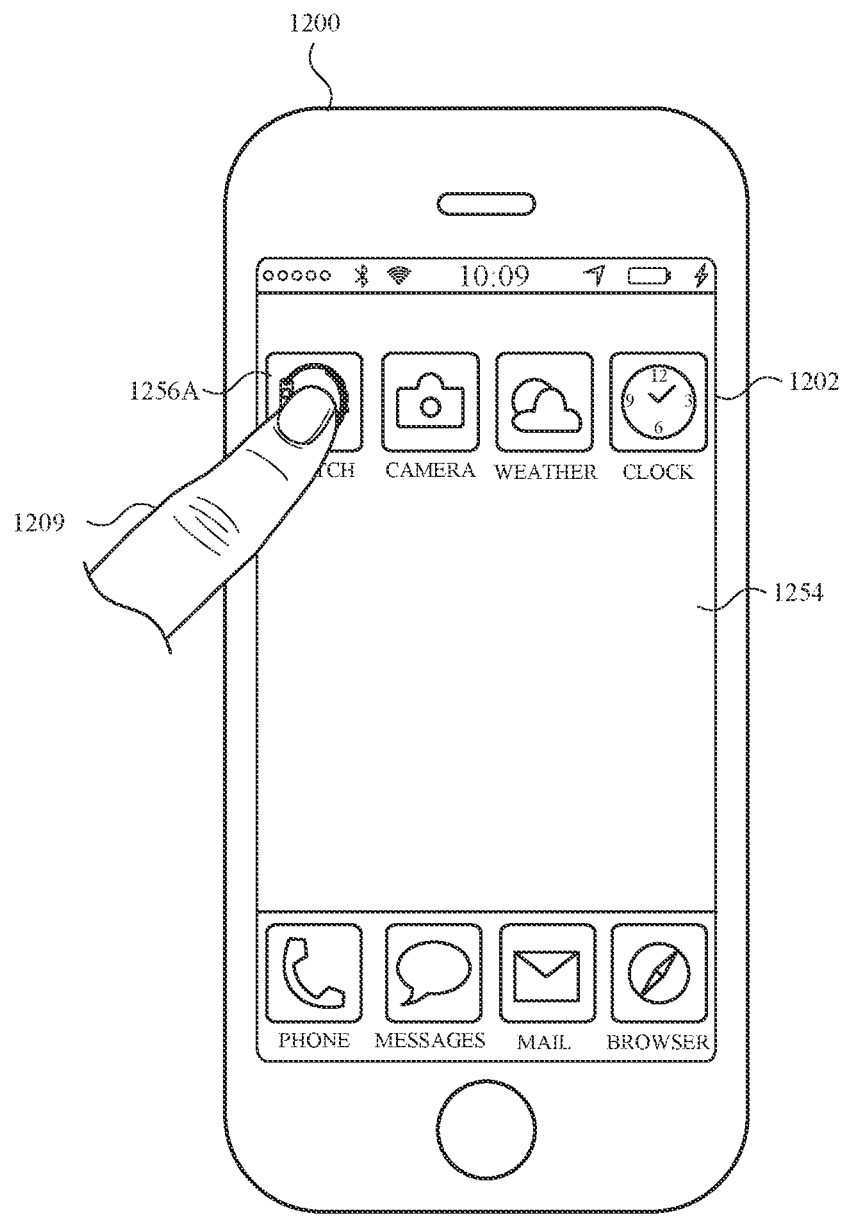

In FIG. 12J, while displaying homescreen user interface 1254, electronic device 1200 detects, via touch-sensitive display 1202 (or alternatively, a voice input via a mic), user activation of external device configuration icon 1256A. For example, as shown in FIG. 12J, the user activation is a tap gesture 1209 on external device configuration icon 1256A.

Figure 12K:
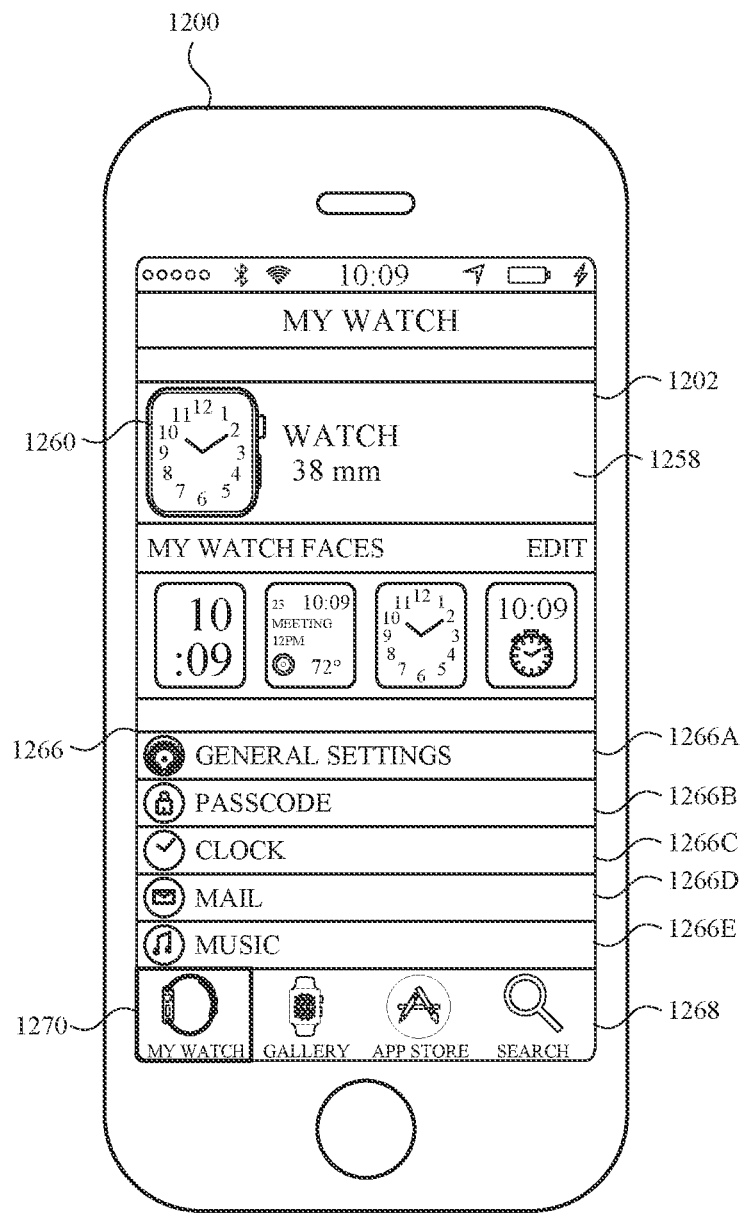

As shown in FIG. 12K, in response to detecting tap gesture 1209, electronic device 1200 displays (e.g., replaces display of homescreen user interface 1254 with) external device configuration user interface 1258. In some embodiments, external device configuration user interface 1258 includes an graphical indication 1260 of the linked external device. In some embodiments, external device configuration user interface 1258 includes a listing 1266 of setting options 1266A-E (e.g., general settings option 1266A, passcode settings option 1266B, clock settings option 1266C, mail settings option 1266D, music settings option 1266E). In some embodiments, external device configuration user interface 1258 includes an application bar 1268 consisting of operating-system controlled applications, which includes external device configuration application, and an indication 1270 that the currently-displayed user interface (i.e., external device configuration user interface 1258) corresponds to the external device configuration application.

Figure 12L:
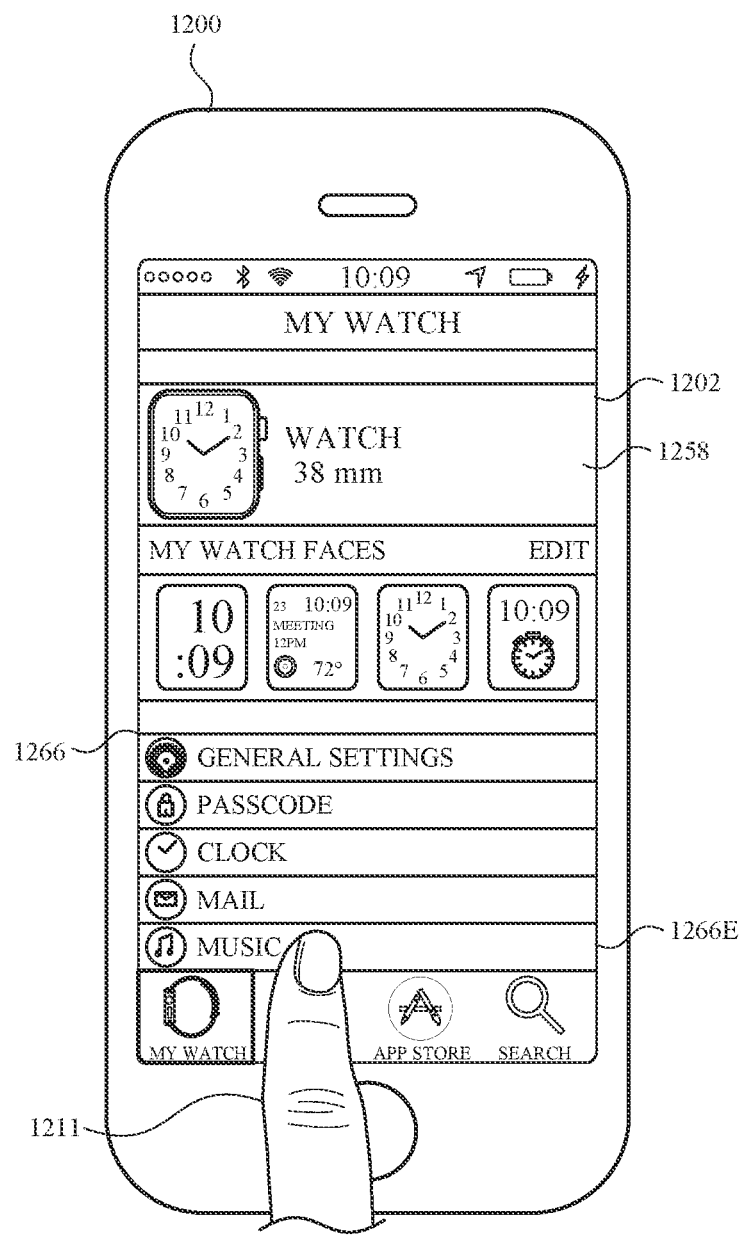
Figure 12M:
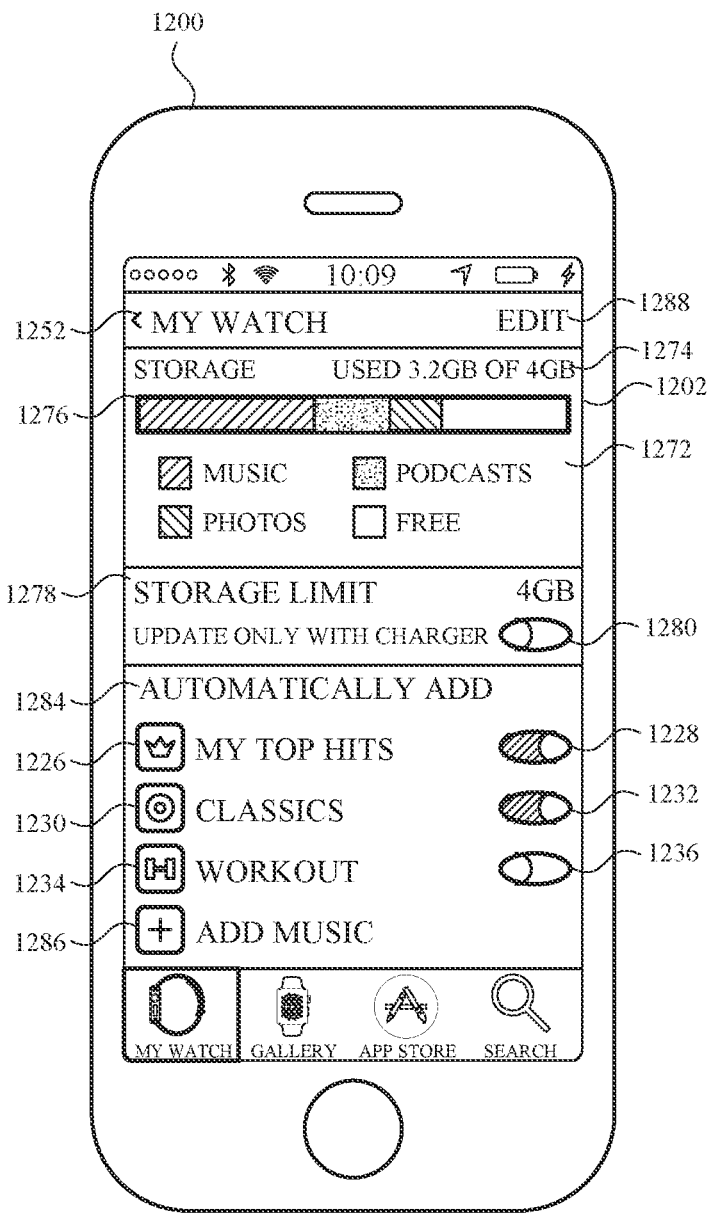

In FIG. 12L, electronic device 1200 detects, via touch-sensitive display 1202 (or alternatively, a voice input via a mic), user selection of music settings option 1266E within listing 1266. For example, the user selection is a tap gesture 1211 on music settings option 1266E. As shown in FIG. 12M, in response to detecting tap gesture 1211, electronic device 1200 displays (e.g., replaces display of external device configuration user interface 1258 with) an audio settings user interface 1272 associated with the linked external device. In some embodiments, audio settings user interface 1272 includes an indication 1274 of the currently-used storage amount and the storage limit of the linked external device (e.g., "USED 3.2 GB OF 4 GB"). In some embodiments, audio settings user interface 1272 includes a storage bar 1276 that proportionally the various different types of files (e.g., music files, podcast files, photo files) that are stored on the linked external device and the amount of free storage available on the linked external device. In some embodiments, audio settings user interface 1272 includes a storage limit indicator 1278 indicating the storage limit of the linked external device. In some embodiments, audio settings user interface 1272 includes an "update only with charger" setting toggle option 1280 which, in FIG. 12M, is currently in the "off" state. In some embodiments, audio settings user interface 1272 includes an edit icon 1288 for editing list entries included in the user interface (e.g., entries of list 1290 depicted in FIG. 12R). In some embodiments, audio settings user interface 1272 includes a selectable indication 1252 that includes an indication (e.g., a textual indication stating "My Watch") that the current application relates to the linked external device, and, when selected, causes electronic device 1200 to return to display of external device configuration user interface 1258.

In some embodiments, audio settings user interface 1272 includes a list 1284 of playlists available on (e.g., stored on) or available via (e.g., from a cloud service) electronic device 1200 that can be automatically pushed to linked external device. The list 1284 of playlists corresponds to the list of playlists (e.g., first playlist 1226 (e.g., "My Top Hits"), second playlist 1230 (e.g., "Classics"), third playlist 1234 (e.g., "Workout")) displayed in setup selection user interface 1220 described with reference to FIGS. 12C-12F, with corresponding toggle icons 1228, 1232, and 1236. Because third playlist 1234 (e.g., "Workout") was de-designated during the initial automatic push configuration process described with reference to FIGS. 12A-12H, third playlist 1234 remains non-designated while first playlist 1226 and second playlist 1230 remain designated for automatic push.

Figure 12N:
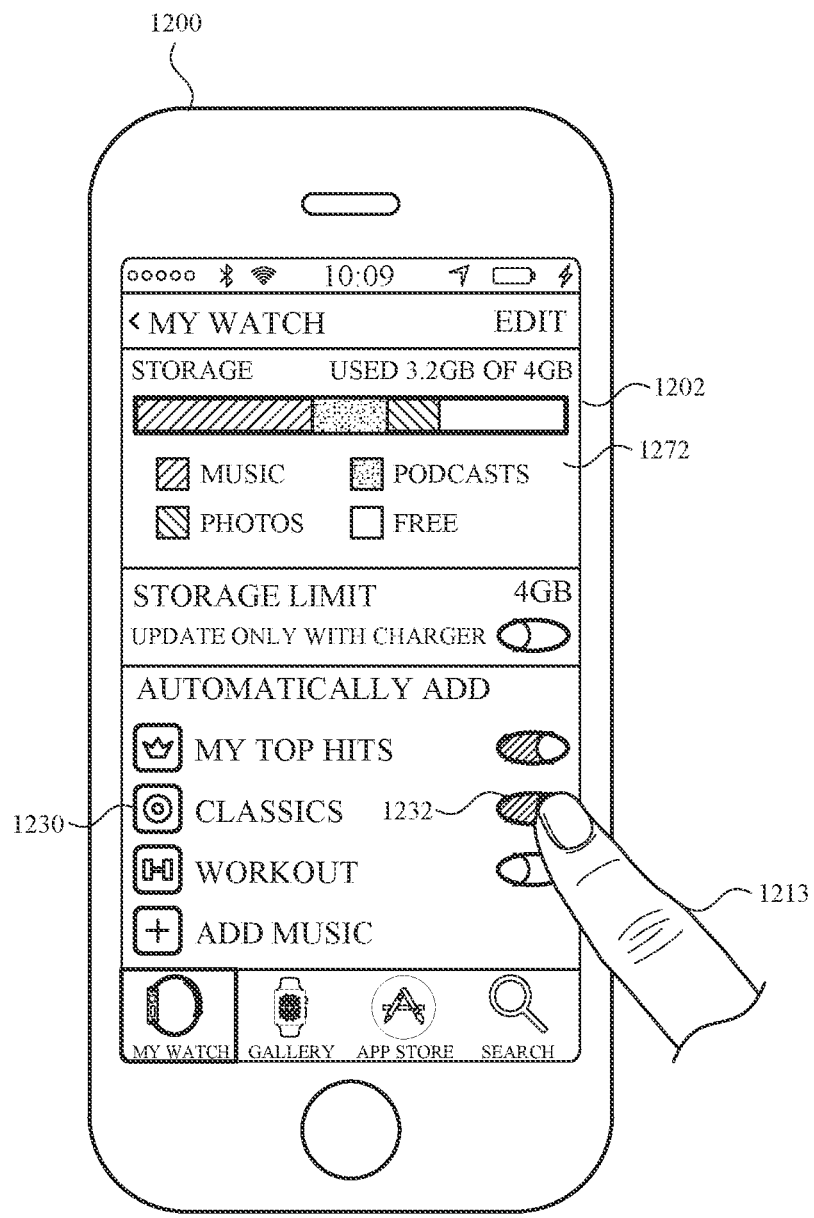
Figure 12O:
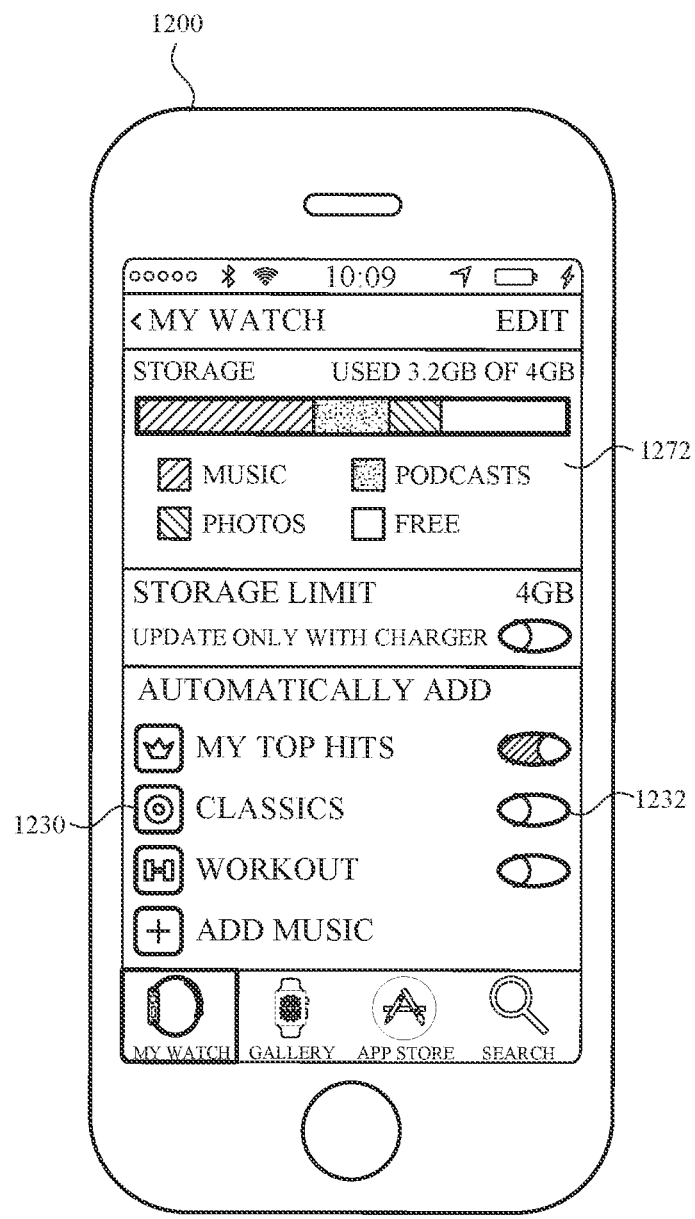

In FIG. 12N, while displaying audio settings user interface 1272, electronic device 1200 detects, via touch-sensitive display 1202 (or alternatively, a voice input via a mic), user input on toggle icon 1232 corresponding to second playlist 1230 (e.g., "Classics"). For example, the user selection is a tap gesture 1213 (or alternatively, a short swipe gesture) on toggle icon 1232 corresponding to second playlist 1230. As shown in FIG. 12O, in response to detecting tap gesture 1213, toggle icon 1232 corresponding to second playlist 1230 shifts to the "non-designated" (e.g., "off") mode, thereby de-designating second playlist 1230 for automatic push from electronic device 1200 to the linked external device.

Figure 12P:
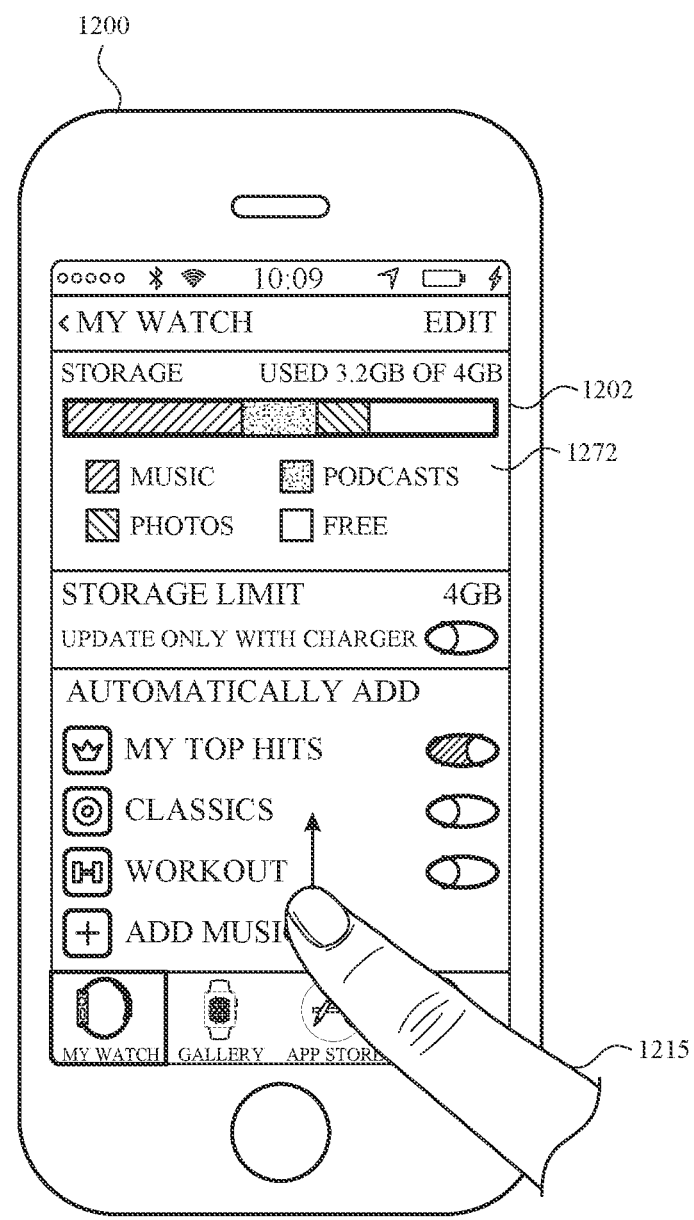
Figure 12Q:
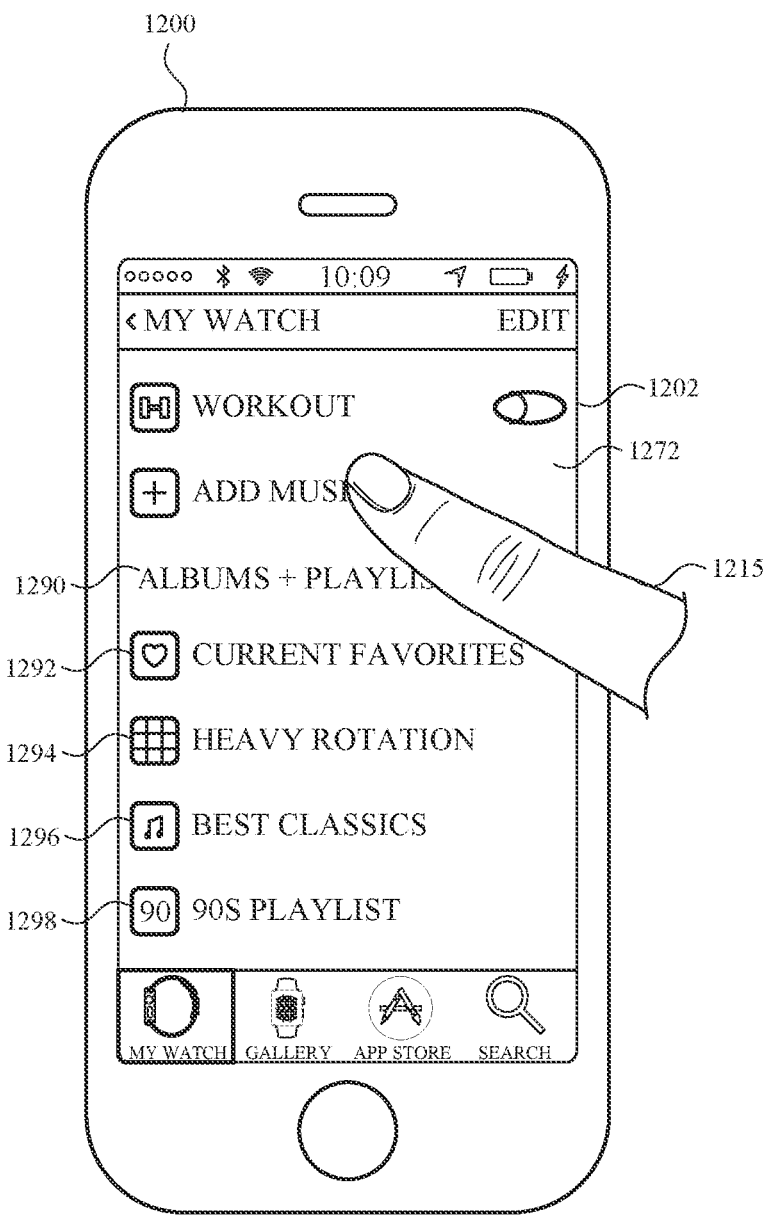
Figure 12R:
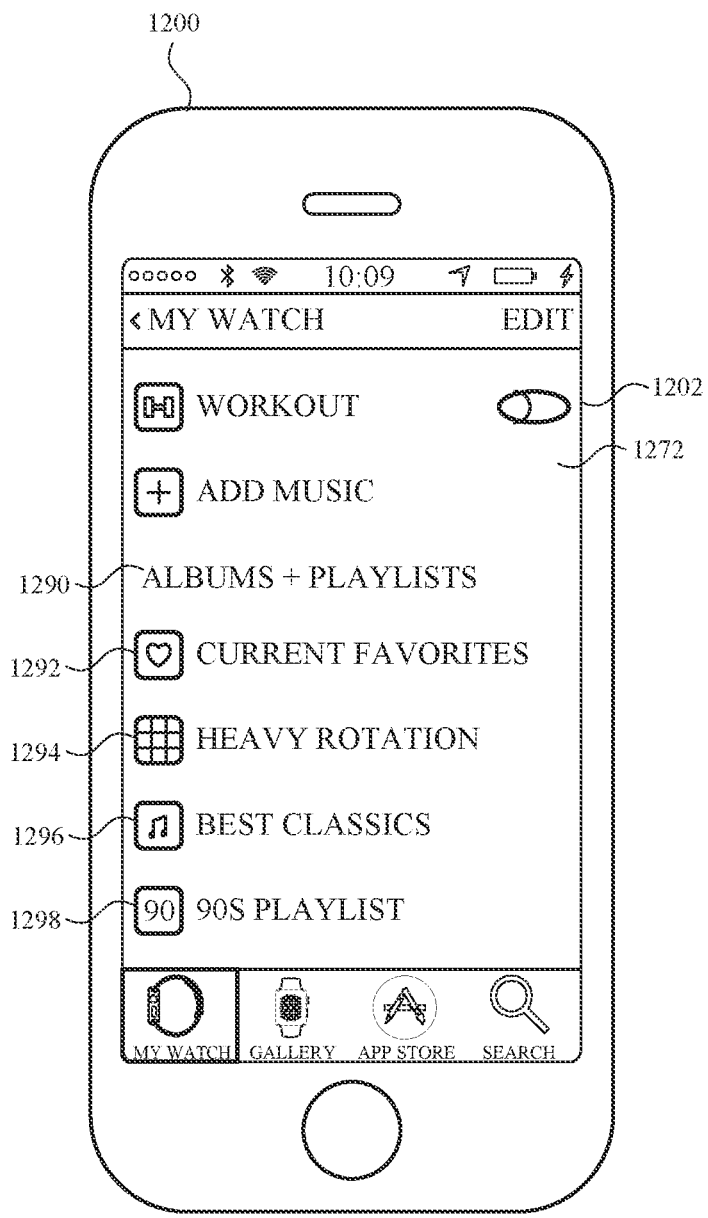

In FIG. 12P, while displaying audio settings user interface 1272, electronic device 1200 detects, via touch-sensitive display 1202 (or alternatively, a voice input via a mic), a scrolling input on audio settings user interface 1272. For example, the scrolling input is a scrolling gesture 1215 in an upwards direction on audio settings user interface 1272. As displayed in the transition from FIG. 12P through FIG. 12R, scrolling gesture 1215 causes gradual display (e.g., a shifting up from the bottom edge of display 1202) of a bottom region of audio settings user interface 1272 that previously could not be displayed on display 1202. As shown in FIGS. 12Q-12R, scrolling gesture 1215 reveals a list 1290 of albums (or playlists, folders) currently stored locally on the linked external device. For example, as shown in FIGS. 12Q-12R, list 1290 includes a first album 1292 (e.g., "Current Favorites"), a second album 1294 (e.g., "Heavy Rotation"), a third album 1296 (e.g., "Best Classics"), and a fourth album 1298 (e.g., "90s Playlist") currently stored on the linked external device.

Figure 12S:
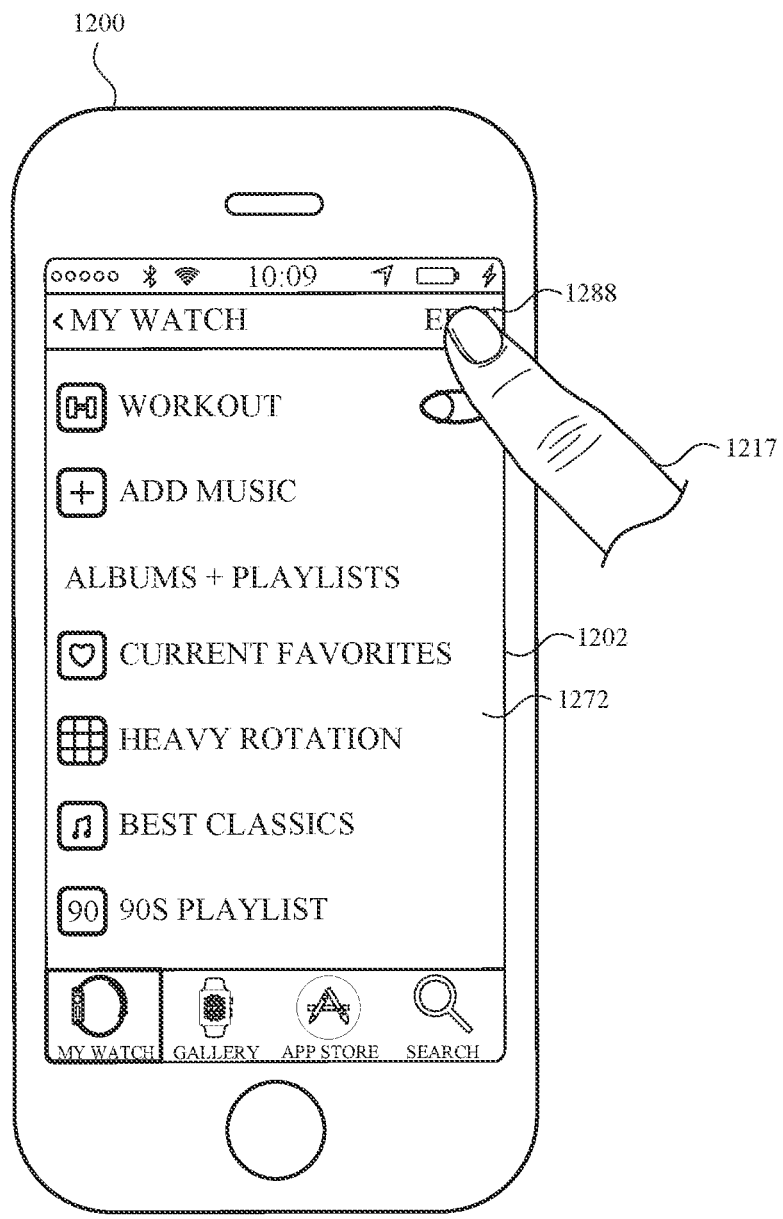
Figure 12T:
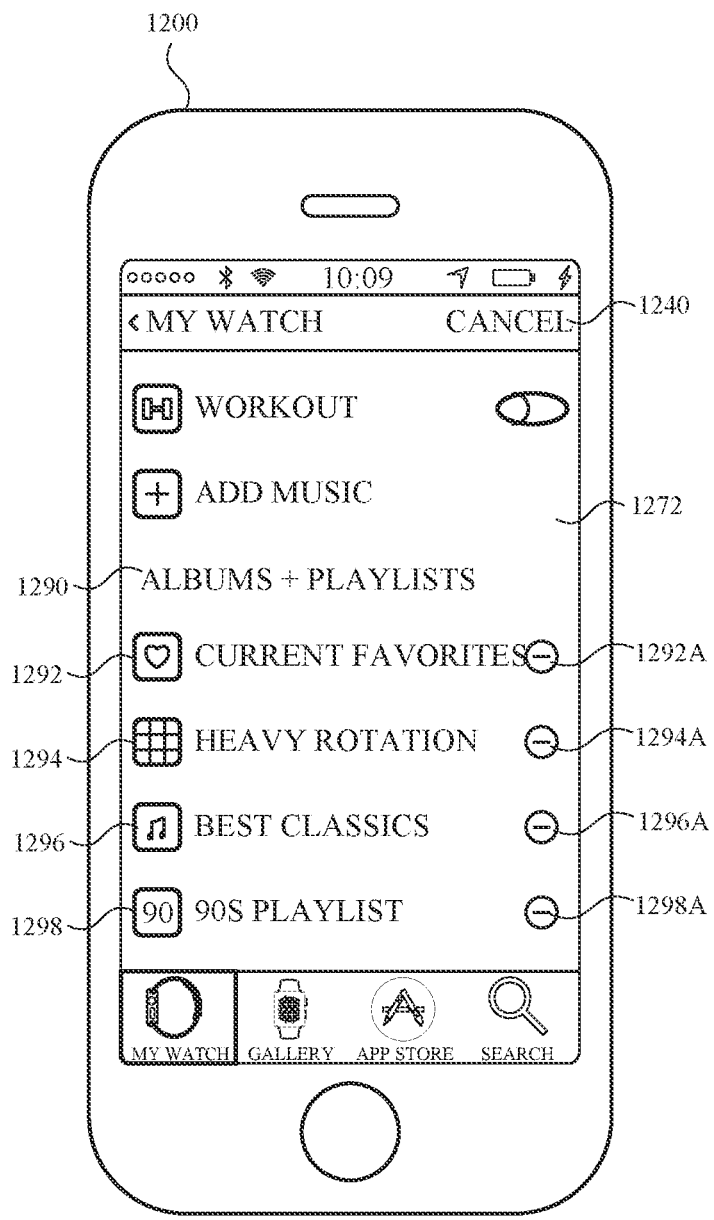

In FIG. 12S, while displaying list 1290 of audio settings user interface 1272, electronic device 1200 detects, via touch-sensitive display 1202 (or alternatively, a voice input via a mic), user selection of edit icon 1288. For example, as shown in FIG. 12S, the user selection of a tap gesture 1217 on edit icon 1288. As shown in FIG. 12T, in response to detecting tap gesture 1217, electronic device 1200 displays, on audio settings user interface 1272 a plurality of remove icons 1292A, 1294A, 1296A, and 1298A corresponding to first album 1292, second album 1294, third album 1296, and fourth album 1298 of list 1290, respectively. Electronic device 1200 also displays, on audio settings user interface 1272, a cancel icon for removing display of the plurality of remove icons.

Figure 12U:
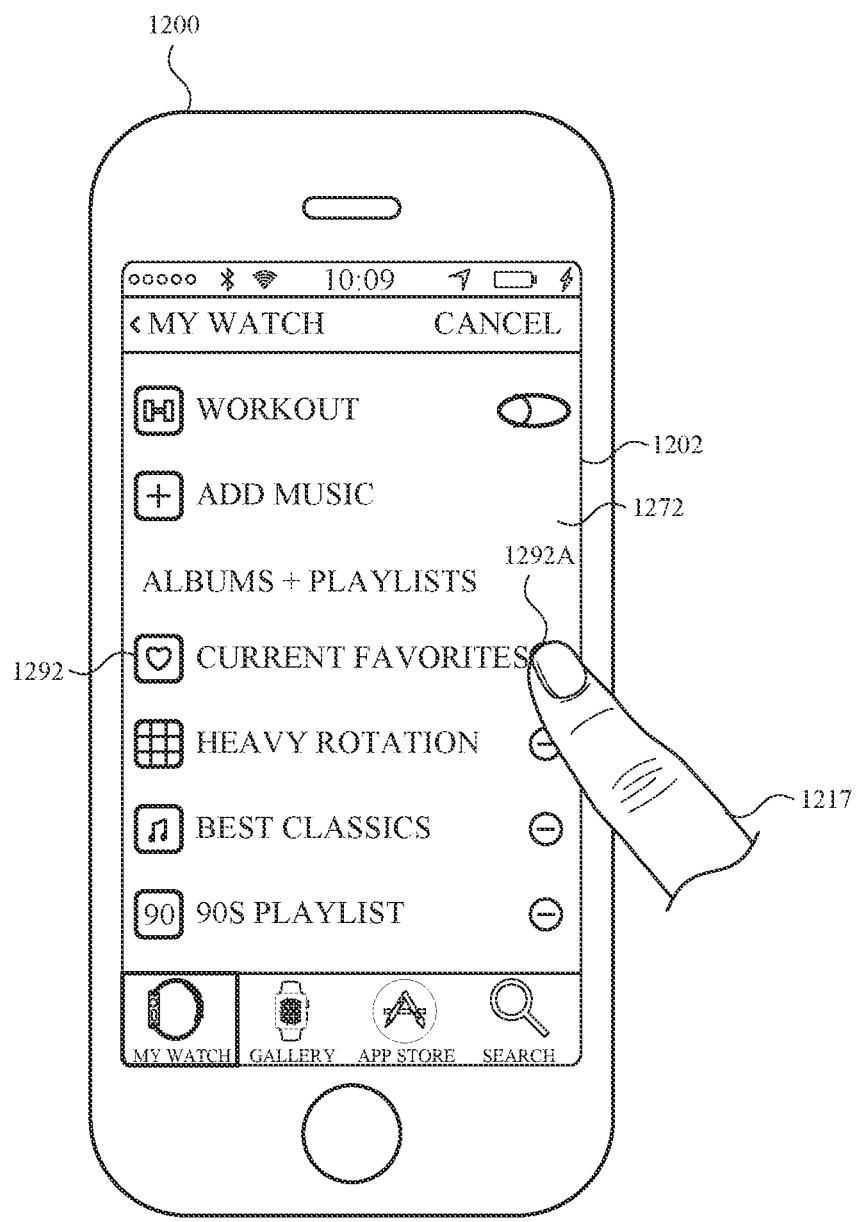
Figure 12V:
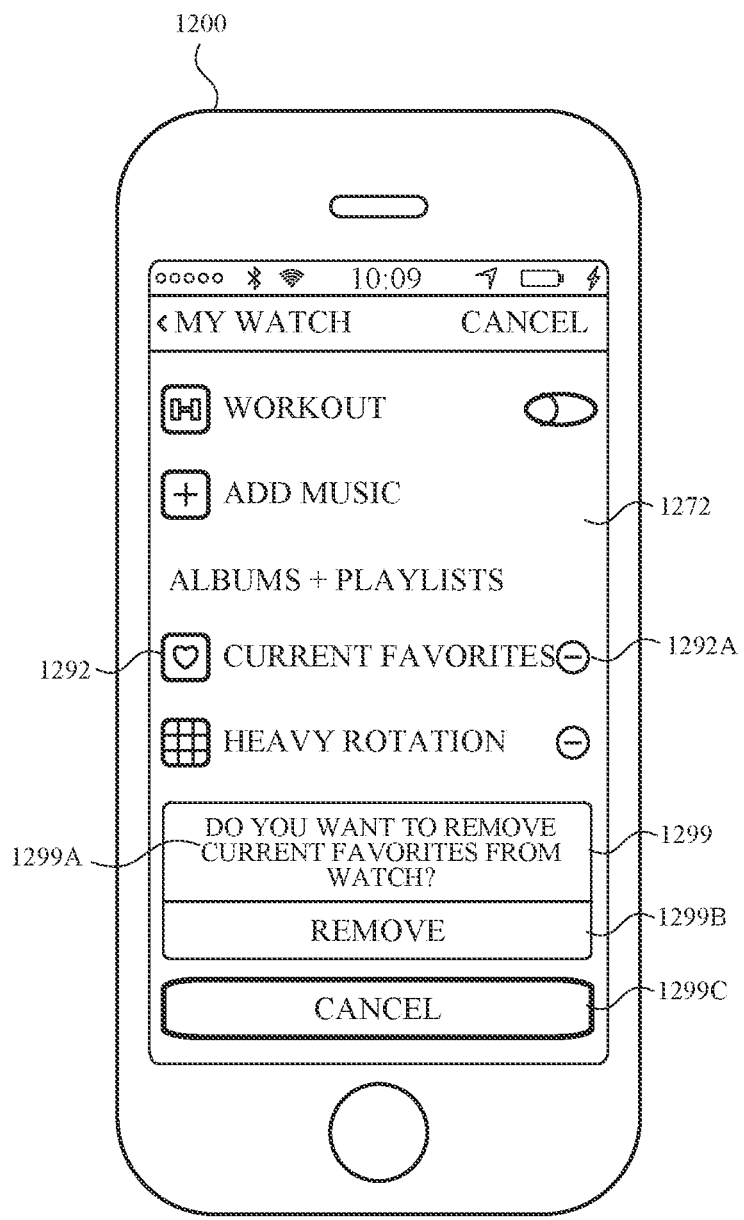

In FIG. 12U, while displaying the plurality of remove icons 1292A, 1294A, 1296A, and 1298A corresponding to first album 1292, second album 1294, third album 1296, and fourth album 1298 of list 1290 on audio settings user interface 1272, electronic device 1200 detects, via touch-sensitive display 1202 (or alternatively, a voice input via a mic), user selection of first remove icon 1292A corresponding to first album 1292. For example, as shown in FIG. 12U, the user selection is a tap gesture 1217 on first remove icon 1292A. As shown in FIG. 12V, in response to detecting tap gesture 1217 on first remove icon 1292A corresponding to first album 1292, electronic device 1200 displays (e.g., at a bottom region of the user interface), a prompt 1299 (e.g., a pop-up prompt) over audio settings user interface 1272 requesting user confirmation for removing data corresponding to first album 1292 from local storage on the linked external device. In some embodiments, prompt 1299 includes an indication 1299A (e.g., a textual indication) confirming the user's intent to have the data associated with the selected album (e.g., first album 1292) removed from the linked external device, a confirmation icon 1299B (e.g., an icon stating "REMOVE"), and a cancel icon 1299C for canceling the removal.

Figure 12W:
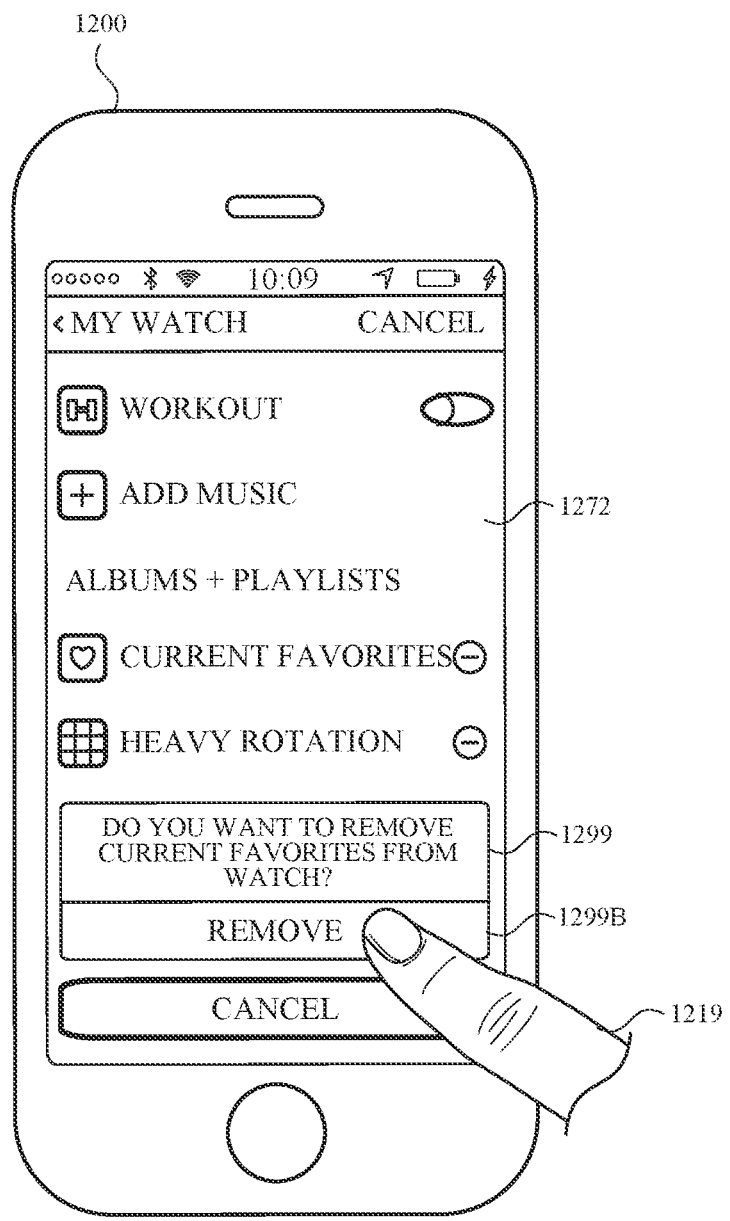
Figure 12X:
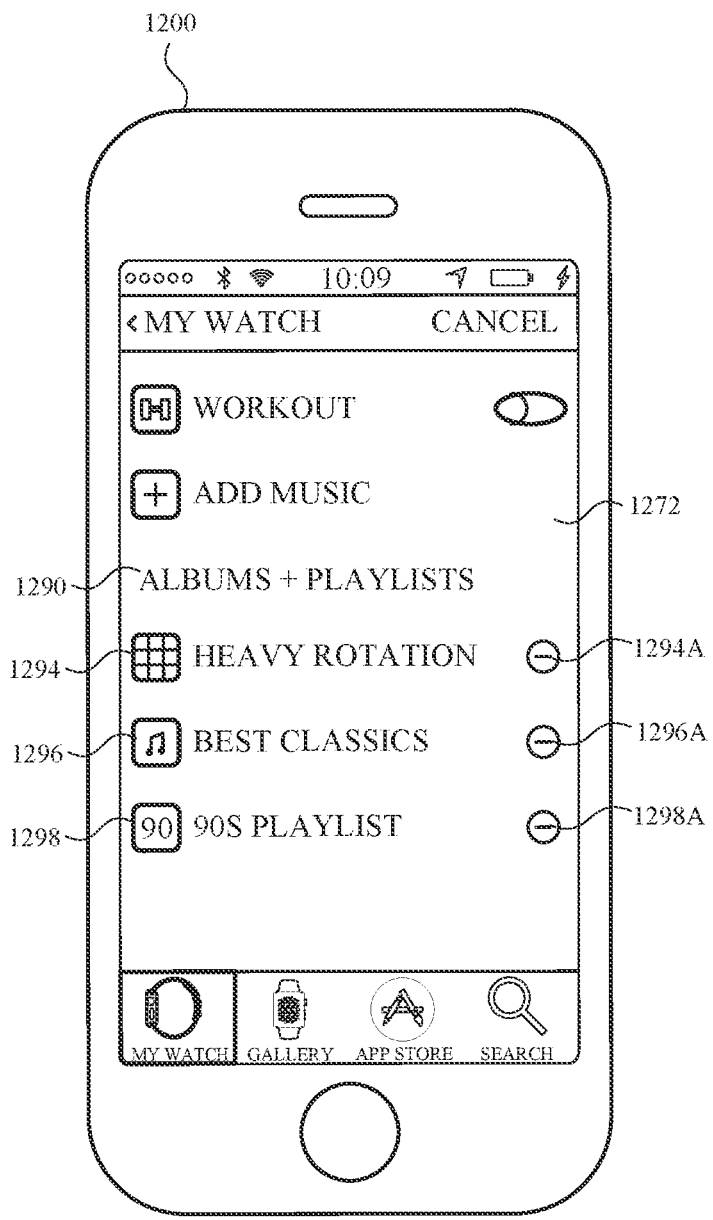

In FIG. 12W, while displaying prompt 1299, electronic device 1200 detects, via touch-sensitive display 1202 (or alternatively, a voice input via a mic), user selection of confirmation icon 1299B. For example, as shown in FIG. 12W, the user selection is a tap gesture 1219 on confirmation icon 1299B. As shown in FIG. 12X, in response to detecting tap gesture 1219 confirming the request to remove data associated with first album from local storage on the linked external device, electronic device 1200 removes display of prompt 1299 and removes display of first album 1292 and remove icon 1292A corresponding to first album 1292 from audio settings user interface 1272. As such, listing 1290 now shows only second album 1294, third album 1296, and fourth album 1298 as being stored locally on the linked external device. Further, electronic device 1200 causes data of corresponding to first album 1292 to be removed from the linked external device.

Figure 12Y:
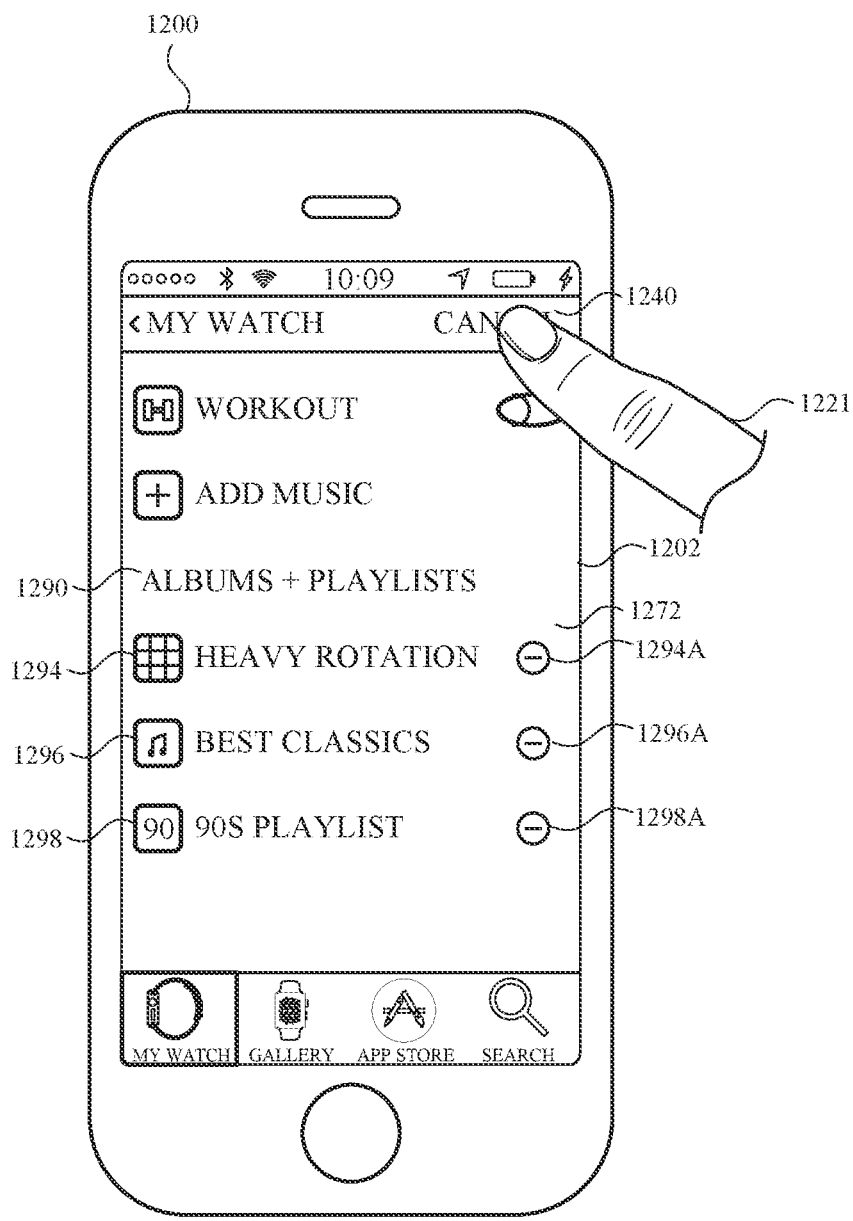
Figure 12Z:
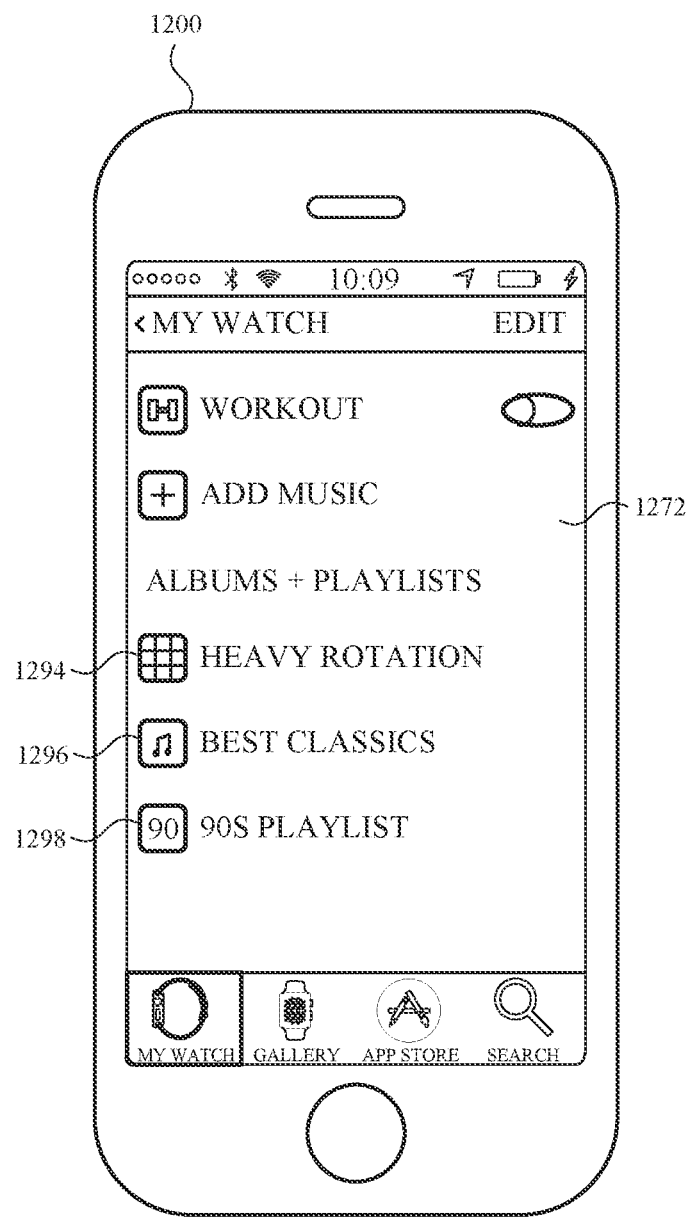
Figure 12A:
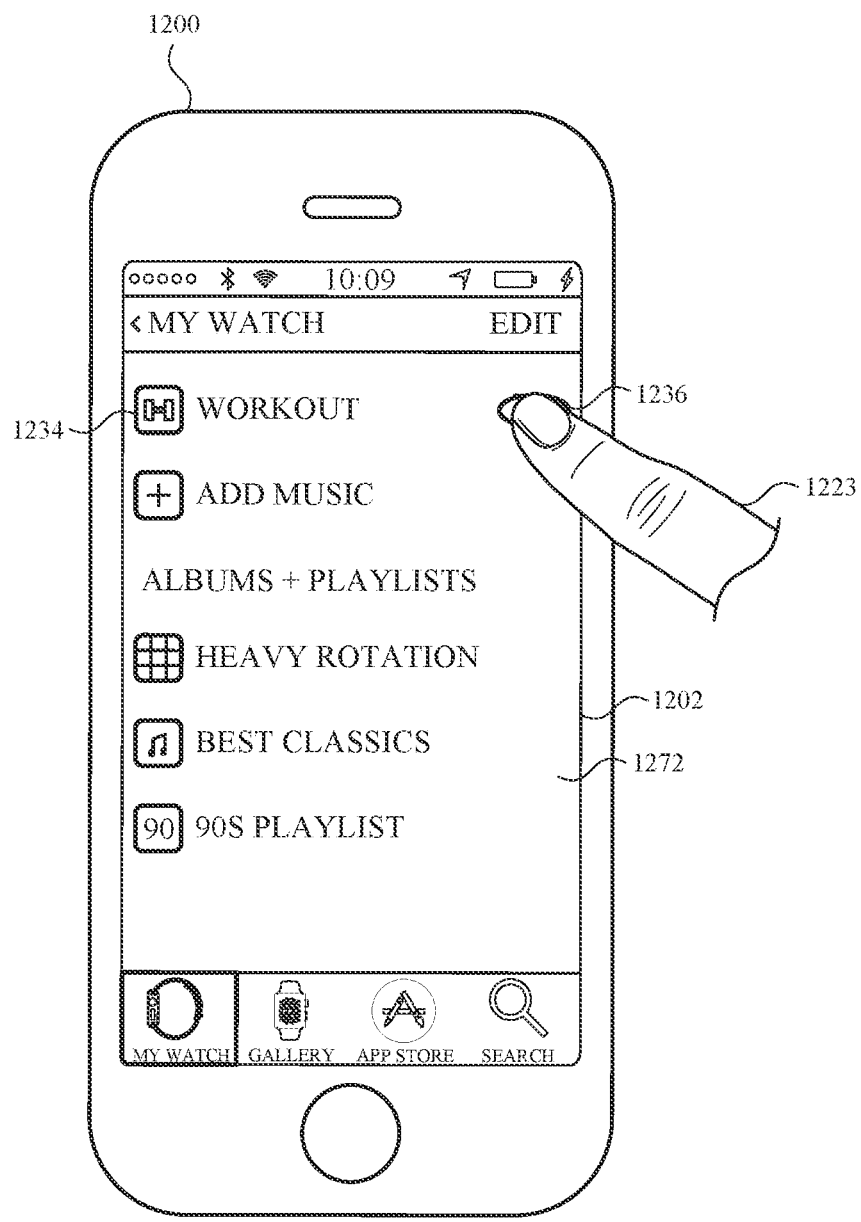
Figure 12A:
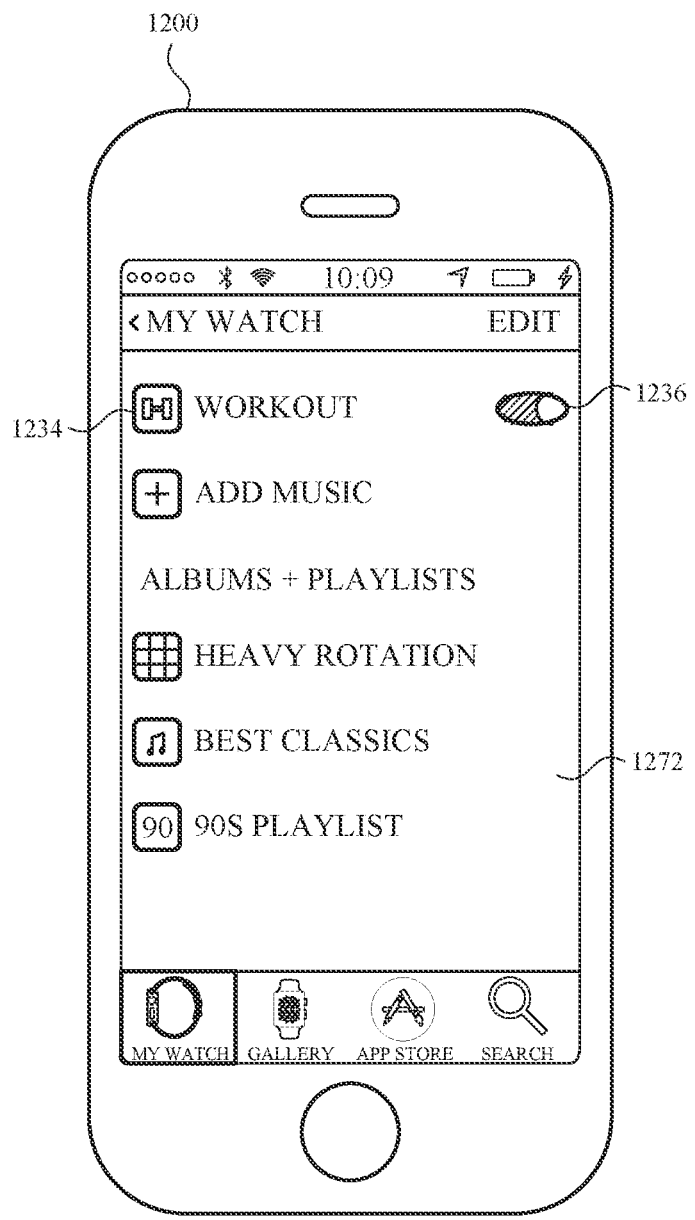
Figure 12A:
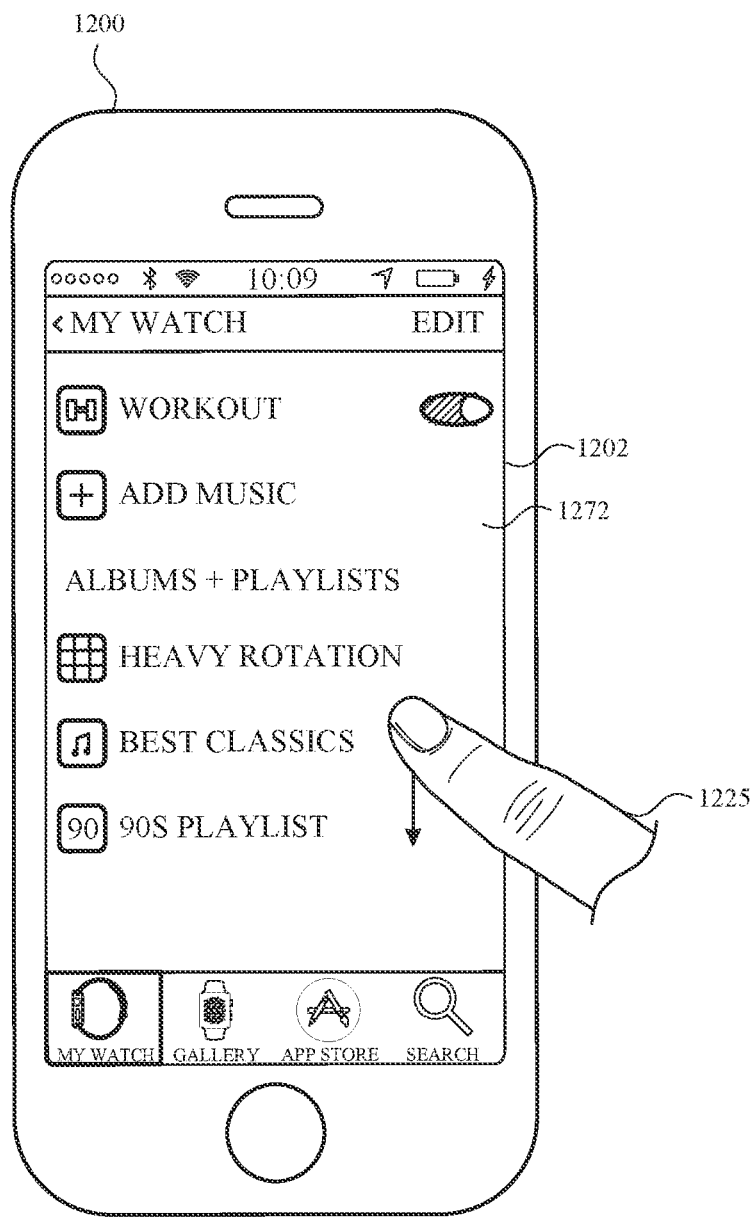
Figure 12A:
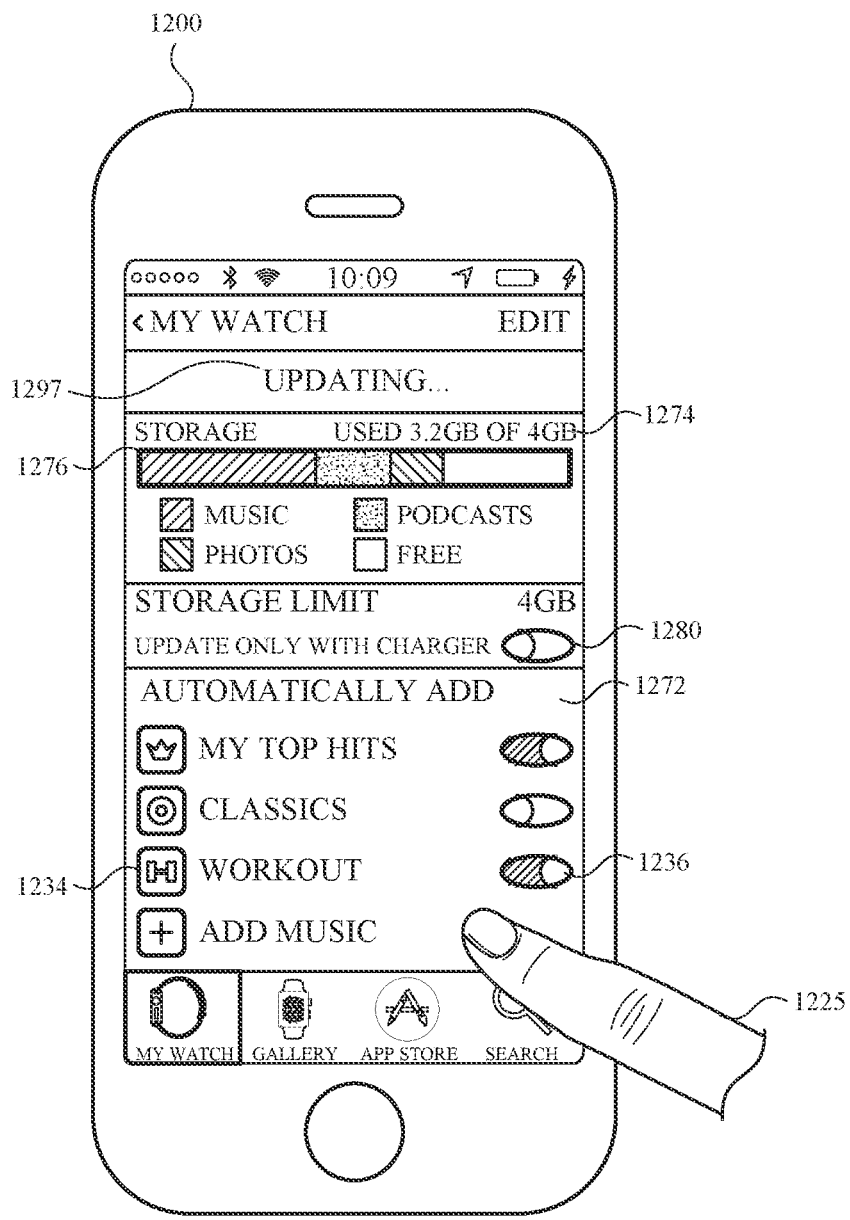
Figure 12A:
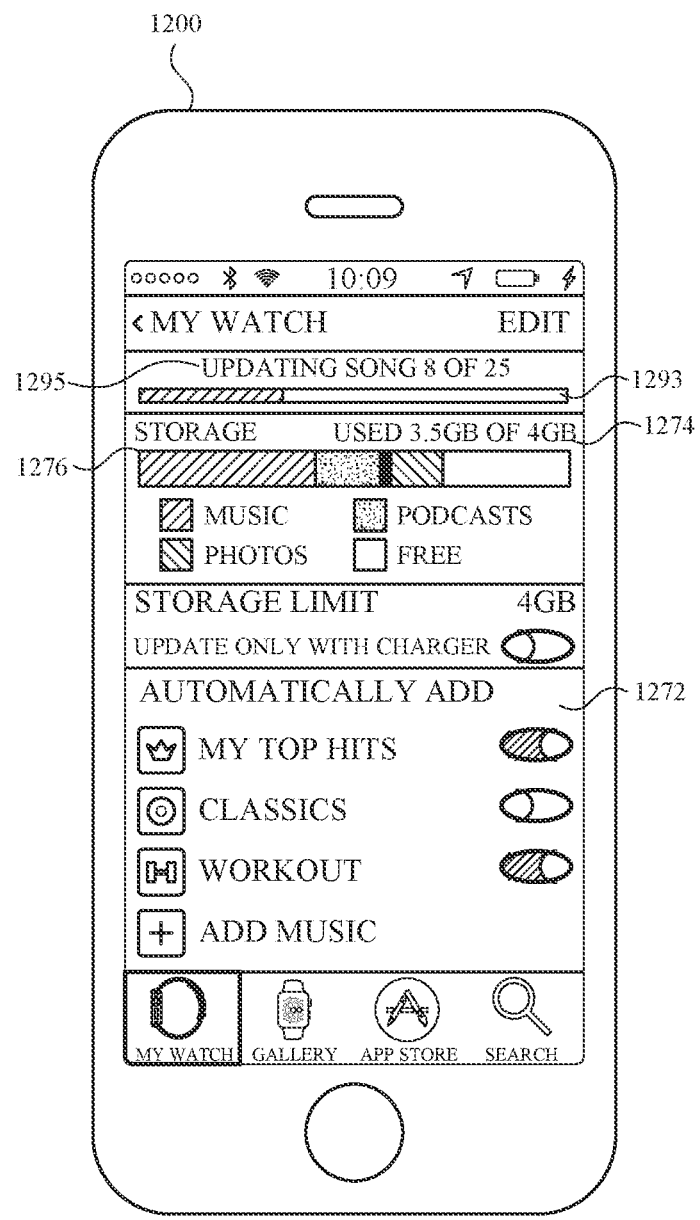

In FIG. 12Y, while displaying the entries (e.g., second album 1294, third album 1296, and fourth album 1298) of listing 1290 and remove icons 1294A, 1296A, and 1298A corresponding to the entries of listing 1290, electronic device 1200 detects, via touch-sensitive display 1202 (or alternatively, a voice input via a mic), user selection of cancel icon 1240. For example, the user selection is a tap gesture 1221 on cancel icon 1240. As shown in FIG. 12Z, in response to detecting tap gesture 1221, electronic device 1200 ceases display of remove icons 1294A, 1296A, and 1298A corresponding to second album 1294, third album 1296, and fourth album 1298, respectively, on audio settings user interface 1272.

In FIG. 12AA, while displaying audio settings user interface 1272, electronic device 1200 detects, via touch-sensitive display 1202 (or alternatively, a voice input via a mic), user input on toggle icon 1236, which is in the "non-designated" mode (e.g., "off" mode), corresponding to third playlist 1234 (e.g., "Workout"). For example, as shown in FIG. 12AA, the user selection is a tap gesture 1223 (or alternatively, a short swipe gesture) on toggle icon 1236. As shown in FIG. 12AB, in response to detecting tap gesture 1223, toggle icon 1236 corresponding to third playlist 1234 (e.g., "Workout") switches from the "non-designated" mode (e.g., "off" mode) to the "designated" mode (e.g., "on" mode).

As shown in the transition from FIG. 12AC to FIG. 12AD, electronic device 1200 detects, via touch-sensitive display 1202 (or alternatively, a voice input via a mic), a scrolling input on audio settings user interface 1272. For example, the scrolling input is a scrolling gesture 1225 in a downwards direction (thus again revealing the top portion of audio settings user interface 1272, as shown in FIG. 12 AD). As shown in FIG. 12AD, toggle icon 1236 corresponding to third playlist 1234 (e.g., "Workout") remains in the "designated" mode. Further, as also shown in FIG. 12AD, toggle icon 1280 corresponding to an update mode (e.g., update the linked external device only when the external device is being charged v. update the linked external device irrespective of whether or not the linked external device is being charged) is in the "off" mode (e.g., update the linked external device irrespective of whether or not the linked external device is being charged). As such, as long as the external device is currently linked to electronic device 1200, electronic device causes data associated with third playlist 1234 to be transmitted to the linked external device to be locally stored on the linked external device. If toggle icon 1280 corresponding to an update mode is in the "on" mode (e.g., update the linked external device only when the external device is being charged), electronic device 1200 causes data transmission to the linked external device only when the linked device is currently being charged.

In some embodiments, as further shown in FIG. 12AD, when initiating update of (e.g., causing data corresponding to third playlist 1234 to be transmitted to) the linked external device, electronic device 1200 displays, on audio settings user interface 1272, an indication 1297 (e.g., a textual indication stating "UPDATING . . . ") that the linked external device is being updated to locally store the transmitted data (e.g., corresponding to third playlist 1234).

In some embodiments, as shown in FIG. 12AE, as the update is progressing, electronic device 1200 updates indication 1295 to include a current progress (e.g., "UPDATING SONG 8 OF 25") of the update. In some embodiments, as also shown in FIG. 12AE, as the update is progressing, electronic device 1200 displays (e.g., adjacent to or below indication 1295) an update status bar 1293 graphically indicating the current progress of the update. In some embodiments, as shown in FIG. 12AE, while causing update of the linked external device, electronic device 1200 updates display of storage limit indicator 1274 (e.g., from "USED 3.2 GB of 4 GB" to "USED 3.5 GB of 4 GB") and storage bar 1276 to account for change in local storage use of the linked external device as the update progresses (i.e., as the external device continues to locally stores the transmitted data (e.g., corresponding to third playlist 1234)).

FIGS. 13A-13C are a flow diagram illustrating a method for playing and managing audio items using an electronic device in accordance with some embodiments. Method 1300 is performed at a device (e.g., 100, 300, 500) with a touch-sensitive display and a wireless communication radio (e.g., Bluetooth, WiFi, NFC, etc.). Some operations in method 1300 are, optionally, combined, the order of some operations is, optionally, changed, and some operations are, optionally, omitted.

As described below, method 1300 provides an intuitive way for playing and managing audio items. The method reduces the cognitive burden on a user for playing and managing audio items, thereby creating a more efficient human-machine interface. For battery-operated computing devices, enabling a user to play and manage audio items faster and more efficiently conserves power and increases the time between battery charges.

At block 1302, the electronic device (e.g., 1200) displays, on the display (e.g., 1202), a user interface (e.g., 1220, 1272) including a plurality of item groups (e.g., 1226, 1230, 1234) (e.g., a plurality of audio playlists, a plurality of audio albums, a plurality of track lists) and a plurality of selection affordances (e.g., 1228,1232, 1236) associated with the plurality of item groups, where a selection affordance has a first state and a second state, and where data of the plurality of item groups are stored on the electronic device. In some examples, the first state is a selected state. In some examples, the first state is a "checked" state. In some examples, the first state is an "on" state. In some examples, the second state is a non-selected state. In some examples, the second state is an "un-checked" state. In some examples, the second state is an "off" state.

Displaying a plurality of item groups and a plurality of selection affordances associated with the plurality of item groups, where a selection affordance can be switched between a first state and a second state to designated or de-designate the corresponding item group provides the user with a quick and efficient way to designate or de-designate the plurality of item groups. Providing additional control options without cluttering the UI with additional displayed controls enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1304, prior to displaying, on the display (e.g., 1202), the user interface (e.g., 1220, 1272) including the plurality of item groups (e.g., a plurality of audio playlists, a plurality of audio albums, a plurality of track lists) and the plurality of selection affordances associated with the plurality of item groups, the electronic device (e.g., 1200) displays, on the display, an initial setup user interface (e.g., 1208) including a proceeding affordance (e.g., 1216). In some examples, the initial setup user interface (e.g., 1208) is a user interface that is displayed only when a user has not yet configured automatic push settings on the device (e.g., a "get started" user interface). In some examples, the proceeding affordance (e.g., 1216) is an affordance for agreeing to proceed with setting up automatic push functionality with the external device (e.g., a "get started" affordance). In some embodiments, at block 1306, the electronic device receives user selection (e.g., a touch gesture, such as a tap) of the proceeding affordance. In some embodiments, at block 1308, in response to receiving the user selection of the proceeding affordance, the electronic device displays the user interface. In some embodiments, the initial setup user interface is displayed in response to detecting, via the wireless communication radio, connectivity with the external device.

At block 1310, the electronic device (e.g., 1200) receives user input on a first selection affordance associated with a first item group. At block 1312, in accordance with a determination that the first selection affordance is in the first state, the electronic device designates the first item group. In some examples, the electronic device (e.g., 1200) designates the first item group to be transmitted to a device different from the electronic device. At block 1314, in accordance with a determination that the first selection affordance is in the second state, the electronic device forgoes designating the first item group.

In some embodiments, at block 1316, the electronic device (e.g., 1200) receives a second user input (e.g., 1215) (e.g., a finger scroll gesture) on the user interface (e.g., 1272). In some embodiments, at block 1318, in response to receiving the second user input (e.g., in response to a user scrolling the user interface to view user interface elements that are not currently visible on the display), the electronic device (e.g., 1200) displays, on the display (e.g., 1202), at least one stored item group of a plurality of stored item groups (e.g., 1294, 1296, 1298) (e.g., at least one playlist of the plurality of playlists currently stored on the electronic device) stored on external device. In some embodiments, at block 1320, the electronic device (e.g., 1200) receives user selection (e.g., 1217) (e.g., a detectable touch gesture, such as a tap) of an edit affordance (e.g., 1288). In some embodiments, at block 1322, in response to receiving the user selection of the edit affordance, the electronic device (e.g., 1200) displays, on the display (e.g., 1202), a plurality of removal affordances (e.g., 1294A, 1296A, 1298a) associated with the plurality of stored item groups.

Displaying the plurality of removal affordances associated with the plurality of sorted item groups in response to receiving the user selection of the edit affordance provides a visual feedback to the user indicating that one or more of the plurality of stored item groups can be removed from local storage on the external device. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, at block 1324, the electronic device (e.g., 1200) receives user selection of a first removal affordance (e.g., 1294A) of the plurality of removal affordances associated with a first stored item group of the plurality of stored item groups. In some embodiments, at block 1326, in response to receiving the user selection of the first removal affordance, the electronic device (e.g., 1200) causes data of the first stored item group (e.g., 1294) to be removed from the external device.

In some embodiments, at block 1328, prior to causing the data of the first stored item group (e.g., 1294) to be removed from the external device, the electronic device (e.g., 1200) displays, on the display (e.g., 1202), a confirmation affordance (e.g., 1299B). In some embodiments, at block 1330, the electronic device (e.g., 1200) receives user selection (e.g., 1219) of the confirmation affordance. In some embodiments, at block 1332, in response to receiving the user selection of the confirmation affordance, the electronic device (e.g., 1200) causes data of the first stored item group (e.g., 1294) to be removed from the external device.

Causing data of the first stored item group to be removed from the external device in response to receiving the user selection of the first removal affordance, without additional user input on the external device, enables a user to easily and efficient control (e.g., remove) data corresponding to items stored on the external device. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

At block 1334, subsequent to detecting, via the wireless communication radio, an external device (e.g., a smartphone, a smartwatch, a tablet computer, a laptop computer, a desktop computer), the electronic device (e.g., 1200), at block 1336, in accordance with a determination that the first item group is designated, automatically transmits (without any user input) data of the items associated with the first item group to the external device to be stored on the external device, and, at block 1338, in accordance with a determination that the first item group is not designated, the electronic device forgoes automatically transmitting data of the items associated with the first item group to the external device to be stored on the external device. In some embodiments, the electronic device is paired with the external device Automatically transmitting data of the items associated with the first item group to the external device to be stored on the external device in accordance with a determination that the first item group is designated and automatically transmitting data of the items associated with the first item group to the external device to be stored on the external device in accordance with a determination that the first item group is not designated enables a user to easily and efficiently control the transmission of data associated with the first item group to the external device by simply designating or de-designating the item group using the electronic device. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the first item group is designated, the electronic device (e.g., 1200), at block 1340, in accordance with a determination that a first item associated with the first item group is stored on the external device (e.g., an audio item of the designated playlist is already stored on the external device), forgoes automatically transmitting the data of the first item to the external device.

In some embodiments, in accordance with the determination that the first item group is designated, the electronic device (e.g., 1200), at block 1342, in accordance with a determination that a second item not associated with the first item group stored on the electronic device is stored on the external device (e.g., an audio item exists in the corresponding playlist of the external device because the playlist previously contained the audio item, but the audio item has been removed from the playlist on the electronic device), causes data of the second item to be removed from the external device.

In some embodiments, at block 1344, prior to automatically transmitting (without any user input) the data of the items in the first item group to the external device to be stored on the external device, the electronic device (e.g., 1200) displays, on the display (e.g., 1202), a confirmation sheet indicating that the first item group is designated. In some examples, the confirmation sheet is a pop-up sheet that partially covers the display. In some examples, the confirmation sheet is a confirmation page that entirely covers the display.

In some embodiments, at block 1346, prior to automatically transmitting (without any user input) the data of the items in the first item group to the external device to be stored on the external device, the electronic device (e.g., 1200) receives, via the wireless communication radio, charge state information (e.g., information concerning whether or not the external device is being charged) of the external device. In some embodiments, at block 1348, in accordance with a determination, based on the received charge state information, that the external device is currently being charged, the electronic device (e.g., 1200) automatically transmits (without any user input) the data of the items associated with the first item group to the external device. In some embodiments, at block 1350, in accordance with a determination, based on the received charge state information, that the external device is not currently being charged, the electronic device (e.g., 1200) forgoes automatically transmitting the data of the items associated with the first item group to the external device.

Automatically transmitting the data of the items associated with the first item group to the external device in accordance with a determination, based on the received charge state information, that the external device is currently being charged and forgoing automatically transmitting the data of the items associated with the first item group to the external device in accordance with a determination, based on the received charge state information, that the external device is not currently being charged enables a user to not have to worry about the charge state of the external device when the data is being transmitted to the external device for local storage on the external device, which can be a battery-intensive process. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, a default state of the first selection affordance is the first state. Thus, in some embodiments, the default setting for a playlist newly added to the electronic device is to be automatically pushed.

In some embodiments, the user interface (e.g., 1272) includes a storage limit indicator (e.g., 1274, 1278) of the external device. In some examples, the storage limit indicator indicates the maximum storage capacity of the external device (e.g., "4 GB," "16 GB," "32 GB").

In some embodiments, the user interface (e.g., 1272) includes a storage bar (e.g., 1276) indicating storage information (e.g., types of data files stored on the external device, such as music, applications, photos, media) of the external device. In some examples, the different types of data files are indicated proportionally to one's respective amount of used storage within the storage bar by adjusting the length of mini-bars associated with the different data types within the storage bar. In some examples, the different types of data files are indicated using different colors. In some examples, while automatically transmitting data of the items associated with the first item group to the external device, the electronic device displays a status indicator (e.g., a status bar that indicates current progress by "filling up" the bar, text that indicates current progress (e.g., "updating 5 of 40")) indicating the current progress of the transmission.

In some embodiments, at block 1352, subsequent to transmitting the data of the items associated with the first item group to the external device, the electronic device (e.g., 1200) receives, via the wireless communication radio, updated storage information (reflecting the data transfer) of the external device. In some embodiments, at block 1354, in response to receiving the updated storage information of the external device, the electronic device (e.g., 1200) updates the storage bar to reflect the updated storage information. Updating the storage bar to reflect the updated storage information in response to receiving the updated storage information of the external device provides the user with easily recognizable feedback regarding the local storage status of the external device, which may have a limited amount of available local storage. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1300 (e.g., FIGS. 13A-13C) are also applicable in an analogous manner to the methods described above. For example, the method of navigating and selecting an audio item to play described in method 700 can be used to select audio items to be played through electronic device 1200. For another example, the method of navigating the displayed stack of stack items described in method 900 can be used to navigate audio items and select audio items to be played through electronic device 1200. For another example, the method of quickly and efficiently switching between user interfaces of active applications described in method 1100 can be used to switch amongst active applications on electronic device 1200. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. An electronic device, comprising:
 a touch-sensitive display;
 one or more processors; and
 memory storing one or more programs configured to be executed by the one or more processors, the one or more programs including instructions for:
  displaying, on the display, a first user interface, wherein the first user interface includes a scrollable plurality of audio playlist items associated with a plurality of audio playlists;
  receiving a first user input on a first audio playlist item of the plurality of audio playlist items;

in response to receiving the first user input on the first audio playlist item:
  displaying, on the display, a second user interface, wherein the second user interface includes:
    an indication of a first audio item of a first audio playlist associated with the first audio playlist item, and
    a first affordance; and
  displaying, on the display, an icon associated with the second user interface that includes an indication that the second user interface is currently displayed;
receiving a second user input on the second user interface;
in response to receiving the second user input on the second user interface:
  displaying, on the display, a third user interface, wherein the third user interface includes a plurality of audio items of the first audio playlist, and wherein the third user interface is different from the first user interface and the second user interface;
while displaying the first affordance, receiving user selection of the first affordance;
in response to receiving the user selection of the first affordance, displaying, via the display, a first add affordance;
receiving user selection of the first add affordance; and
in response to receiving the user selection of the first add affordance:
  storing the first audio item on the electronic device; and
  forgoing to store a second audio item of the plurality of audio items of the first audio playlist different from the first audio item.

2. The electronic device of claim 1, the one or more programs further including instructions for:
  in accordance with a determination that the first audio item is not contained in a media library associated with a user account that is logged into the electronic device, displaying, on the display, a second affordance;
  receiving user selection of the second affordance; and
  in response to receiving the user selection of the second affordance, causing the first audio item to be added to the media library.

3. The electronic device of claim 1, the one or more programs further including instructions for:
  in accordance with a determination that the first audio item is contained in a media library associated with a user account that is logged into the electronic device, displaying, on the display, an indication that the first audio item is contained in the media library.

4. The electronic device of claim 1, the one or more programs further including instructions for:
  while displaying the first user interface, receiving a third input;
  in response to receiving the third input, displaying, on the display, a plurality of menu affordances;
  receiving user selection of a first menu affordance of the plurality of menu affordances, wherein the first menu affordance is associated with a media library; and
  in response to receiving the user selection of the first menu affordance, displaying, on the display, one or more audio items associated with the media library.

5. The electronic device of claim 4, the one or more programs further including instructions for:
  while displaying the one or more audio items associated with the media library, receiving user selection of a third audio item of the one or more audio items associated with the media library; and
  in response to receiving the user selection of the third audio item, displaying, on the display, the second user interface, wherein the second user interface includes:
    a first indication of the third audio item, and
    a second indication indicating that the third audio item is contained in the media library.

6. The electronic device of claim 1, the one or more programs further including instructions for:
  subsequent to receiving the user selection of the first affordance, displaying, on the display, a second add affordance;
  receiving user selection of the second add affordance; and
  in response to receiving the user selection of the second add affordance, storing all of the plurality of audio items of the first audio playlist on the electronic device.

7. The electronic device of claim 1, the one or more programs further including instructions for:
  in response to receiving the first user input on the first audio playlist item, causing audio output of the first audio item.

8. The electronic device of claim 1, the one or more programs further including instructions for:
  while the electronic device has no connectivity with an external device that is storing a third audio item of the first audio playlist, receiving user selection of the third audio item; and
  in response to receiving the user selection of the third audio item of the first audio playlist:
    in accordance with a determination that the third audio item is stored on the electronic device, causing audio output of the third audio item, and
    in accordance with a determination that the third audio item is not stored on the electronic device, forgoing to cause audio output of the third audio item.

9. The electronic device of claim 1, the one or more programs further including instructions for:
  receiving user input on a third audio item of the plurality of audio items of the first audio playlist displayed on the third user interface, wherein the third audio item is different from the first audio item; and
  in response to receiving the user input on the third audio item:
    displaying, on the display, the second user interface, wherein the second user interface includes an indication of the third audio item, and
    causing audio output of the third audio item.

10. A non-transitory computer-readable storage medium storing one or more programs configured to be executed by one or more processors of an electronic device with a touch-sensitive display, the one or more programs including instructions for:
  displaying, on the display, a first user interface, wherein the first user interface includes a scrollable plurality of audio playlist items associated with a plurality of audio playlists;
  receiving a first user input on a first audio playlist item of the plurality of audio playlist items;

in response to receiving the first user input on the first audio playlist item:
  displaying, on the display, a second user interface, wherein the second user interface includes:
    an indication of a first audio item of a first audio playlist associated with the first audio playlist item, and
    a first affordance; and
  displaying, on the display, an icon associated with the second user interface that includes an indication that the second user interface is currently displayed;
receiving a second user input on the second user interface;
in response to receiving the second user input on the second user interface:
  displaying, on the display, a third user interface, wherein the third user interface includes a plurality of audio items of the first audio playlist, and wherein the third user interface is different from the first user interface and the second user interface;
while displaying the first affordance, receiving user selection of the first affordance;
in response to receiving the user selection of the first affordance, displaying, via the display, a first add affordance;
receiving user selection of the first add affordance; and
in response to receiving the user selection of the first add affordance:
  storing the first audio item on the electronic device; and
  forgoing to store a second audio item of the plurality of audio items of the first audio playlist different from the first audio item.

11. The non-transitory computer-readable storage medium of claim 10, the one or more programs further including instructions for:
  in accordance with a determination that the first audio item is not contained in a media library associated with a user account that is logged into the electronic device, displaying, on the display, a second affordance;
  receiving user selection of the second affordance; and
  in response to receiving the user selection of the second affordance, causing the first audio item to be added to the media library.

12. The non-transitory computer-readable storage medium of claim 10, the one or more programs further including instructions for:
  in accordance with a determination that the first audio item is contained in a media library associated with a user account that is logged into the electronic device, displaying, on the display, an indication that the first audio item is contained in the media library.

13. The non-transitory computer-readable storage medium of claim 10, the one or more programs further including instructions for:
  while displaying the first user interface, receiving a third input;
  in response to receiving the third input, displaying, on the display, a plurality of menu affordances;
  receiving user selection of a first menu affordance of the plurality of menu affordances, wherein the first menu affordance is associated with a media library; and
  in response to receiving the user selection of the first menu affordance, displaying, on the display, one or more audio items associated with the media library.

14. The non-transitory computer-readable storage medium of claim 13, the one or more programs further including instructions for:
  while displaying the one or more audio items associated with the media library, receiving user selection of a third audio item of the one or more audio items associated with the media library; and
  in response to receiving the user selection of the third audio item, displaying, on the display, the second user interface, wherein the second user interface includes:
    a first indication of the third audio item, and
    a second indication indicating that the third audio item is contained in the media library.

15. The non-transitory computer-readable storage medium of claim 10, the one or more programs further including instructions for:
  subsequent to receiving the user selection of the first affordance, displaying, on the display, a second add affordance;
  receiving user selection of the second add affordance; and
  in response to receiving the user selection of the second add affordance, storing all of the plurality of audio items of the first audio playlist on the electronic device.

16. The non-transitory computer-readable storage medium of claim 10, the one or more programs further including instructions for:
  in response to receiving the first user input on the first audio playlist item, causing audio output of the first audio item.

17. The non-transitory computer-readable storage medium of claim 10, the one or more programs further including instructions for:
  while the electronic device has no connectivity with an external device that is storing a third audio item of the first audio playlist, receiving user selection of the third audio item; and
  in response to receiving the user selection of the third audio item of the first audio playlist:
    in accordance with a determination that the third audio item is stored on the electronic device, causing audio output of the third audio item, and
    in accordance with a determination that the third audio item is not stored on the electronic device, forgoing to cause audio output of the third audio item.

18. The non-transitory computer-readable storage medium of claim 10, the one or more programs further including instructions for:
  receiving user input on a third audio item of the plurality of audio items of the first audio playlist displayed on the third user interface, wherein the third audio item is different from the first audio item; and
  in response to receiving the user input on the third audio item:
    displaying, on the display, the second user interface, wherein the second user interface includes an indication of the third audio item, and
    causing audio output of the third audio item.

19. A method, comprising:
at an electronic device with a touch-sensitive display:
  displaying, on the display, a first user interface, wherein the first user interface includes a scrollable plurality of audio playlist items associated with a plurality of audio playlists;
  receiving a first user input on a first audio playlist item of the plurality of audio playlist items;

in response to receiving the first user input on the first audio playlist item:
  displaying, on the display, a second user interface, wherein the second user interface includes:
    an indication of a first audio item of a first audio playlist associated with the first audio playlist item, and
    a first affordance; and
  displaying, on the display, an icon associated with the second user interface that includes an indication that the second user interface is currently displayed;
receiving a second user input on the second user interface;
in response to receiving the second user input on the second user interface:
  displaying, on the display, a third user interface, wherein the third user interface includes a plurality of audio items of the first audio playlist, and wherein the third user interface is different from the first user interface and the second user interface;
while displaying the first affordance, receiving user selection of the first affordance;
in response to receiving the user selection of the first affordance, displaying, via the display, a first add affordance;
receiving user selection of the first add affordance; and
in response to receiving the user selection of the first add affordance:
  storing the first audio item on the electronic device; and
  forgoing to store a second audio item of the plurality of audio items of the first audio playlist different from the first audio item.

20. The method of claim 19, further comprising:
in accordance with a determination that the first audio item is not contained in a media library associated with a user account that is logged into the electronic device, displaying, on the display, a second affordance;
receiving user selection of the second affordance; and
in response to receiving the user selection of the second affordance, causing the first audio item to be added to the media library.

21. The method of claim 19, further comprising:
in accordance with a determination that the first audio item is contained in a media library associated with a user account that is logged into the electronic device, displaying, on the display, an indication that the first audio item is contained in the media library.

22. The method of claim 19, further comprising:
while displaying the first user interface, receiving a third input;
in response to receiving the third input, displaying, on the display, a plurality of menu affordances;
receiving user selection of a first menu affordance of the plurality of menu affordances, wherein the first menu affordance is associated with a media library; and
in response to receiving the user selection of the first menu affordance, displaying, on the display, one or more audio items associated with the media library.

23. The method of claim 22, further comprising:
while displaying the one or more audio items associated with the media library, receiving user selection of a third audio item of the one or more audio items associated with the media library; and
in response to receiving the user selection of the third audio item, displaying, on the display, the second user interface, wherein the second user interface includes:
  a first indication of the third audio item, and
  a second indication indicating that the third audio item is contained in the media library.

24. The method of claim 19, further comprising:
subsequent to receiving the user selection of the first affordance, displaying, on the display, a second add affordance;
receiving user selection of the second add affordance; and
in response to receiving the user selection of the second add affordance, storing all of the plurality of audio items of the first audio playlist on the electronic device.

25. The method of claim 19, further comprising:
in response to receiving the first user input on the first audio playlist item, causing audio output of the first audio item.

26. The method of claim 19, further comprising:
while the electronic device has no connectivity with an external device that is storing a third audio item of the first audio playlist, receiving user selection of the third audio item; and
in response to receiving the user selection of the third audio item of the first audio playlist:
  in accordance with a determination that the third audio item is stored on the electronic device, causing audio output of the third audio item, and
  in accordance with a determination that the third audio item is not stored on the electronic device, forgoing to cause audio output of the third audio item.

27. The method of claim 19, further comprising:
receiving user input on a third audio item of the plurality of audio items of the first audio playlist displayed on the third user interface, wherein the third audio item is different from the first audio item; and
in response to receiving the user input on the third audio item:
  displaying, on the display, the second user interface, wherein the second user interface includes an indication of the third audio item, and
  causing audio output of the third audio item.

* * * * *